(12) United States Patent
Patolsky et al.

(10) Patent No.: US 11,929,486 B2
(45) Date of Patent: Mar. 12, 2024

(54) NANOSTRUCTURED COMPOSITE ELECTRODES

(71) Applicant: Technology Innovation Momentum Fund (Israel) Limited Partnership, Tel-Aviv (IL)

(72) Inventors: Fernando Patolsky, Tel-Aviv (IL); Guy Davidy, Tel-Aviv (IL); Nimrod Harpak, Tel-Aviv (IL)

(73) Assignee: Technology Innovation Momentum Fund (Israel) Limited Partnership, Tel-Aviv (IL)

( * ) Notice: Subject to any disclaimer, the term of this patent is extended or adjusted under 35 U.S.C. 154(b) by 586 days.

(21) Appl. No.: 16/760,491

(22) PCT Filed: Oct. 31, 2018

(86) PCT No.: PCT/IL2018/051161
§ 371 (c)(1),
(2) Date: Apr. 30, 2020

(87) PCT Pub. No.: WO2019/087187
PCT Pub. Date: May 9, 2019

(65) Prior Publication Data
US 2020/0358083 A1  Nov. 12, 2020

Related U.S. Application Data

(60) Provisional application No. 62/622,176, filed on Jan. 26, 2018, provisional application No. 62/579,520, filed on Oct. 31, 2017.

(51) Int. Cl.
*H01M 4/134* (2010.01)
*H01M 4/36* (2006.01)
(Continued)

(52) U.S. Cl.
CPC ............ *H01M 4/134* (2013.01); *H01M 4/366* (2013.01); *H01M 4/386* (2013.01); *H01M 4/662* (2013.01);
(Continued)

(58) Field of Classification Search
CPC ......... H01M 10/0525; H01M 2220/20; H01M 4/134; H01M 4/36; H01M 4/366;
(Continued)

(56) References Cited

U.S. PATENT DOCUMENTS 7,683,359 B2  3/2010  Green
8,017,430 B2  9/2011  Green
(Continued)

FOREIGN PATENT DOCUMENTS

CN  101684548  3/2010
CN  102460782  5/2012
(Continued)

OTHER PUBLICATIONS

Kim et al., Materials Letters, 2010, 64, 2306-2309. (Year: 2010).*
(Continued)

*Primary Examiner* — Zhongqing Wei

(57) ABSTRACT

Composite electrodes are described herein, comprising a stainless steel substrate and silicon-containing nanostructures extending from the substrate, as well as processes for preparing such electrodes without requiring a catalyst by pre-treatment of the steel. At least a portion of the silicon-containing nanostructures are characterized by: being substantially devoid of a non-silicon catalyst material and/or a noble metal; and/or including along its length a metal constituent originating from the steel substrate; and/or including a metal silicide extending from the substrate and along at least a portion of its length; and/or being fused with at least one other silicon-containing nanostructure at a
(Continued)

location removed from a surface of the substrate to form a sponge-like three-dimensional structure; and/or being stainless steel nanostructures having a layer of silicon disposed thereon.

8 Claims, 101 Drawing Sheets
(82 of 101 Drawing Sheet(s) Filed in Color)

(51) Int. Cl.
  *H01M 4/38* (2006.01)
  *H01M 4/66* (2006.01)
  *H01M 10/0525* (2010.01)
(52) U.S. Cl.
  CPC .... *H01M 10/0525* (2013.01); *H01M 2220/20* (2013.01)
(58) Field of Classification Search
  CPC ........ H01M 4/38; H01M 4/386; H01M 4/662; H01M 10/052; H01M 4/0421; H01M 4/049; H01M 4/1395; H01M 4/58; H01M 4/667; H01M 4/669; H01M 4/00; H01M 10/00
  See application file for complete search history.

(56) References Cited

U.S. PATENT DOCUMENTS

| | | | |
|---|---|---|---|
| 8,637,185 | B2 | 1/2014 | Berdichevsky et al. |
| 8,956,765 | B2 | 2/2015 | Wang et al. |
| 9,105,921 | B2 | 8/2015 | Pushparaj et al. |
| 9,761,877 | B2 | 9/2017 | Rosso et al. |
| 2007/0215249 | A1* | 9/2007 | Lunner ............... C21C 7/076 75/416 |
| 2010/0285358 | A1* | 11/2010 | Cui .................. H01M 4/661 429/231.5 |
| 2011/0114145 | A1 | 5/2011 | Yang |
| 2011/0189510 | A1 | 8/2011 | Caracciolo |
| 2011/0215441 | A1 | 9/2011 | Lin et al. |
| 2013/0220821 | A1 | 8/2013 | Cho |
| 2014/0183450 | A1 | 7/2014 | Shelke |
| 2015/0325852 | A1 | 11/2015 | Wang et al. |
| 2015/0337438 | A1 | 11/2015 | Hong et al. |
| 2015/0372290 | A1 | 12/2015 | Li et al. |
| 2016/0305011 | A1 | 10/2016 | Wang et al. |
| 2017/0309903 | A1 | 10/2017 | Peled et al. |

FOREIGN PATENT DOCUMENTS

| | | |
|---|---|---|
| CN | 102942184 | 2/2013 |
| CN | 103764544 | 4/2014 |
| CN | 104409686 | 3/2015 |
| CN | 104685678 | 6/2015 |
| EP | 2927192 | 10/2015 |
| JP | 2010-262752 | 11/2010 |
| JP | 2016-030854 | 3/2016 |
| KR | 10-0709860 | 4/2007 |
| WO | WO 2010/129910 | 11/2010 |
| WO | WO 2019/087187 | 5/2019 |
| WO | WO 2019/087188 | 5/2019 |

OTHER PUBLICATIONS

Supplementary European Search Report and the European Search Opinion dated Aug. 10, 2021 From the European Patent Office Re. Application No. 18874378.5. (22 Pages).
Xie et al. "In Situ Formation of Indium Catalysts to Synthesize Crystalline Silicon Nanowires on Flexible Stainless Steel Substrates by PECVD", Journal of Crystal Growth, 347(1):7-10, May 15, 2012.
Notification of Office Action and Search Report dated Sep. 2, 2022 From the State Intellectual Property Office of the People's Republic of China Re. Application No. 201880075535.1 and Its Summary of Office Action in English. (15 Pages).
International Preliminary Report on Patentability dated May 14, 2020 From the International Bureau of WIPO Re. Application No. PCT/IL2018/051161. (8 Pages).
International Preliminary Report on Patentability dated May 14, 2020 From the International Bureau of WIPO Re. Application No. PCT/IL2018/051162. (8 Pages).
International Search Report and the Written Opinion dated Feb. 11, 2019 From the International Searching Authority Re. Application No. PCT/IL2018/051162. (16 Pages).
International Search Report and the Written Opinion dated Feb. 12, 2019 From the International Searching Authority Re. Application No. PCT/IL2018/051161. (14 Pages).
Beaulieu et al. "Colossal Reversible Volume Changes in Lithium Alloys", Electrochemical and Solid-State Letters, 4(9): A137-A140, Available Online Jul. 5, 2001.
Beaulieu et al. "Reaction of Li With Alloy Thin Films Studied by In Situ AFM", Journal of the Electrochemical Society, 150(11): A1457-A1464, Available Online Sep. 19, 2003.
Ben Ishai et al. "Shape- and Dimension-Controlled Single-Crystalline Silicon and SiGe Nanotubes: FET Devices", Journal of the American Chemical Society, JACS, 131(10): 3679-3689, Feb. 18, 2009.
Besenhard et al. "Will Advanced Lithium-Alloy Anodes Have a Chance in Lithium-Ion Batteries?", Journal of Power Sources, 68(1): 87-90, Sep. 1997.
Chan et al. "High-Performance Lithium Battery Anodes Using Silicon Nanowires", Nature Nanotechnology, 3(1): 31-35, Published Online Dec. 16, 2007.
Chou et al. "Microstructures and Mechanical Properties of Thin Films of Aluminium Oxide", Scripta Metallurgica et Materialia, 25(10): 2203-2208, Oct. 1991.
Cohen et al. "Novel Rechargeable 3D-Microbatteries on 3D-Printed-Polymer Substrates: Feasibility Study", Electrochimica Acta, 265: 690-701, Mar. 1, 2018.
Deshpande et al. "Modeling Diffusion-Induced Stress in Nanowire Electrode Structures", 195(15): 5081-5088, Available Online Feb. 18, 2010.
Istratov et al. "Iron and Its Complexes in Silicon", Applied Physics A: Materials Science & Processing, 69(1): 13-44, Published Online May 26, 1999.
Kim et al. "Lithiation of Rutile TiO2 Coated Si NWs Observed by In-Situ TEM", Chemistry of Materials, 27(20): 6929-6933, Published Online Oct. 1, 2015.
Kim et al. "Self-Catalytic Growth of Silicon Nanowires on Stainless Steel", Materials Letters, 64(21): 2306-2309, Available Online Jun. 23, 2010.
Li et al. "Carbon Nanotube-Enhanced Growth of Silicon Nanowires as an Anode for High-Performance Lithium-Ion Batteries", Advanced Energy Materials, 2(1): 87-93, Published Online Dec. 12, 2011.
Liu et al. "Size-Dependent Fracture of Silicon Nanoparticles During Lithiation", ACS Nano, 6(2): 1522-1531, Published Online Jan. 4, 2012.
Peled "The Electrochemical Behavior of Alkali and Alkaline Earth Metals in Nonaqueous Battery Systems—The Solid Electrolyte Interphase Model", Journal of the Electrochemical Society, 126(12): 2047-2051, Dec. 1979.
Peled et al. "Review—SEI: Past, Present and Future", Journal of the Electrochemical Society, 164(7): A1703-A1719, Published Online Jun. 6, 2017.
Peled et al. "Tissue-Like Silicon Nanowires-Based Three-Dimensional Anodes for High-Capacity Lithium Ion Batteries", Nano Letters, 15(6): 3907-3916, Published Online May 18, 2015.
Ryu et al. "Failure Modes of Silicon Powder Negative Electrode in Lithium Secondary Batteries", Electrochemical and Solid-State Letters, 7(10): A306-A309, Available Online Sep. 3, 2004.
Strauss et al. "Charge and Mass Transport Properties of LiI-P(EO)n-Al2O3-Based Composite Polymer Electrolytes", Electrochimica Acta, 43(10-11): 1315-1320, Apr. 30, 1998.

(56) References Cited

OTHER PUBLICATIONS

Wu et al. "Stable Cycling of Double-Walled Silicon Nanotube Battery Anodes Through Solid-Electrolyte Interphase Control", Nature Nanotechnology, 7(5): 310-315, Published Online Mar. 25, 2012.
Notification of Office Action and Search Report dated Mar. 3, 2023 From the State Intellectual Property Office of the People's Republic of China Re. Application No. 201880075535.1 and Its Translation Into English. (7 Pages).

\* cited by examiner

| Atom % | Wt.% Error | Element Wt.% | ZAF | Element Line |
|---|---|---|---|---|
| 7.25 | ± 0.51 | 2.52 | 3.072 | C K |
| 44.30 | ± 0.74 | 20.51 | 1.422 | O K |
| 11.78 | ± 1.37 | 17.73 | 0.980 | Cr K |
| 1.89 | ± 1.46 | 3.00 | 1.090 | Mn K |
| 34.79 | ± 5.18 | 56.24 | 1.090 | Fe K |
| .......... | | .......... | | |
| 100.00 | | 100.00 | | Total |

| | condition | Capacity after 40 cycles [mAh/cm²] | STDEV | \|ΔC\| = C before rolling - C after rolling [mAh/cm²] |
|---|---|---|---|---|
| BATCH 1 | Before rolling | 4.65 | 0.006 | 0.03 |
| | After rolling | 4.68 | 0.212 | |
| BATCH 2 | Before rolling | 4.91 | 0.264 | 1.17 |
| | After rolling | 3.74 | 0.127 | |
| BATCH 3 | Before rolling | 3.91 | 0.206 | 0.66 |
| | After rolling | 3.25 | 0.521 | |

FIG. 80D

NANOSTRUCTURED COMPOSITE ELECTRODES

FIELD AND BACKGROUND OF THE INVENTION

The present invention, in some embodiments thereof, relates to electrochemistry and more particularly, but not exclusively, to silicon-based electrodes which are usable, for example, in energy storage devices such as lithium ion batteries.

One of the most common energy storage devices is the battery, along with fuel cells and capacitors. One of the most investigated areas regarding batteries is the search for new materials to serve as anodes or cathodes with increased capacity, cycle life and overall performance improvement, relative to currently practiced technologies. The lithium ion battery, in particular, has been subject to considerable degree of interest.

Commercial lithium ion batteries typically have graphite as their anode material, reaching a theoretical capacity of 372 mAh/g. While graphite is characterized by high stability and long cycle life, due to relatively low volumetric change, it has been recognized that replacing graphite with silicon may help to meet the demand for higher capacities. Silicon is both abundant and has a theoretical capacity versus lithium which reaches 4200 mAh/g, which is an order of magnitude higher than that of graphite.

However, currently available silicon anodes suffer from several clear disadvantages. One such disadvantage of silicon is the large volumetric change of the silicon structure during lithiation and de-lithiation phases (~320% volumetric expansion) [Beaulieu et al., *J Electrochem Soc* 2003, 150: A1457-A1464]. These volumetric changes result in the cracking and pulverization of the anode, leading to rapid degradation of the silicon anode [Beaulieu et al., *Electrochem Solid-State Lett* 2001, 4:A137-A140; Besenhard et al., *J Power Sources* 1997, 68:87-90; Ryu et al., *Electrochem Solid-State Lett* 2004, 7:A306-A309]. Furthermore, the volumetric expansion that causes cracks and pulverization also allows the formation of a new solid electrolyte interface (SEI) [Peled, *J Electrochem Soc* 1979, 126:2047-2051], which causes a rapid decay in capacity and increase in impedance due to the insulating nature of this layer, and which builds up as the battery progresses through time, all the while slowing down electrolyte decomposition into the silicon material.

One way to handle the considerable pulverization of silicon anodes is to reduce the size of the silicon material to the nanoscale rather than using bulk silicon. The high surface-to-volume ratio of nanoscale silicon objects increases the ability of the structure to withstand stress, thus limiting the effect of the cracking of the material [Deshpande et al., *J Power Sources* 2010, 195:5081-5088]. Many types of silicon nanostructures (SiNS) have been investigated, including silicon nanoparticles (SiNP), nanotubes (SiNT), core-shell structures, and nanowires (SiNW).

Liu et al. [*ACS Nano* 2012, 6:1522-1531] reports that upon first lithiation of silicon nanoparticles (observed via transmission electron microscopy), particles larger than ~150 nm exhibit cracks on the surface.

Cracking of silicon particles can cause loss of contact with the current collector along with further SEI formation, eventually leading to rapid capacity decay. A considerable disadvantage of using SiNPs as the anode material is that the harvesting of SiNPs smaller than 150 nm from a bulk material requires grinding, milling and forms of clean extraction in order to successfully use these nanoparticles for battery applications. Furthermore, once the SiNPs are ready for use, the need for binder material in order to create good and conductive electrical contact with the current collector also limits the process.

SiNWs and SiNTs also pose some constraints regarding the size of the silicon structure due to their greater stress resilience.

Wu et al. [*Nat Nanotechnol* 2012, 7:310-315] reports subjecting ~30 nm double-walled SiNTs composed of Si and Si oxide, at a density of ~16 μg/cm$^2$, to 6000 cycles at 12 C rate using, reaching a capacity of 940 mAh/gram under such conditions. Polymer nanofibers were prepared by electrospinning, followed by carbonization and silicon coating, followed by heating in order to remove the carbon layer and create a thicker oxide layer.

While reaching very high cyclability in their lithium ion battery, the methodology of Wu et al. is impractical for several reasons: (i) the production of SiNTs as described therein, as well as production of SiNTs by alternative techniques (e.g., as described by [Ben-Ishai & Patolsky, *J Am Chem Soc* 2009, 131:3679-3689]), is complicated, and requires several stages to complete, thereby harming the scalability of the process; and (ii) the reported density of the SiNTs corresponds to an electrode capacity of about 0.015 mAh/cm$^2$, which is very low for a practical lithium ion battery.

Chan et al. [*Nat Nanotechnol* 2008, 3:31-35] reported a high-capacity lithium ion battery using SiNWs that were grown directly on the current collector, allowing for direct electron transport and good electrical contact. Very high capacities were reported, with the theoretical capacity being achieved at the first charge cycle at C/20 rate. However, a coulombic efficiency of only ~90% was reported.

Peled et al. [*Nano Lett* 2015, 15:3907-3916] describes growing SiNWs on a SGL25AA carbon fabric using CVD and the vapor-liquid-solid (VLS) method. The fabric serves as a three dimensional (3D), open structured surface upon which gold nanoparticles attach using poly-L-lysine via electrostatic interactions.

Additional background art includes Chou et al. [*Scr Metall Mater* 1991, 25:2203-2208]; Istratov et al. [*Appl Phys A* 1999, 69:13-44]; Kim et al. [*Materials Lett* 2010, 64:2306-2309]; Kim et al. [*Chem Mater* 2015, 27:6929-6933]; Li et al. [*Adv Energy Mater* 2012, 2:87-93]; and Peled & Menkin [*J Electrochem Soc* 2017, 164:A1703-A1719]; and U.S. Pat. Nos. 7,683,359, 8,017,430, and 8,637,185.

SUMMARY OF THE INVENTION

According to an aspect of some embodiments of the invention, there is provided a composite electrode, comprising:
 a stainless steel substrate; and
 a plurality of silicon-containing nanostructures extending from the stainless steel substrate,
 wherein in at least a portion, or in all, of the plurality of silicon-containing nanostructures, each of the silicon-containing nanostructures is characterized by at least one of:
  being substantially devoid of a non-silicon catalyst material; and/or
  being substantially devoid of a noble metal; and/or
  including along its length a metal constituent originating from the stainless steel substrate; and/or including a metal silicide extending from the stainless steel substrate and along at least a portion of its length; and/or being fused with at least one other silicon-containing nanostructure at a location removed from a surface of the stainless steel substrate to form a sponge-like three-dimensional structure; and/or being stainless steel nanostructures having a layer of silicon disposed thereon.

According to an aspect of some embodiments of the invention, there is provided a composite electrode comprising:

a stainless steel body, an outer surface of the stainless steel body including a plurality of elongated stainless steel nanostructures extending from the stainless steel body; and a layer of silicon disposed on each of the plurality of elongated stainless steel nanostructures.

According to an aspect of some embodiments of the invention, there is provided a process of preparing a composite electrode, the process comprising:

contacting a stainless steel substrate with hydrofluoric acid (HF); and subsequent to the aforementioned contacting, subjecting the substrate to conditions for growing a silicon-containing nanostructure which extends from the substrate.

According to an aspect of some embodiments of the invention, there is provided a process of preparing a composite electrode, the method comprising:

contacting a stainless steel body with a gaseous environment containing hydrogen gas a temperature of from about 850° C. to about 1200° C., thereby growing a plurality of elongated stainless steel nanostructures extending from the stainless steel body through exposure to the environment; and forming a layer of silicon on each of the plurality of elongated stainless steel nanostructures.

According to some of any of the embodiments of the invention, in at least a portion, or in all, of the plurality of silicon-containing nanostructures, each of the silicon-containing nanostructures is characterized by at least one of:

being substantially devoid of a non-silicon catalyst material; and/or being substantially devoid of a noble metal; and/or including along its length a metal constituent originating from the stainless steel substrate; and/or including a metal silicide extending from the stainless steel substrate and along at least a portion of its length; and/or being fused with at least one other silicon-containing nanostructure at a location removed from a surface of the stainless steel substrate to form a sponge-like three-dimensional structure.

According to some of any of the embodiments of the invention, at least a portion of the silicon-containing nanostructures is substantially devoid of a metallic material usable as non-silicon catalyst in vapor-liquid-solid growth of silicon nanostructures.

According to some of any of the embodiments of the invention referring to a metallic material, the metallic material comprises a noble metal.

According to some of any of the embodiments of the invention, at least a portion of the silicon-containing nanostructures is substantially devoid of a noble metal.

According to some of any of the embodiments of the invention, each of the plurality of silicon-containing nanostructures is substantially devoid of a non-silicon catalyst material.

According to some of any of the embodiments of the invention referring to a non-silicon catalyst material, the non-silicon catalyst material is usable in vapor-liquid-solid growth of silicon nanostructures.

According to some of any of the embodiments of the invention referring to a non-silicon catalyst material, the non-silicon catalyst material is a metallic catalyst material.

According to some of any of the embodiments of the invention, each of the plurality of silicon-containing nanostructures is substantially devoid of a noble metal.

According to some of any of the embodiments of the invention referring to a noble metal, the noble metal comprises gold.

According to some of any of the embodiments of the invention, in in at least a portion, or in all, of the plurality of silicon-containing nanostructures, each silicon-containing nanostructure includes along its length one or more metal constituents originating from the stainless steel substrate.

According to some of any of the embodiments of the invention relating to a metal constituent, the metal constituent is selected from nickel, copper and iron.

According to some of any of the embodiments of the invention, in at least a portion, or in all, of the plurality of nanostructures, each of the silicon-containing nanostructures includes a metal silicide extending from the stainless steel substrate and along at least a portion of its length.

According to some of any of the embodiments of the invention, in at least a portion, or in all, of the plurality of silicon-containing nanostructures, each of the silicon-containing nanostructures is fused with at least one other silicon-containing nanostructure at a location removed from a surface of the stainless steel substrate to form a sponge-like three-dimensional structure.

According to some of any of the embodiments of the invention, the plurality of silicon-containing nanostructures forms a three-dimensional network of crossing strands.

According to some of any of the embodiments of the invention, in at least a portion, or all, of the plurality of silicon-containing nanostructures, each of the silicon-containing nanostructures includes a crystalline core and a semi-amorphous shell.

According to some of any of the embodiments of the invention, in at least a portion, or in all, of the plurality of silicon-containing nanostructures, each silicon-containing nanostructure has a length of between 20 micrometers and 300 micrometers.

According to some of any of the embodiments of the invention, in at least a portion, or in all, of the plurality of silicon-containing nanostructures, each silicon-containing nanostructure has a diameter of between 10 nm and 300 nm.

According to some of any of the embodiments of the invention, at least a portion of the silicon-containing nanostructures comprises silicon nanowires.

According to some of any of the embodiments of the invention relating to a layer of silicon, the layer of silicon substantially coats an outer surface of at least a portion, or each, of the plurality of stainless steel nanostructures.

According to some of any of the embodiments of the invention relating to a layer of silicon, the layer of silicon has a thickness of from about 6 nm to about 200 nm.

According to some of any of the embodiments of the invention relating to stainless steel nanostructures, the plurality of elongated stainless steel nanostructures forms a three-dimensional network of crossing strands.

According to some of any of the embodiments of the invention relating to stainless steel nanostructures, the plurality of elongated stainless steel nanostructures forms a sponge-like nanoporous stainless steel network at the outer surface of the stainless steel body.

According to some of any of the embodiments of the invention relating to stainless steel nanostructures, each of the plurality of elongated stainless steel nanostructures has a length of between 20 micrometers and 300 micrometers.

According to some of any of the embodiments of the invention relating to stainless steel nanostructures, each of the plurality of stainless steel nanostructures has a diameter of between 30 nm and 90 nm.

According to some of any of the embodiments of the invention relating to contacting with HF, following the contacting, a nanoporous surface structure including a plurality of nanostructure growth seed sites on the stainless steel substrate is obtained, and growing the silicon nanostructure is from at least a portion, or from each, of the plurality of nanostructure growth seed sites.

According to some of any of the embodiments of the invention relating to contacting with HF, contacting is with an aqueous HF solution.

According to some of any of the embodiments of the invention relating to contacting with HF, a concentration of the HF ranges from 5% and 15%, by weight.

According to some of any of the embodiments of the invention relating to contacting with HF, the contacting is for a time period of from 10 minutes to 60 minutes.

According to some of any of the embodiments of the invention relating to a silicon-containing nanostructure, growing the silicon-containing nanostructure is performed through vapor deposition, using a silicon precursor.

According to some of any of the respective embodiments of the invention, the silicon precursor is 99.5% silane.

According to some of any of the embodiments of the invention relating to vapor deposition, the vapor deposition occurs at a temperature of between 400° C. and 500° C.

According to some of any of the embodiments of the invention relating to vapor deposition, the vapor deposition occurs at a pressure of at least 1 Torr.

According to some of any of the embodiments of the invention relating to vapor deposition, the vapor deposition occurs for between 5 minutes and 90 minutes.

According to some of any of the embodiments of the invention relating to a process, the process further comprises, subsequent to growing the nanostructure, subjecting the nanostructure to heat treatment.

According to some of any of the embodiments of the invention relating to a heat treatment, the heat treatment is in an atmosphere of hydrogen gas or in a vacuum.

According to some of any of the embodiments of the invention relating to a heat treatment, the heat treatment is for a time period that ranges from 2 to 8 minutes.

According to some of any of the embodiments of the invention relating to a heat treatment, the heat treatment occurs at a temperature between 650° C. and 850° C.

According to some of any of the embodiments of the invention relating to a process, the conditions provide a silicon-containing nanostructure featuring at least one dimension of from about 10 nm to about 200 nm.

According to some of any of the embodiments of the invention relating to a process of preparing a composite electrode, the composite electrode is as described herein, according to any of the respective embodiments.

According to some of any of the embodiments of the invention relating to a gaseous environment, a concentration of said hydrogen gas in said gaseous environment is from 1 to 10%, by volume.

According to some of any of the embodiments of the invention relating to a gaseous environment, the gaseous environment further includes at least one of nitrogen or argon gas.

According to some of any of the embodiments of the invention relating to contacting with a gaseous environment, the contacting is for a time period of at least 30 minutes.

According to some of any of the embodiments of the invention relating to a layer of silicon, forming the layer of silicon comprises vapor deposition of silicon at a temperature of from about 380° C. to about 550° C.

According to some of any of the embodiments of the invention relating to a layer of silicon, forming the layer of silicon comprises vapor deposition of silicon for a time period of from about 30 minutes to about 180 minutes.

According to some of any of the embodiments of the invention relating to a layer of silicon, forming the layer of silicon comprises vapor deposition of silicon using a silane gas precursor.

According to some of any of the embodiments of the invention relating to a layer of silicon, forming the layer of silicon comprises vapor deposition of silicon at a pressure of from about 1 Torr to about 25 Torr.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data.

Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

The file of this patent contains at least one drawing executed in color. Copies of this patent with color drawings will be provided by the Patent and Trademark Office upon request and payment of the necessary fee.

Figure 1:
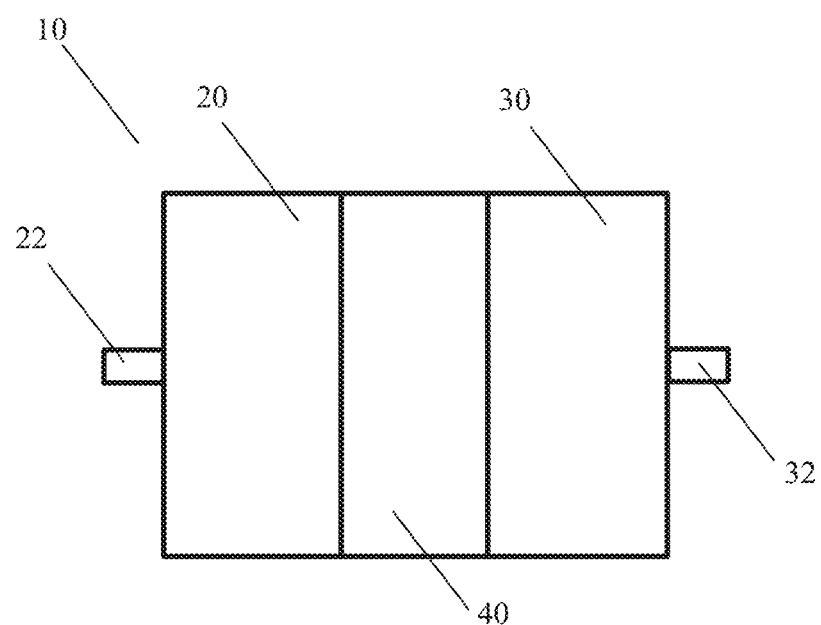

FIG. 1 depicts a battery comprising a silicon-based electrode according to some embodiments of the invention.

Figure 2A:
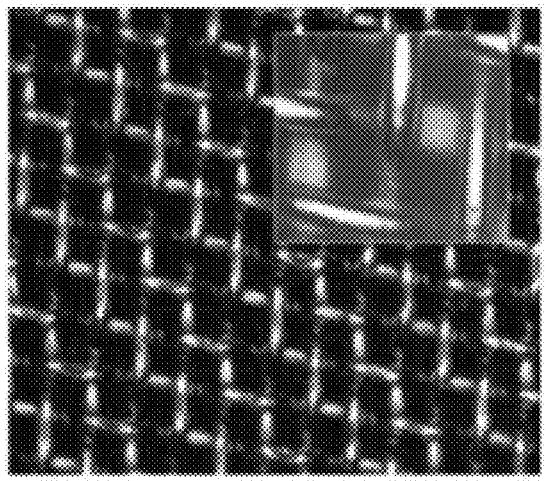
Figure 2B:
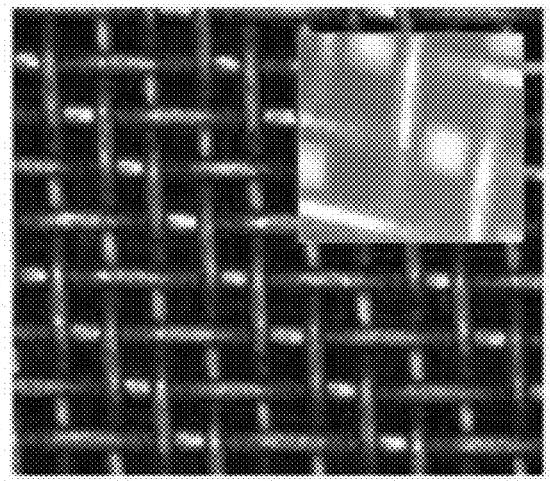
Figure 2C:
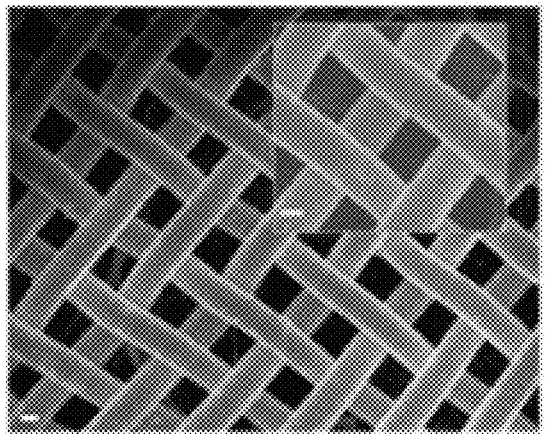
Figure 2D:
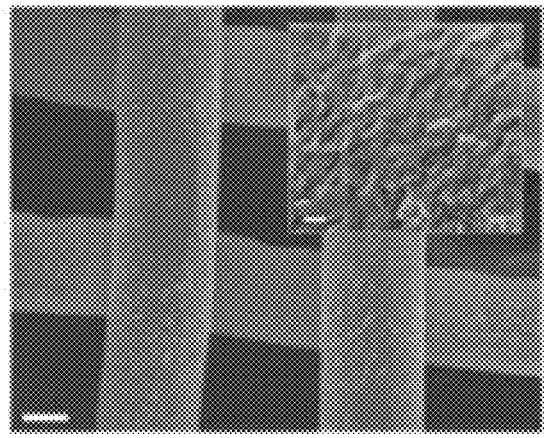

FIGS. 2A-2D present optical microscopy images (FIGS. 2A and 2B; dark-field images, with bright-field images in insets) and high-resolution scanning electron microscopy images (FIGS. 2C and 2D) of stainless steel mesh treated with 40% HF for 30 minutes (FIGS. 2B and 2D) and untreated (as-received) stainless steel mesh (FIGS. 2A and 2C); scale bars in FIGS. 2C and 2D represent 10 μm, except for inset of FIG. 2D in which scale bar represents 1 μm (insets in all figures are at higher magnification).

Figure 3A:
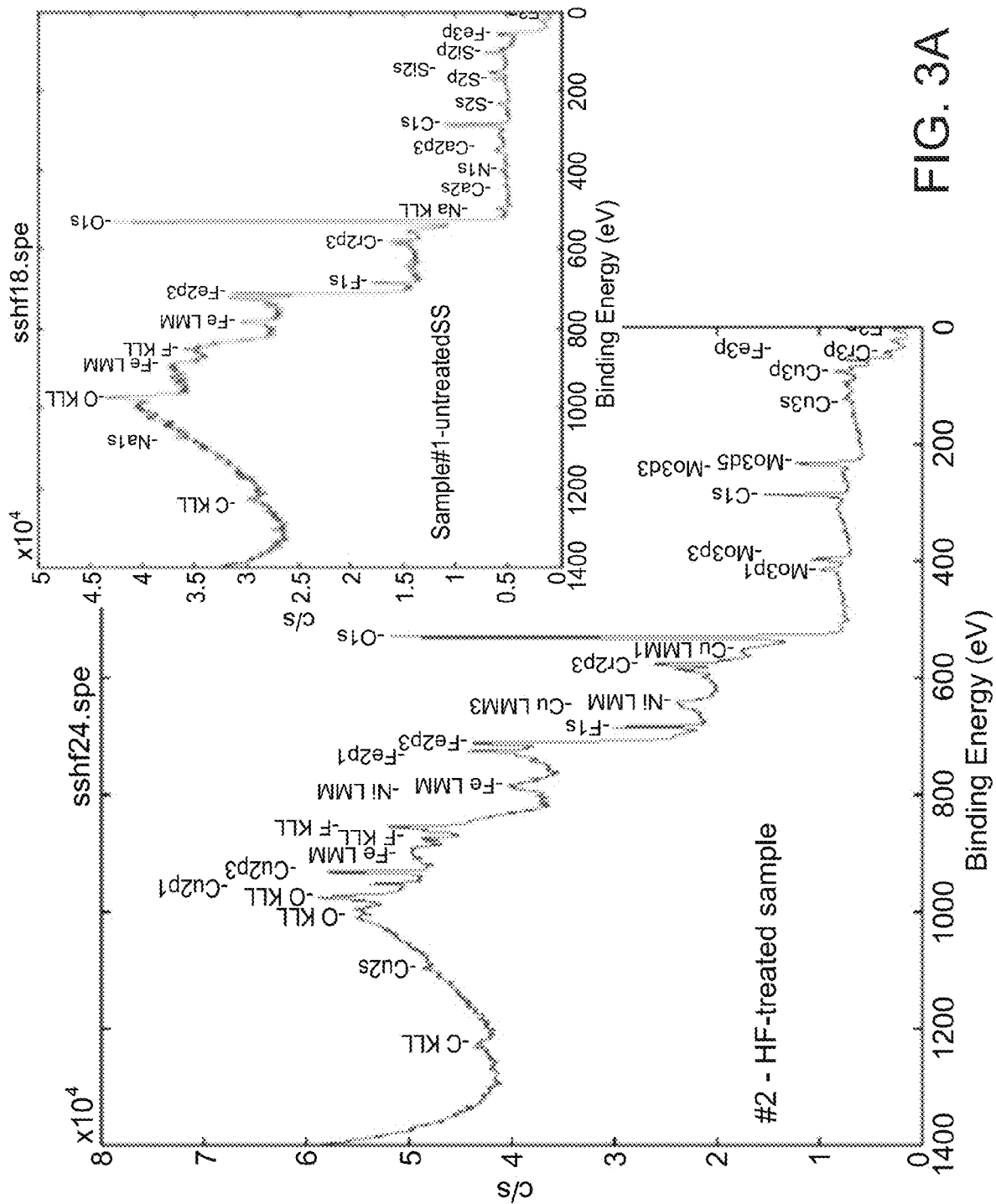
Figure 3B:
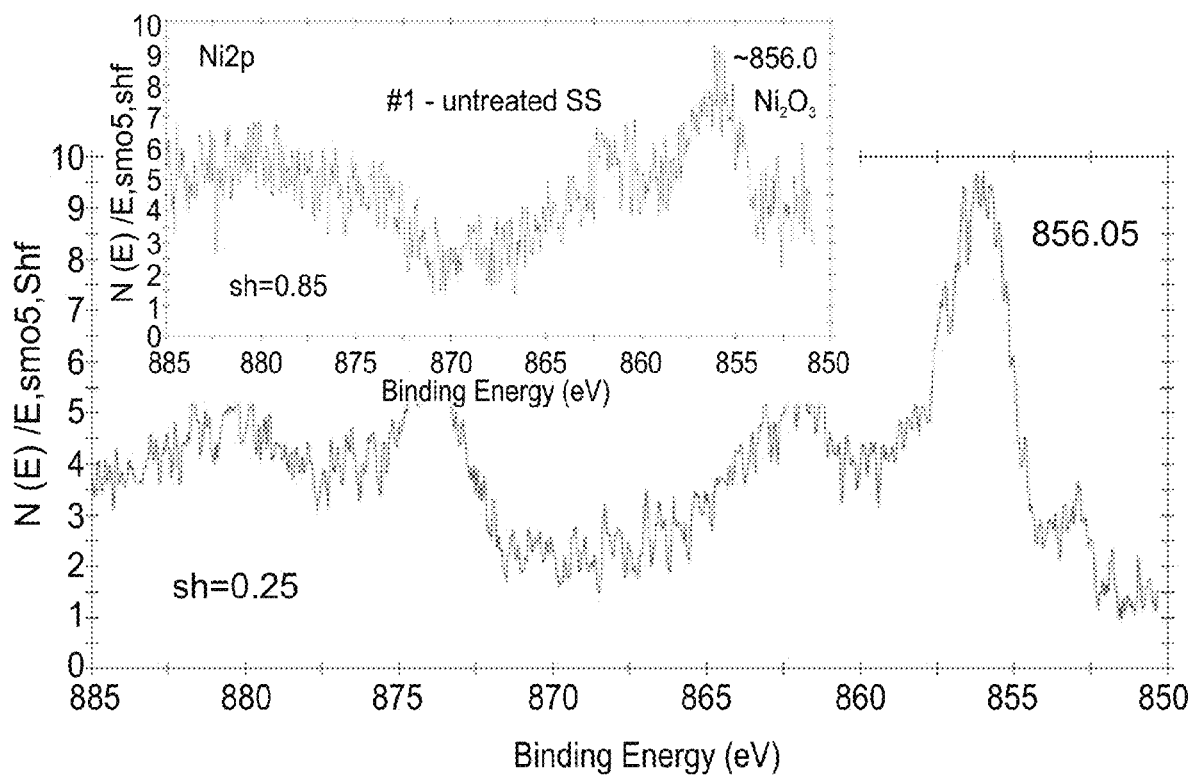
Figure 3C:
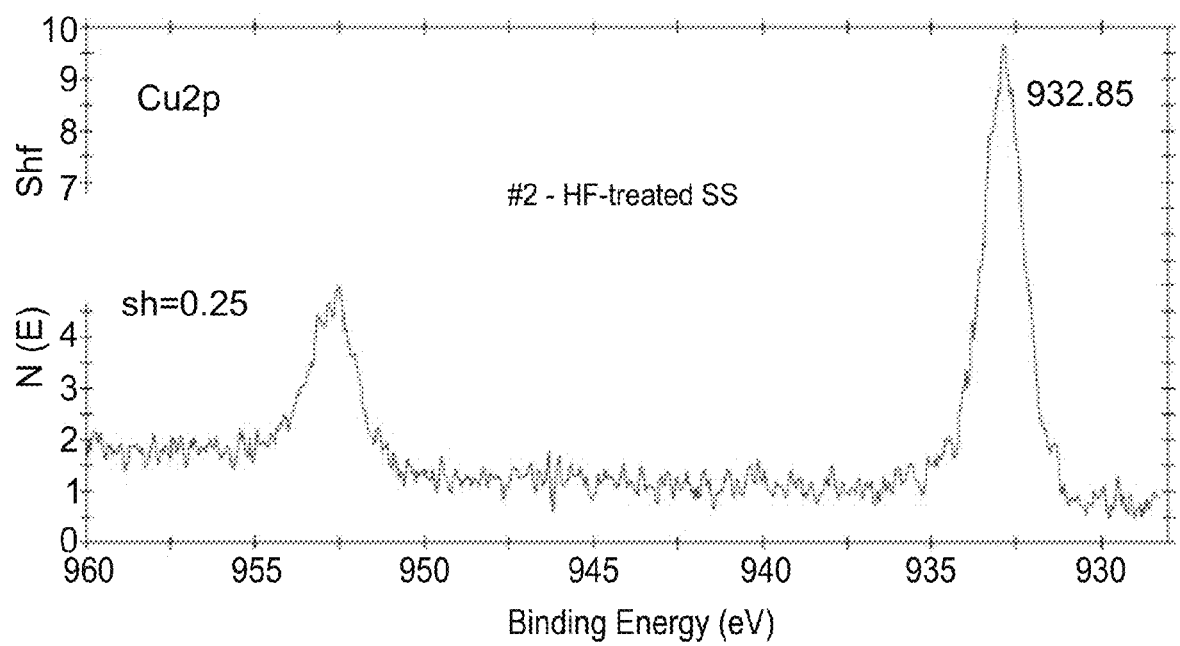

FIGS. 3A-3C present X-ray photoelectron spectroscopy (XPS) spectra of stainless steel (grade 316) treated with 40% HF for 30 minutes; FIG. 3B shows the portion of the spectrum in FIG. 3A containing nickel peaks, and FIG. 3C shows the portion of the spectrum in FIG. 3A containing copper peaks (insets present corresponding spectra of untreated control steel).

Figure 4A:
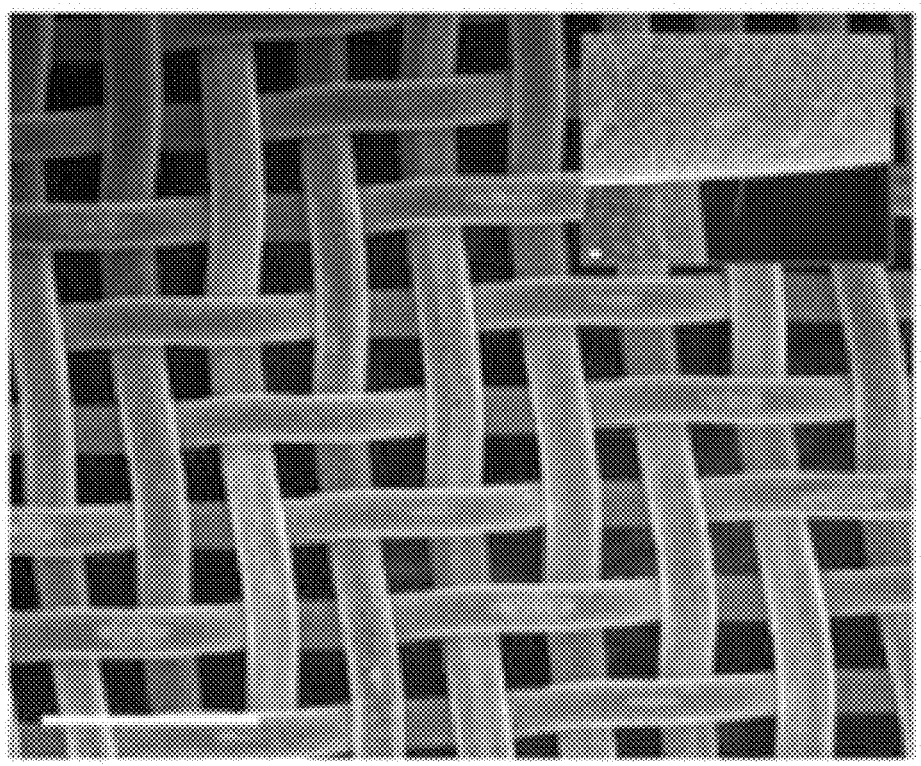
Figure 4B:
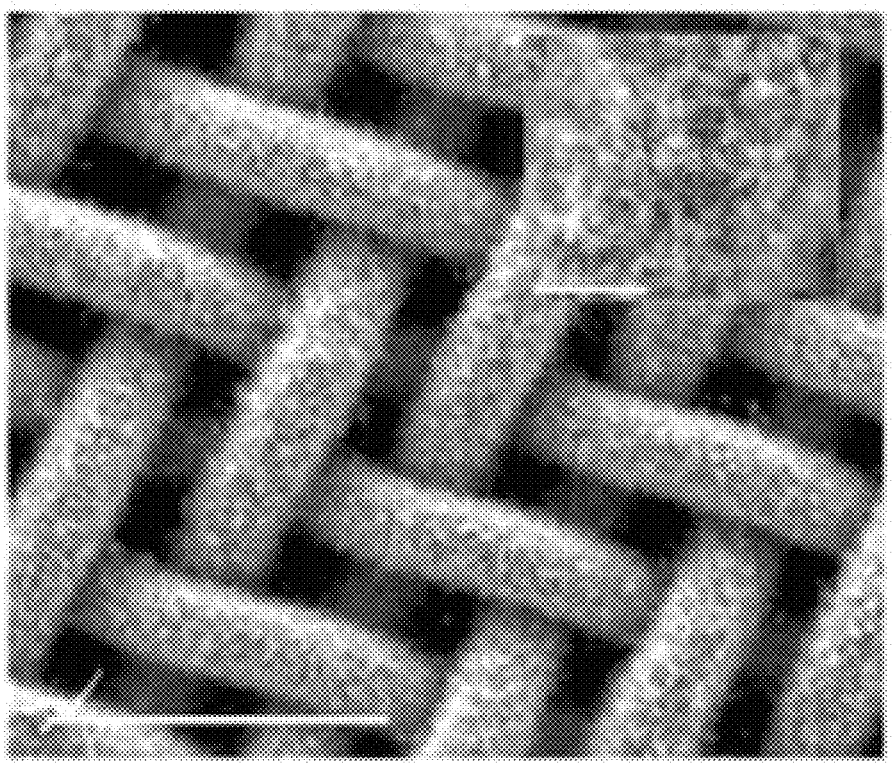

FIGS. 4A and 4B present scanning electron microscopy images of stainless steel mesh with (FIG. 4B) or without (FIG. 4A) treatment with 40% HF for 30 minutes, followed by chemical vapor deposition of silicon for 1 hour; silicon density in FIG. 4B was 1.18 mg/cm$^2$; scale bars represent 100 μm, except for insets in which scale bar represents 1 μm (FIG. 4A) or 10 μm (FIG. 4B).

Figure 5A:
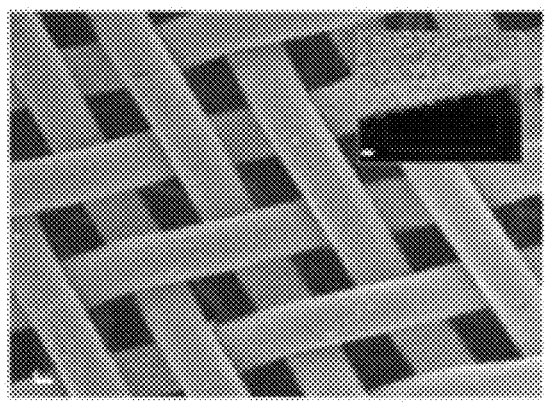
Figure 5B:
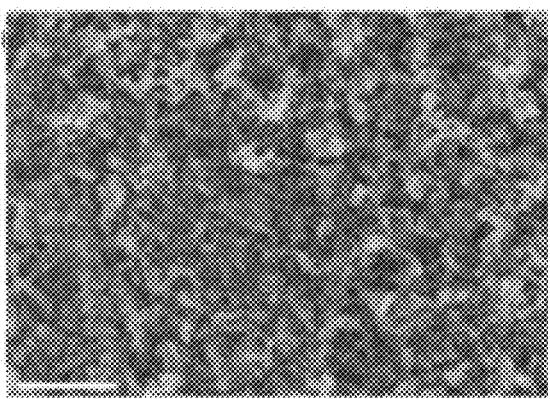
Figure 5C:
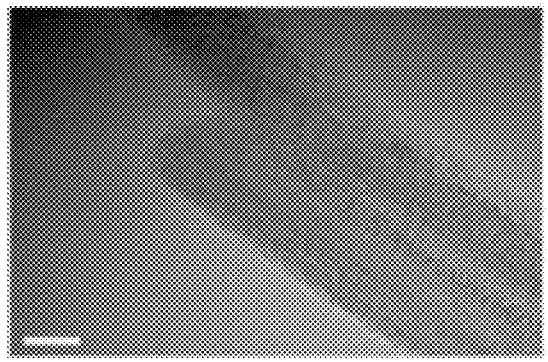
Figure 5D:
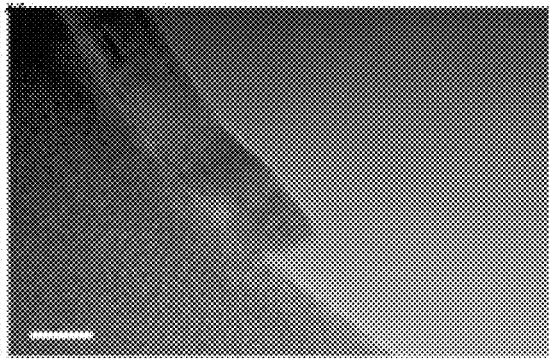
Figure 6A:
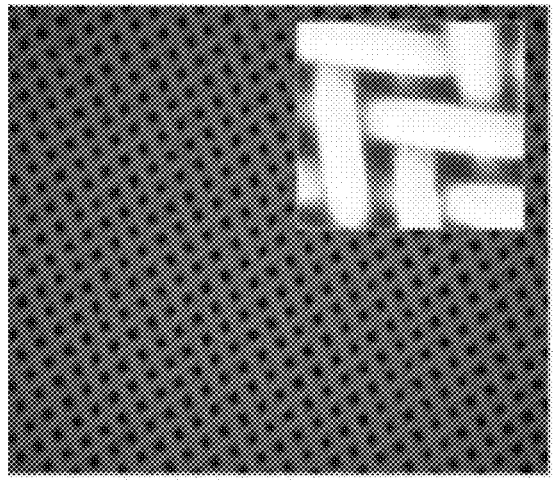
Figure 6B:
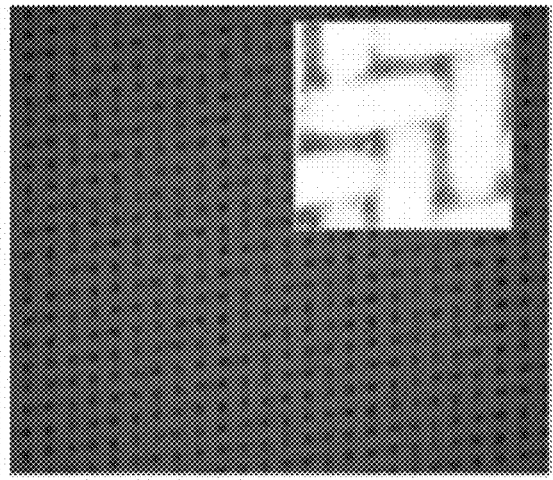
Figure 6C:
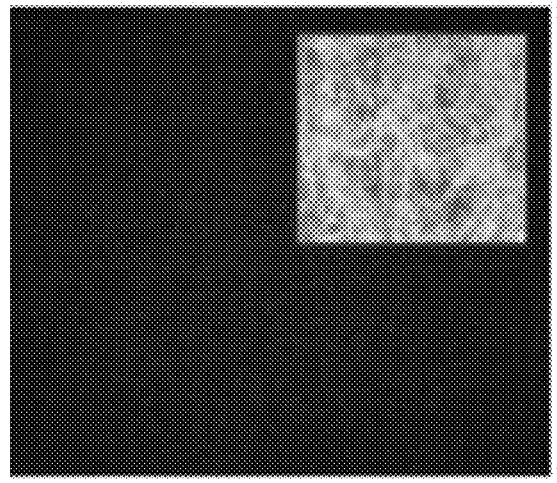
Figure 6D:
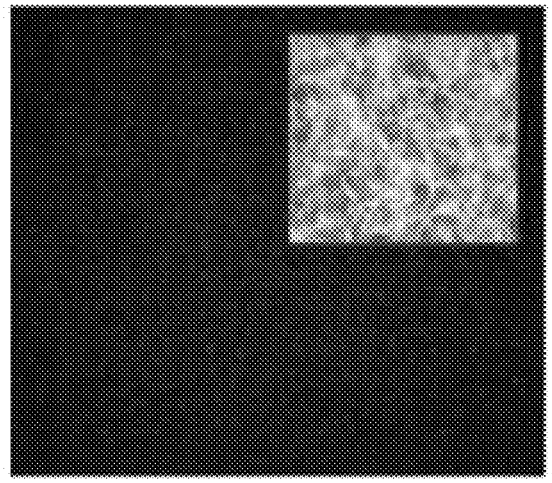

FIGS. 5A-5D present high-resolution scanning electron microscopy images (FIGS. 5A and 5B) and high-resolution transmission electron microscopy images (FIGS. 5C and 5D) of stainless steel mesh treated with 40% HF for 30 minutes, followed by chemical vapor deposition of silicon for 7 minutes (460° C., 25 Torr, 5 sccm silane, 20 sccm argon); scale bars represent 10 μm in FIG. 5A, 1 μm in FIG. 5B, and 10 nm in FIGS. 5C and 5D.

FIGS. 6A-6D present optical dark-field microscopy images of stainless steel mesh treated with 40% HF for 30 minutes, followed by chemical vapor deposition of silicon unto a silicon density of 0.5 mg/cm$^2$ (FIG. 6A), 1.09 mg/cm$^2$ (FIG. 6B), 3.07 mg/cm$^2$ (FIG. 6C), or 5.11 mg/cm$^2$ (FIG. 6D) was obtained (insets in all figures are at higher magnification).

Figure 7A:
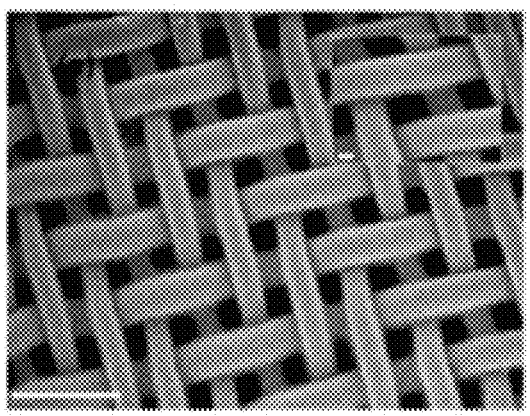
Figure 7B:
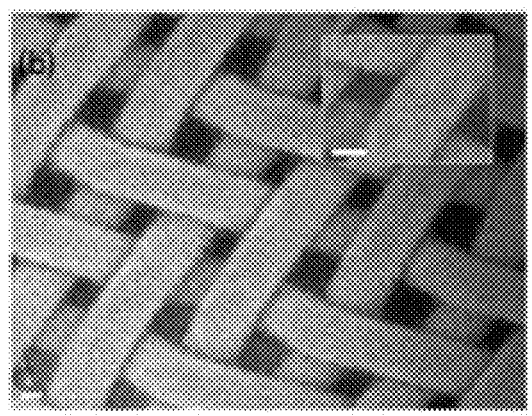
Figure 7C:
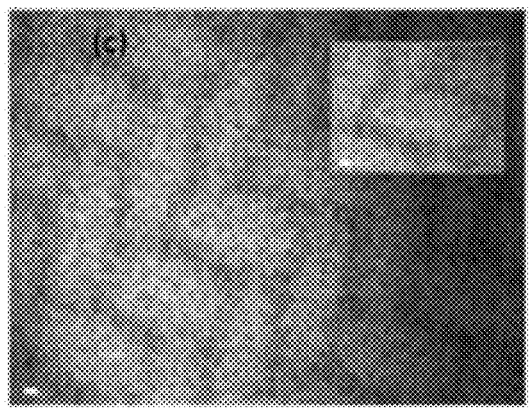
Figure 7D:
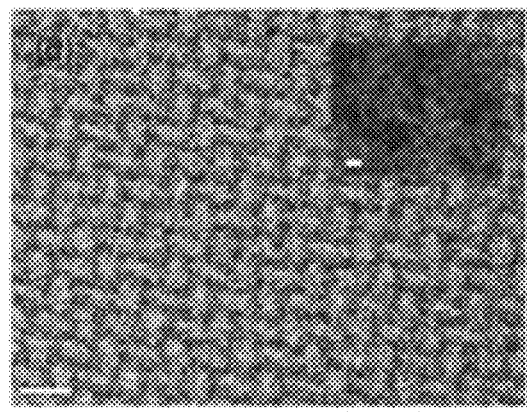

FIGS. 7A-7D present high-resolution scanning electron microscopy images of the same samples of stainless steel mesh with deposited silicon shown in FIGS. 6A-6D, respectively; scale bars represent 100 μm in FIGS. 7A and 7D, and 10 μm in FIGS. 7B and 7C, and in insets of all figures.

Figure 8A:
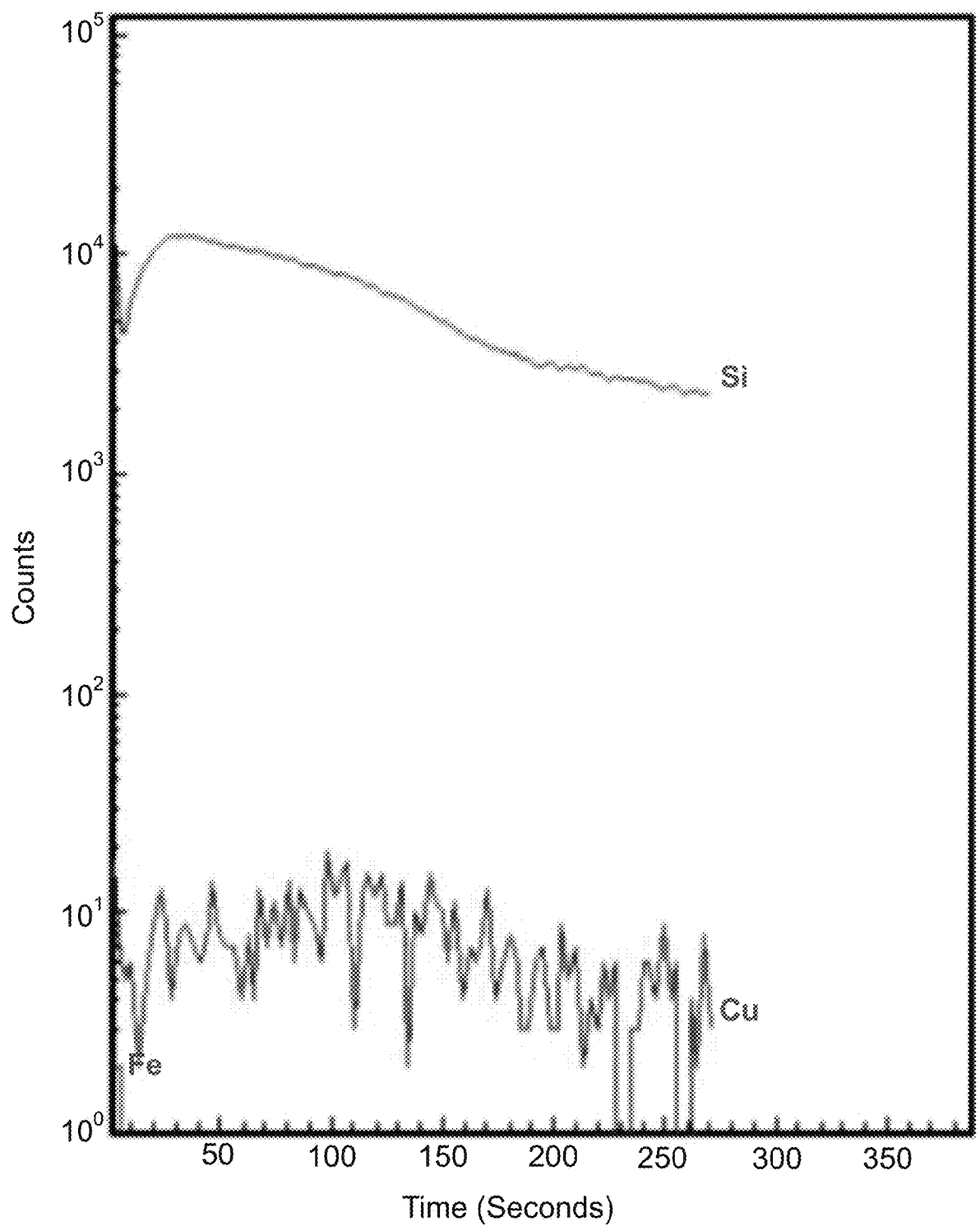
Figure 8B:
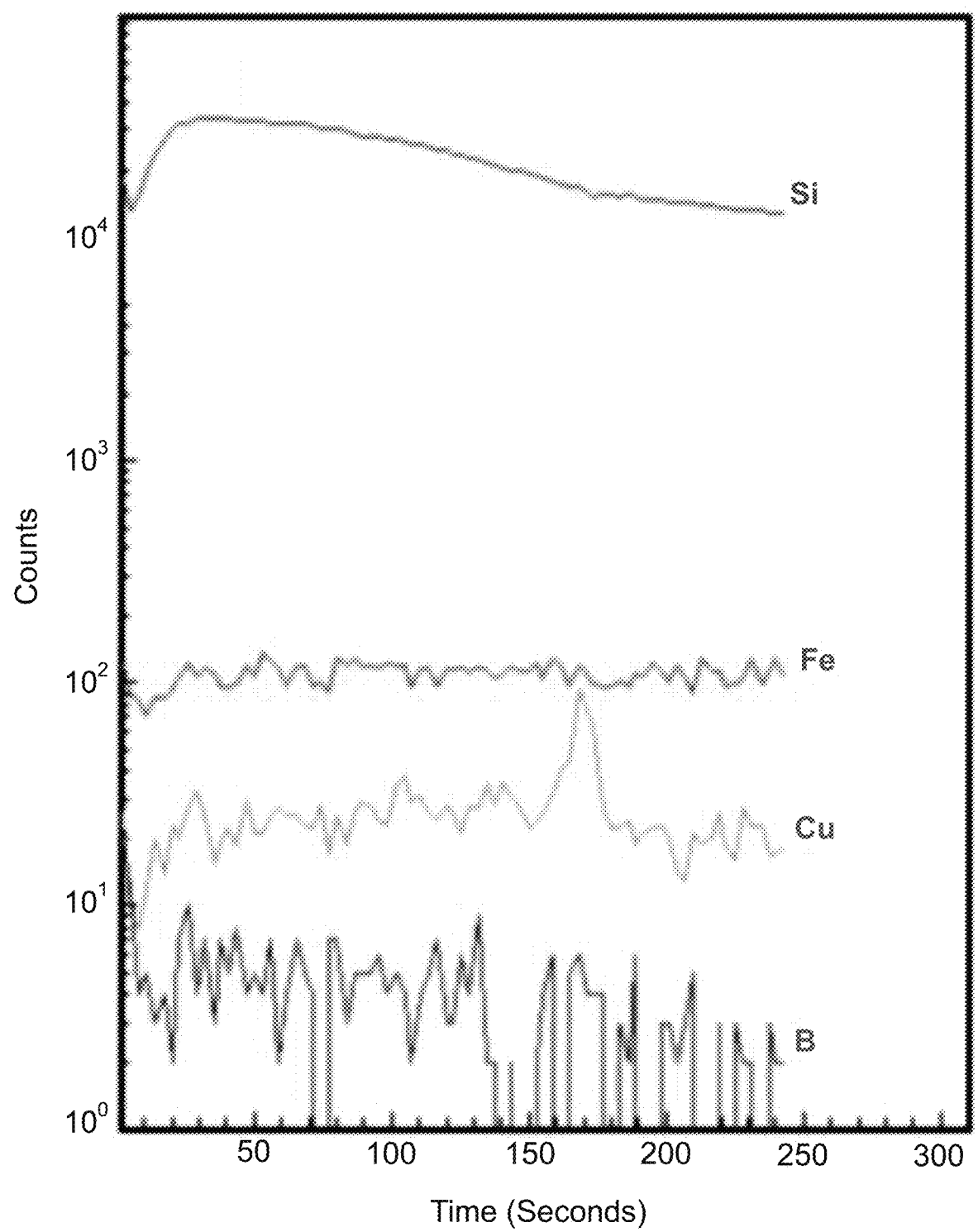

FIGS. 8A and 8B present TOF-SIMS (time of flight secondary ion mass spectrometry) spectra of silicon nanostructures comprising intrinsic (FIG. 8A) or p-type boron-doped (FIG. 8B) silicon grown on a stainless steel mesh, following treatment of the mesh with 40% HF for 30 minutes.

Figure 9:
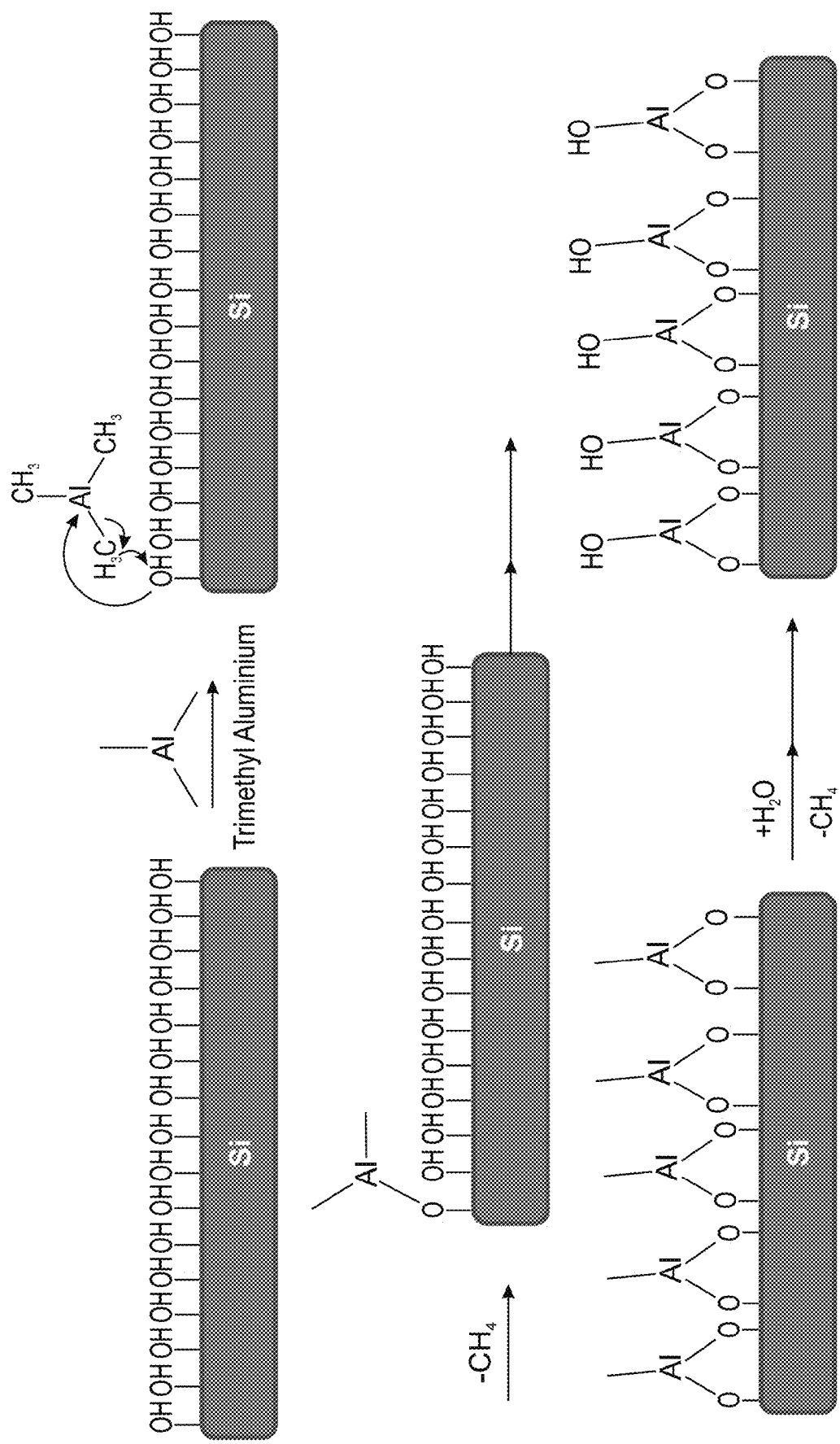

FIG. 9 presents a schematic depiction of formation of an alumina coating on silicon by atomic layer deposition, according to some embodiments of the invention.

Figure 10A:
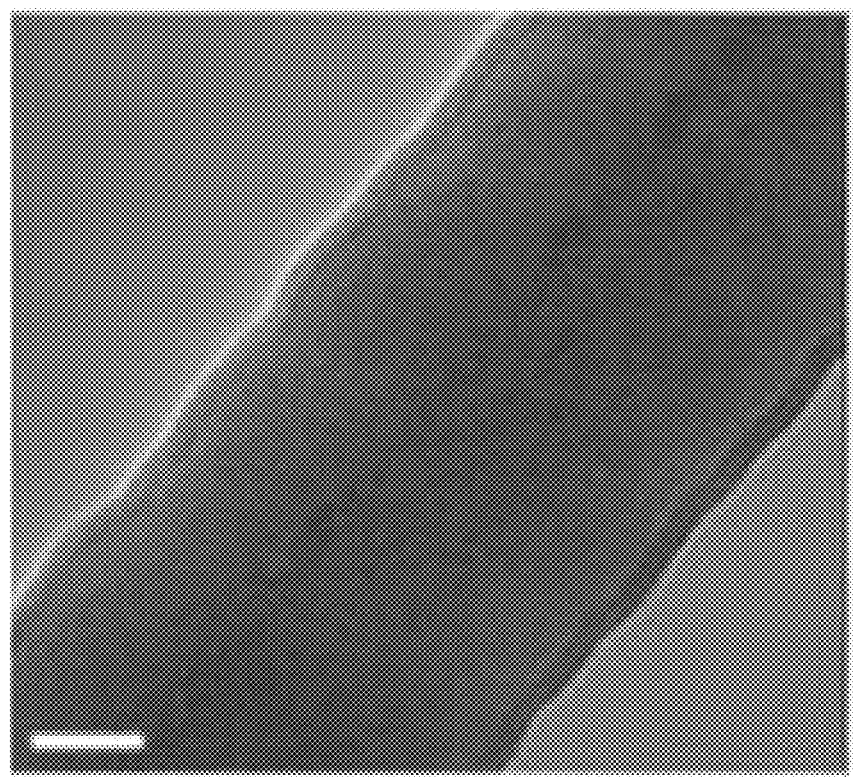
Figure 10B:
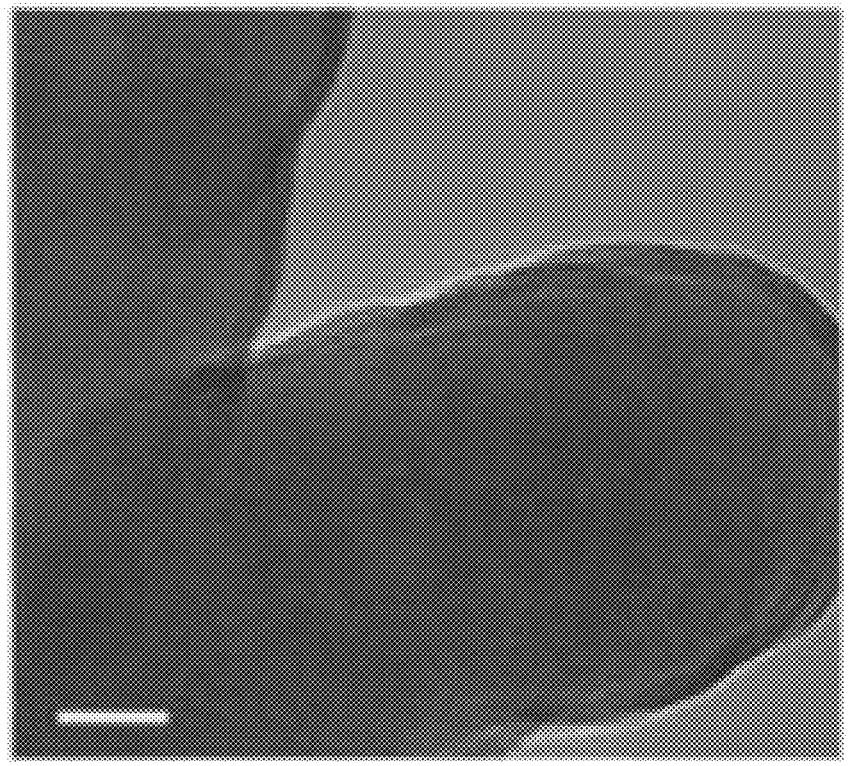
Figure 10C:
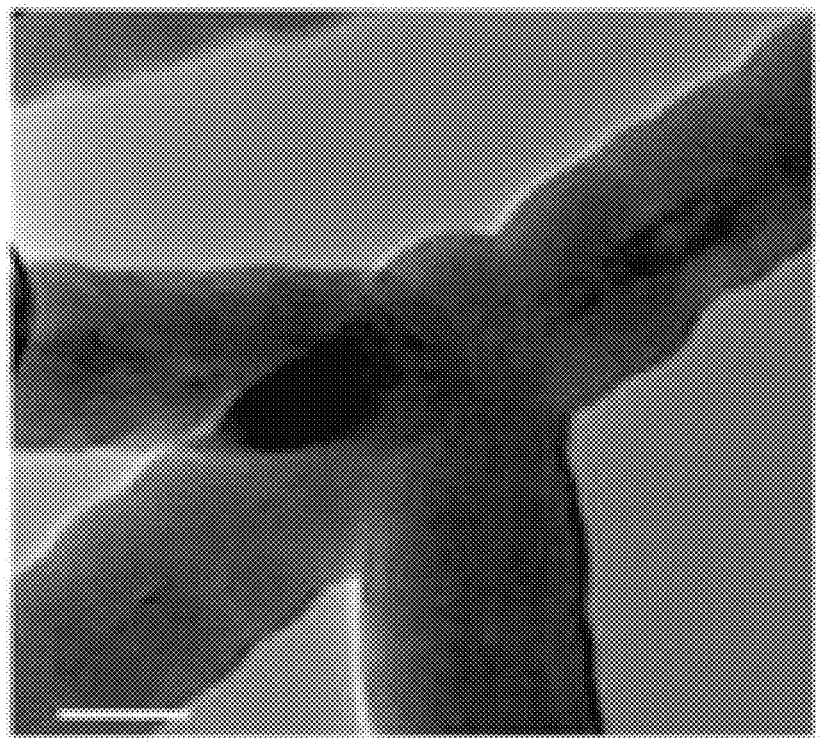
Figure 10D:
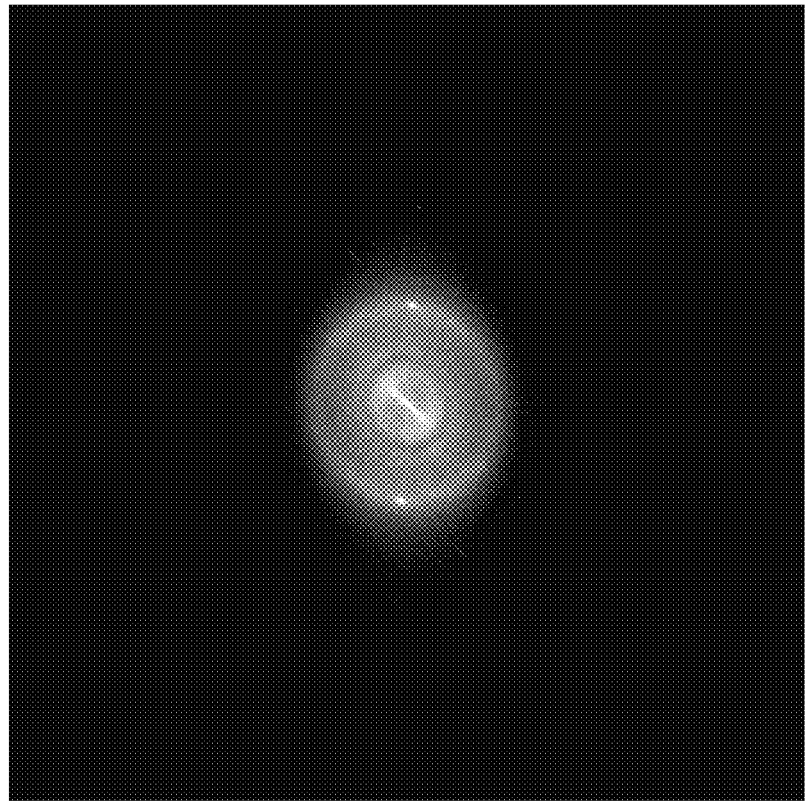

FIGS. 10A-10D present transmission electron microscopy images of exemplary silicon structures grown on a stainless steel substrate, and coated with a layer of alumina (~5 nm) by "exposure" atomic layer deposition; FIGS. 10A and 10D show a clear crystalline core (FIG. 10D presents a fast Fourier transform showing crystallinity in the [111] direction in the sample shown in FIG. 10A), and FIGS. 10B and 10C show exemplary interconnected structures; scale bars represent 20 nm in FIG. 10A (structure diameter is 78 nm) and FIG. 10B, and 50 nm in FIG. 10C.

Figure 11:
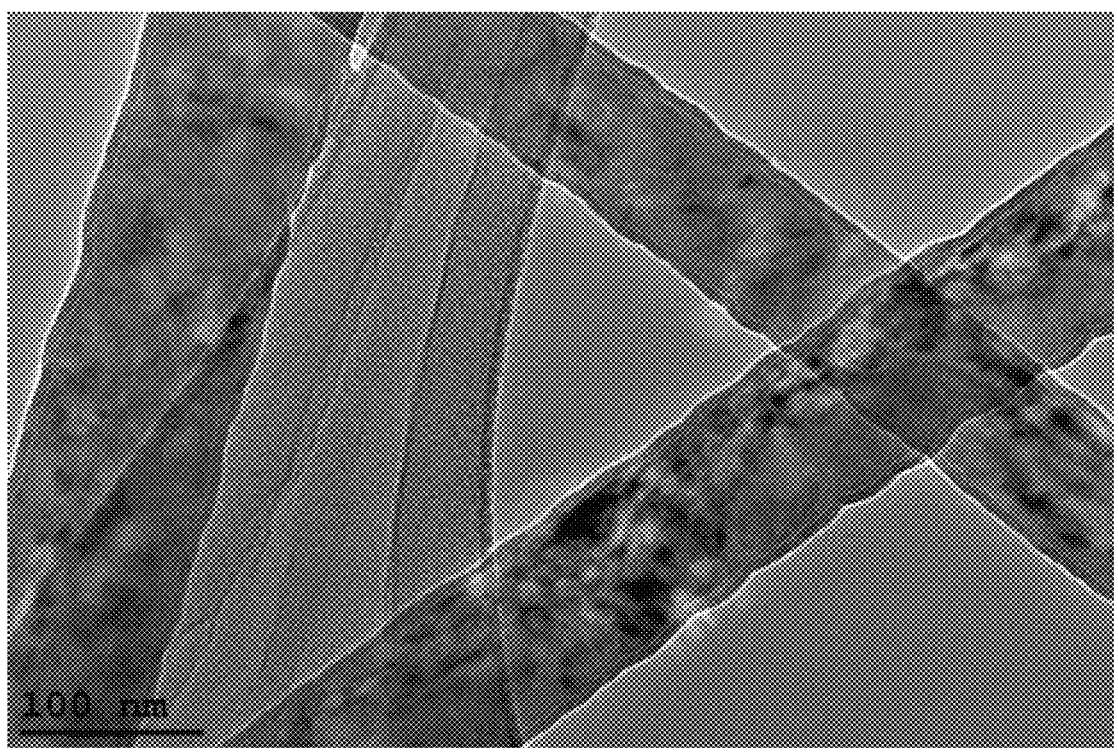

FIG. 11 presents a transmission electron microscopy image of exemplary silicon structures grown on a stainless steel substrate and subjected to two lithiation/de-lithiation cycles.

Figure 12A:
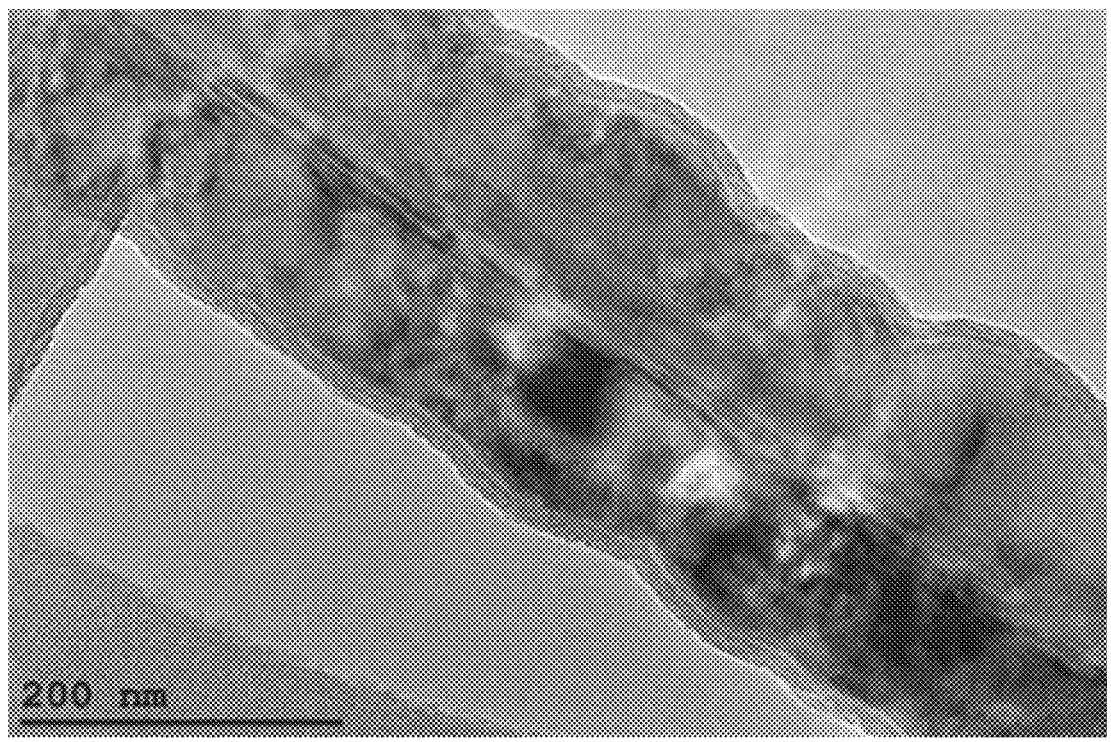
Figure 12B:
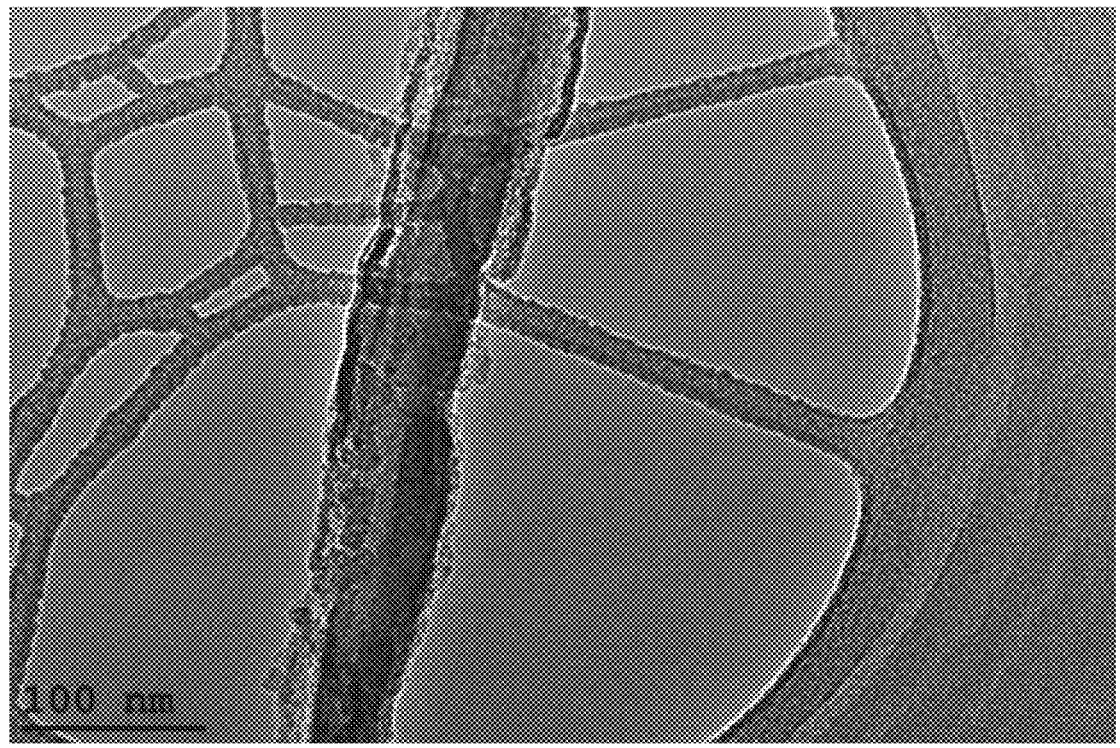

FIGS. 12A and 12B presents transmission electron microscopy images of exemplary silicon structures grown on a stainless steel substrate and coated with a layer of alumina, and then subjected to two lithiation/de-lithiation cycles.

Figure 13A:
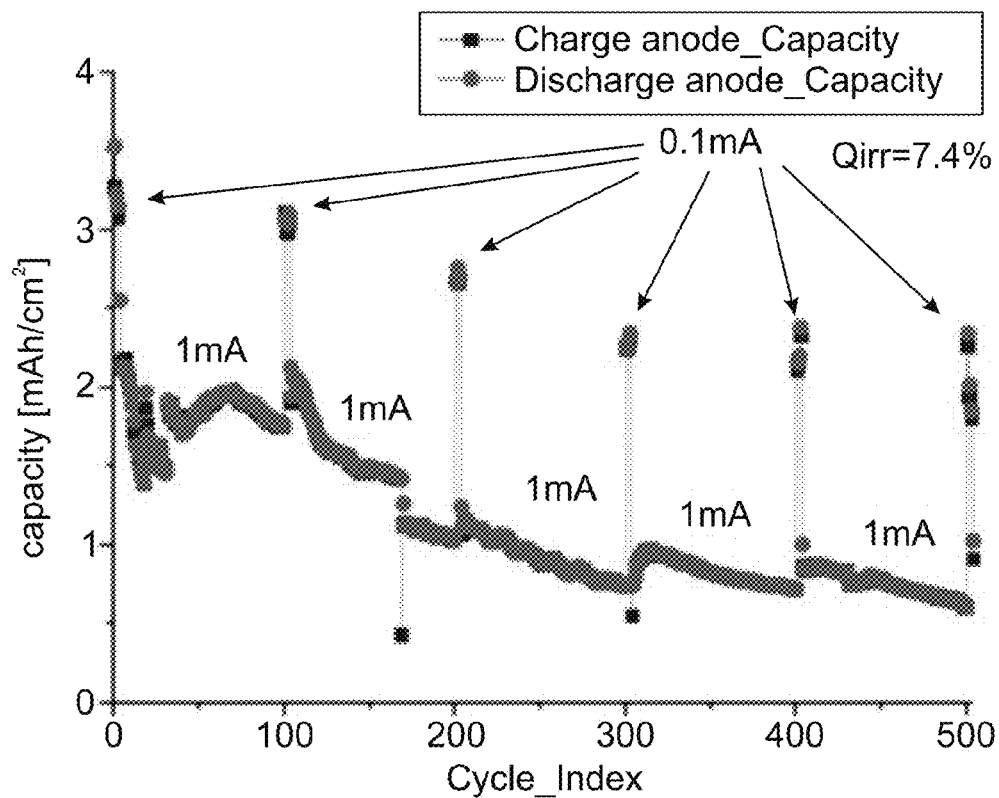
Figure 13B:
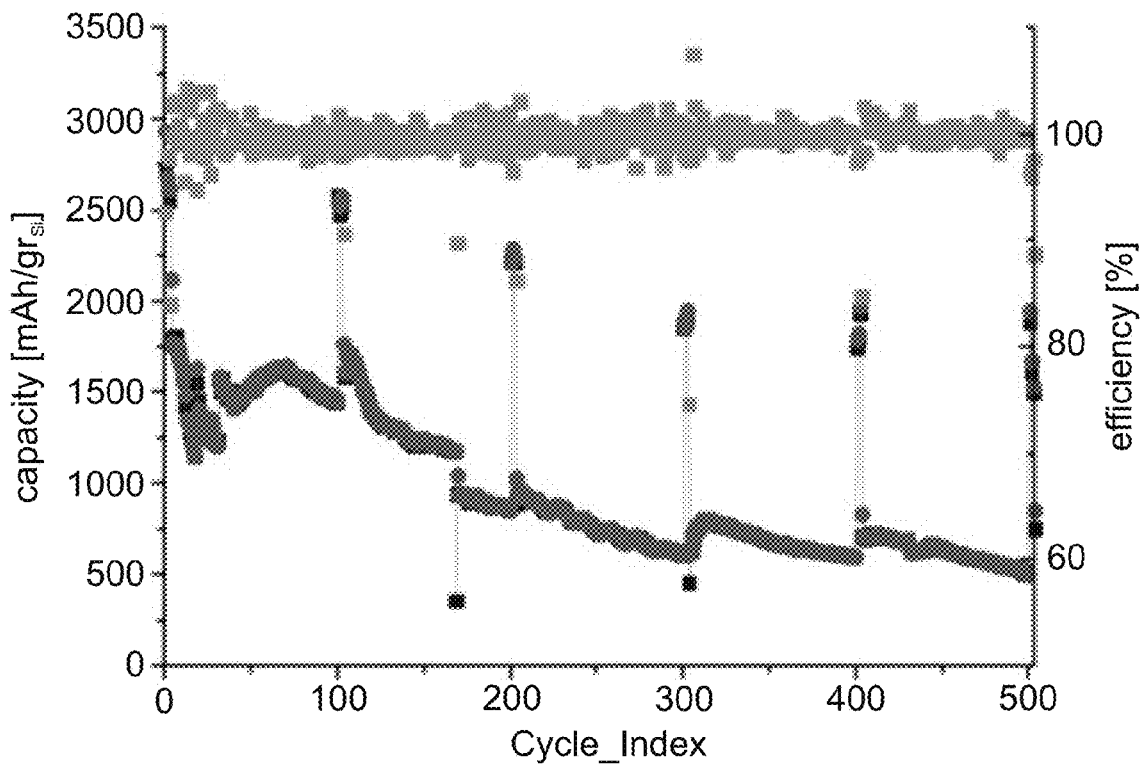
Figure 13C:
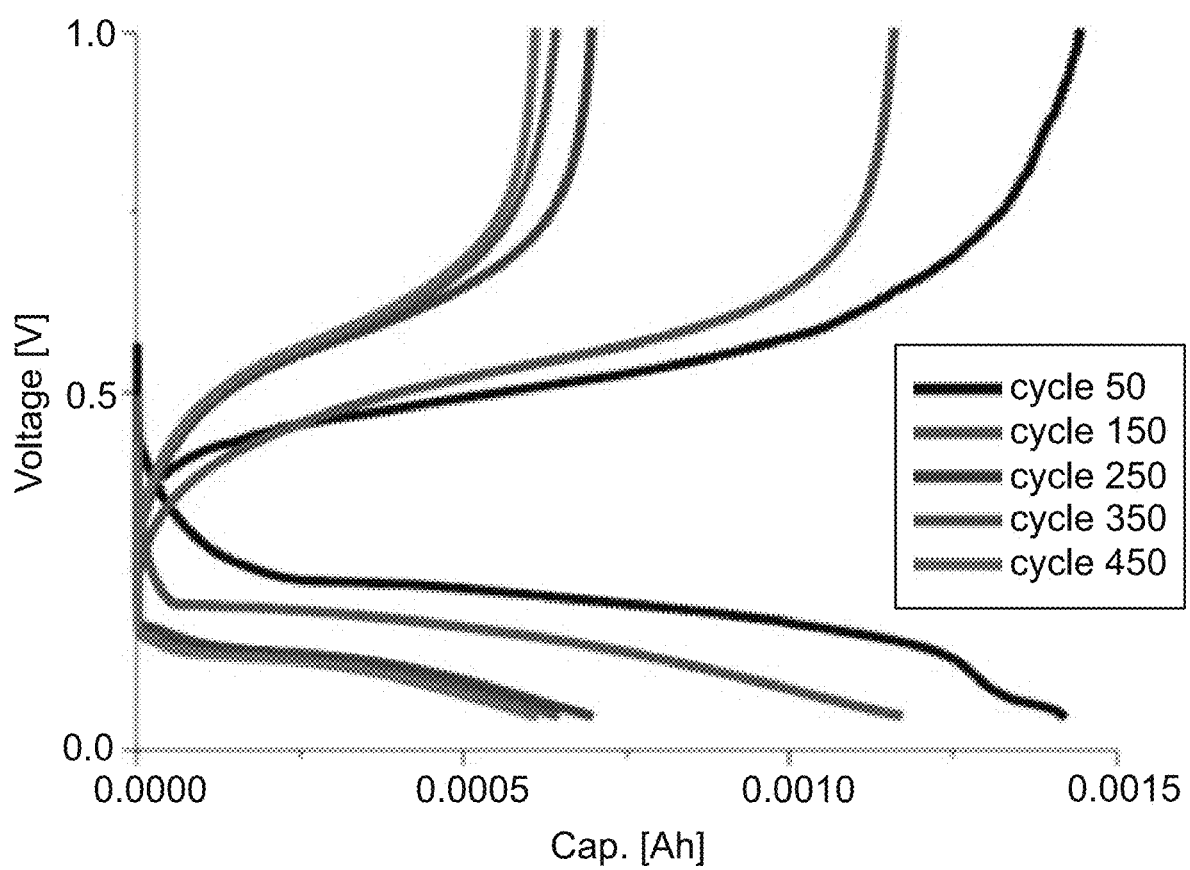

FIGS. 13A-13C present graphs showing the charge and discharge capacity (FIGS. 13A and 13B) and coulombic efficiency (FIG. 13B; light squares) of an exemplary anode comprising 1.18 mg/cm$^2$ silicon coated with alumina as a function of number of electrochemical cycles (at 1 mA, with occasional cycles at 0.1 mA), as well as voltage of the anode as a function of capacity (Cap.) at cycles 50, 150, 250, 350 and 450 (electrochemical cell constructed with 85% 1 M LiPF$_6$ in 1:1 EC:DEC (1:1 ethylene carbonate:diethyl carbonate) with 2% VC (vinylene carbonate) and 15% FEC (fluoroethylene carbonate)).

Figure 14A:
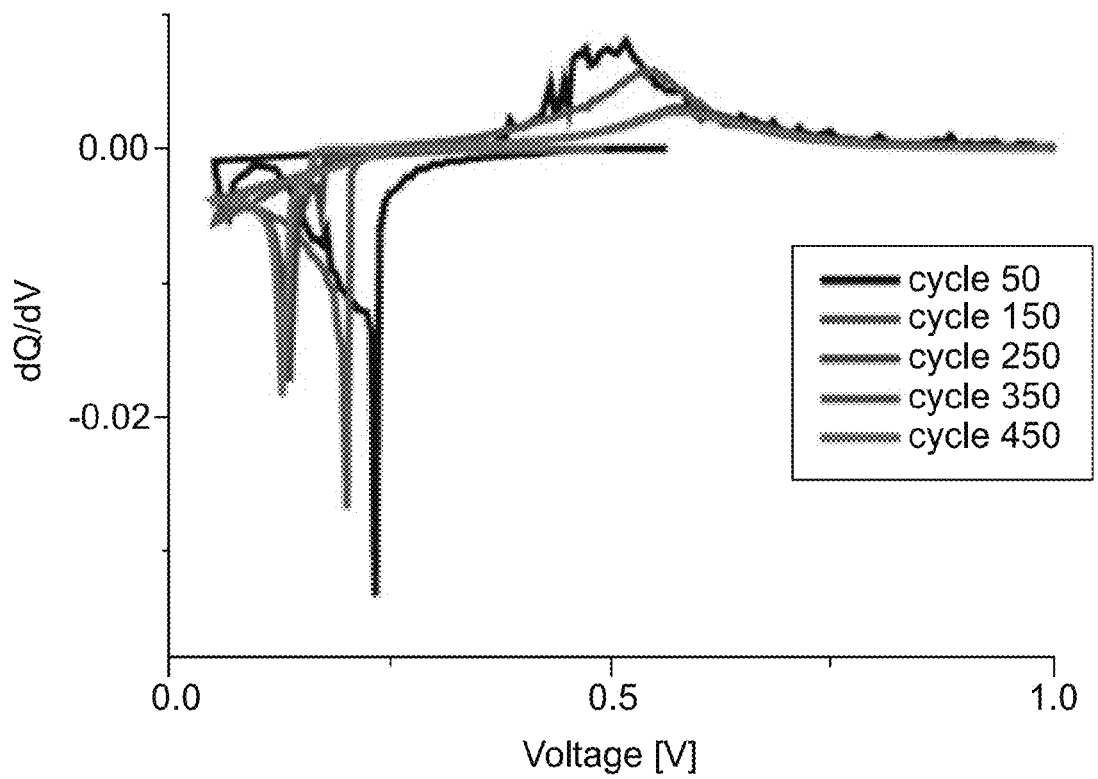
Figure 14B:
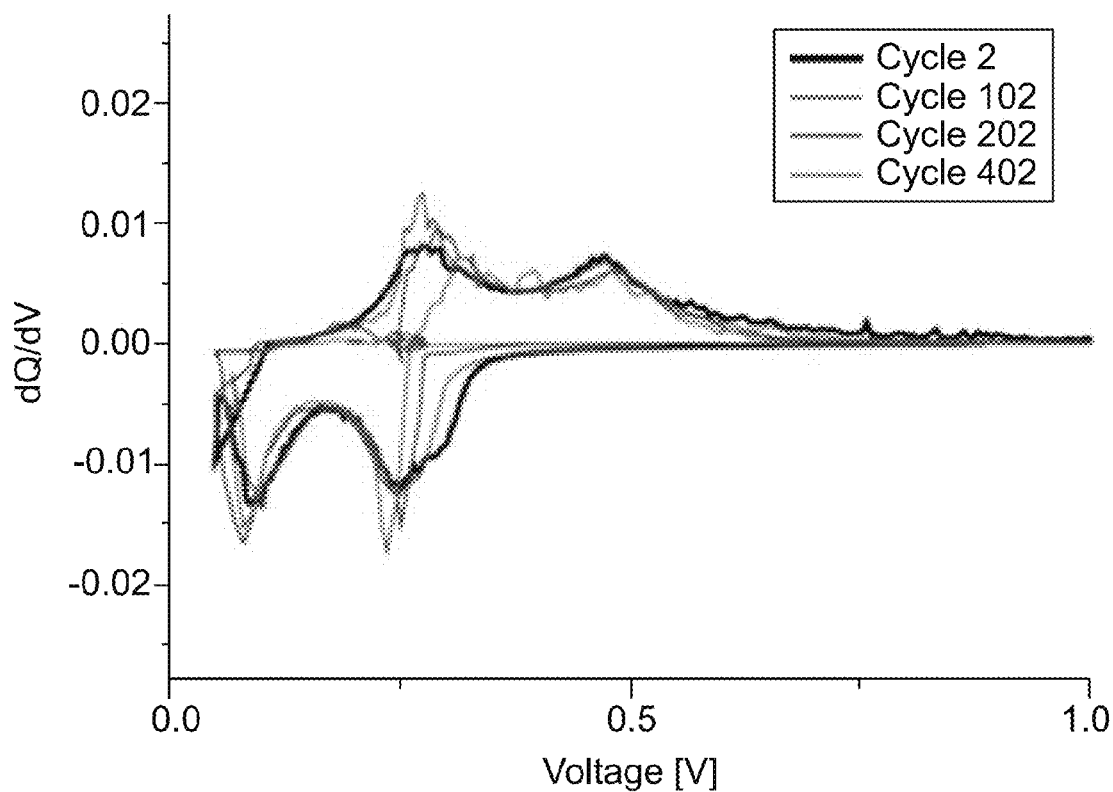

FIGS. 14A and 14B present dQ/dV plots for an exemplary anode comprising 1.18 mg/cm$^2$ silicon coated with alumina undergoing cycles at 1 mA current (FIG. 14A) or 0.1 mA current (FIG. 14B) (electrochemical cell constructed with 85% 1 M LiPF$_6$ in 1:1 EC:DEC and 2% VC+15% FEC).

Figure 15A:
Figure 15B:
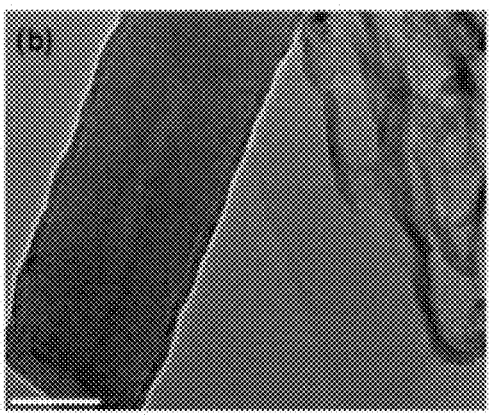
Figure 15C:
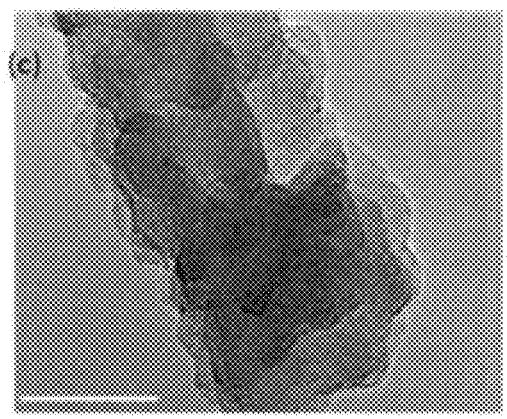
Figure 15D:
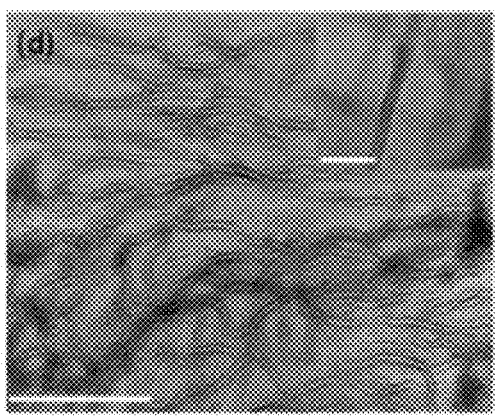

FIGS. 15A-15D present scanning electron microscopy (FIG. 15A) and transmission electron microscopy (FIGS. 15B-15D) images of silicon structures (FIGS. 15A-15C) and solid electrolyte interface (SEI) (FIG. 15D) of an exemplary anode comprising 1.18 mg/cm$^2$ silicon coated with alumina, following 700 cycle; FIG. 15B shows structure with intact alumina coating, FIG. 15C shows structure disconnected from alumina coating, FIG. 15D shows disconnected alumina shells in (SEI) with zooming in on an alumina shell in inset; scale bars represent 50 μm in FIG. 15A, 50 nm in FIGS. 15B and 15C, 200 nm in FIG. 15D, and 5 nm in inset of FIG. 15D.

Figure 16:
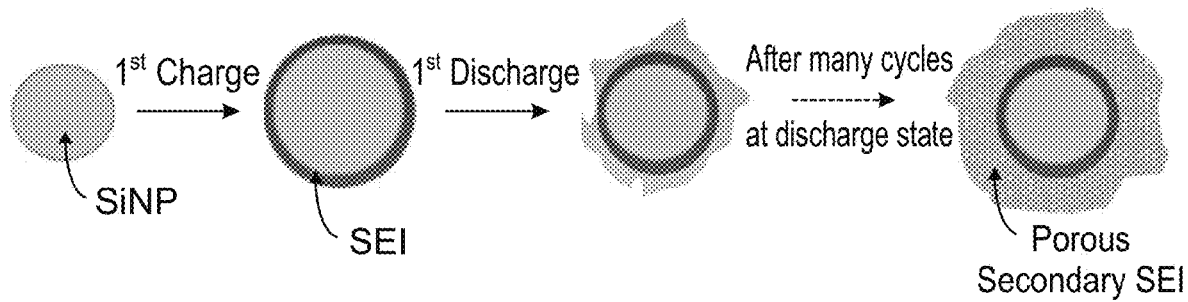

FIG. 16 depicts a model of solid electrolyte interface (SEI) formation on a silicon nanoparticle according to some embodiments of the invention following repeated charge and discharge.

Figure 17A:
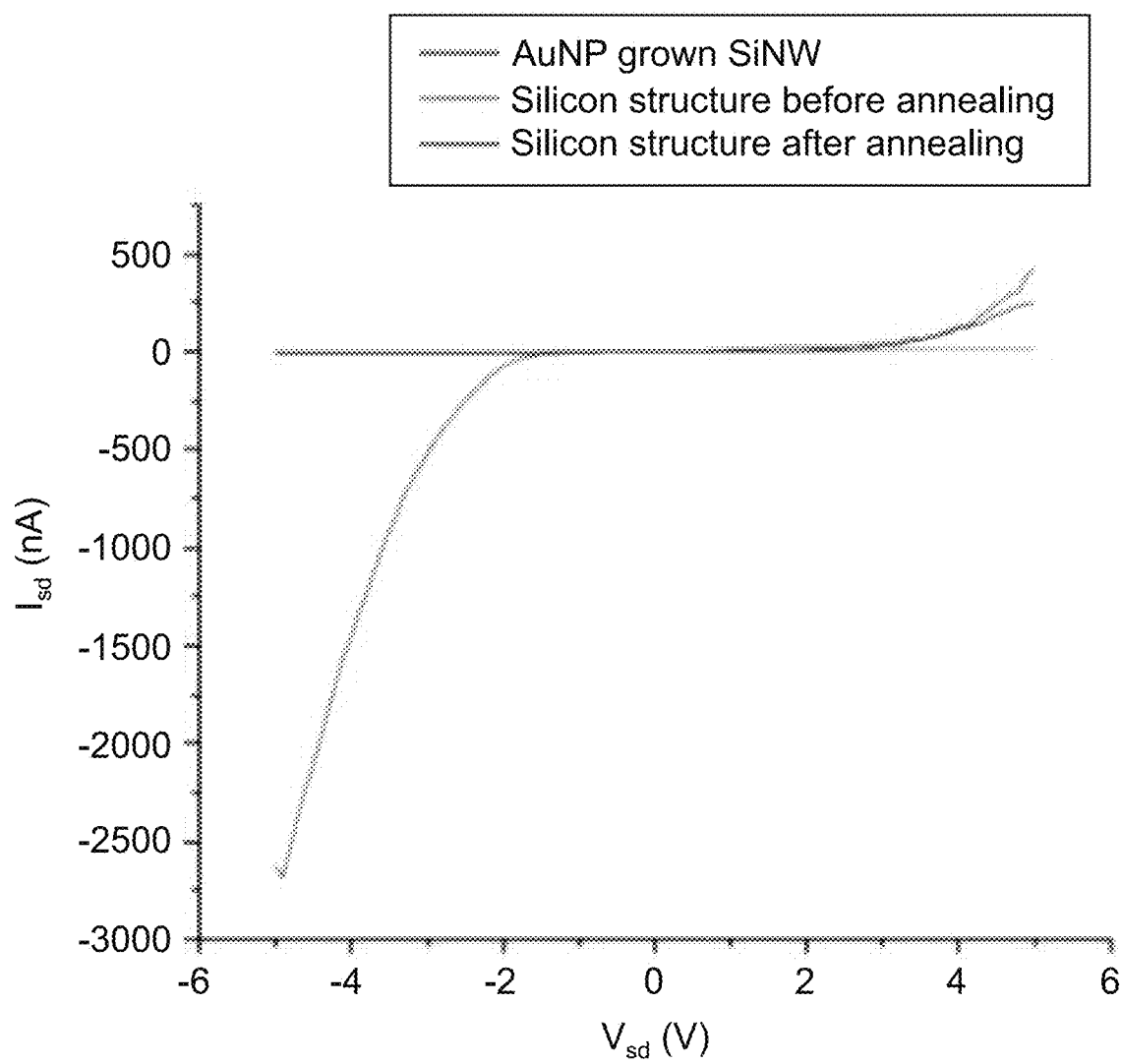
Figure 17B:
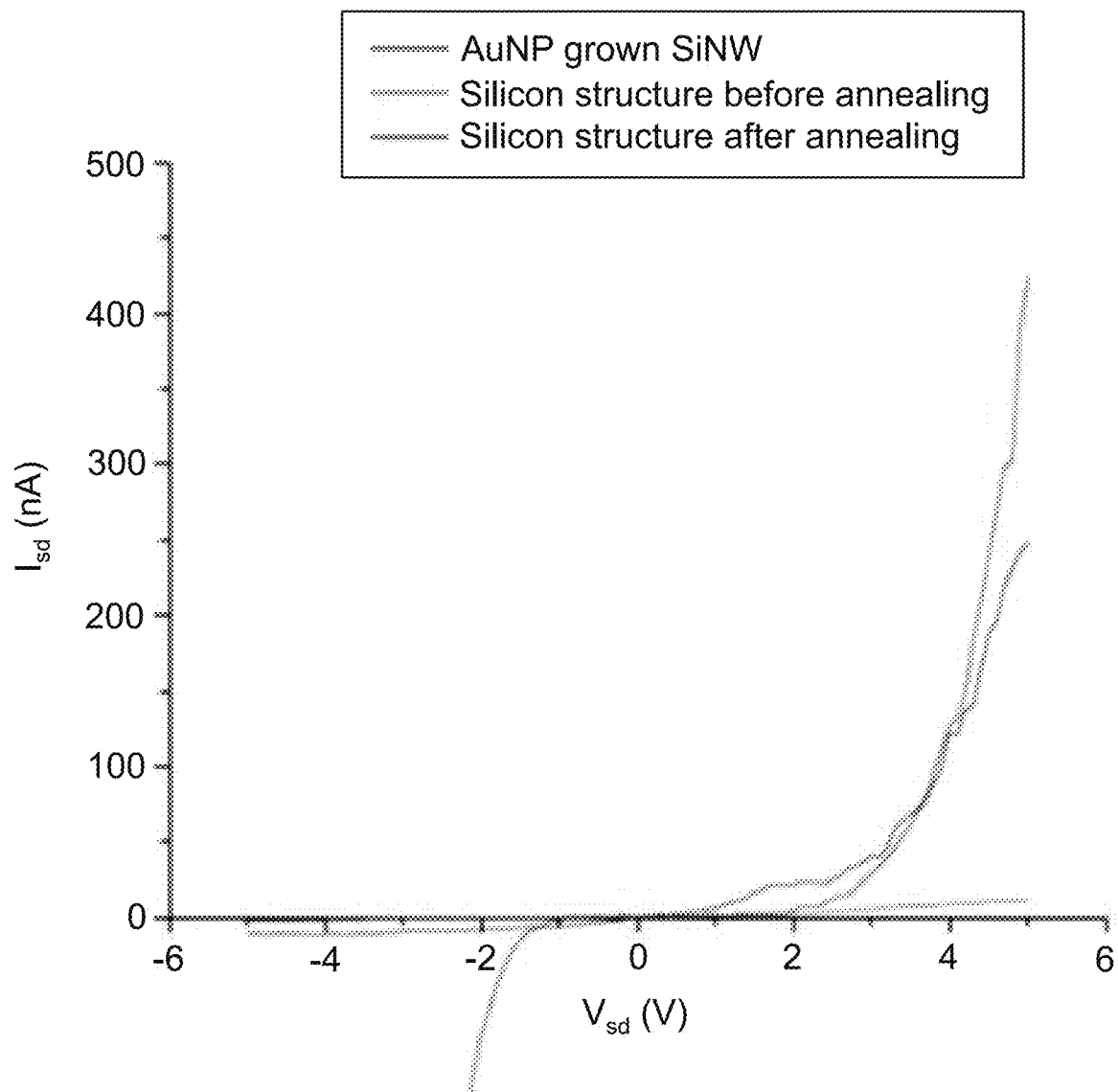
Figure 17C:
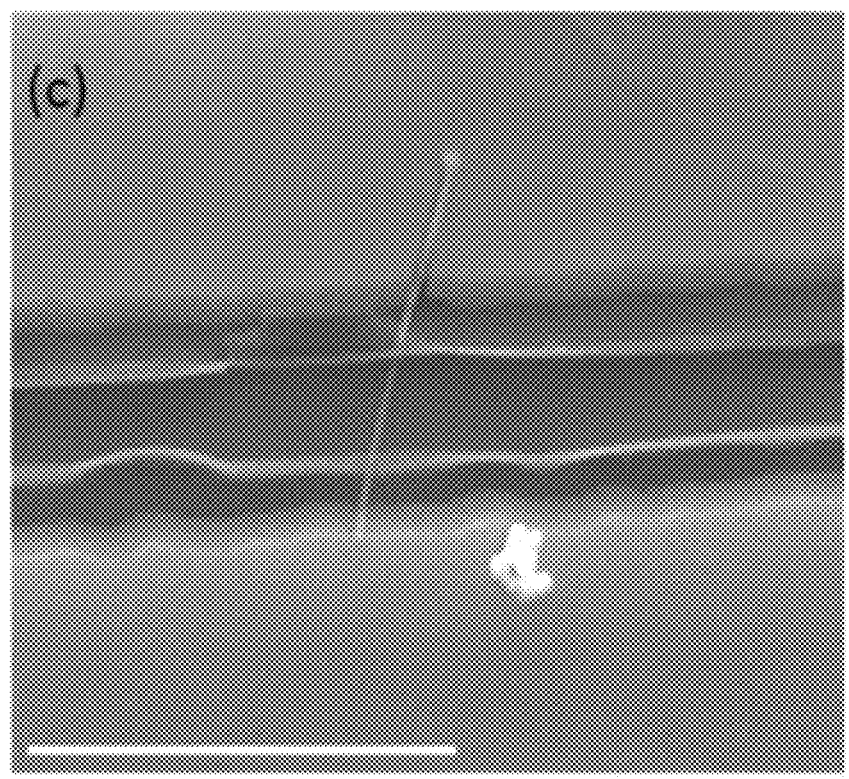
Figure 17D:
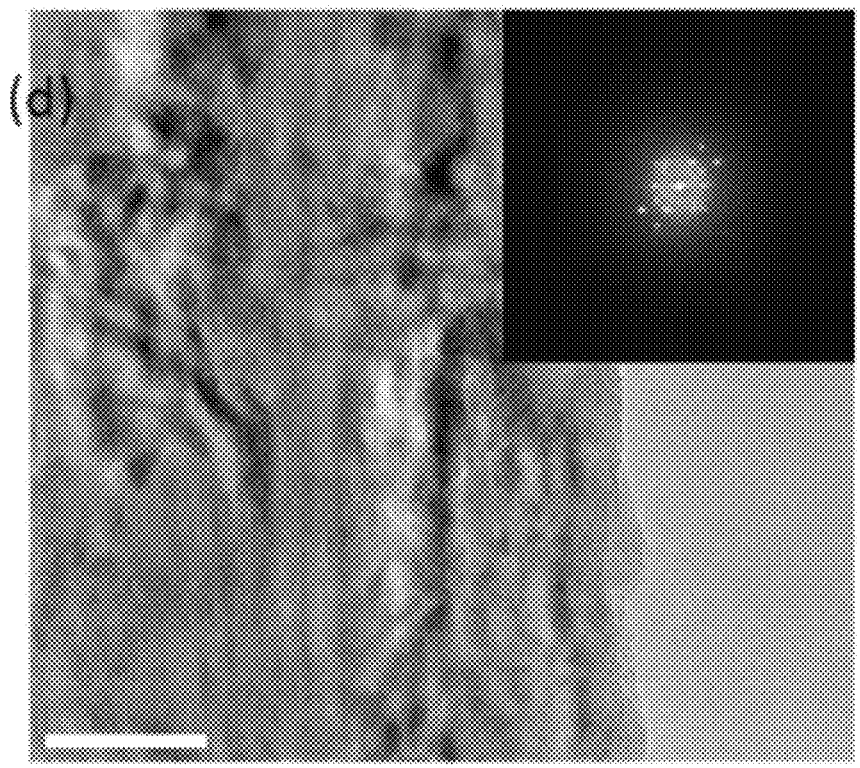

FIGS. 17A-17D present graphs showing I$_{sd}$ (source-drain current) as a function of V$_{sd}$ (source-drain voltage) at zero gate voltage (FIGS. 17A and 17B, which differ only in scaling of y-axis) for p-type silicon nanowire structures grown on native silicon substrate using 20 nm gold nanoparticles as catalyst (AuNP grown SiNW) or silicon structures grown on stainless steel before or after 2 hours annealing at 650° C., as well as a scanning electron microscopy image of an exemplary silicon structure between source and drain electrodes (FIG. 17C) and high-resolution transmission electron microscopy image (FIG. 17D) and fast Fourier transform (inset of FIG. 17D) of a polycrystalline silicon structure after annealing; scale bar represents 5 µm in FIG. 17C and 20 nm in FIG. 17D.

Figure 18:
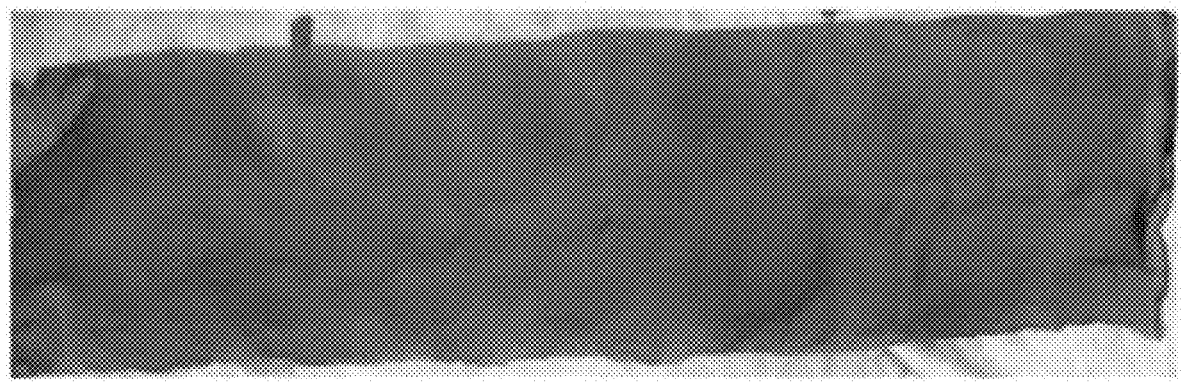

FIG. 18 presents an image of a 3D sponge-like nanoporous silicon-on-stainless steel network (1 meter by 30 centimeters), with a silicon density of 0.6 mg/cm$^2$, according to some embodiments of the invention; the stainless steel (grade 316) was treated with HF, followed by deposition of silicon using a 4 inch chemical vapor deposition apparatus.

Figure 19:
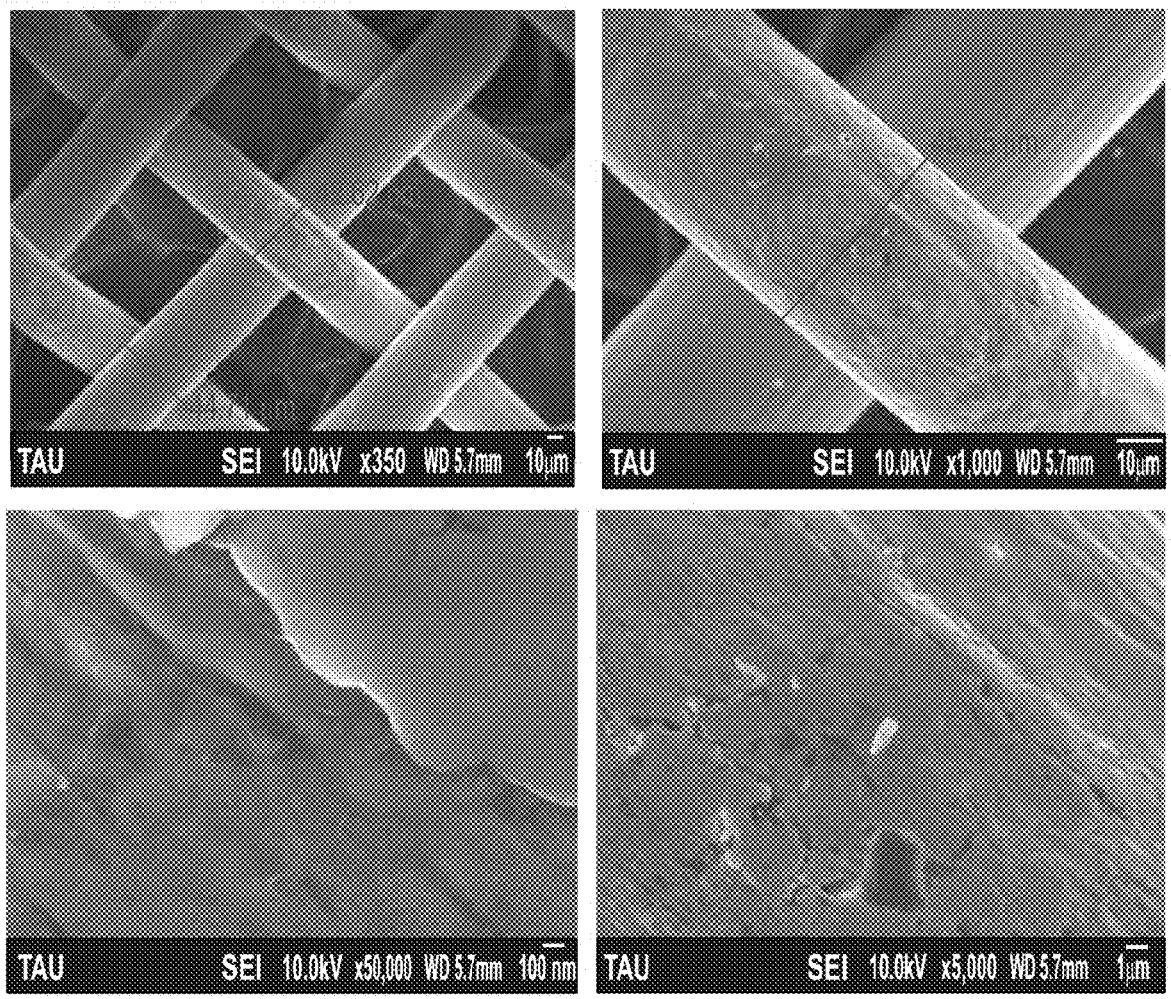
Figure 20A:
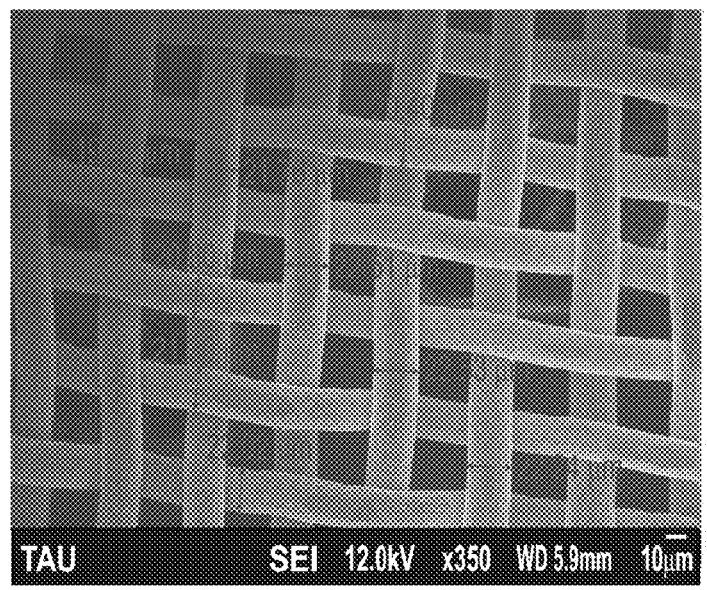
Figure 20B:
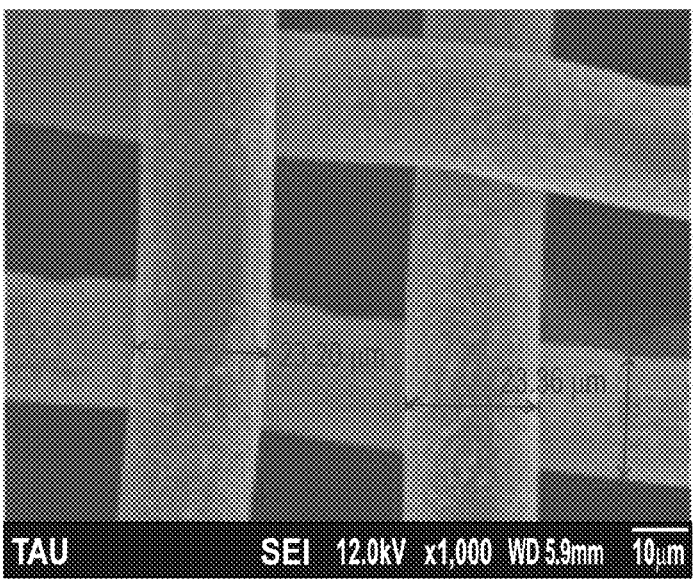
Figure 20C:
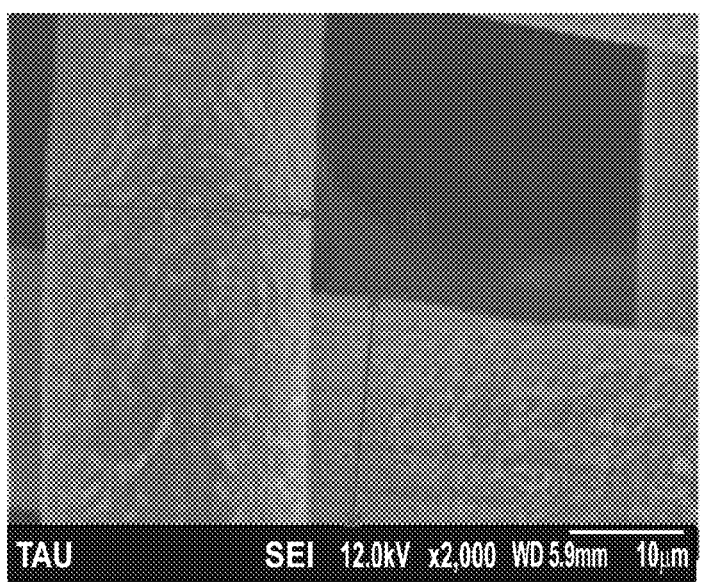
Figure 20D:
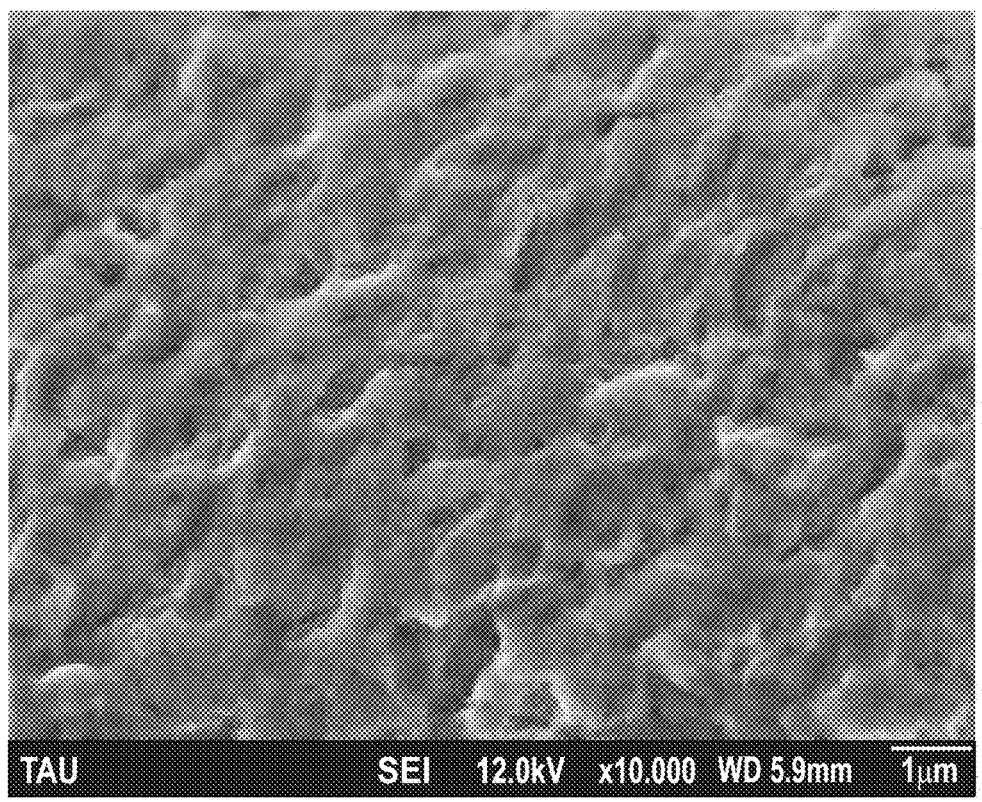
Figure 20E:
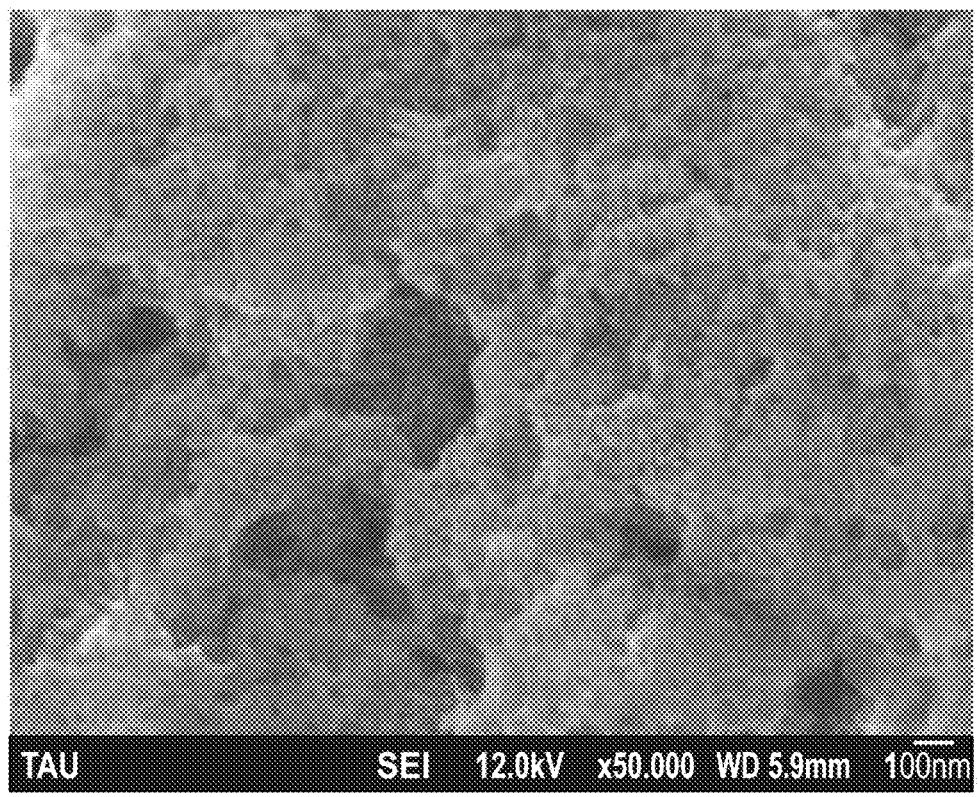

FIG. 19 presents high-resolution scanning electron microscopy images of untreated (as-received) stainless steel (304) mesh, at various magnifications.

FIGS. 20A-20E present high-resolution scanning electron microscopy images of stainless steel (304) mesh following treatment with HF for 30 minutes, at various magnifications.

Figure 21:
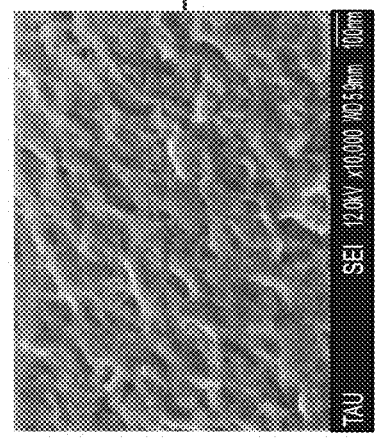
Figure 21:
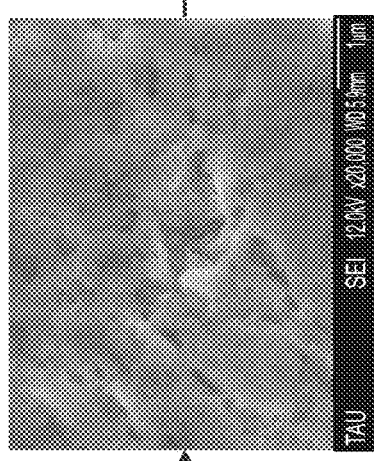
Figure 21:
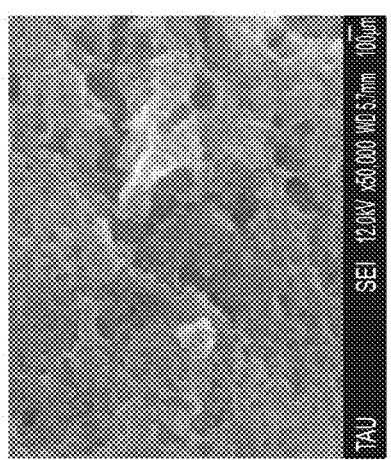

FIG. 21 presents scanning electron microscopy images of stainless steel (304) mesh (25 µm) following treatment with HF for 30, 45 and 60 minutes.

Figure 22:
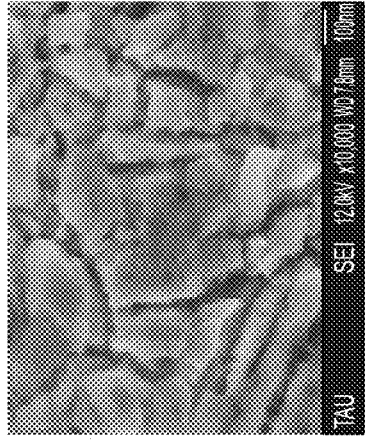
Figure 22:
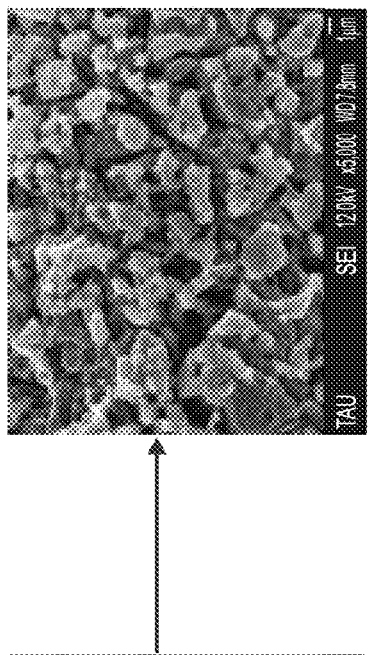
Figure 22:
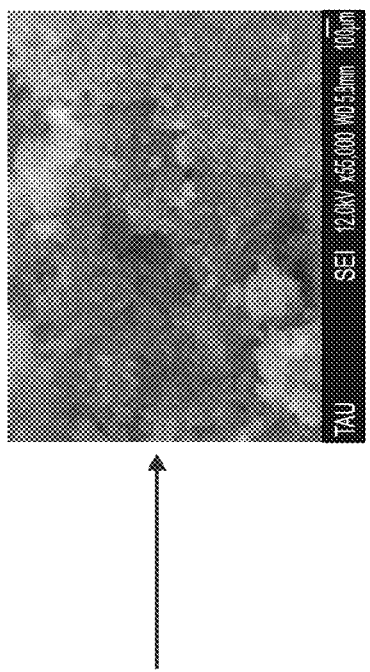

FIG. 22 presents scanning electron microscopy images of stainless steel (304) mesh (50 µm) following treatment with HF for 30, 45 and 60 minutes.

Figure 23:
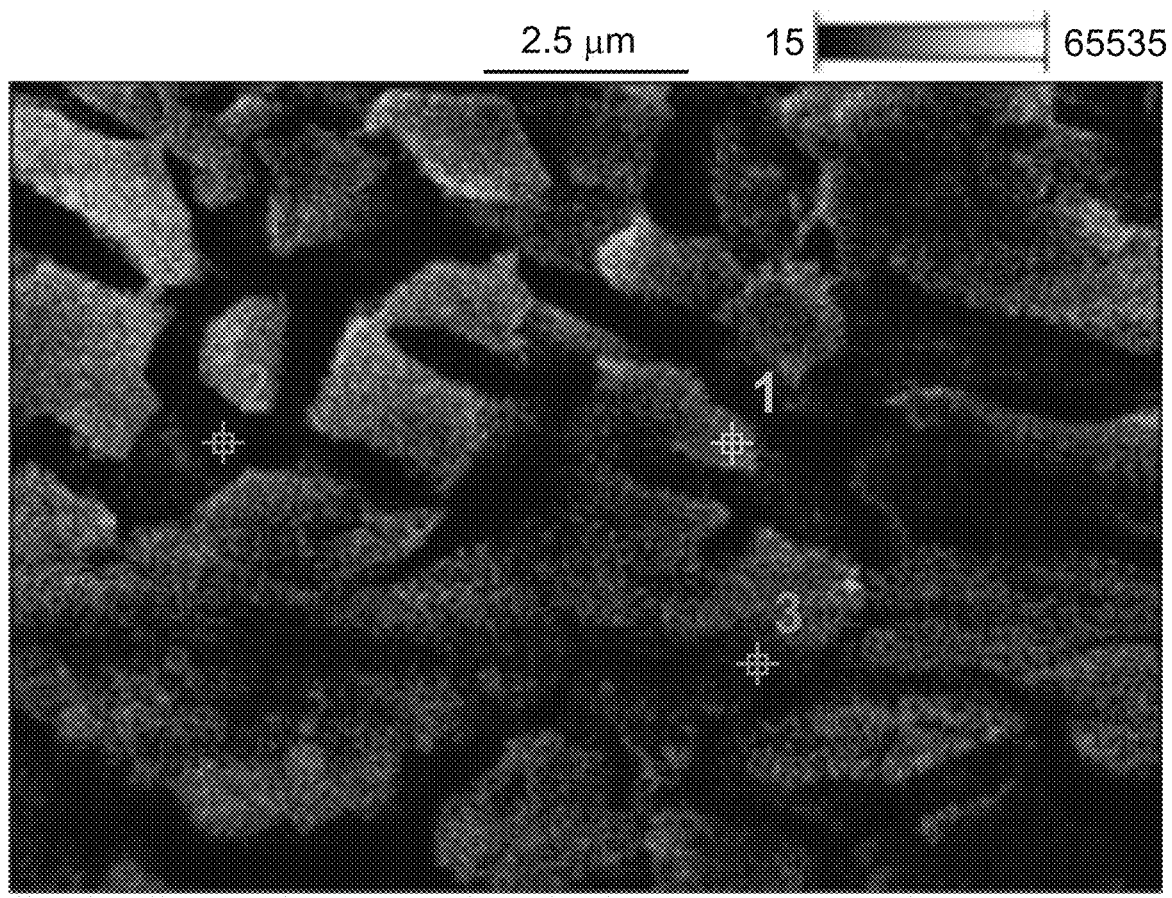

FIG. 23 presents a scanning electron microscopy image of stainless steel (304) treated with HF for 30 minutes.

Figures 24A, 24B:
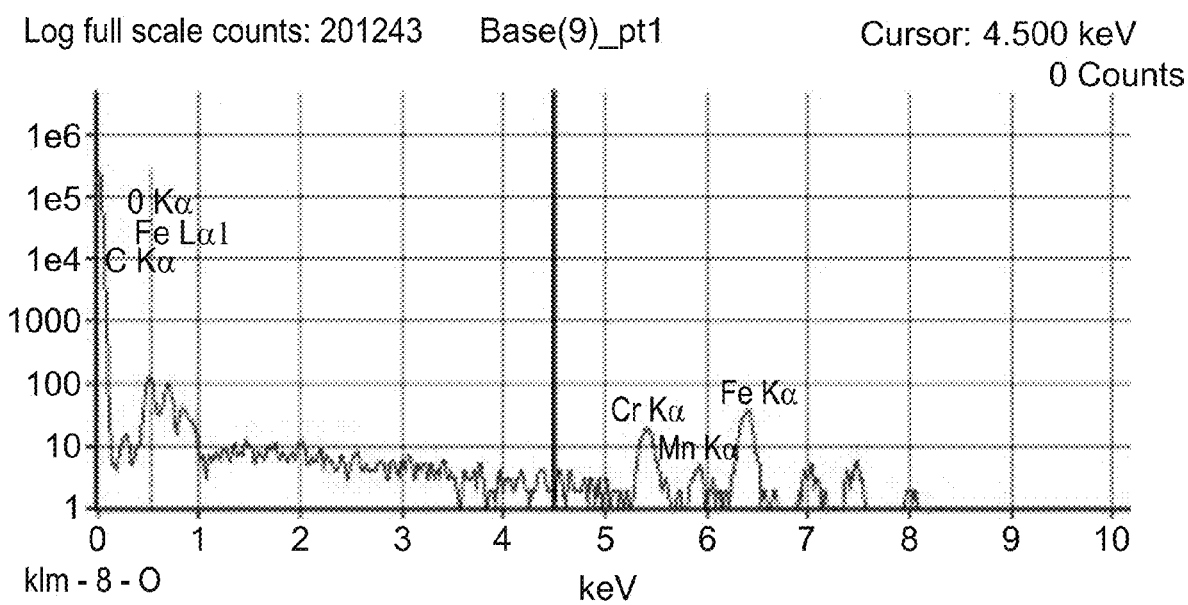
Figure 25C:
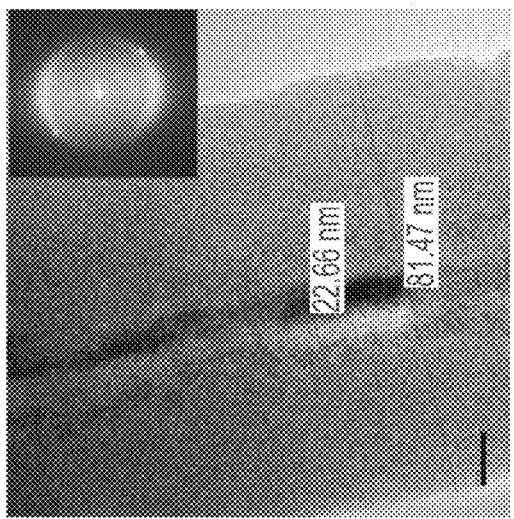
Figure 25F:
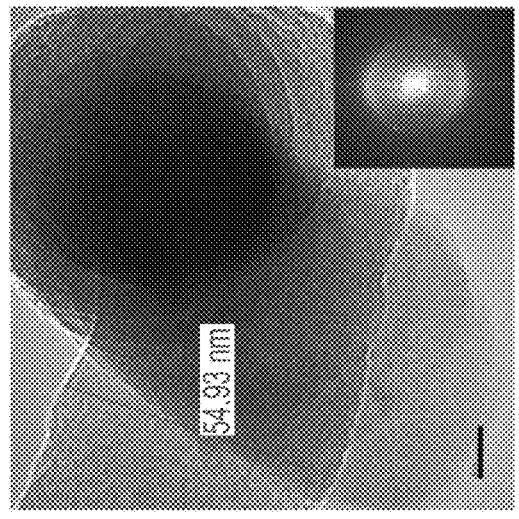
Figure 25B:
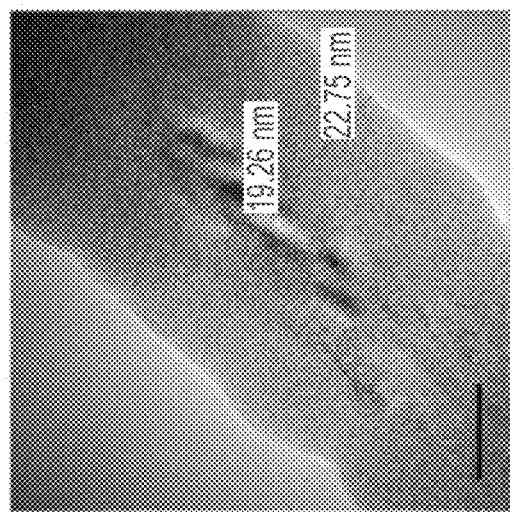
Figure 25E:
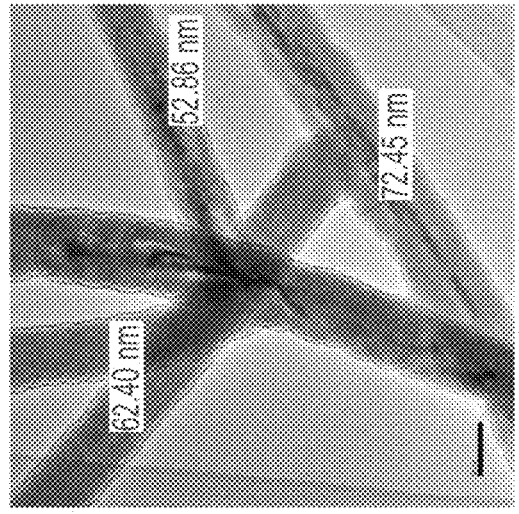
Figure 25A:
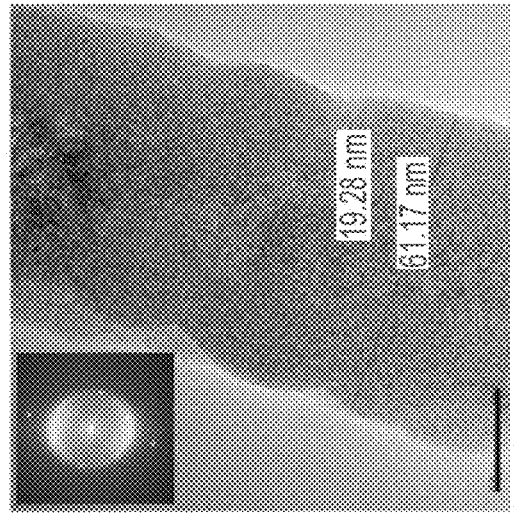
Figure 25D:
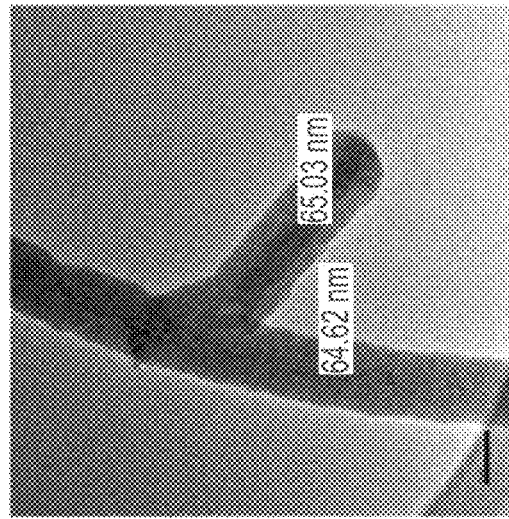
Figure 26A:
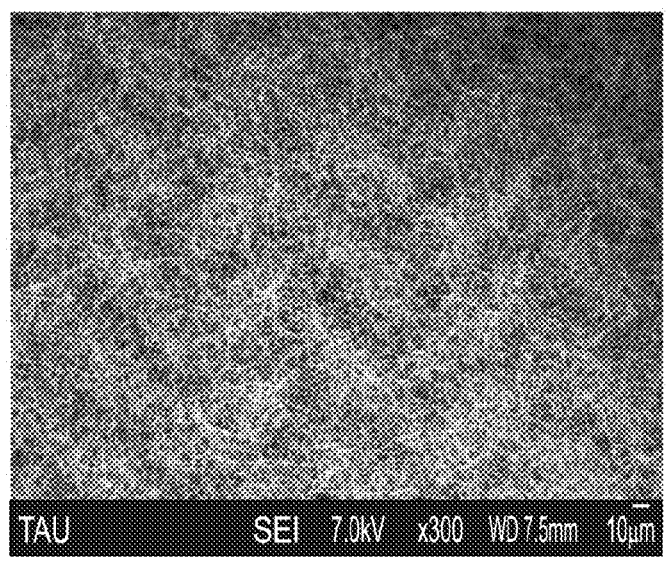
Figure 26B:
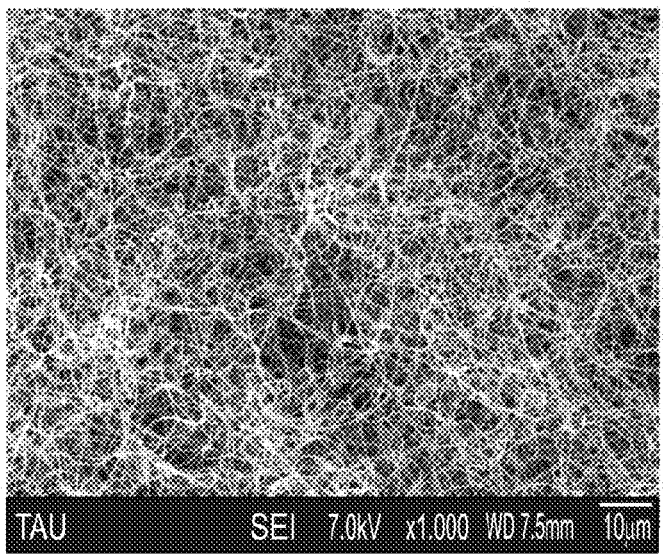
Figure 26C:
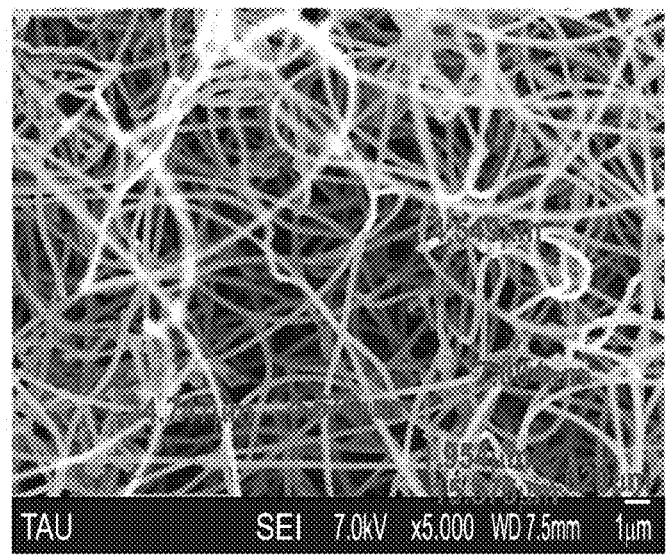
Figure 26D:
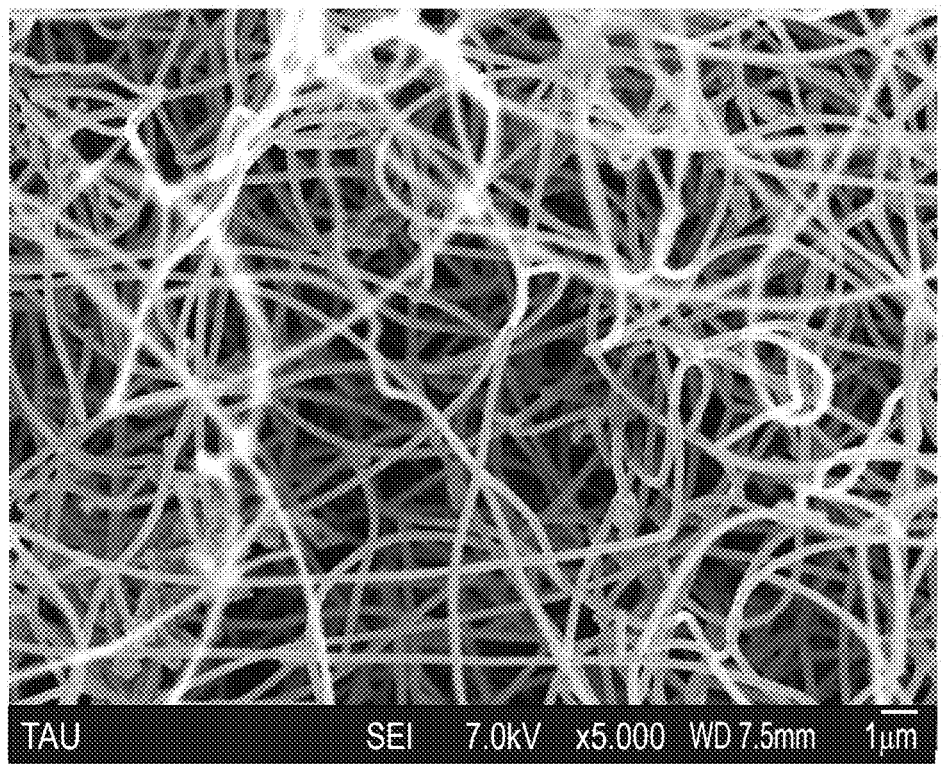
Figure 26E:
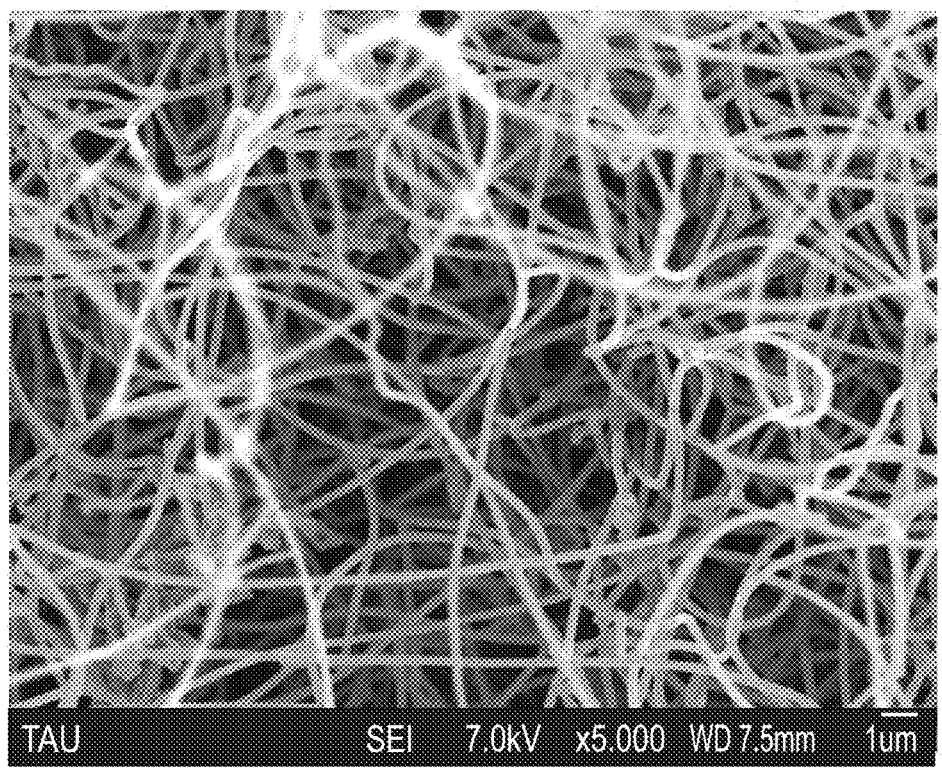

FIGS. 24A and 24B present an elemental analysis by energy dispersive X-ray spectroscopy of stainless steel (304) treated with HF for 30 minutes FIGS. 25A-25F present transmission electron microscopy images of exemplary silicon nanostructures comprising a crystalline core and an amorphous silicon shell (insets of FIGS. 25A, 25C and 25F present fast Fourier transforms).

FIGS. 26A-26E presents high resolution scanning electron microscopy images of p-type silicon nanostructures grown by CVD for 140 minutes on a stainless steel mesh (25 µm) pre-treated with HF for 30 minutes (average domain diameter=232.5±3.5 nm).

Figure 27:
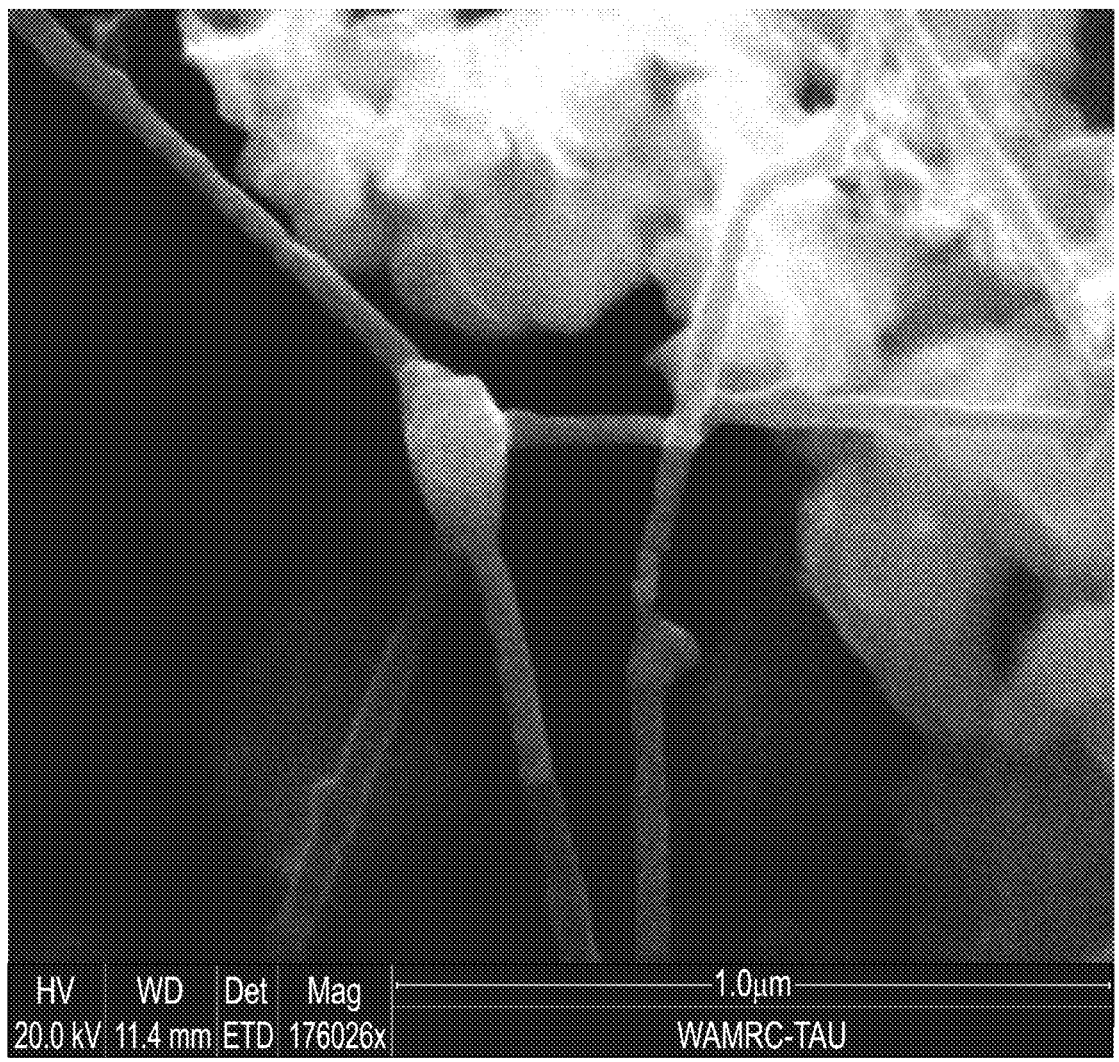
Figure 28A:
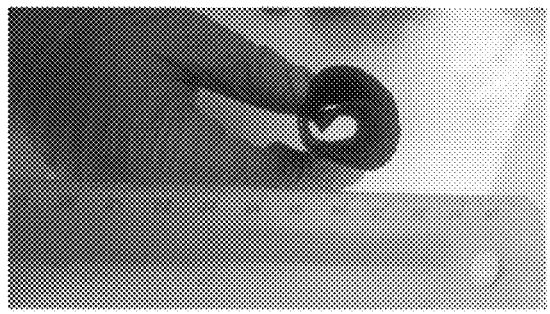
Figure 28B:
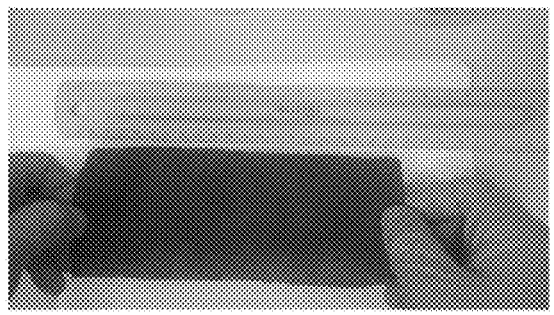
Figure 28C:
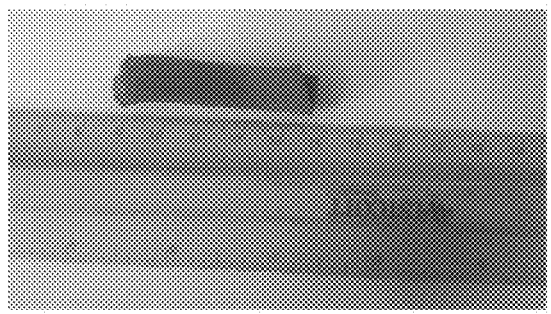
Figure 28D:

FIG. 27 presents a high resolution scanning electron microscopy image of welded silicon junctions following high-temperature annealing of a silicon network, according to some embodiments of the invention.

FIGS. 28A-28D presents images of an HF-treated stainless steel mesh (25 µm) rolled into a cylinder (diameter approximately 1.5 cm), before (FIG. 28A) and after (FIG. 28B-28D) being subjected to CVD (for 90 minutes at 25 Torr and 460° C.) to deposit silicon nanostructures.

Figure 29A:
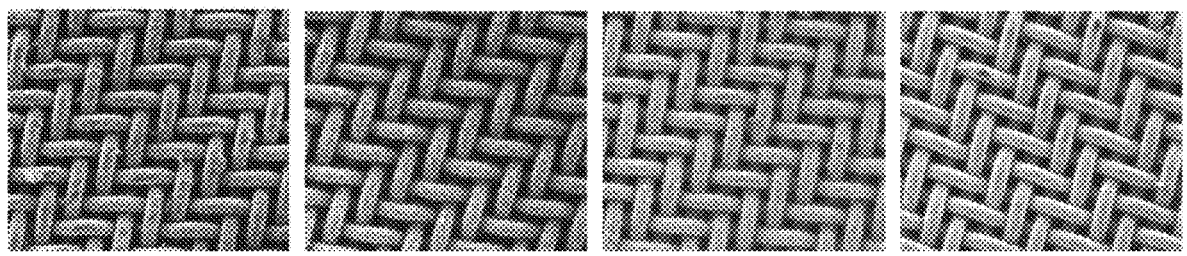
Figure 29B:
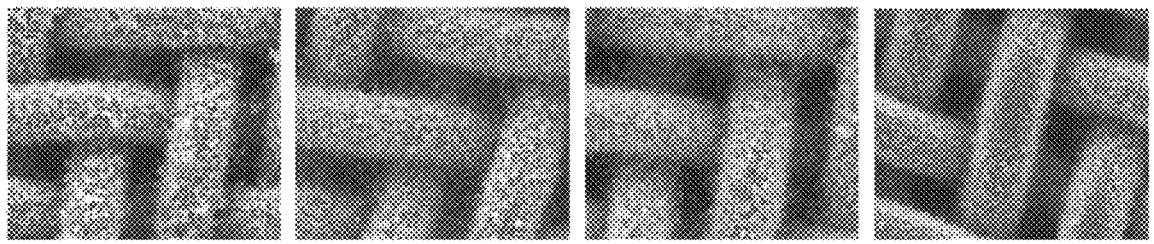
Figure 30A:
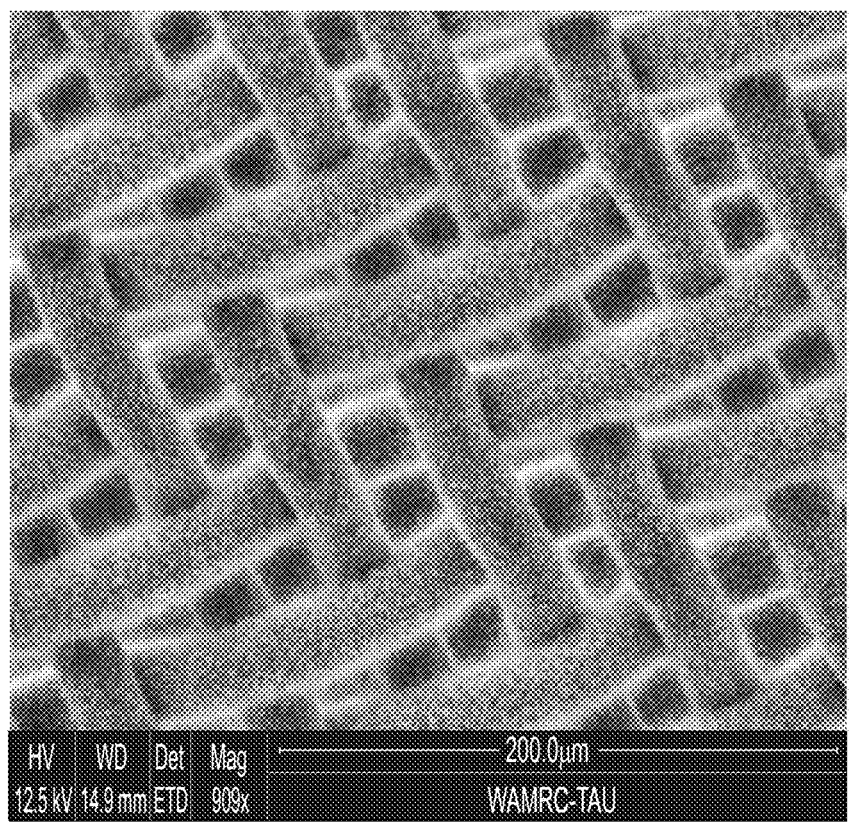
Figure 30B:
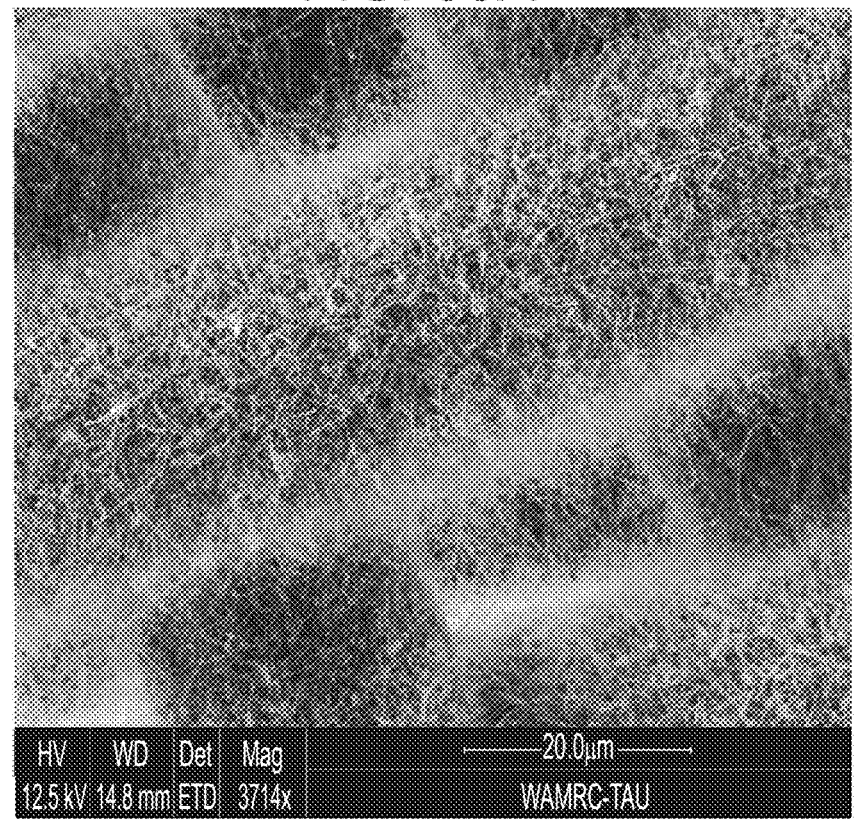
Figure 30C:
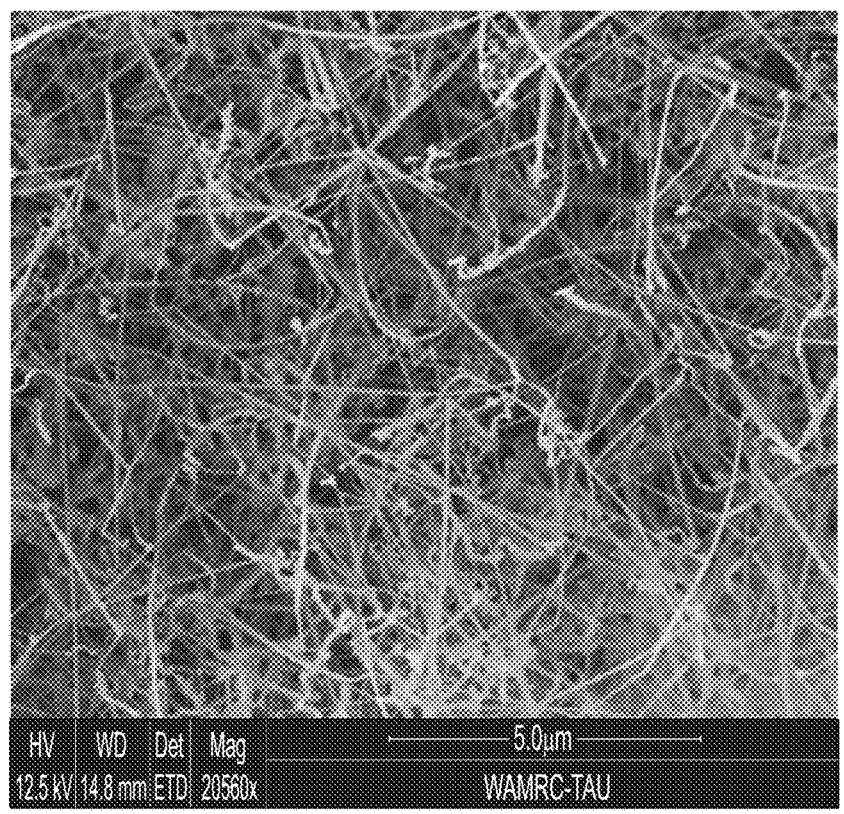
Figure 30D:
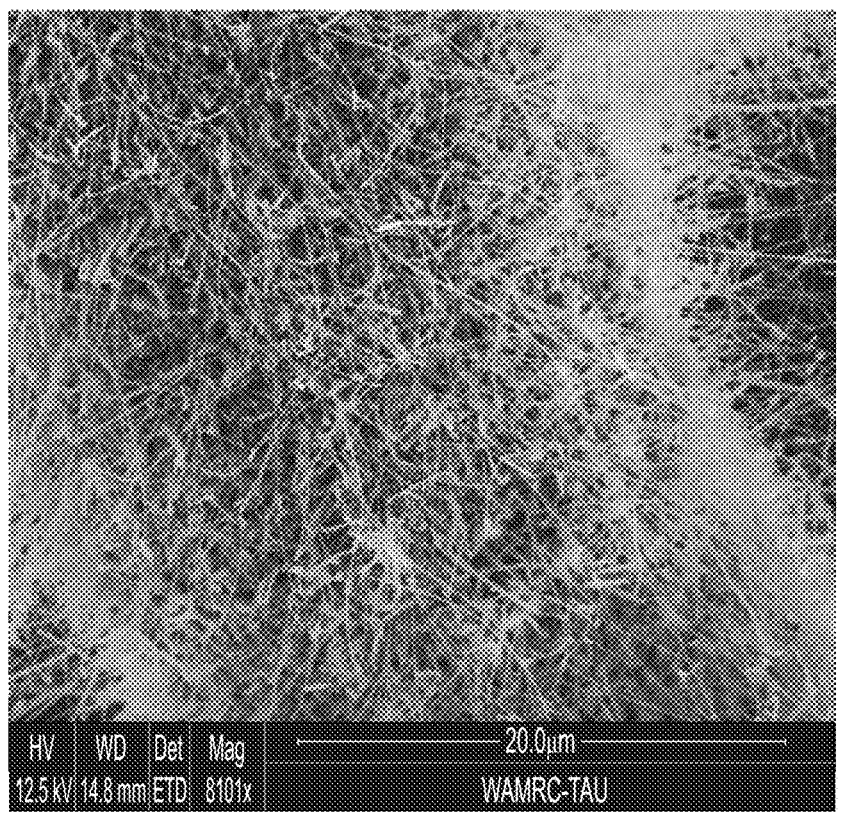
Figure 30E:
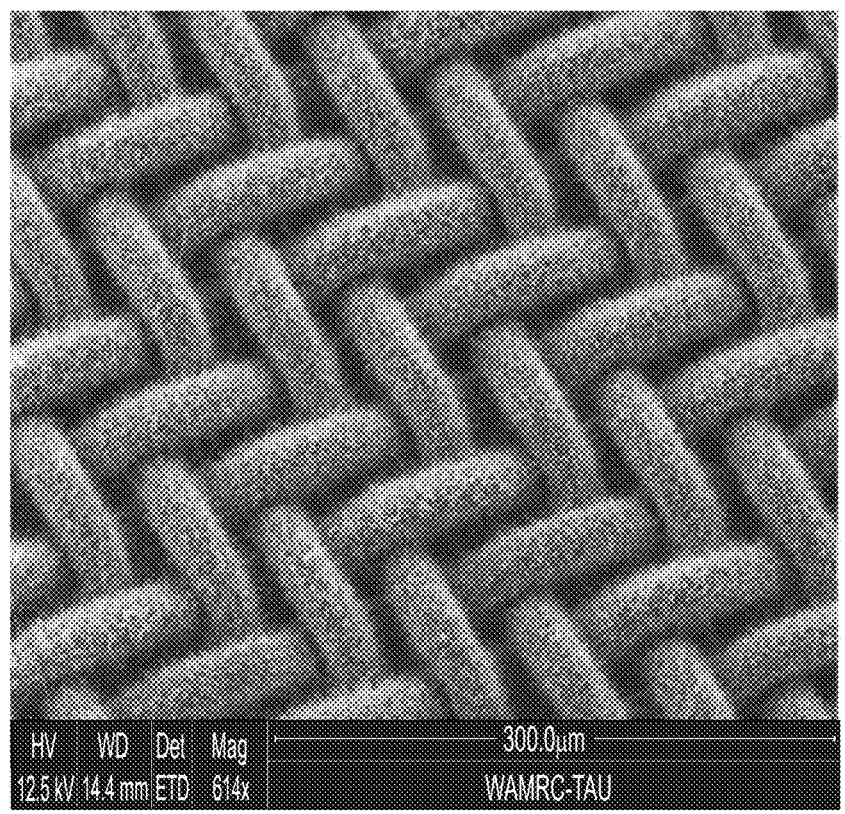
Figure 30F:
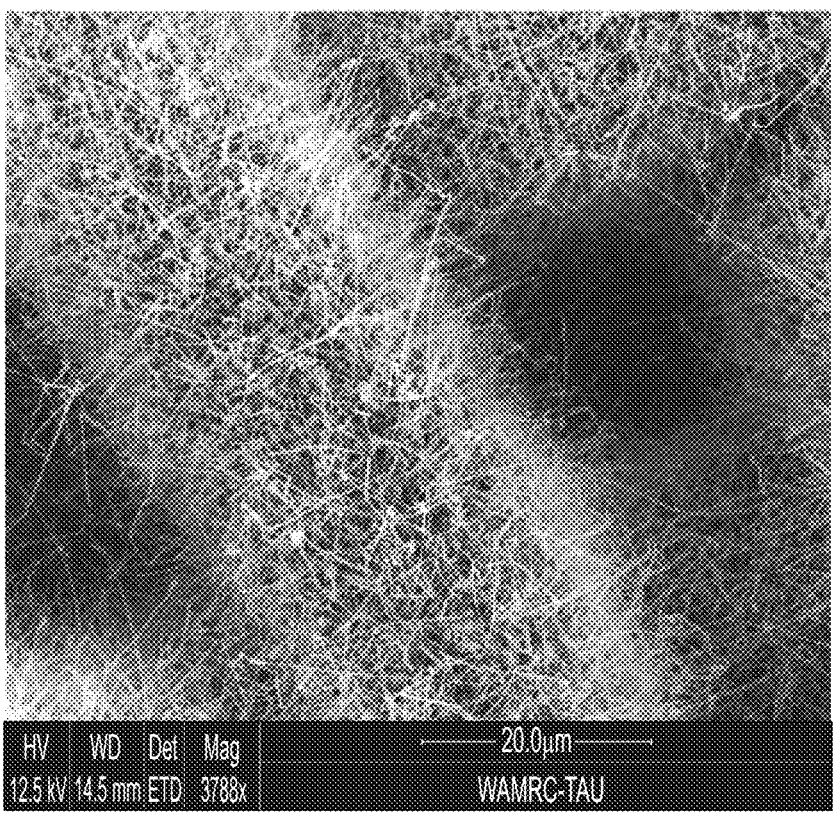

FIGS. 29A and 29B each presents images of an HF-treated stainless steel sheet (25 µm) rolled and subjected to CVD (as described for FIG. 28) taken from different lengths of the roll, at moderate (FIG. 29A) and high (FIG. 29B) magnification (left-side corresponds to upstream and right-side corresponds to downstream with respect to silane flow) (HV=15.0 kV, WD=11.0-11.3 mm, magnification about ×500 in FIG. 29A, and about ×2000 in FIG. 29B).

FIGS. 30A-30F present scanning electron microscopy images of a stainless steel mesh following heat-treatment at temperatures in a range of 950–1100° C. in a hydrogen-containing atmosphere according to some embodiments of the invention.

FIGS. 31A-31E present transmission electron microscopy images (FIGS. 31A, 31C and 31D), an EDX spectroscopy spectrum (FIG. 31B) and a fast Fourier transform (FIG. 31E; of the sample shown in FIG. 31D) of metal-based structures on a stainless steel mesh following heat-treatment at temperatures in a range of 950–1100° C. in a hydrogen-containing atmosphere according to some embodiments of the invention (scale bar represents 20 nm).

FIGS. 32A-32F present transmission electron microscopy images of silicon-coated metal-based structures on stainless steel mesh following heat-treatment at temperatures in a range of 950–1100° C. in a hydrogen-containing atmosphere, and deposition of silicon by chemical vapor deposition, according to some embodiments of the invention (scale bar represents 20 nm); insets of FIGS. 32C-32F present fast Fourier transforms.

Figure 33:
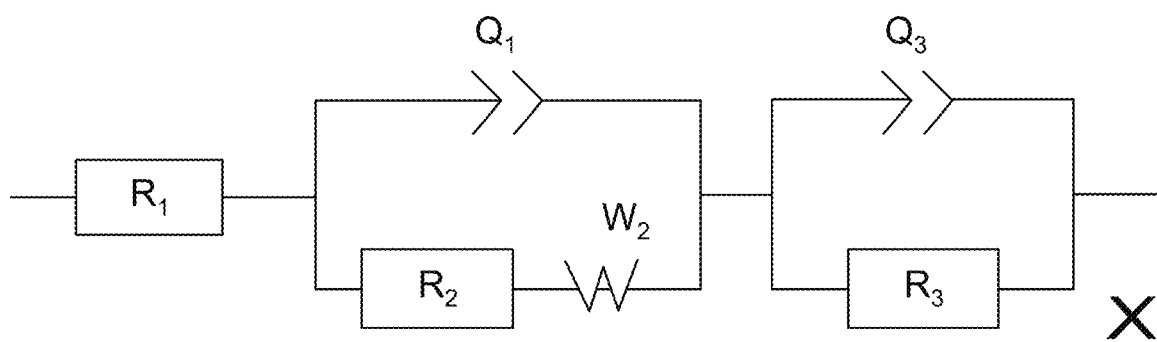

FIG. 33 depicts a Randles circuit model used for analysis.

Figure 34A:
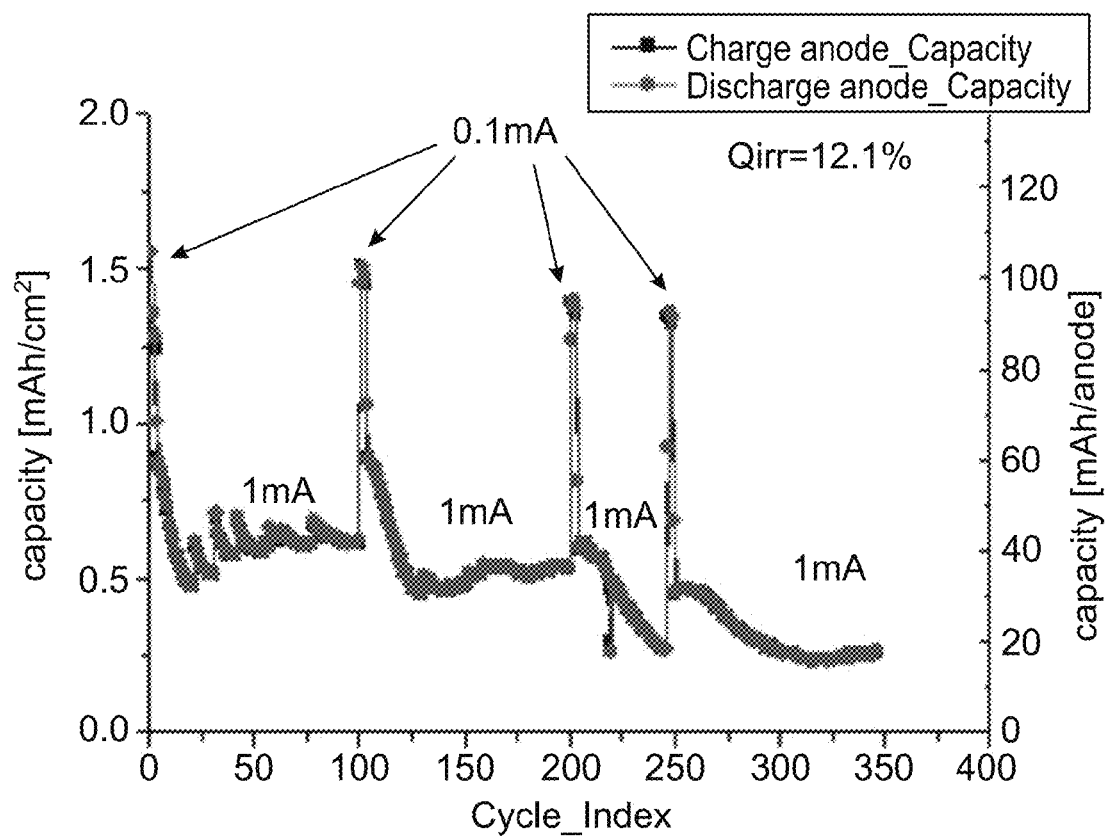
Figure 34B:
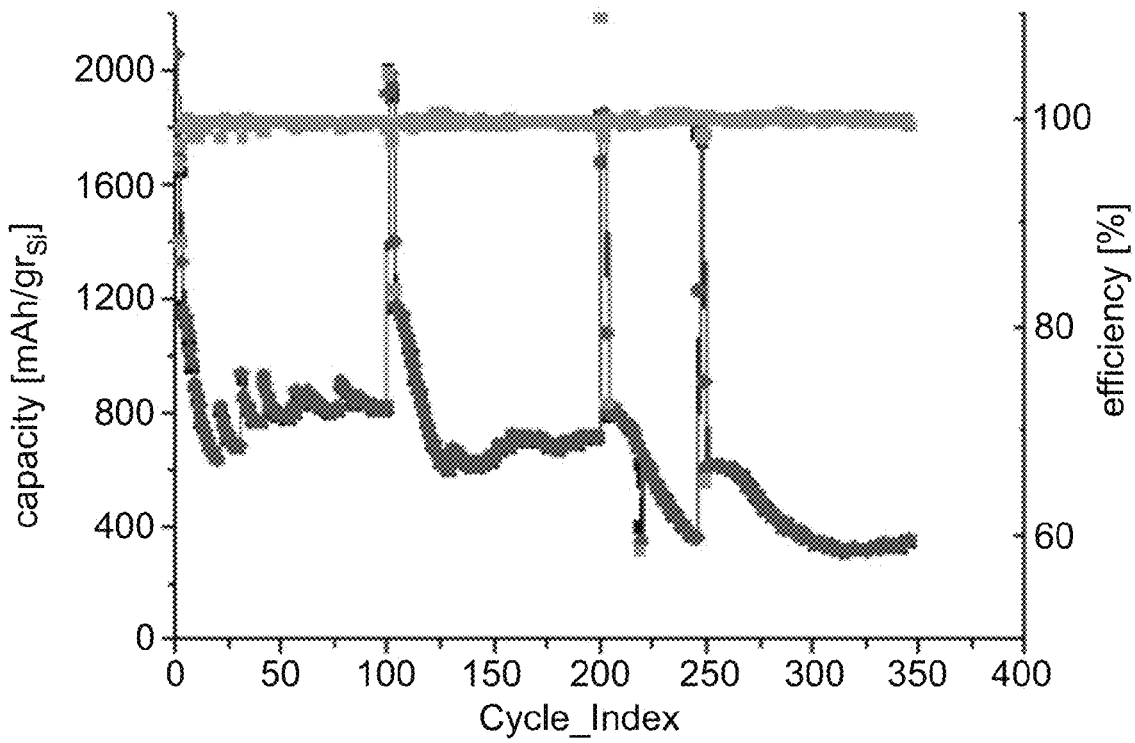

FIGS. 34A and 34B present graphs showing capacity (in units of mAh per cm$^2$ or per anode (FIG. 34A) or per gram silicon (FIG. 34B)) and coulombic efficiency (FIG. 34B) of silicon nanostructure anode (0.77 mg p-doped [1:4000] silicon per cm$^2$ on stainless steel mesh) during charge or discharge as a function of number of electrochemical cycles (cycle index) in range of 0.05-1 V (electrolyte is 0.85 M LiPF$_6$ in EC:DEC+2% VC+15% FEC).

Figure 35:
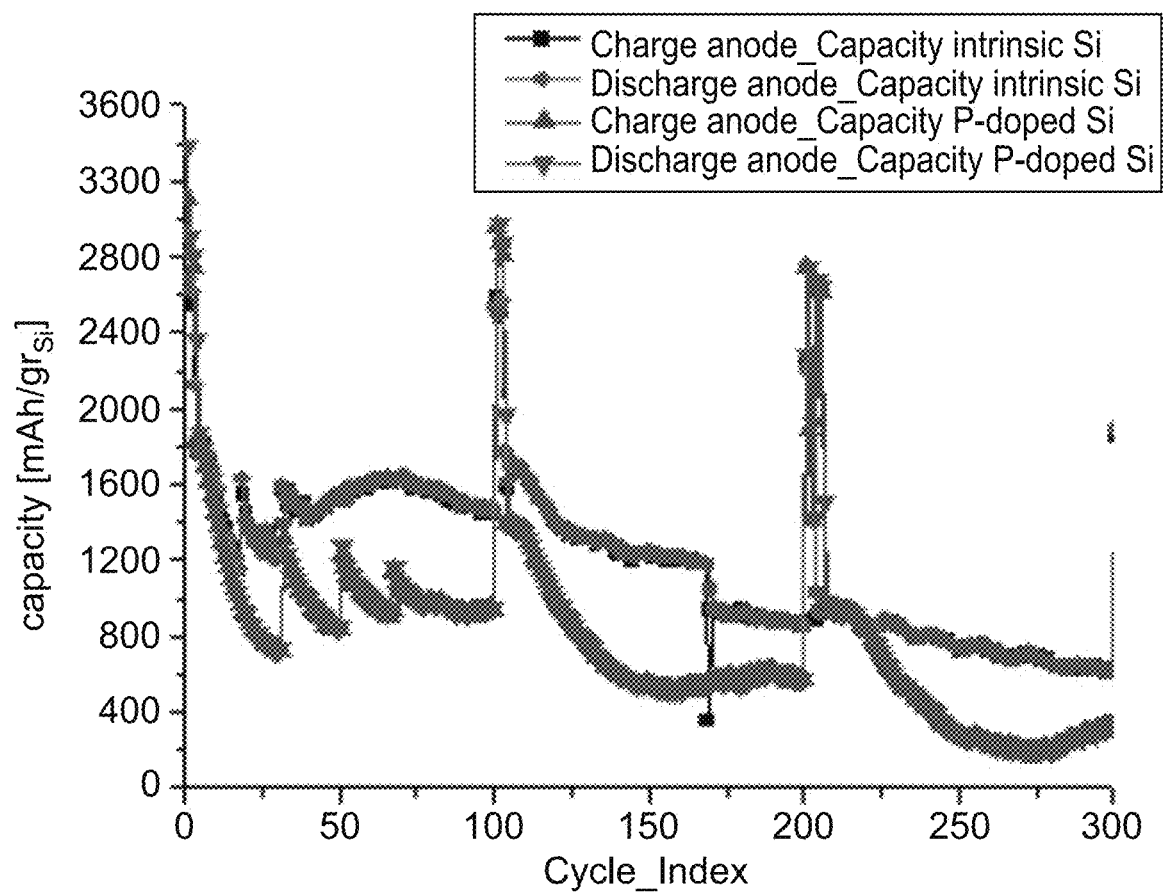

FIG. 35 presents a graph showing capacity (in units of mAh per gram silicon) of p-doped and intrinsic silicon nanostructure anode (alumina-coated silicon on stainless steel mesh) during charge or discharge as a function of number of electrochemical cycles (cycle index).

Figure 36:
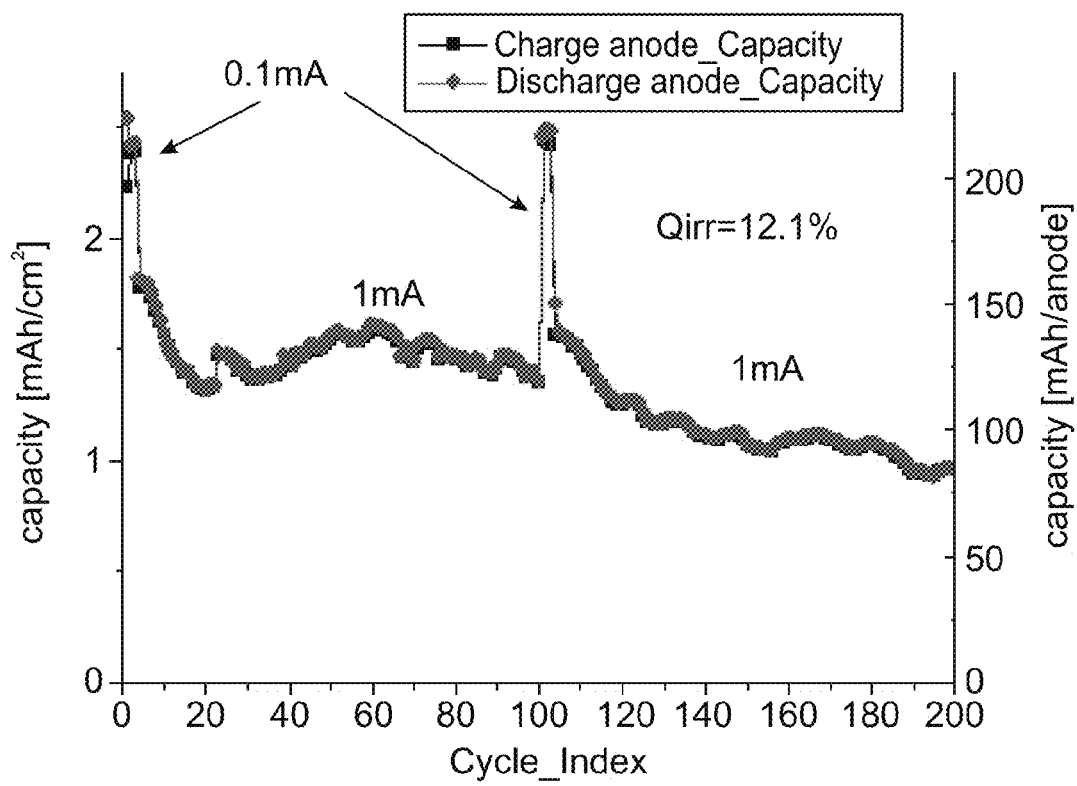

FIG. 36 presents a graph showing capacity (in units of mAh/cm$^2$ and units of mAh per anode) of silicon nanostructure anode (0.78 cm$^2$, 0.7 mg Si on stainless steel mesh) with regular carbon ink during charge or discharge as a function of number of electrochemical cycles (cycle index) in range of 0.05-1 V (electrolyte is 0.85 M LiPF$_6$ in EC:DEC+2% VC+15% FEC); average CE (coulombic efficiency) was 99.24%.

Figure 37:
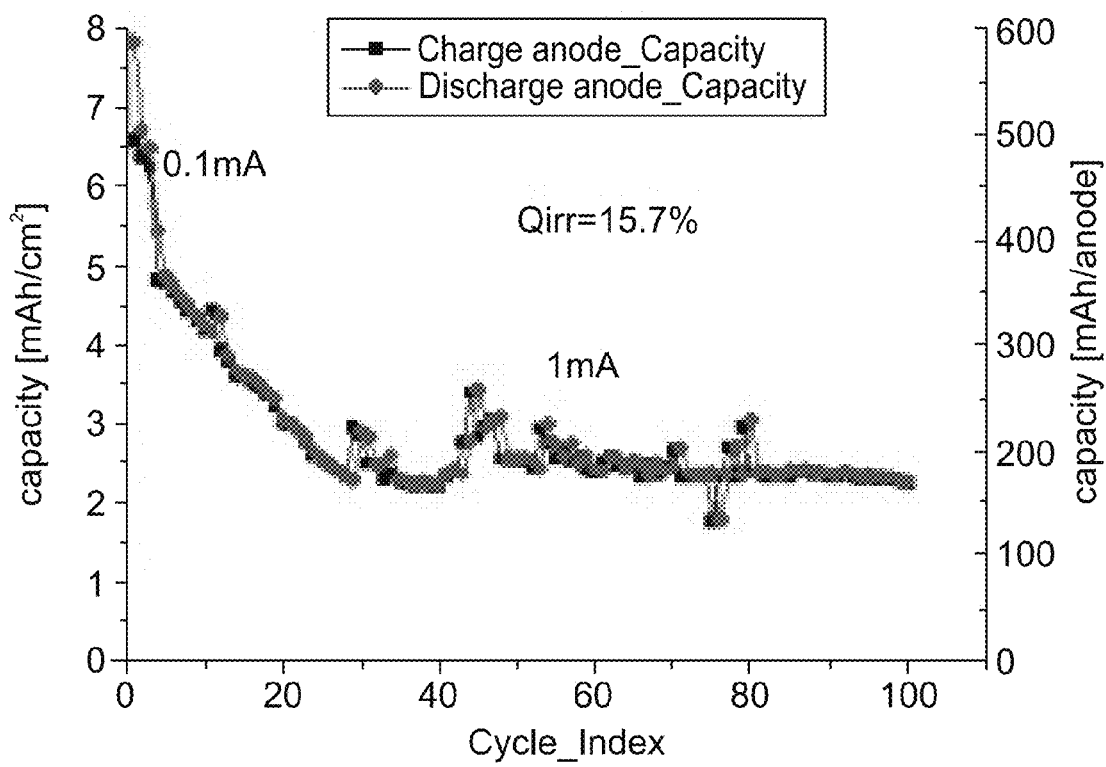

FIG. 37 presents a graph showing capacity (in units of mAh/cm$^2$ and units of mAh per anode) of silicon nanostructure anode (0.78 cm$^2$, 1.4 mg Si on stainless steel mesh) with regular carbon ink during charge or discharge as a function of number of electrochemical cycles (cycle index) in range of 0.05-1 V (electrolyte is 0.85 M LiPF$_6$ in EC:DEC+2% VC+15% FEC); average CE was 99.04%.

Figure 38:
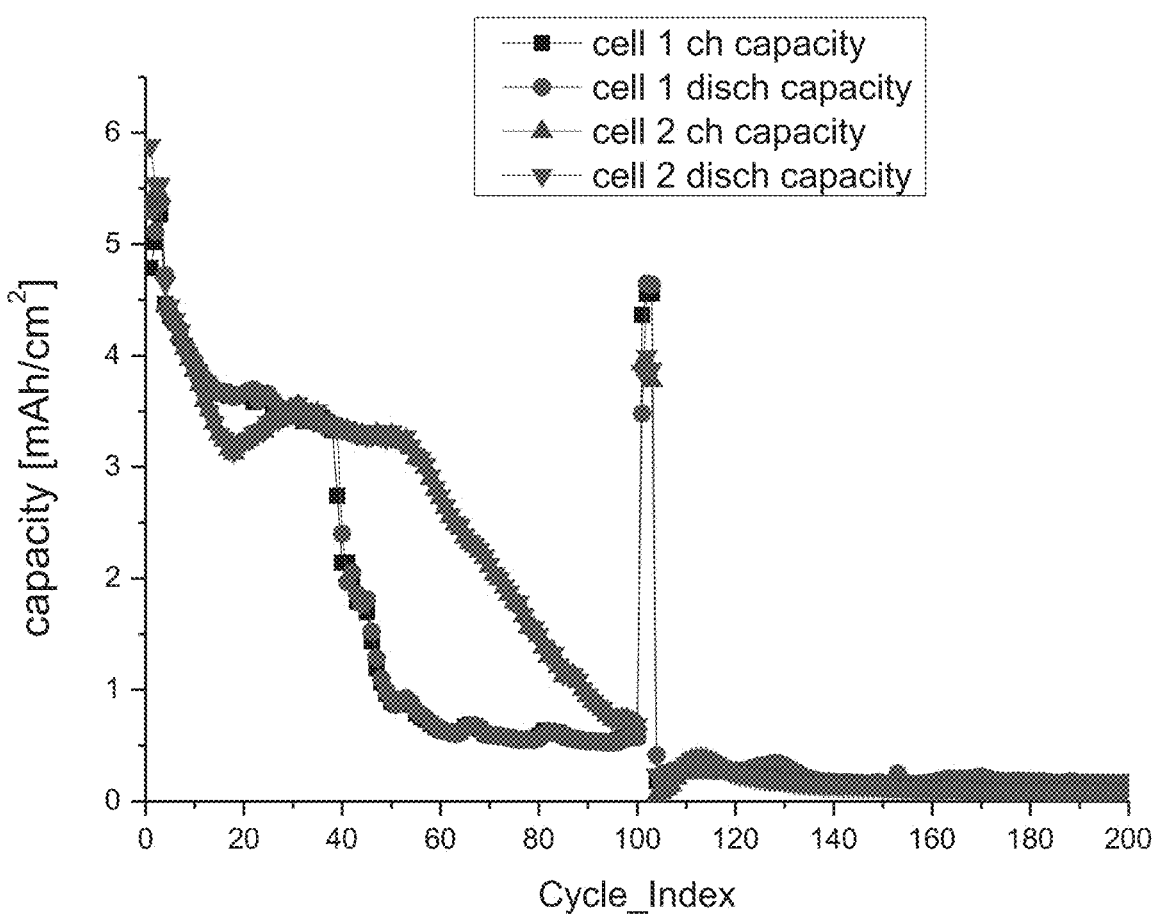

FIG. 38 presents a graph showing capacity of two silicon nanostructure anodes (1.13 cm$^2$, 2.26 mg Si on stainless steel mesh) with TUBALL carbon nanotube ink during charge (ch) or discharge (disch) as a function of number of electrochemical cycles (cycle index) in range of 0.05-1 V (electrolyte is 0.85 M LiPF$_6$ in EC:DEC+2% VC+15% FEC).

Figure 39:
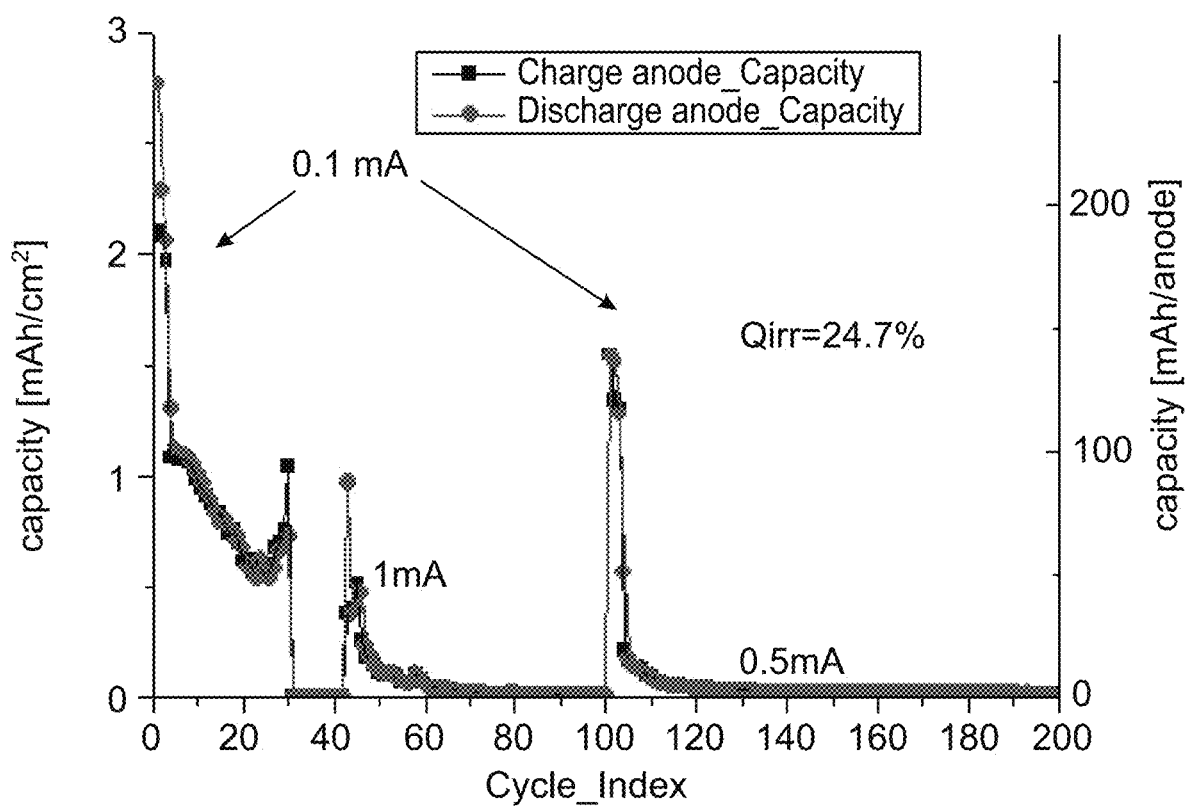

FIG. 39 presents a graph showing capacity of a silicon nanostructure anode (0.78 cm$^2$, 0.7 mg Si on stainless steel mesh) with no carbon ink during charge or discharge as a function of number of electrochemical cycles (cycle index) in range of 0.05-1 V (electrolyte is 0.85 M LiPF$_6$ in EC:DEC+2% VC+15% FEC).

Figure 40:
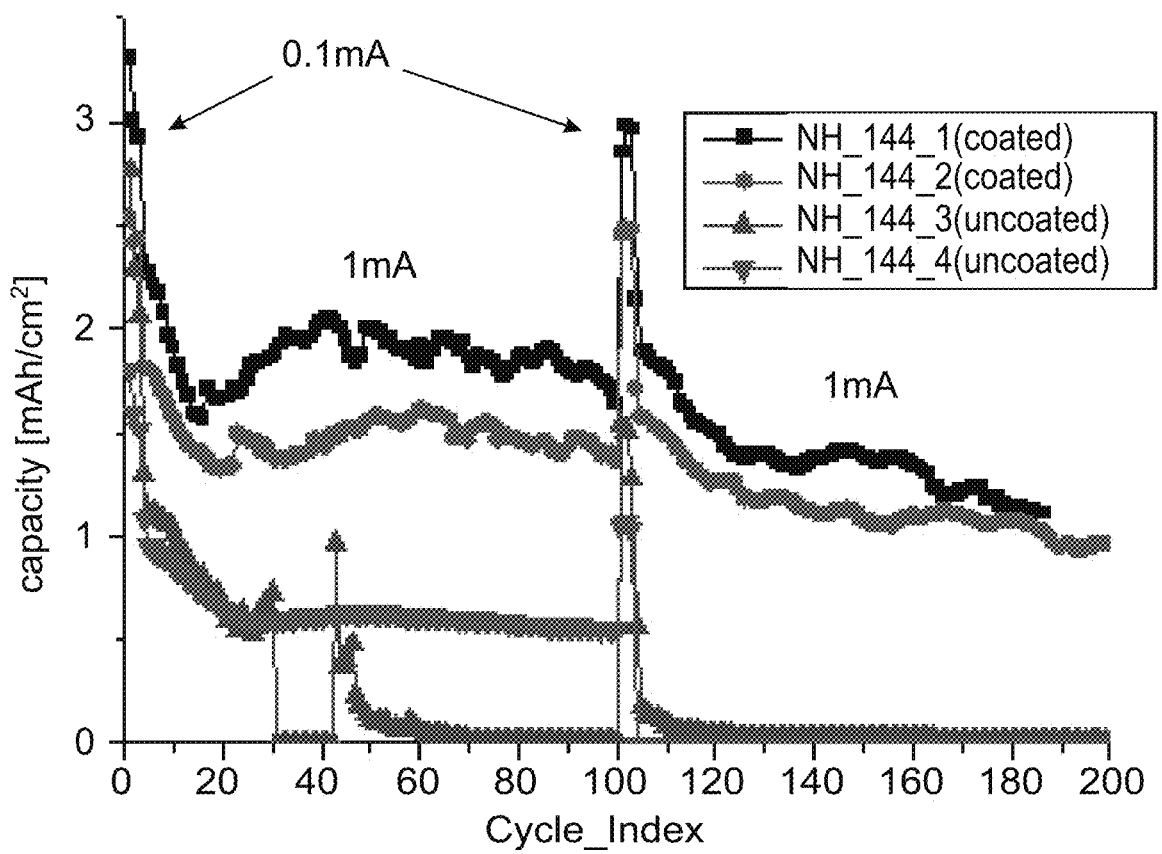

FIG. 40 presents a graph showing capacity of 4 silicon nanostructure anodes, coated or uncoated with carbon ink (0.93 mg/cm$^2$), as a function of number of electrochemical cycles (cycle index).

Figure 41:
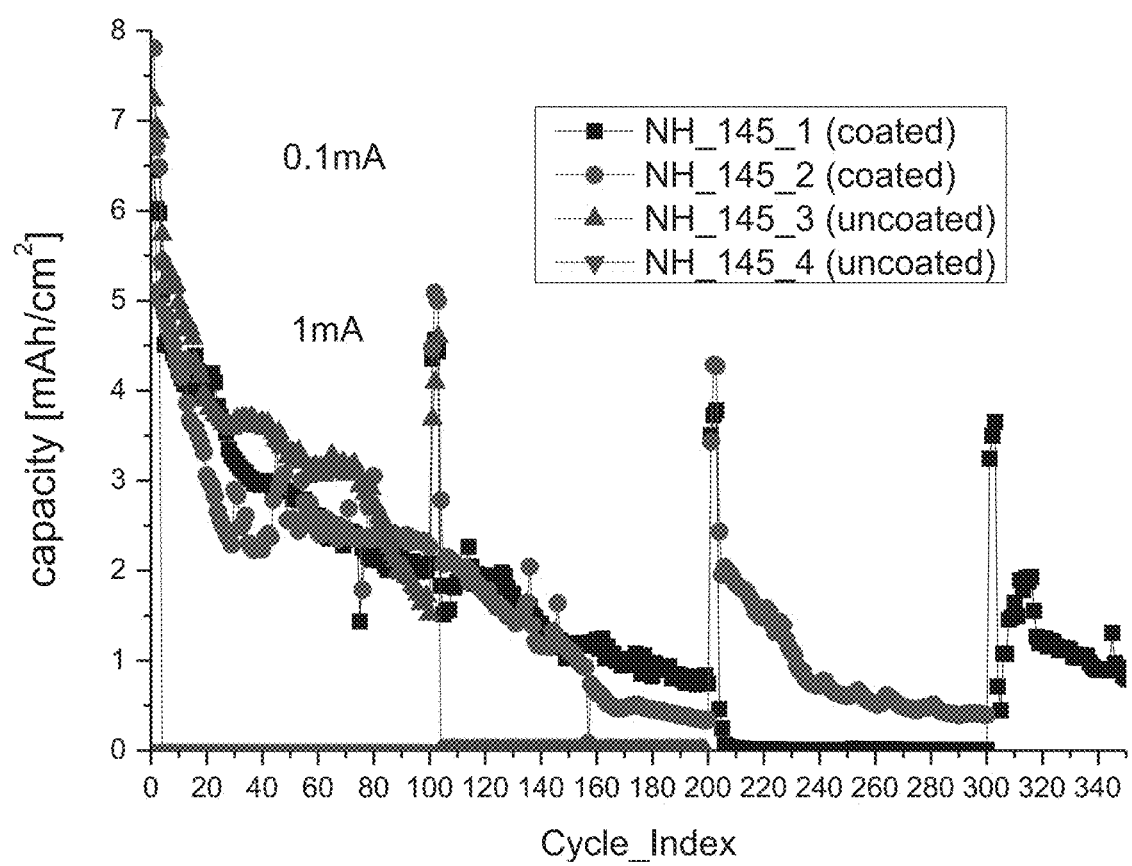

FIG. 41 presents a graph showing capacity of 4 silicon nanostructure anodes, coated or uncoated with carbon ink, as a function of number of electrochemical cycles (cycle index) versus lithium metal (1.86 mg/cm$^2$).

Figure 42:
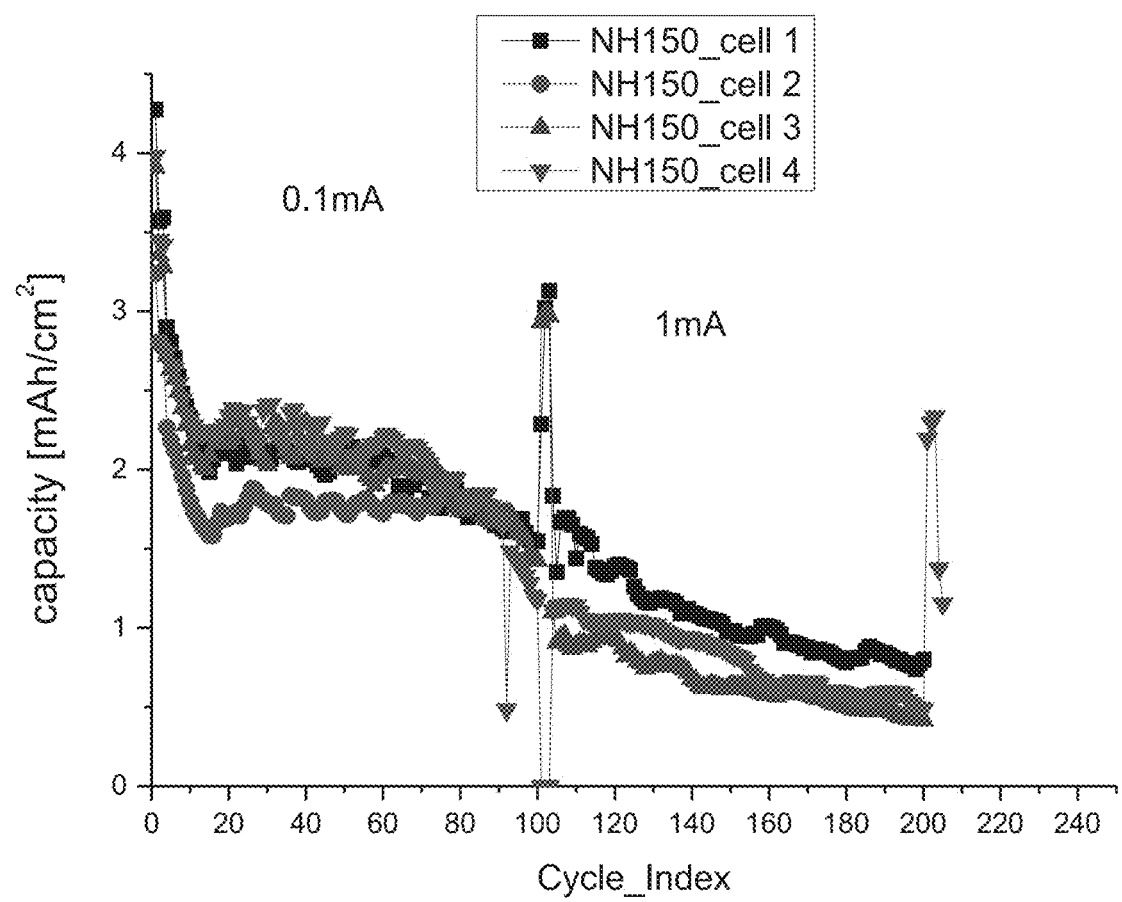

FIG. 42 presents a graph showing capacity of 4 silicon nanostructure anodes coated with SWCNT ink, as a function of number of electrochemical cycles (cycle index) versus lithium metal (1.15 mg/cm$^2$).

Figure 43:
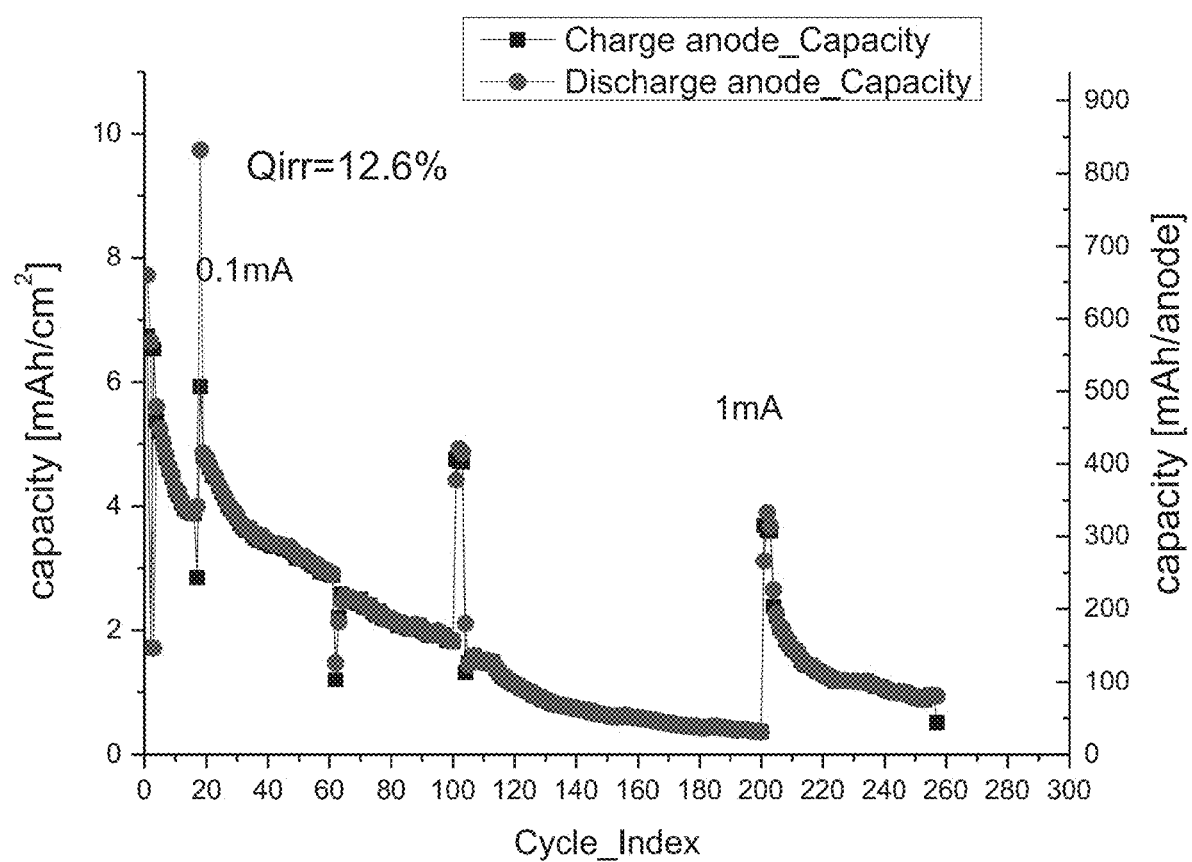

FIG. 43 presents a graph showing capacity of a silicon nanostructure anode coated with SWCNT ink, during charge or discharge as a function of number of electrochemical cycles (cycle index) versus lithium metal (2.2 mg/cm$^2$).

Figure 44:
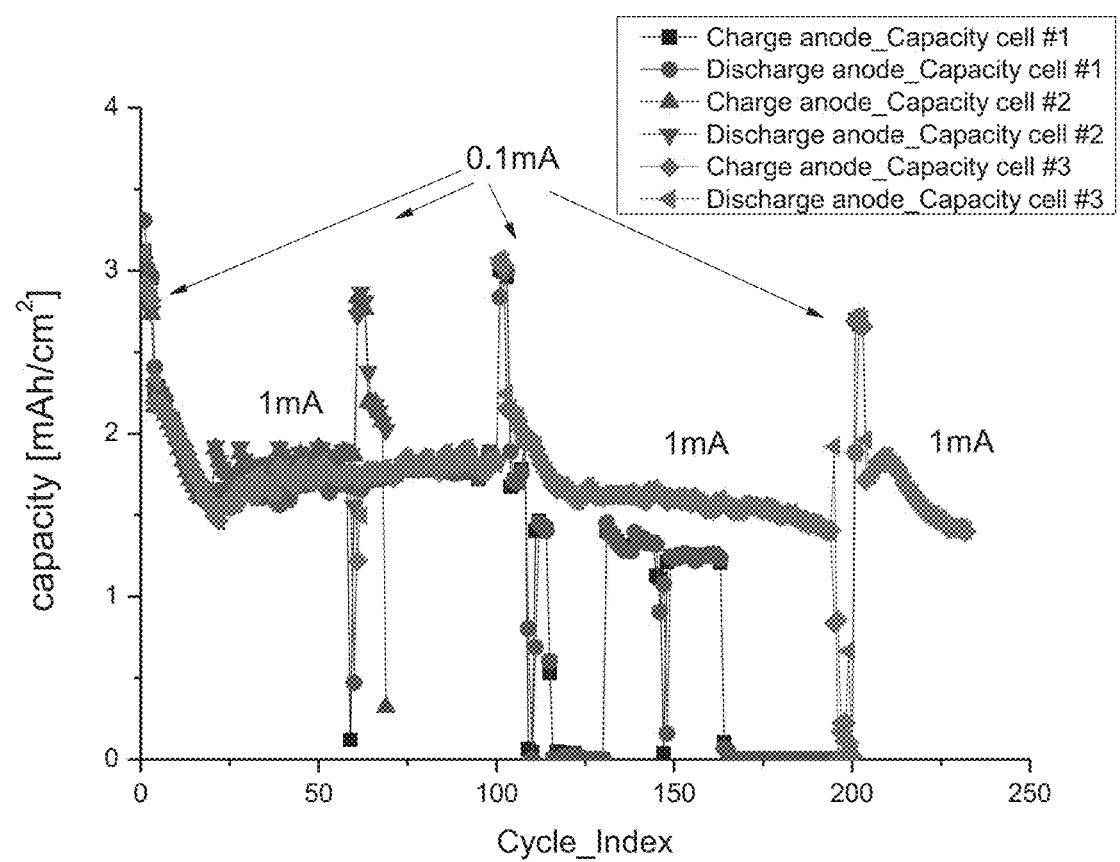

FIG. 44 presents a graph showing capacity of 3 silicon nanostructure anodes (1.13 cm$^2$, 1 mg Si) coated with SWCNT ink, during charge or discharge, as a function of number of electrochemical cycles (cycle index) in range of 0.05-1 V (electrolyte is 0.85 M LiPF$_6$ in EC:DEC+2% VC+15% FEC); cells #1-2 suffered from bugs in the programs, cell #3 is still running.

Figure 45A:
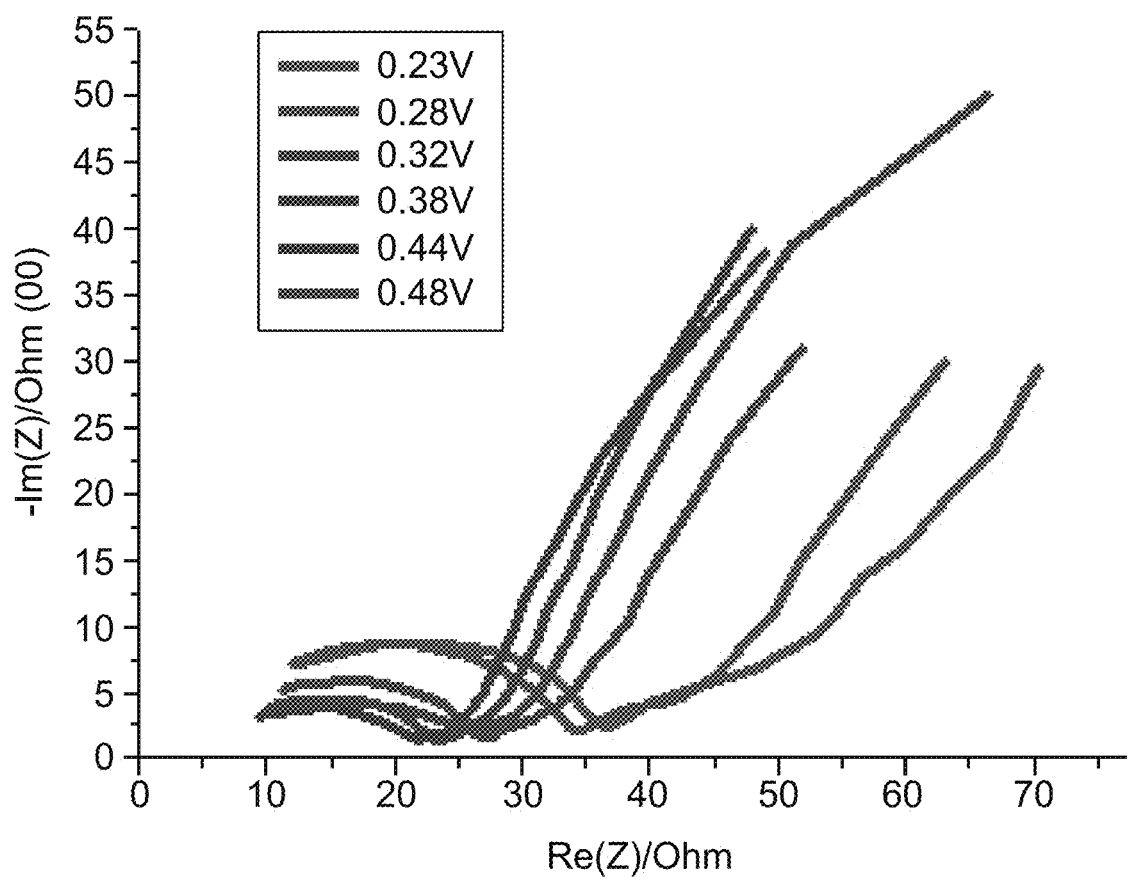
Figure 45B:
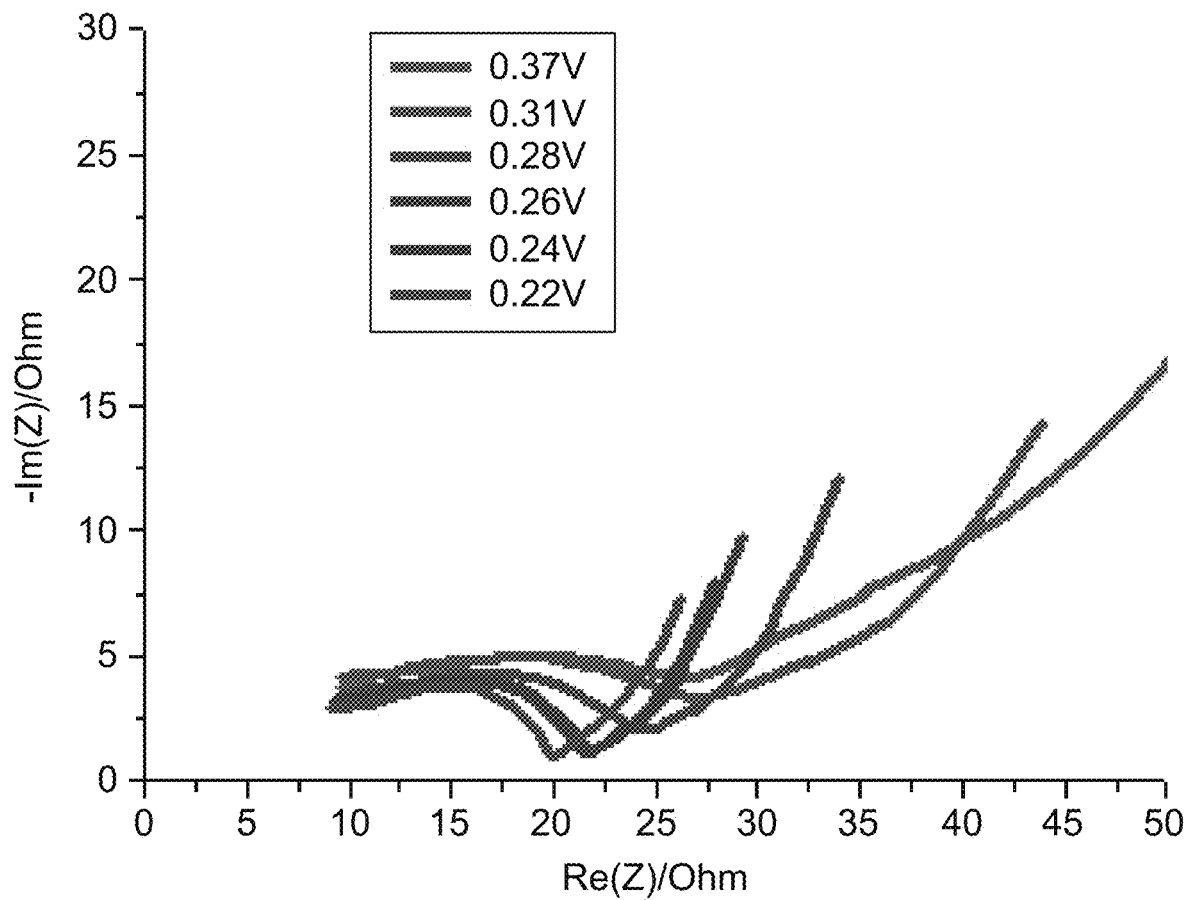

FIGS. 45A and 45B present impedance spectroscopy Nyquist plots for charge (FIG. 45A) and discharge (FIG. 45B) of a silicon nanostructure anode versus lithium metal.

Figure 46A:
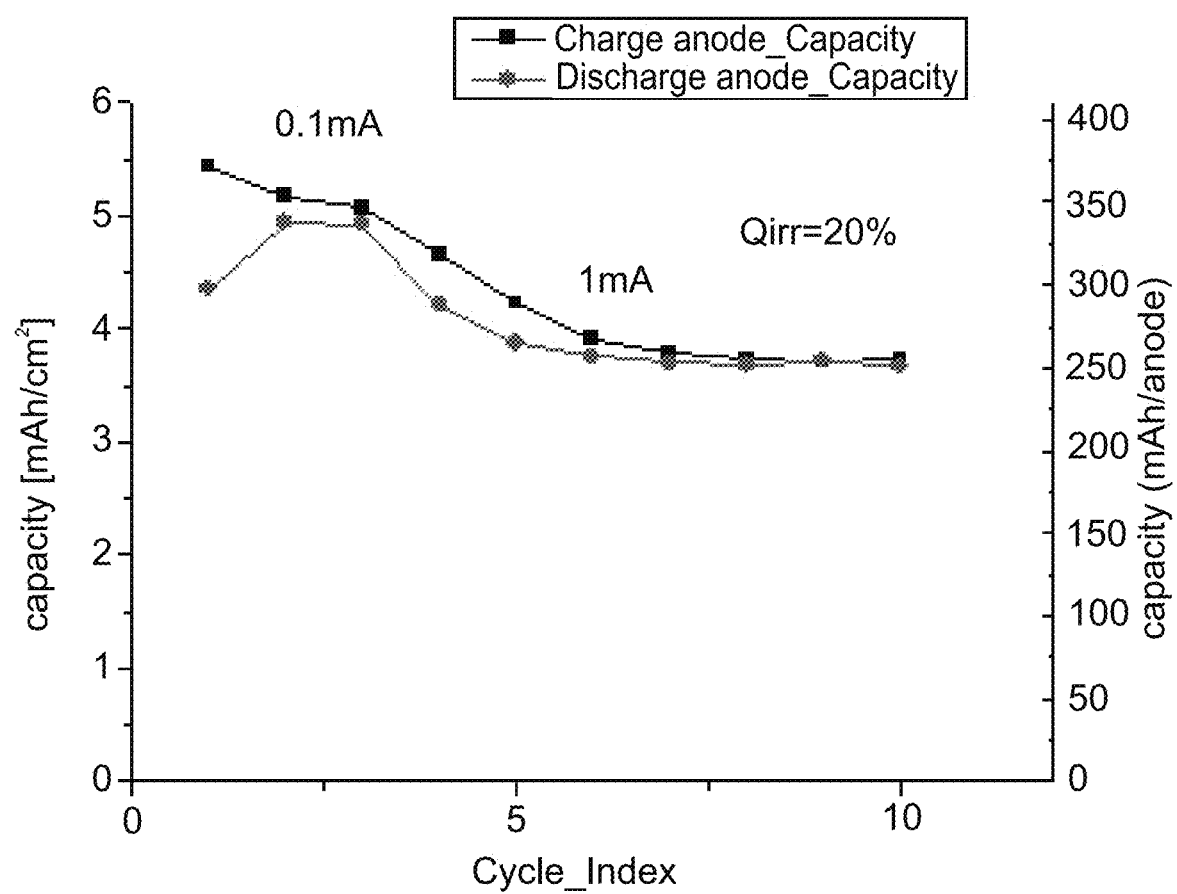
Figure 46B:
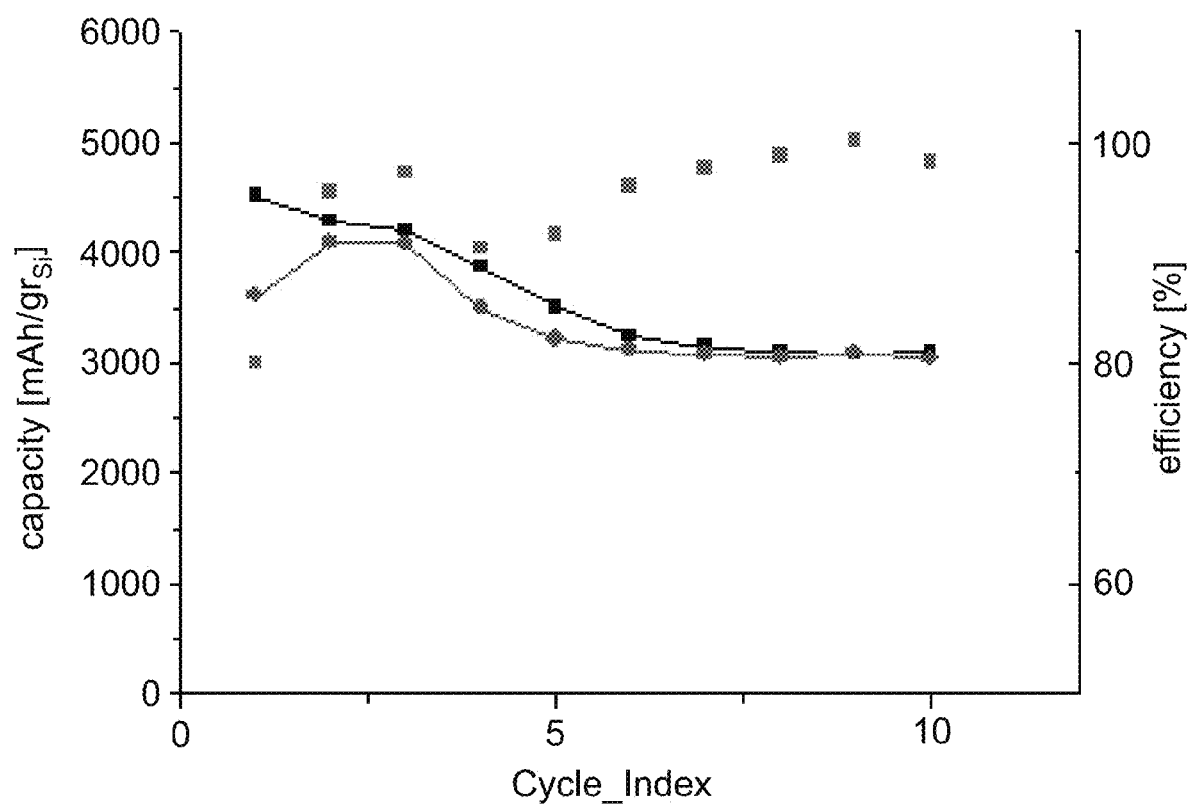

FIGS. 46A and 46B present graphs showing capacity (in units of mAh per cm$^2$ or per anode (FIG. 46A) or per gram silicon (FIG. 46B)) and coulombic efficiency (light squares in FIG. 46B) of silicon nanostructure anode (0.78 cm$^2$, 0.94 mg Si on stainless steel mesh) during charge or discharge as a function of number of electrochemical cycles (cycle index) versus NCA cathode (obtained from Tadiran) in range of 2.8-4 V (electrolyte is 0.95 M LiPF$_6$+0.05 M LIBOB in EMC:DMC:FEC:PC [3:3:3:1]).

Figure 47:
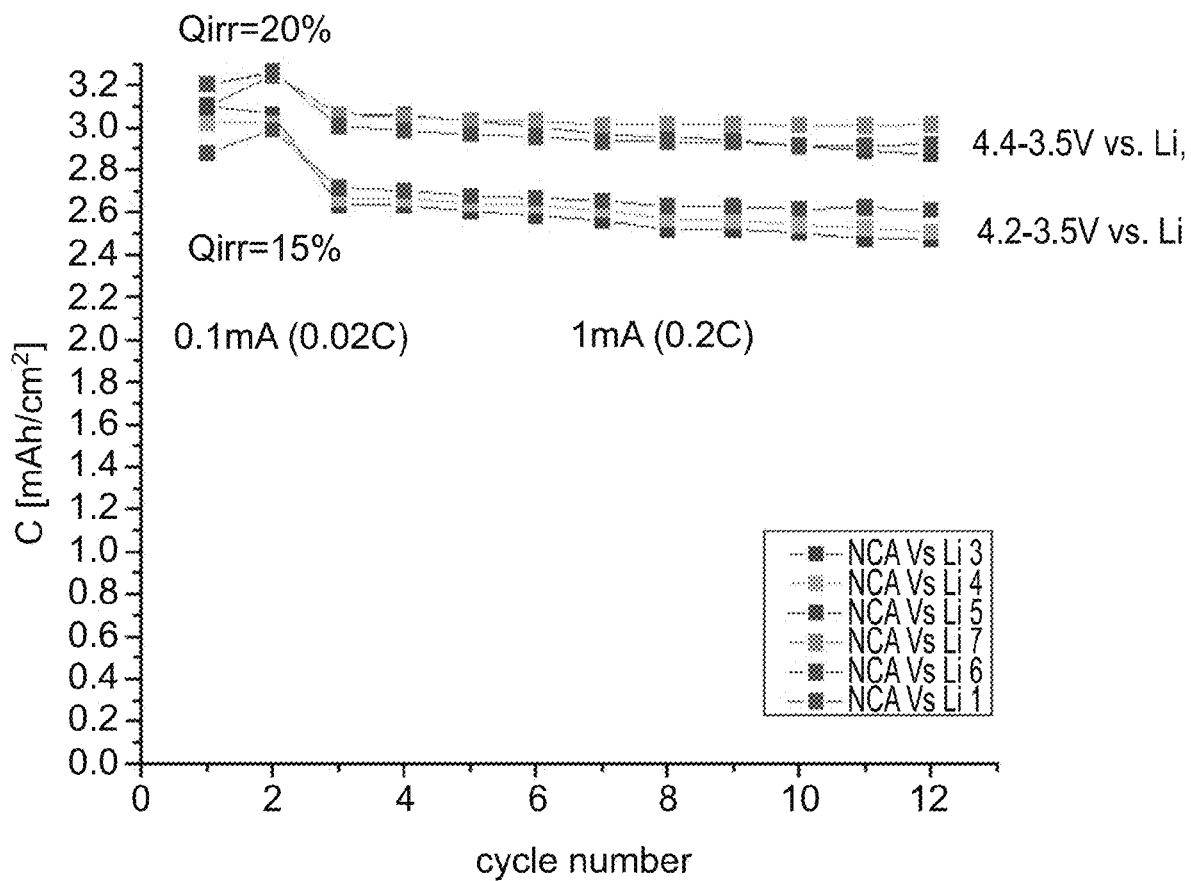

FIG. 47 presents a graph showing capacity (C) of NCA cathodes (1.77 cm$^2$, 19 mg/cm$^2$) versus lithium metal as a function of number of electrochemical cycles in a range of 4.4-3.5 V (cells 5-7) or 4.2-3.5 V (cells 1, 3, 4) (electrolyte is 0.85 M LiPF$_6$ in EC:DEC+2% VC+15% FEC).

Figure 48:
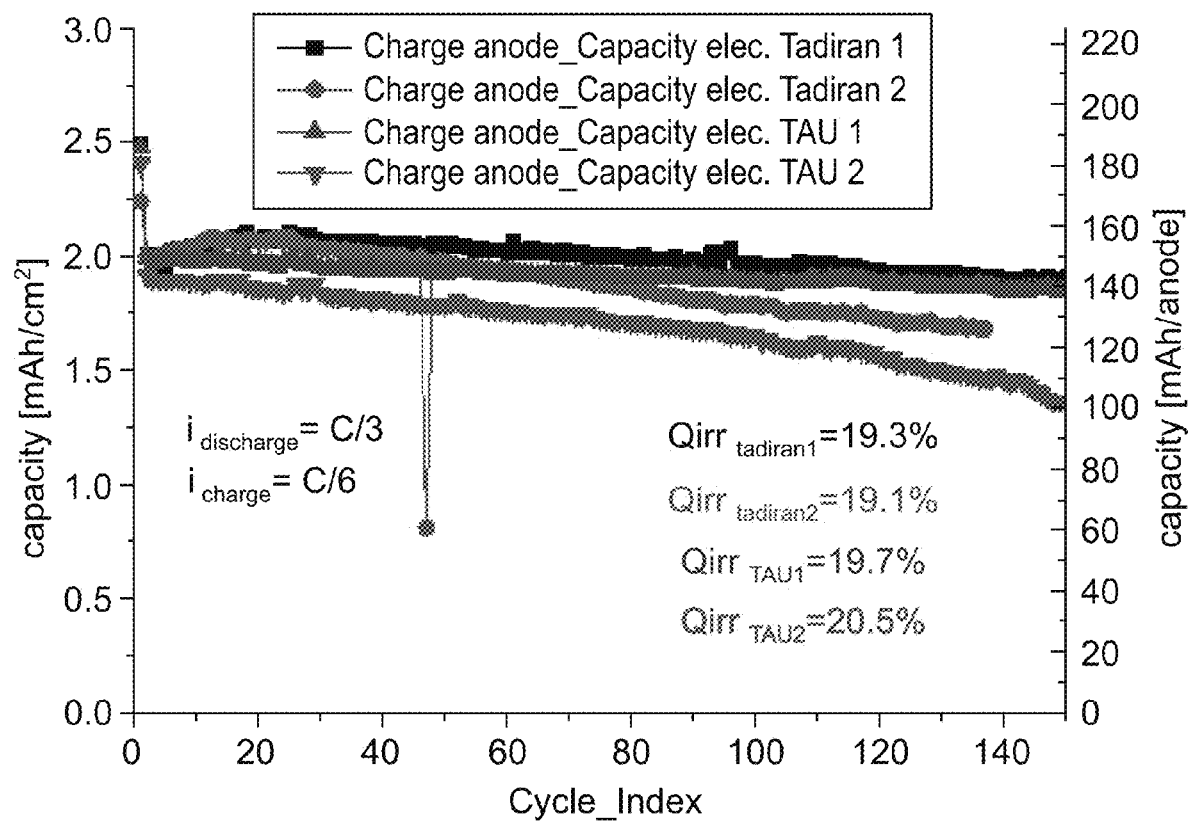

FIG. 48 presents a graph showing capacity of NCA cathodes (1.77 cm$^2$) versus lithium metal during charge, as a function of number of electrochemical cycles (cycle index) in range of 4.2-4.6 V, using 0.85 M LiPF$_6$ in EC:DEC+2% VC+15% FEC ("TAU" duplicate samples) or 0.95 M LiPF$_6$+0.05 M LIBOB in EMC:DMC:FEC:PC [3:3:3:1] ("Tadiran" duplicate samples) as electrolyte.

Figure 49:
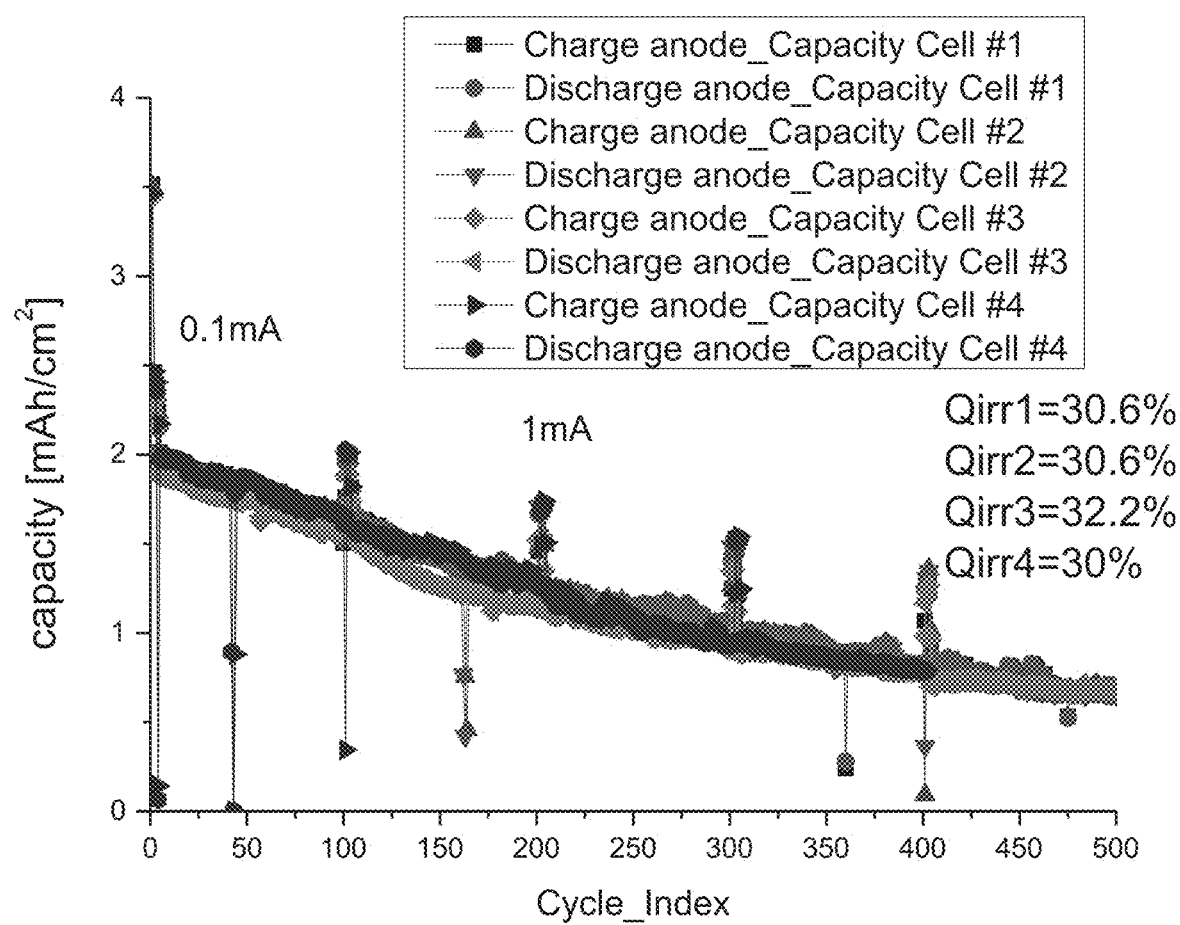

FIG. 49 presents a graph showing capacity of 4 silicon nanostructure anodes (2 mg/cm$^2$ Si) coated with SWCNT ink, during charge or discharge, as a function of number of electrochemical cycles (cycle index) in full cell versus NCA cathode in range of 4-3 V (electrolyte is 0.85 M LiPF$_6$ in EC:DEC+2% VC+15% FEC).

Figure 50:
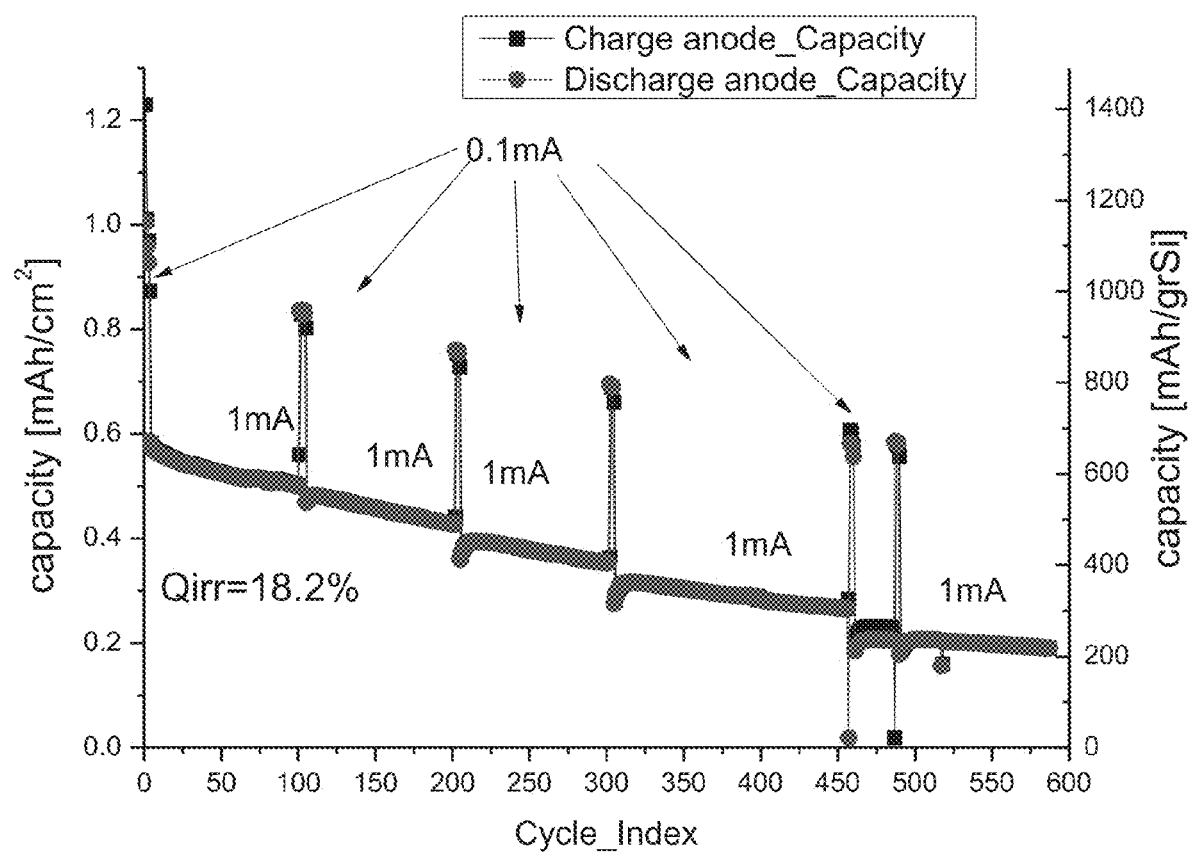

FIG. 50 presents a graph showing capacity of a silicon nanostructure anode (0.88 mg/cm$^2$ Si) coated with SWCNT ink, during charge or discharge, as a function of number of electrochemical cycles (cycle index) versus LFP cathode in range of 0.05-1 V (electrolyte is 0.85 M LiPF$_6$ in EC:DEC+2% VC+15% FEC); average CE was 99.93%.

Figure 51A:
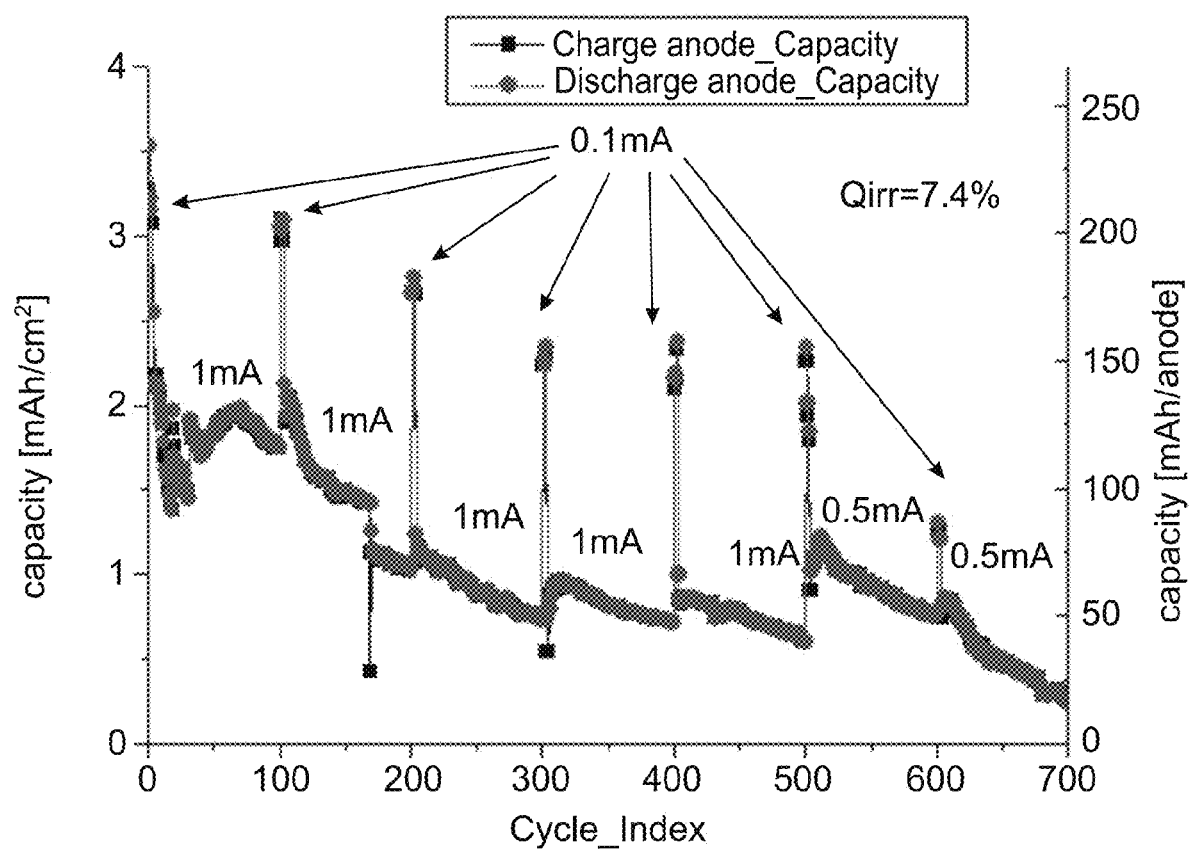
Figure 51B:
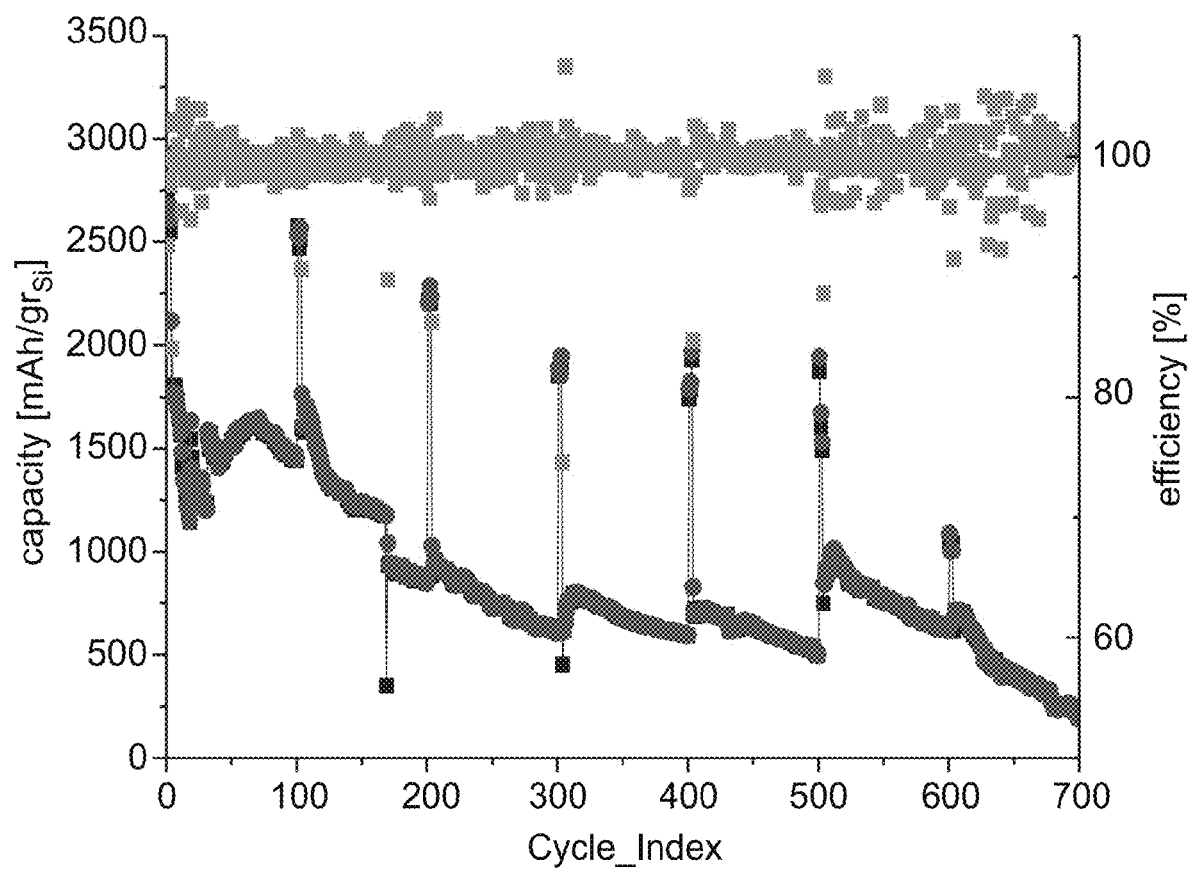

FIGS. 51A and 51B present graphs showing capacity (in units of mAh per cm$^2$ or per anode (FIG. 51A) or per gram silicon (FIG. 51B)) and coulombic efficiency (light squares in FIG. 51B) of (alumina-coated) silicon nanostructure anode (0.78 cm$^2$, 0.94 mg Si, 0.2 mg alumina on stainless steel mesh) during charge or discharge as a function of number of electrochemical cycles (cycle index) in range of 0.05-1 V (electrolyte is 0.85 M LiPF$_6$ in EC:DEC+2% VC+15% FEC); average CE was 99.4%, cell still active.

Figure 52:
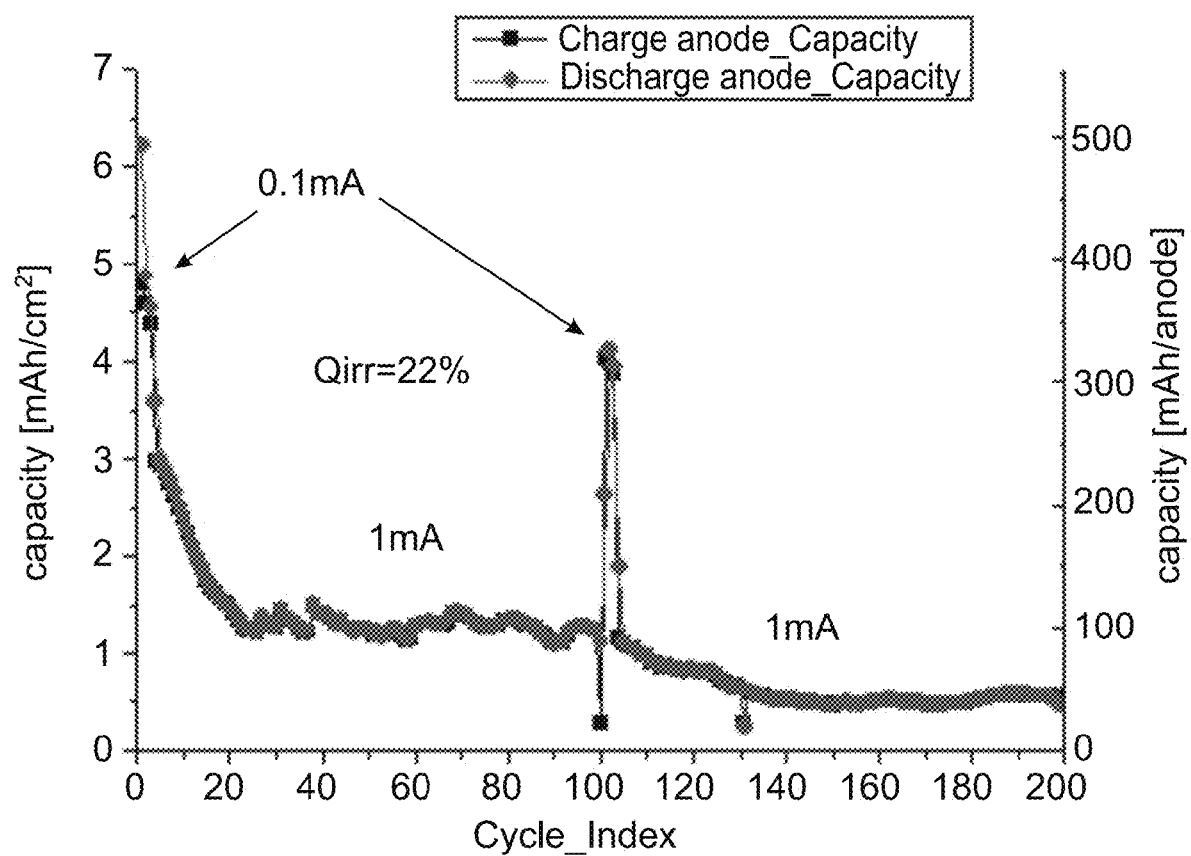

FIG. 52 presents a graph showing capacity of (alumina-coated) silicon nanostructure anode (0.78 cm$^2$, 1.7 mg Si on stainless steel mesh) coated with regular carbon ink, during charge or discharge, as a function of number of electrochemical cycles (cycle index) in range of 0.05-1 V (electrolyte is 0.85 M LiPF$_6$ in EC:DEC+2% VC+15% FEC); average CE was 99.14%.

Figure 53:
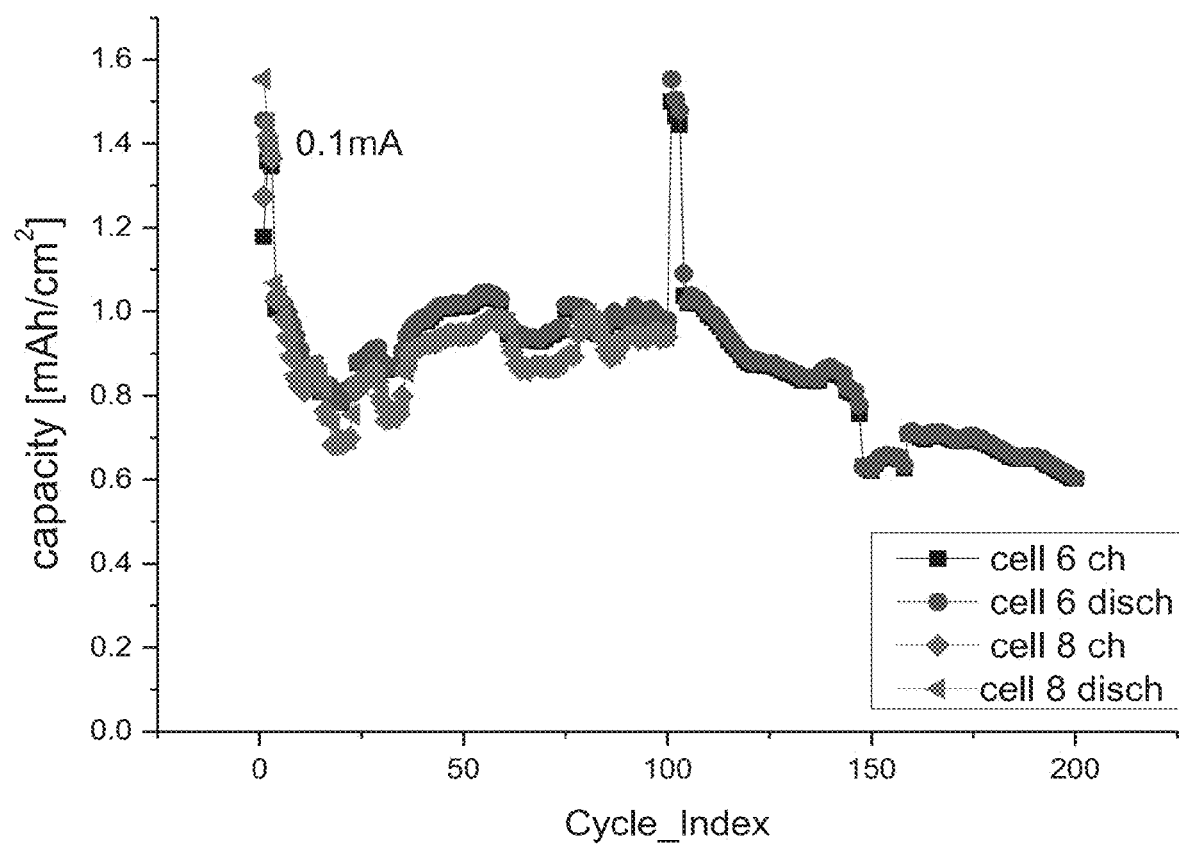

FIG. 53 presents a graph showing capacity of two (alumina-coated) silicon nanostructure anodes (0.5 mg/cm$^2$ Si, ~5 nm alumina, on stainless steel mesh) coated with regular carbon ink, during charge (ch) or discharge (disch), as a function of number of electrochemical cycles (cycle index) in full cell versus NCA cathode in range of 4-3 V (electrolyte is 0.85 M LiPF$_6$ in EC:DEC+2% VC+15% FEC).

Figure 54:
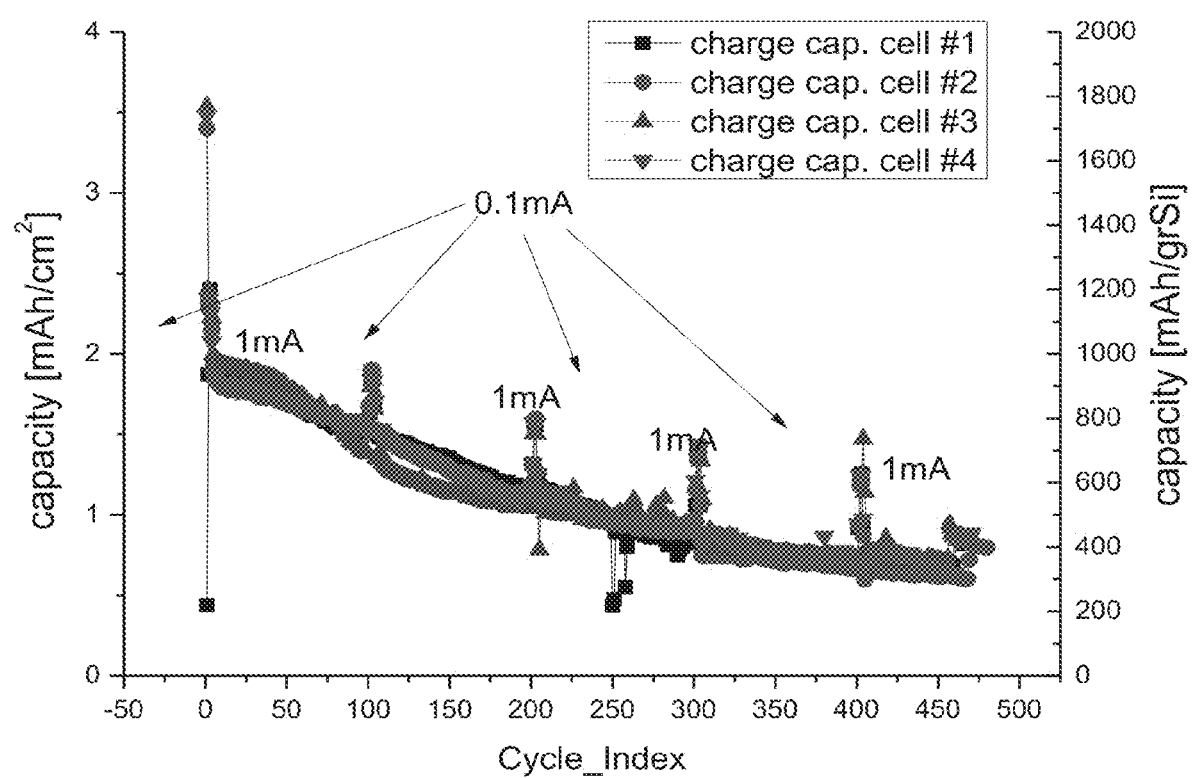

FIG. 54 presents a graph showing capacity of 4 (alumina-coated) silicon nanostructure anodes (2.1 mg/cm$^2$ Si, ~5 nm alumina, on stainless steel mesh) coated with regular carbon ink, during charge, as a function of number of electrochemical cycles (cycle index) in full cell versus NCA cathode in range of 4-3 V (electrolyte is 0.85 M LiPF$_6$ in EC:DEC+2% VC+15% FEC).

Figure 55:
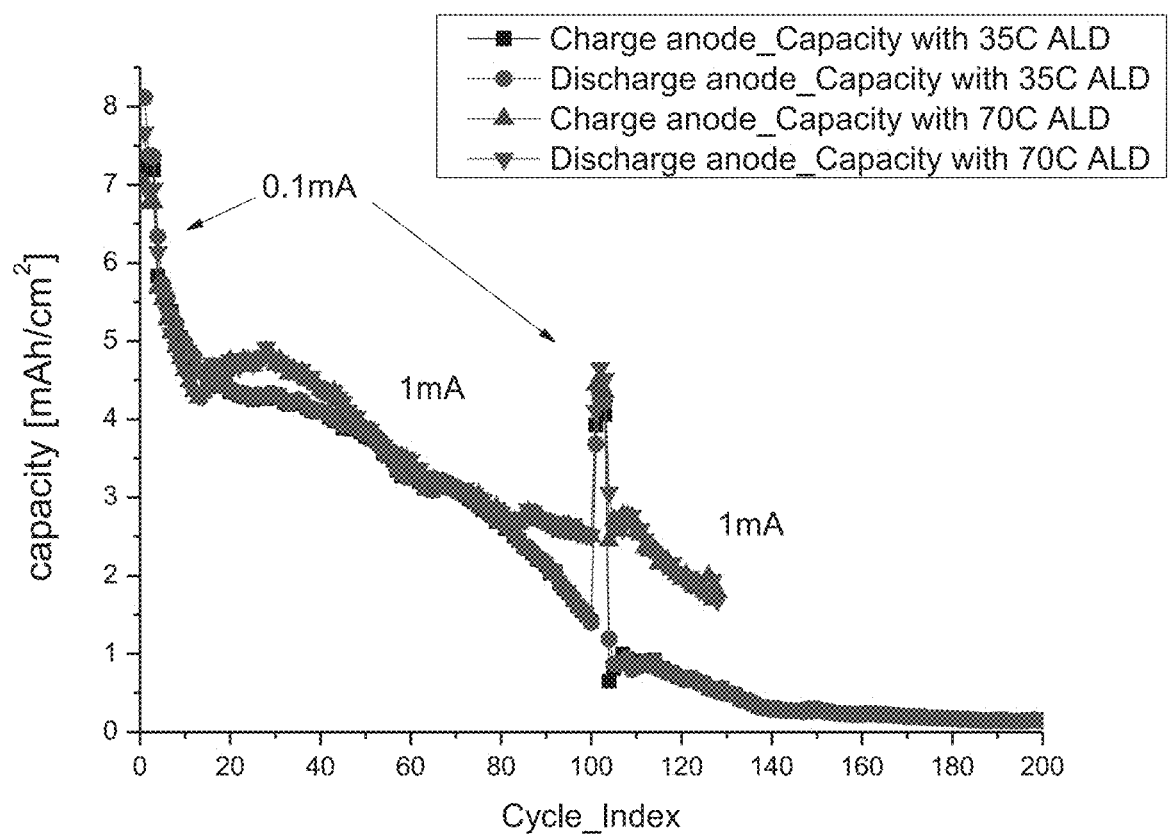

FIG. 55 presents a graph showing capacity of silicon nanostructure anodes (1.13 cm$^2$, 2.7 mg Si on stainless steel mesh) coated with alumina formed by 35 cycles (~5 nm) or 70 cycles (~10 nm) of ALD and then coated with SWCNT ink, during charge or discharge, as a function of number of electrochemical cycles (cycle index).

Figure 56A:
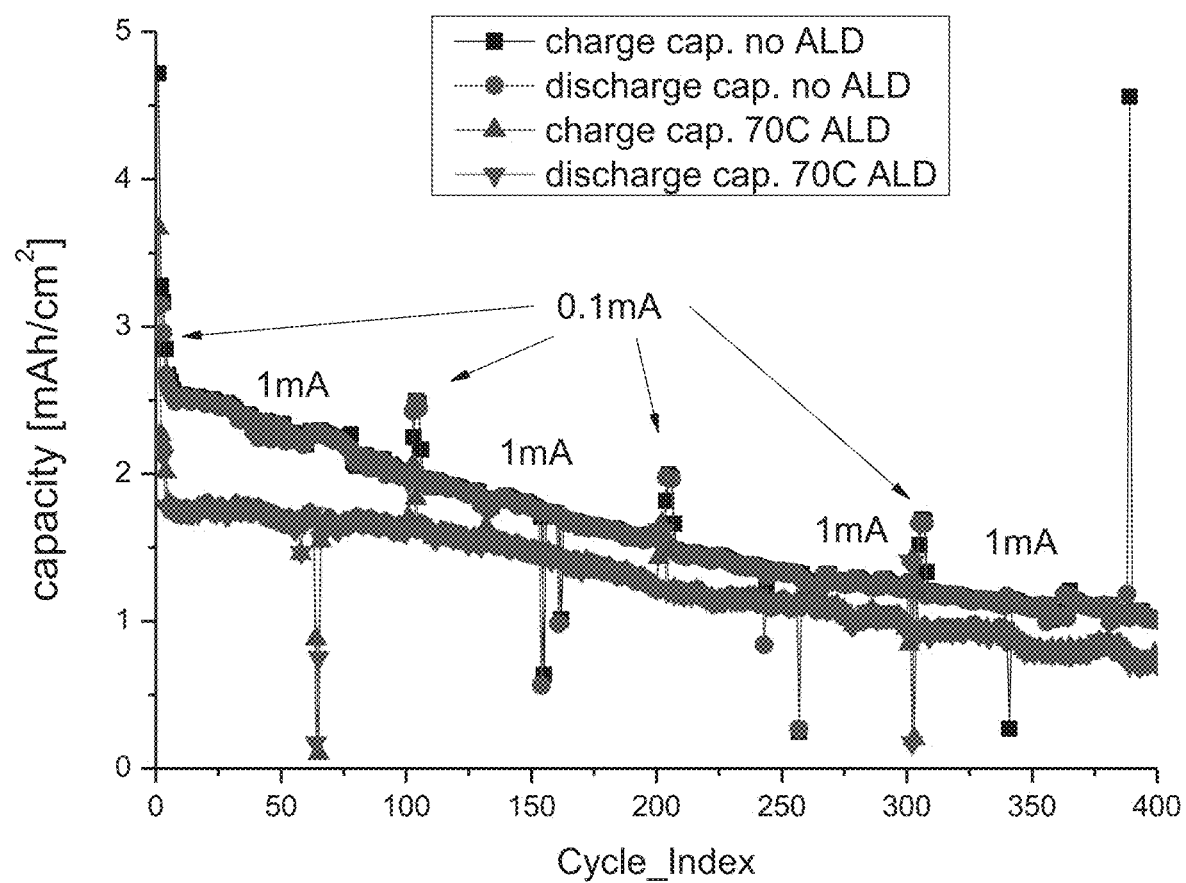
Figure 56B:
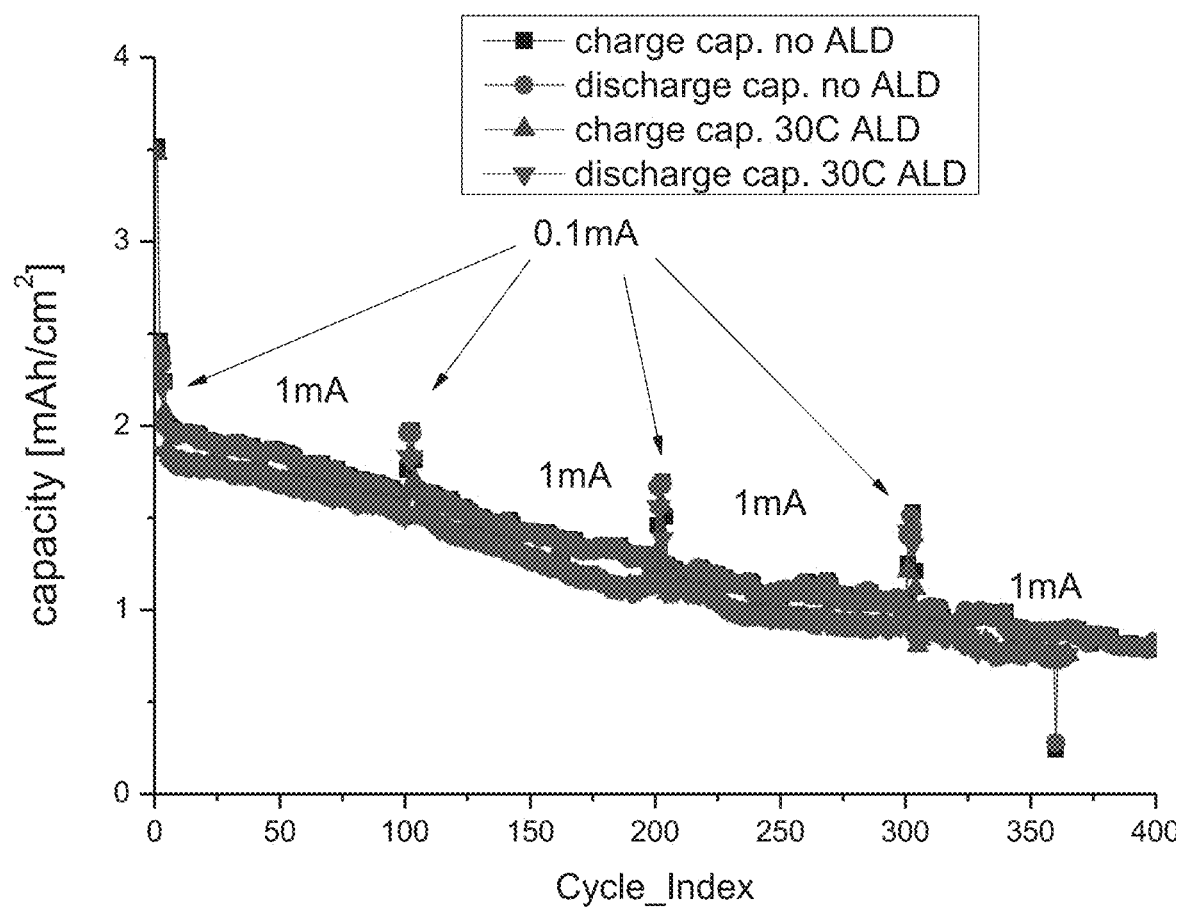

FIGS. 56A and 56B present graphs showing capacity of silicon nanostructure anodes (2.4 mg/cm$^2$ Si in FIG. 56A, 2.1 mg/cm$^2$ Si in FIG. 56B) with or without alumina coating alumina formed by 30 cycles (FIG. 56B) or 70 cycles (FIG. 56A) of ALD, during charge or discharge, as a function of number of electrochemical cycles (cycle index).

Figure 57A:
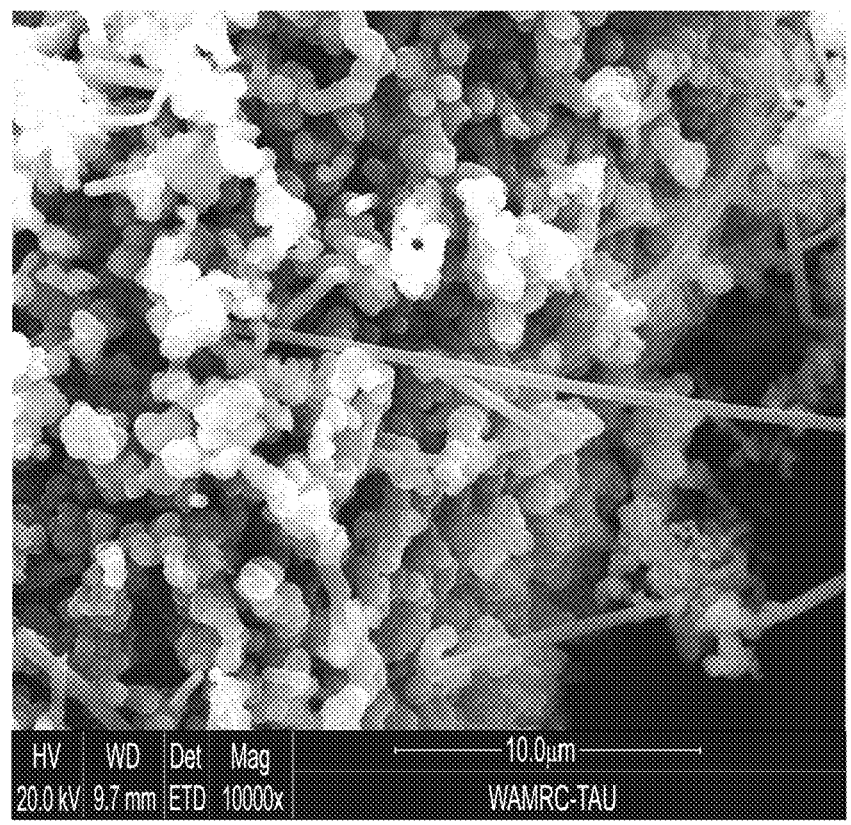
Figure 57B:
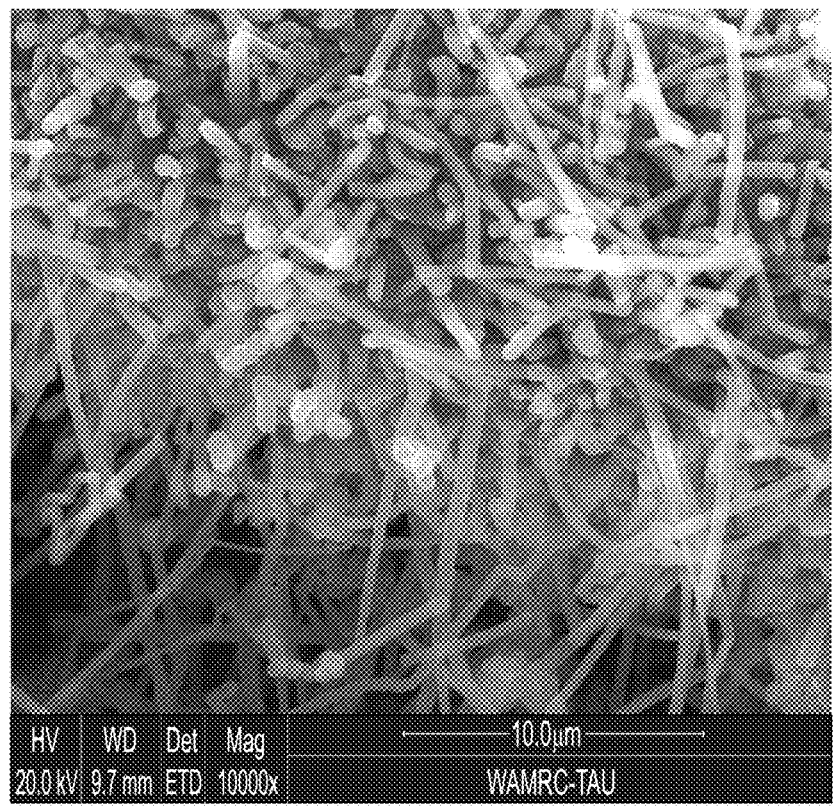

FIGS. 57A and 57B present scanning electron microscopy images of silicon nanostructures (1.8 mg/cm$^2$ Si) with (FIG. 57B) and without (FIG. 57A) annealing at 400° C. for 2 hours.

Figure 58:
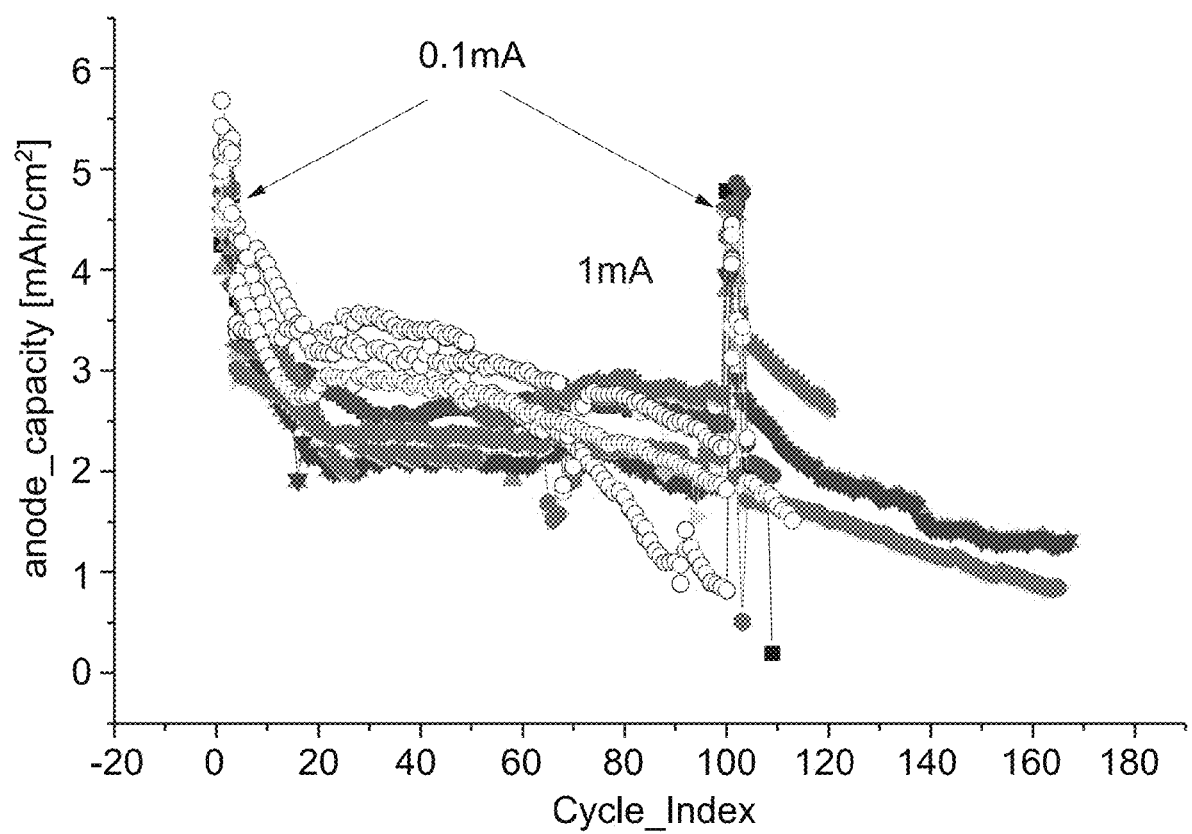

FIG. 58 presents a graph showing capacity of 8 silicon nanostructure anodes as a function of number of electrochemical cycles (cycle index); full symbols represent anodes subjected to annealing, open symbols represent non-annealed anodes.

Figure 59:
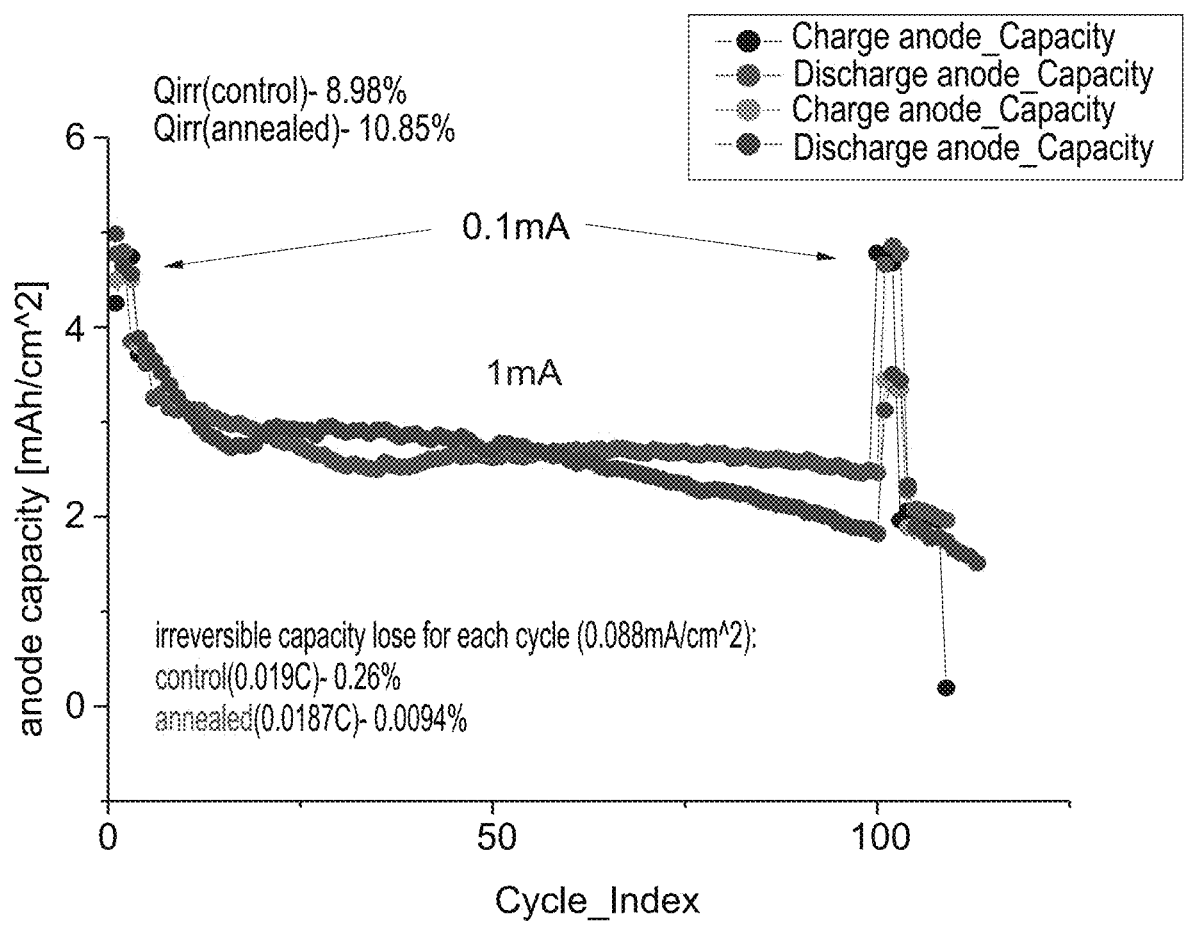

FIG. 59 presents a graph showing capacity of silicon nanostructure anodes, during charge or discharge, as a function of number of electrochemical cycles (cycle index) versus lithium; red and black symbols represent anode subjected to annealing, blue and green symbols represent non-annealed control anode.

Figure 60:
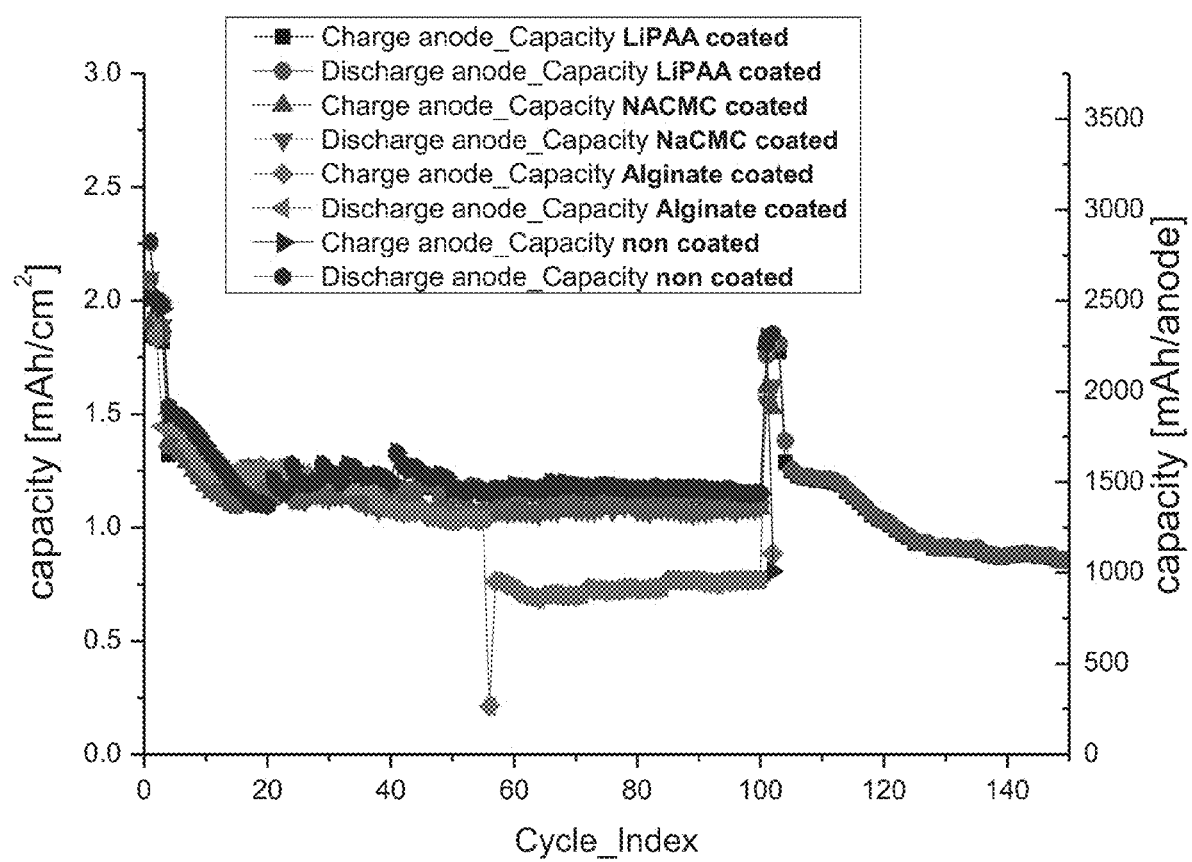

FIG. 60 presents a graph showing capacity of silicon nanostructure anodes (1.13 cm$^2$, 0.9 mg Si on stainless steel mesh) with or without a polymer coating (LiPAA, NaCMC or alginate), during charge or discharge, as a function of number of electrochemical cycles (cycle index) in range of 0.05-1 V (carbon coating is SB carbon, electrolyte is 0.85 M LiPF$_6$ in EC:DEC+2% VC+15% FEC).

Figure 61A:
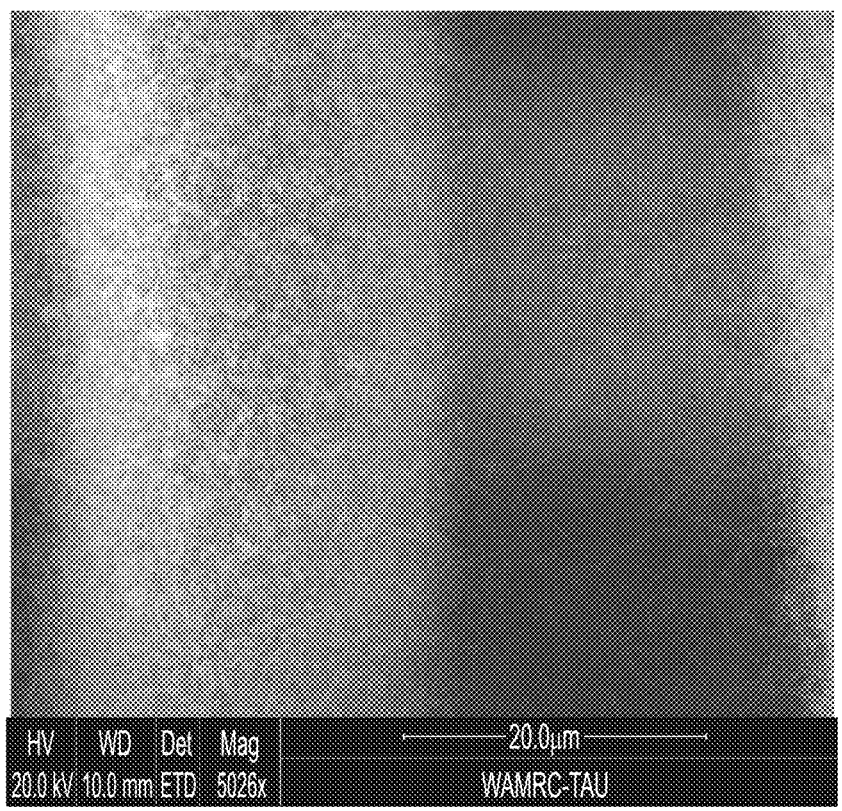
Figure 61B:
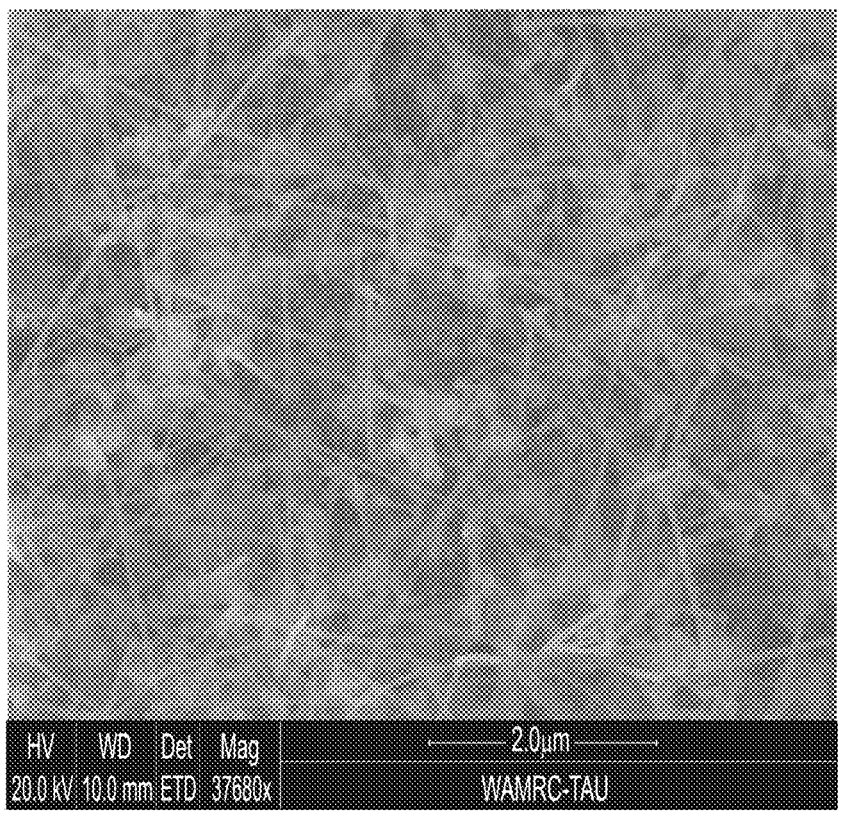

FIGS. 61A and 61B present scanning electron microscopy images (at different magnifications) of silicon nanostructures deposited on stainless steel mesh using disilane (3 sccm) and hydrogen (10 sccm) at 15 Torr and 430° C. for 20 minutes.

Figure 62A:
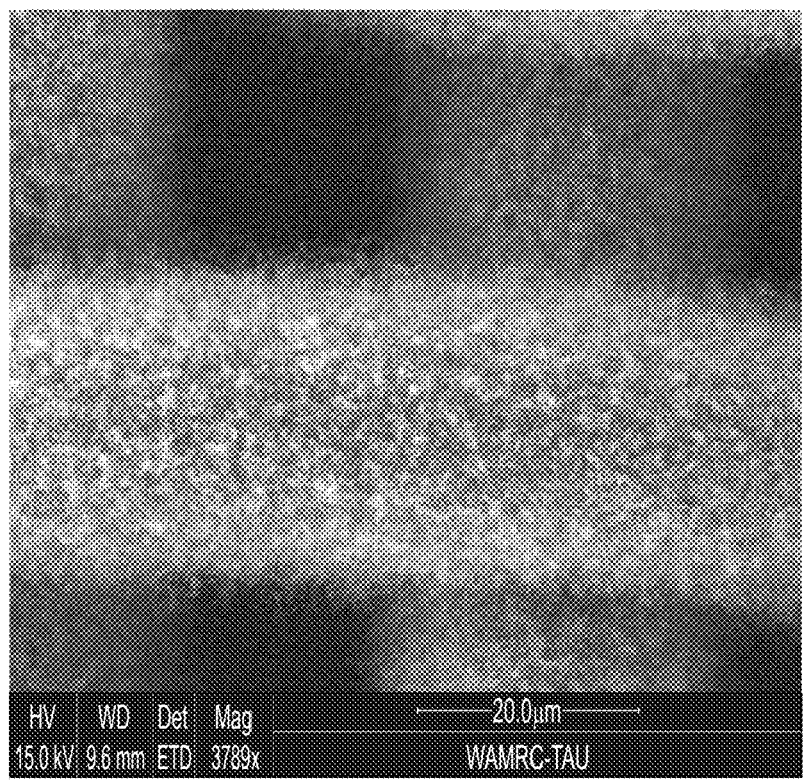
Figure 62B:
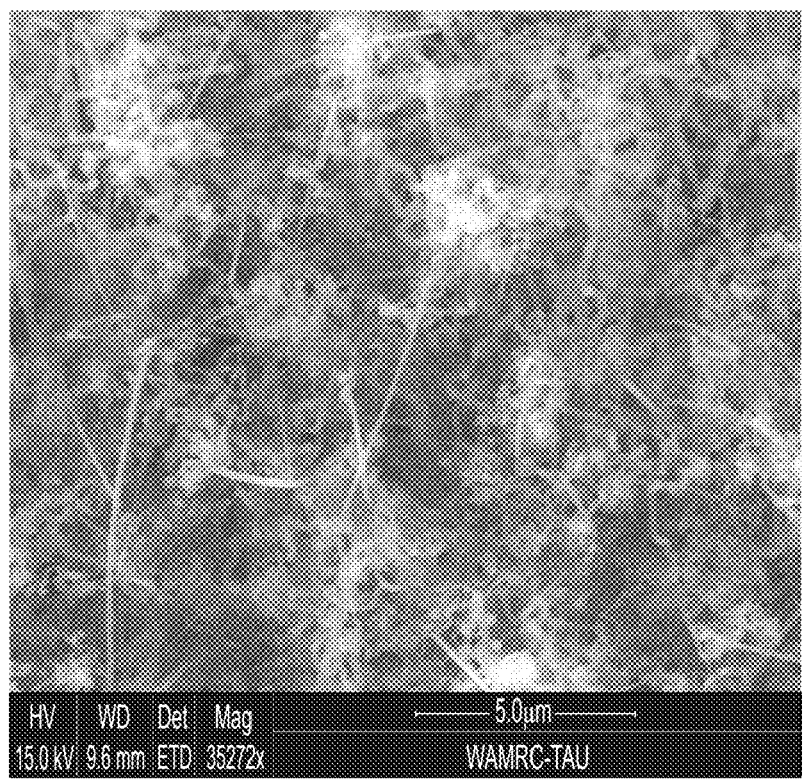

FIGS. 62A and 62B present scanning electron microscopy images (at different magnifications) of silicon nanostructures deposited on stainless steel mesh using disilane (3 sccm) and hydrogen (10 sccm) at 15 Torr and 420° C. for 20 minutes.

Figure 63A:
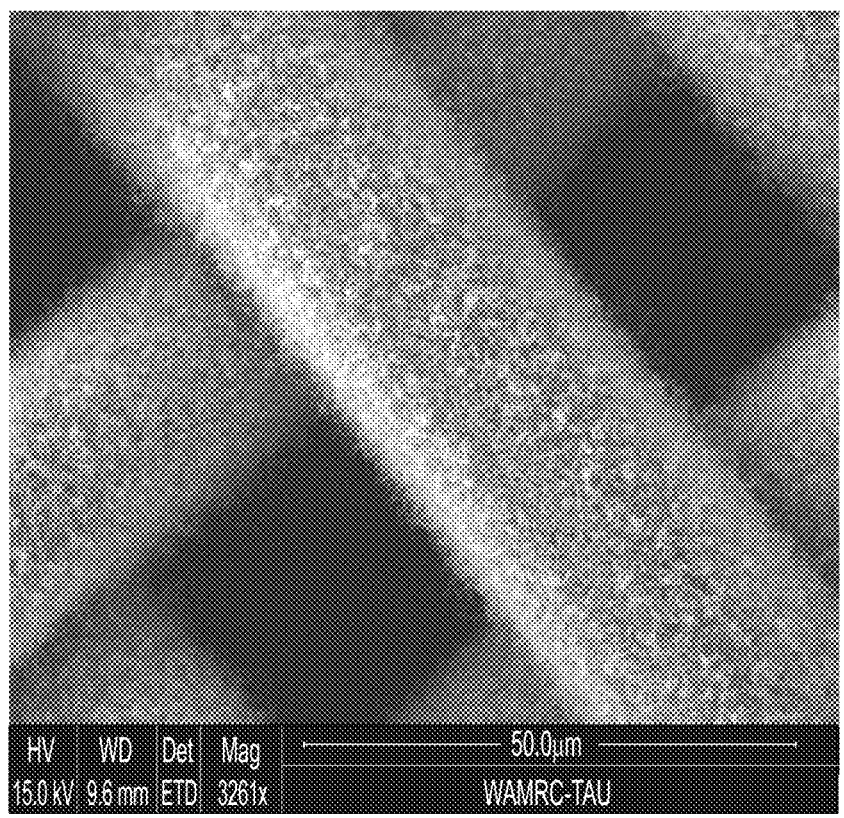
Figure 63B:
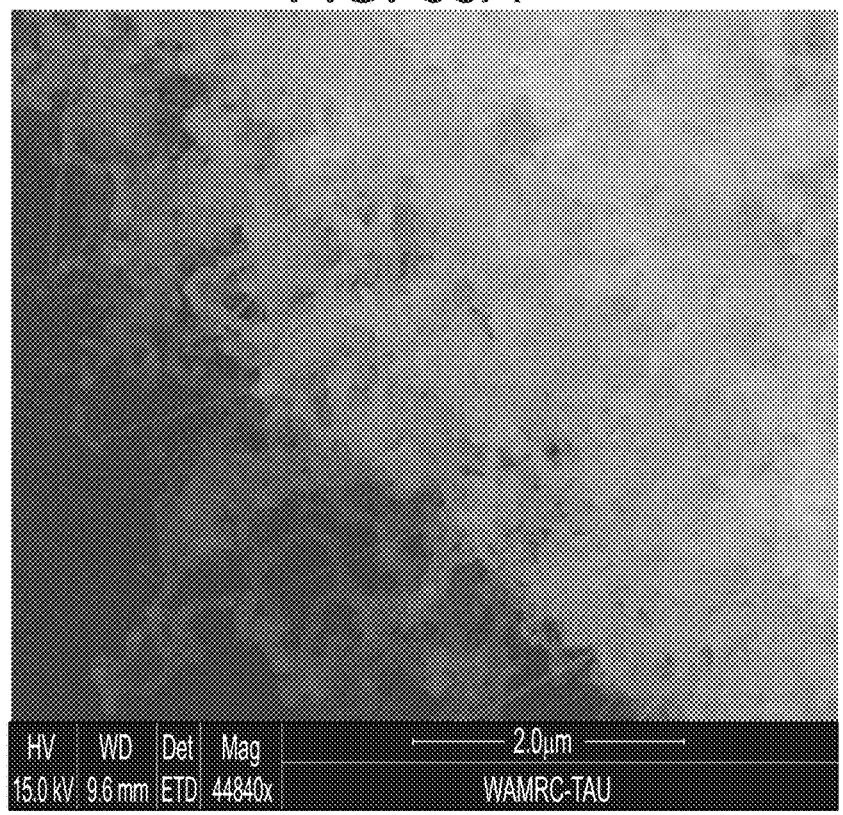

FIGS. 63A and 63B present scanning electron microscopy images (at different magnifications) of silicon nanostructures deposited on stainless steel mesh using disilane (3 sccm), hydrogen (5 sccm) and argon (5 sccm) at 25 Torr and 410° C. for 20 minutes.

Figure 64:
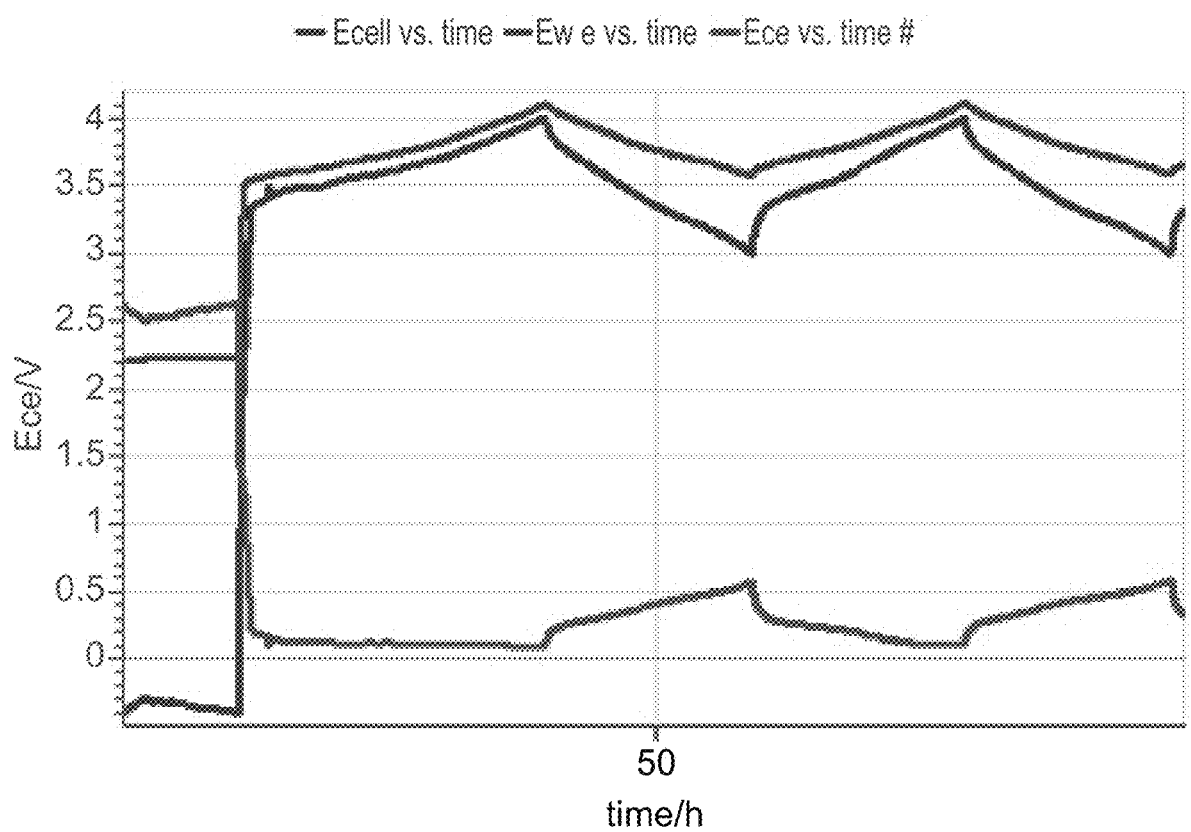

FIG. 64 presents a graph showing the voltage of working electrode (Ewe), counter electrode (Ece) and cell (Ecell) of a silicon nanostructure-NCA cell as a function of time during cycling, as determined using a 3-electrode cell with a lithium reference.

Figure 65:
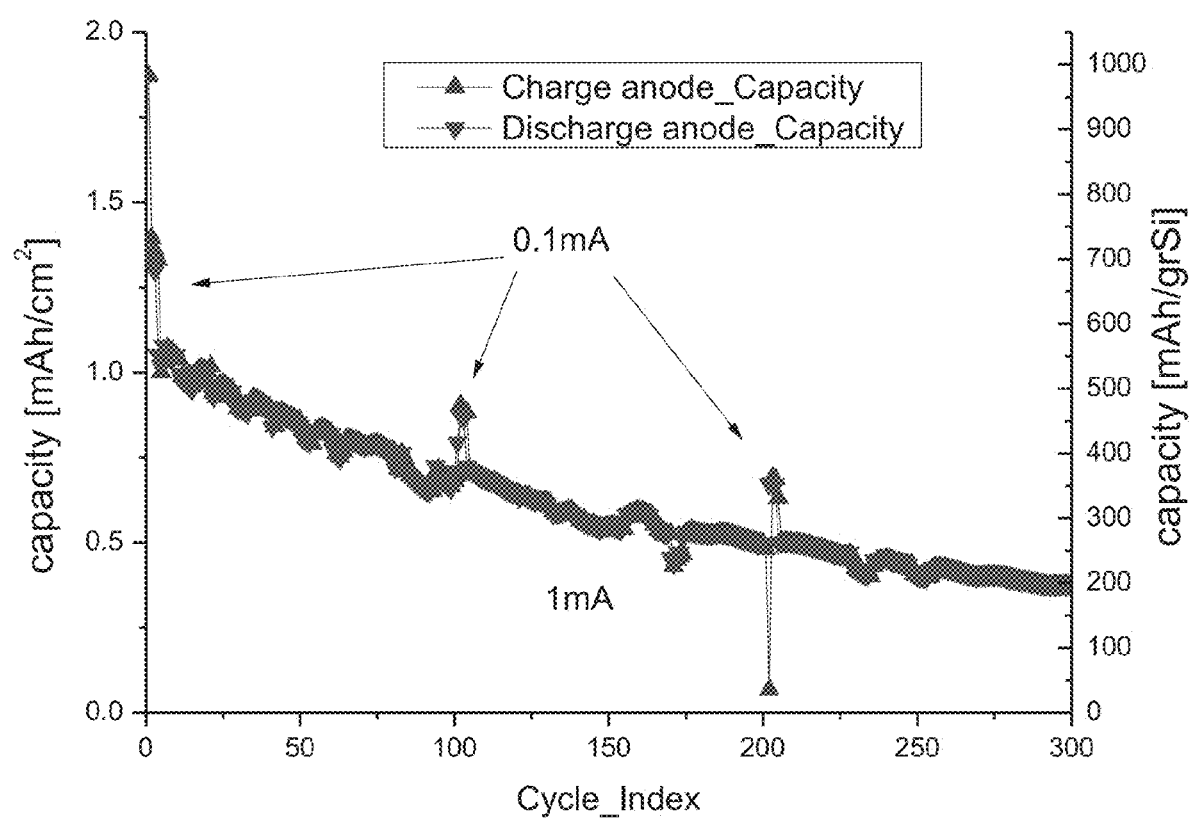

FIG. 65 presents a graph showing the cell capacity of a silicon nanostructure-LFP cell, during charge or discharge, as a function of number of electrochemical cycles (cycle index), in a 3-electrode cell with a lithium reference.

Figure 66:
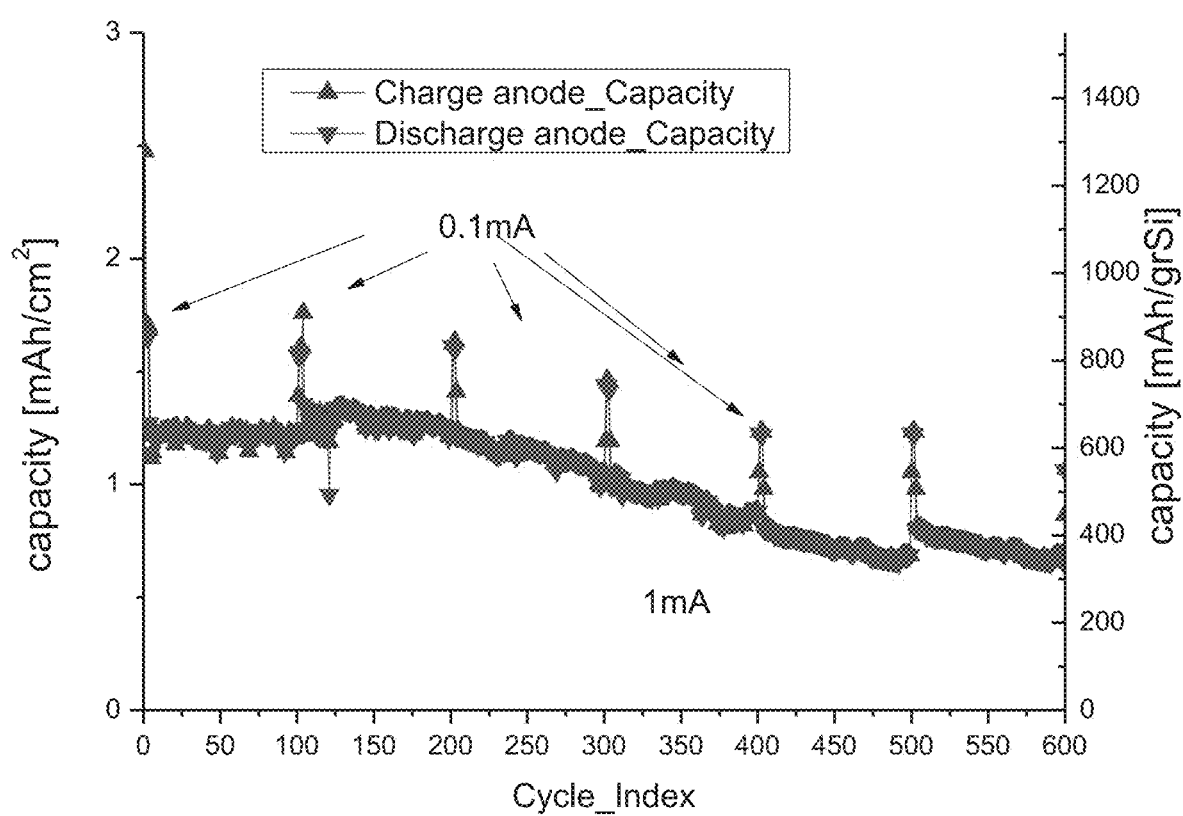

FIG. 66 presents a graph showing the cell capacity of a silicon nanostructure-NCA cell, during charge or discharge, as a function of number of electrochemical cycles (cycle index), in a 3-electrode cell with a lithium reference.

Figure 67:
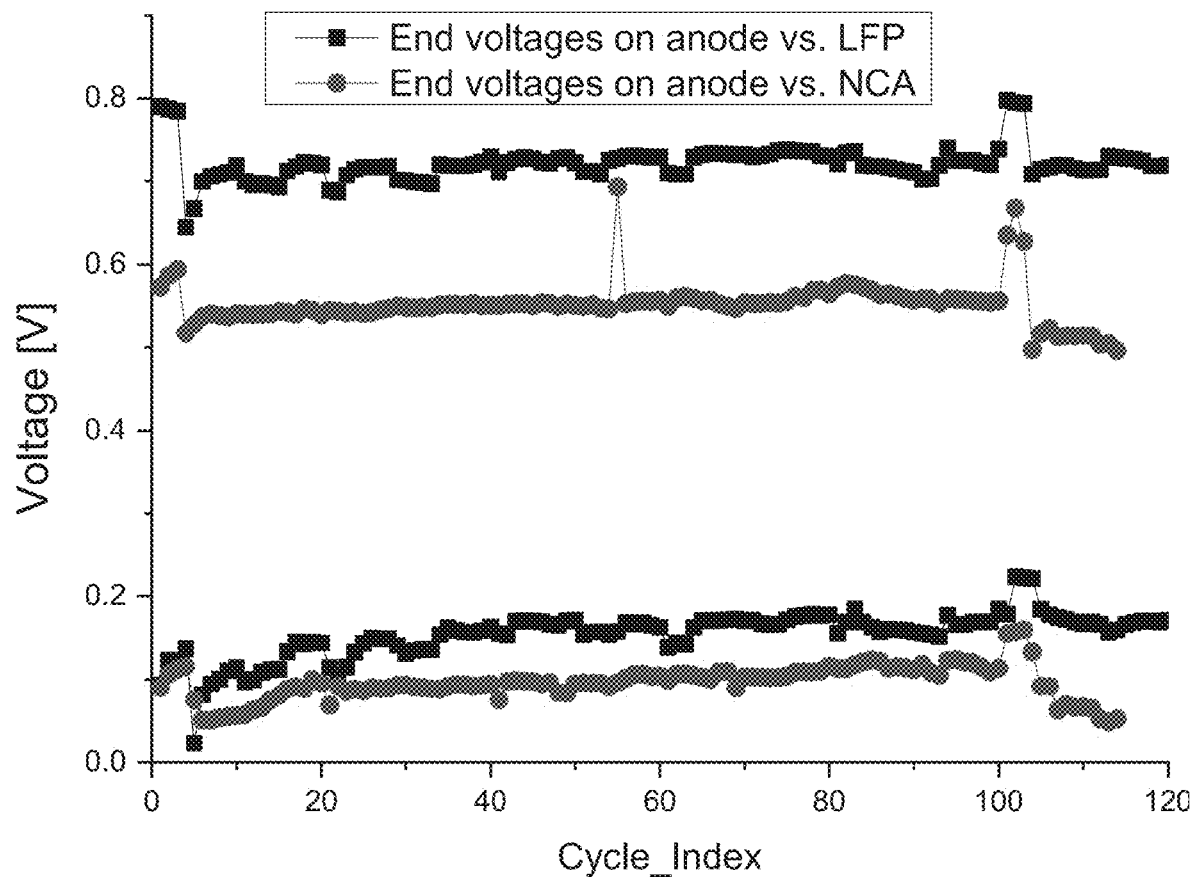

FIG. 67 presents a graph showing the end voltages on a silicon nanostructure anode during electrochemical cycling versus LFP or NCA cathode, as a function of number of cycles (cycle index), as determined in a 3-electrode cell.

Figure 68:
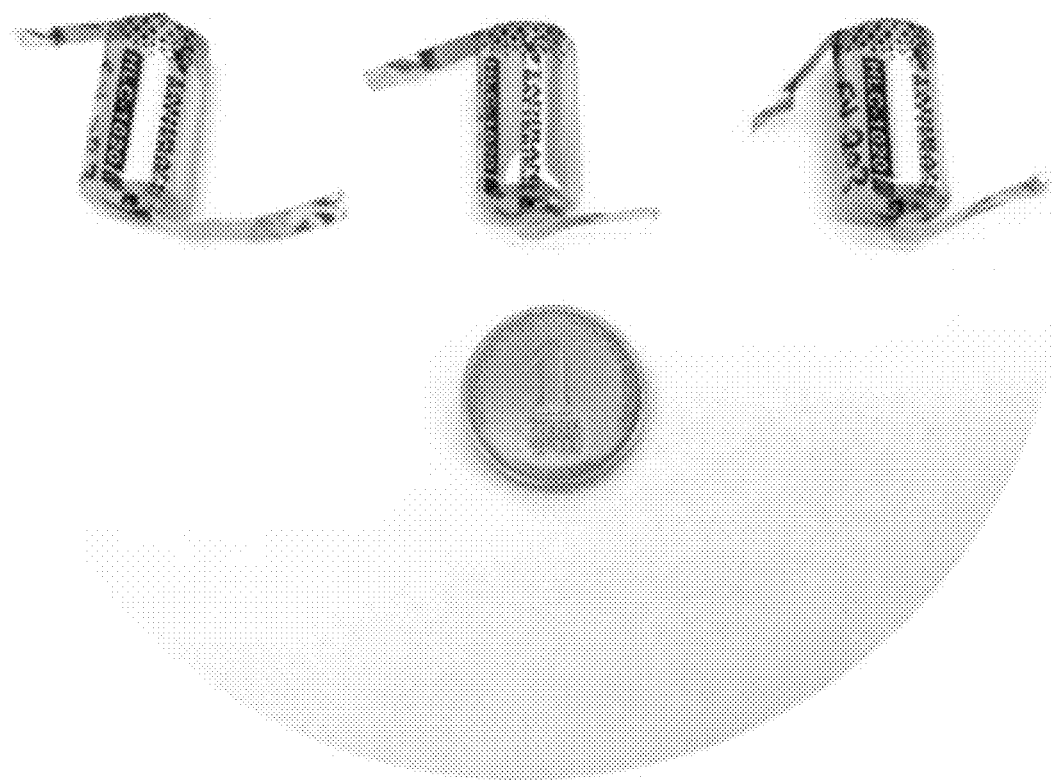

FIG. 68 present a photograph of three ⅓ AAA silicon nanostructure-NCA cells prepared according to some embodiments of the invention (coin used as size reference has 18 mm diameter).

Figure 69:
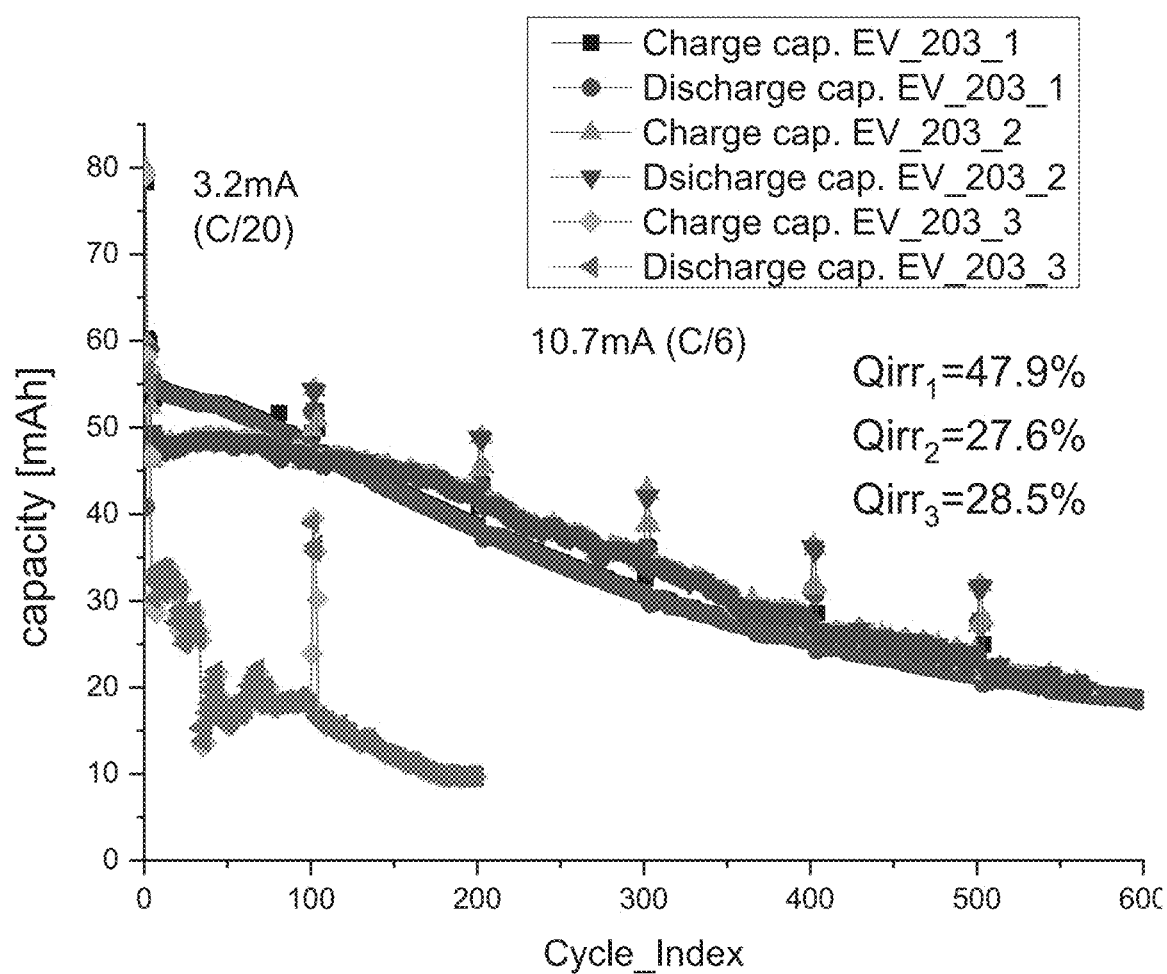

FIG. 69 presents a graph showing the capacity of three ⅓ AAA silicon nanostructure-NCA cells prepared according to some embodiments of the invention, during charge or discharge, as a function of number of electrochemical cycles (cycle index) at a rate of C/20 or C/6.

Figure 70:
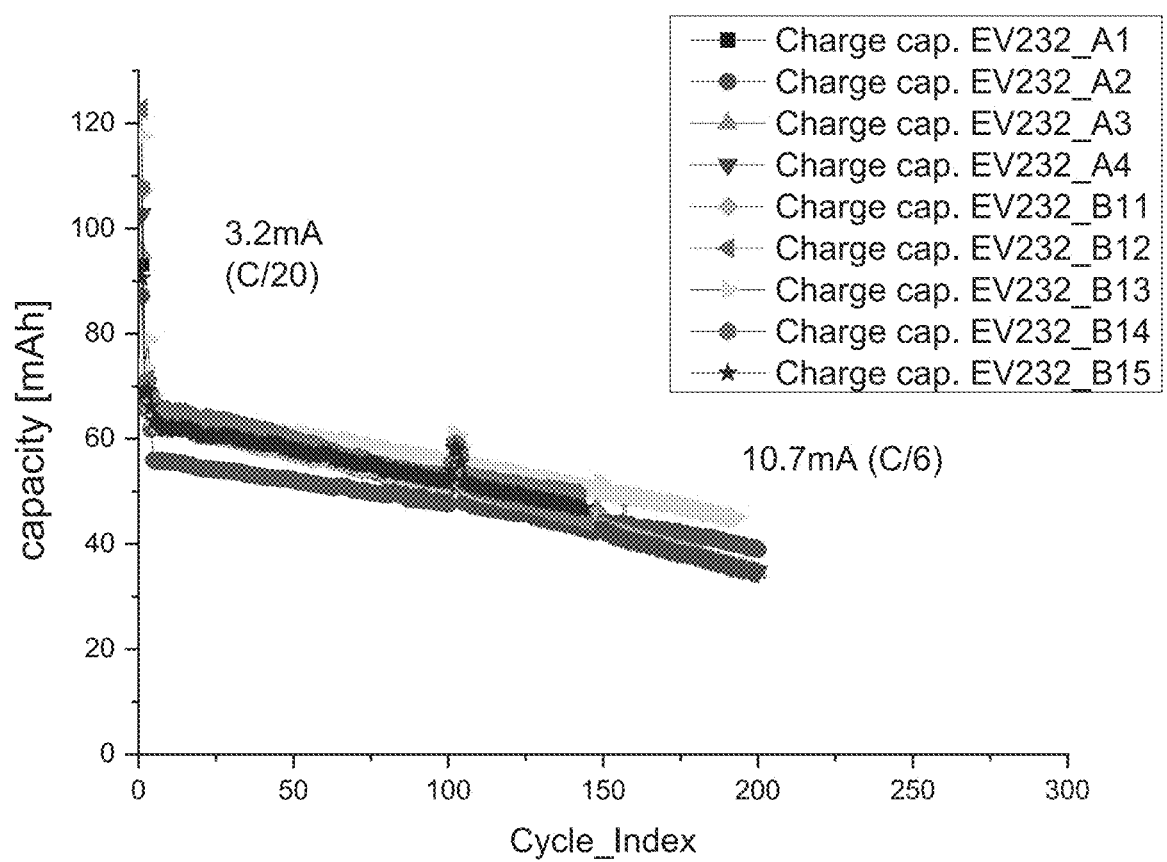

FIG. 70 presents a graph showing the capacity (during charge) of nine ⅓ AAA silicon nanostructure-NCA cells prepared according to some embodiments of the invention, as a function of number of electrochemical cycles (cycle index) at a rate of C/3.

Figure 71:
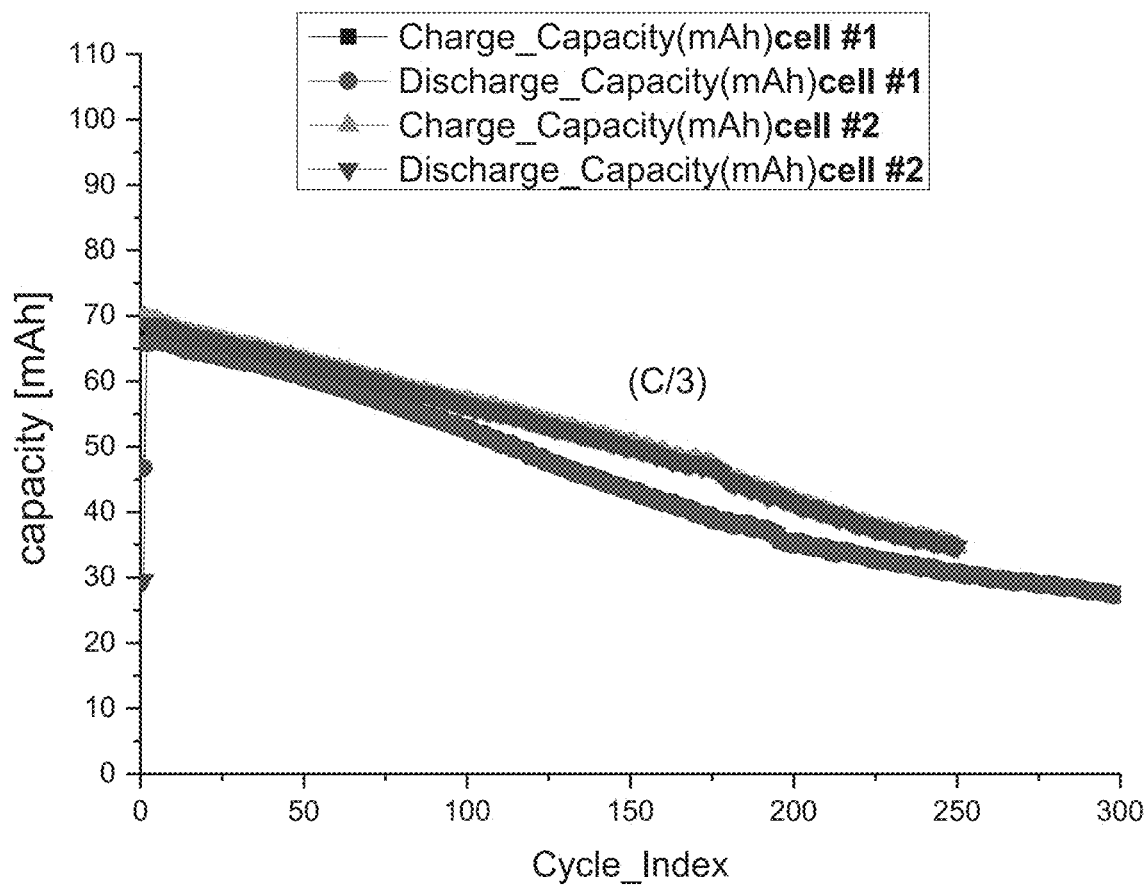

FIG. 71 presents a graph showing the capacity (during charge or discharge) of two ⅓ AAA silicon nanostructure-NCA cells prepared according to some embodiments of the invention, as a function of number of electrochemical cycles (cycle index).

Figure 72:
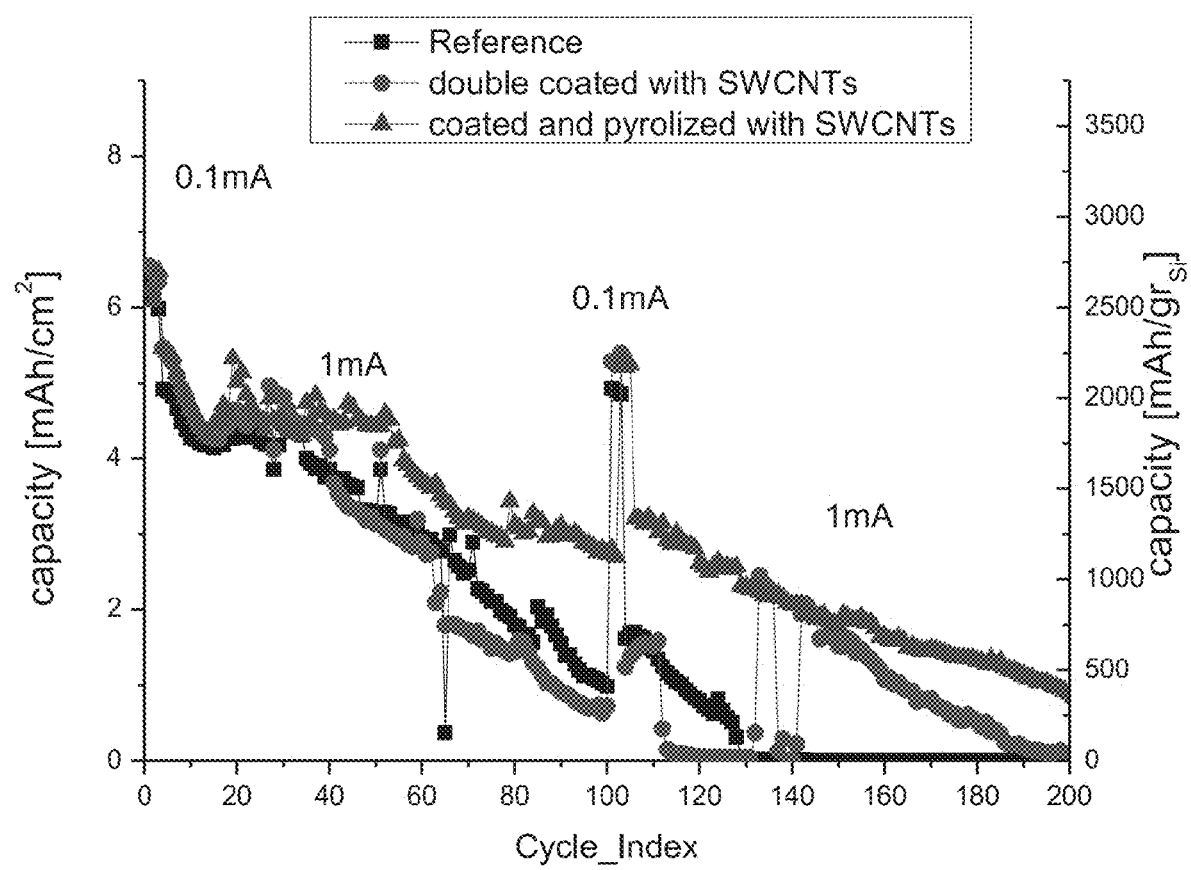

FIG. 72 presents a graph showing the capacity of silicon nanostructure anodes with or without (reference) a double coat with SWCNTs, followed (in one sample) by pyrolization, as a function of number of electrochemical cycles (cycle index).

Figure 73A:
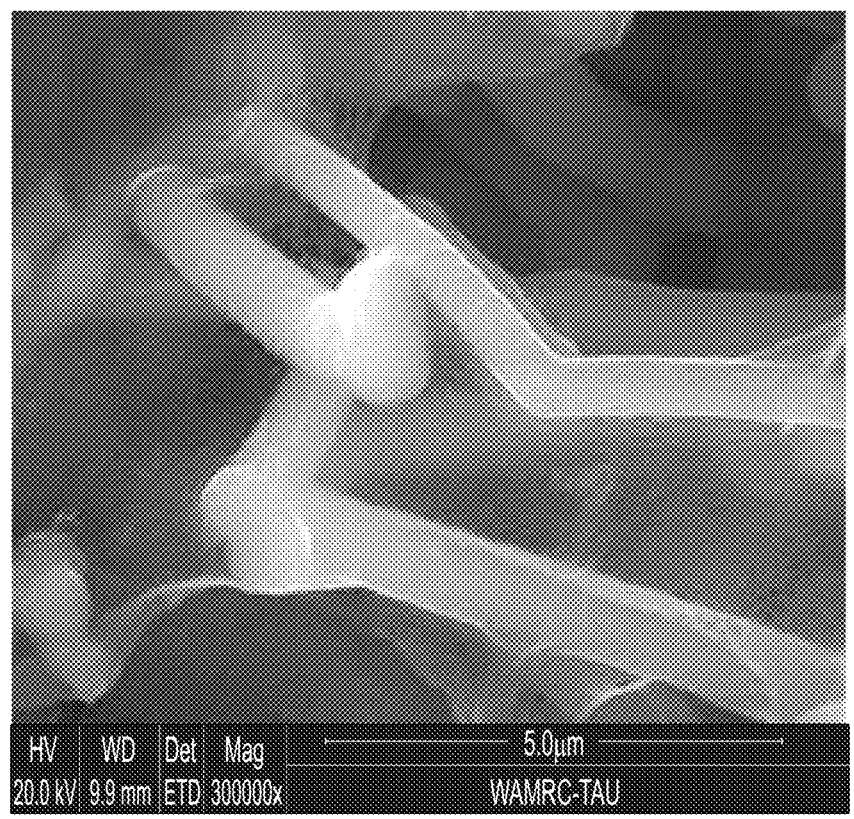
Figure 73B:
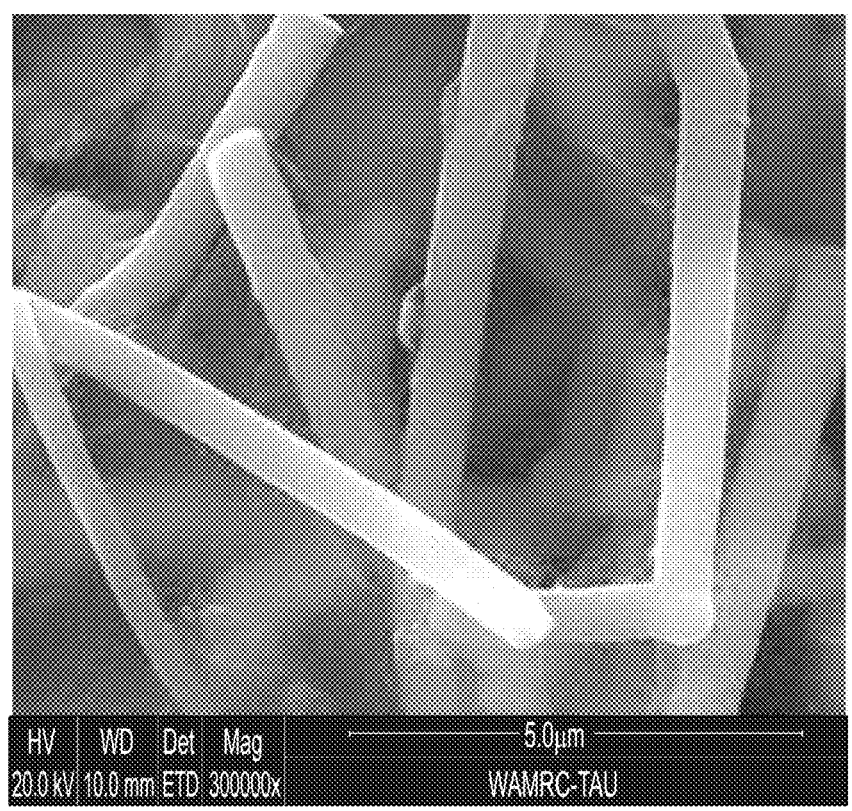

FIGS. 73A and 73B present scanning electron microscopy images of silicon nanostructures with double-coated with SWCNTs, with (FIG. 73B) or without (FIG. 73A) being subjected to pyrolization at 750° C. for 1 hour (in argon/hydrogen).

Figure 74:
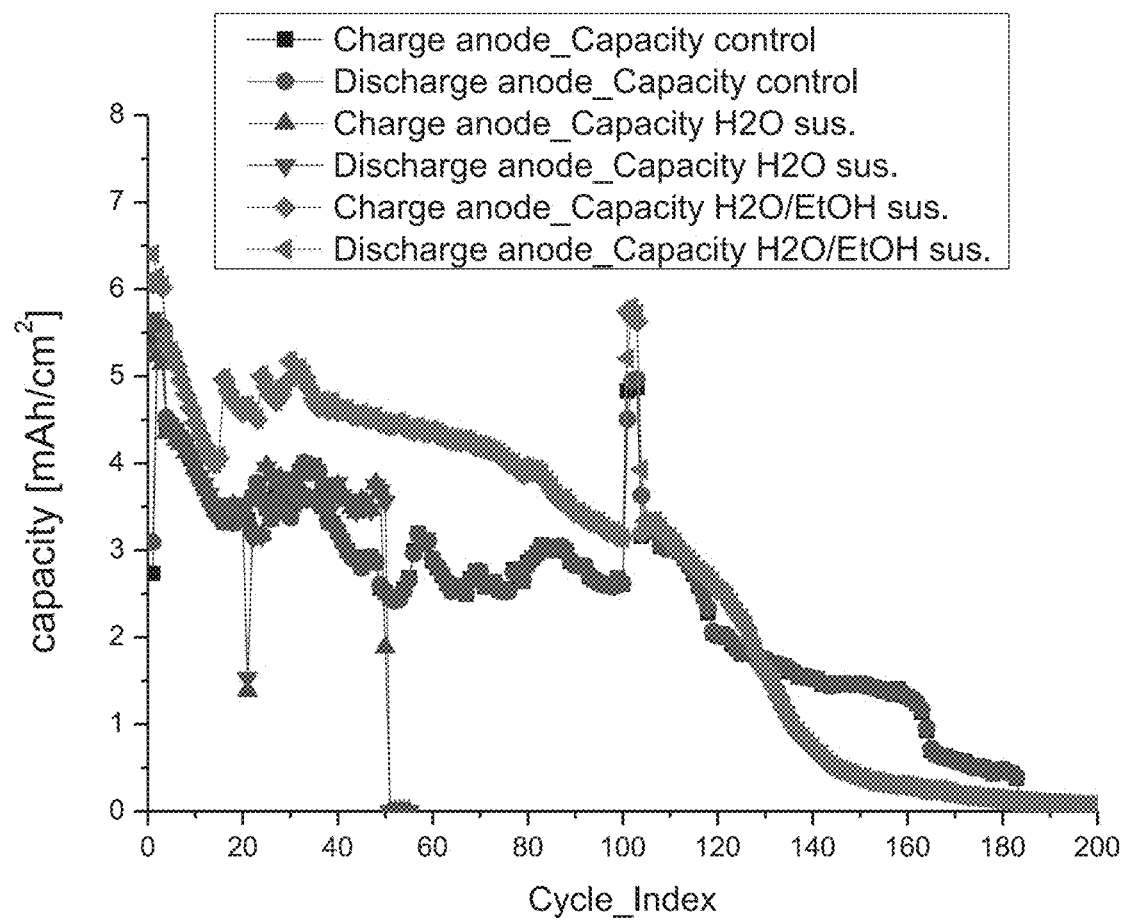

FIG. 74 presents a graph showing the capacity of silicon nanostructure anodes (during charge or discharge) following submersion in a suspension of carbon nanotubes in water or water/ethanol, as a function of number of electrochemical cycles (cycle index) (control anode was not submerged).

Figure 75:
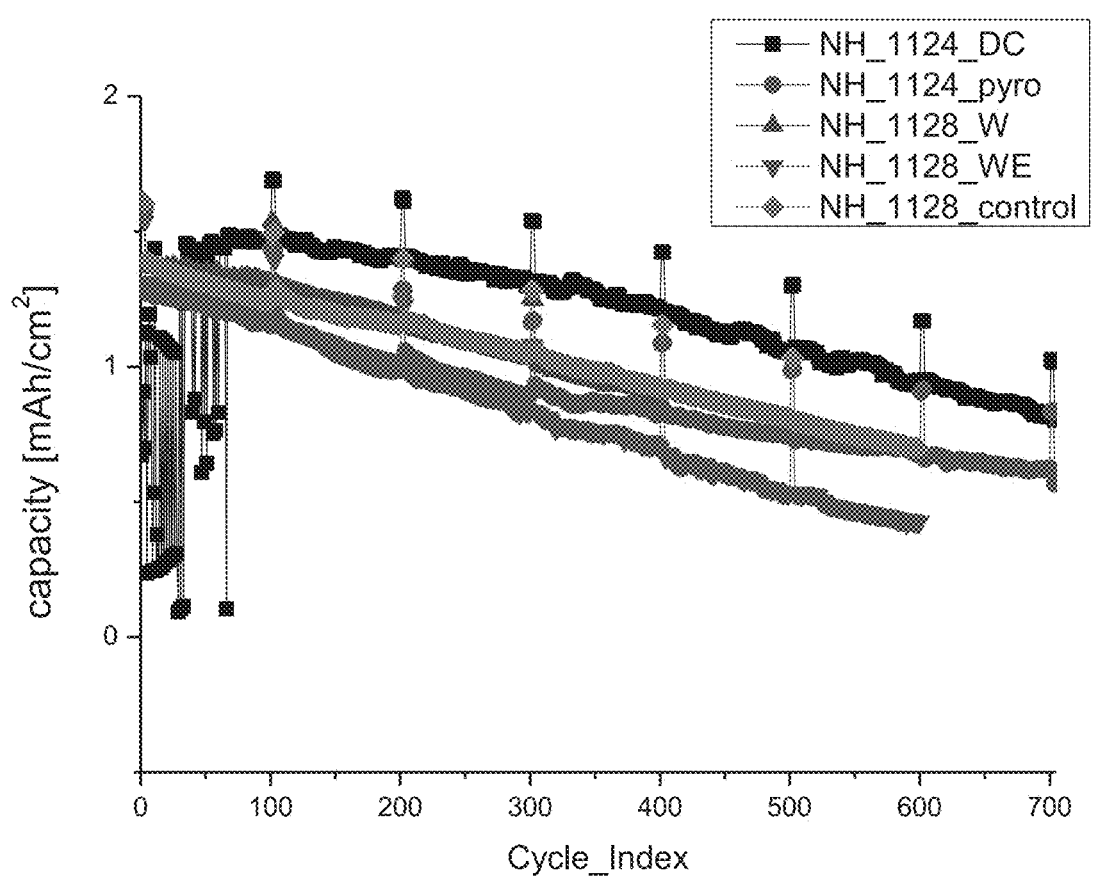

FIG. 75 presents a graph showing the capacity of silicon nanostructure anodes double-coated (i.e., coated on both sides) by carbon nanotube ink with (pyro) or without (DC) pyrolization, or by carbon nanotube ink diluted in water (W) or water/ethanol (WE), as a function of number of electrochemical cycles (cycle index) versus NCA cathode in range of 4-3 V (control anode was coated only on current collector side, electrolyte is 0.85 M LiPF$_6$ in EC:DEC+2% VC+15% FEC).

Figure 76:
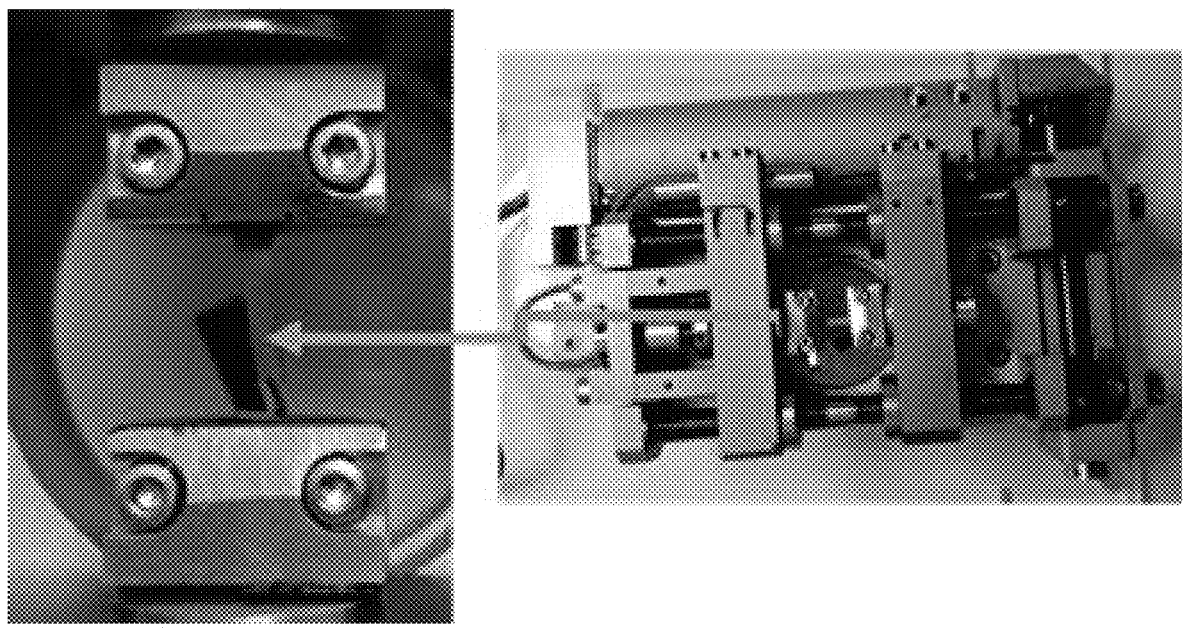

FIG. 76 presents photographs of an in situ tensile test instrument (zooming in left panel).

Figure 77:
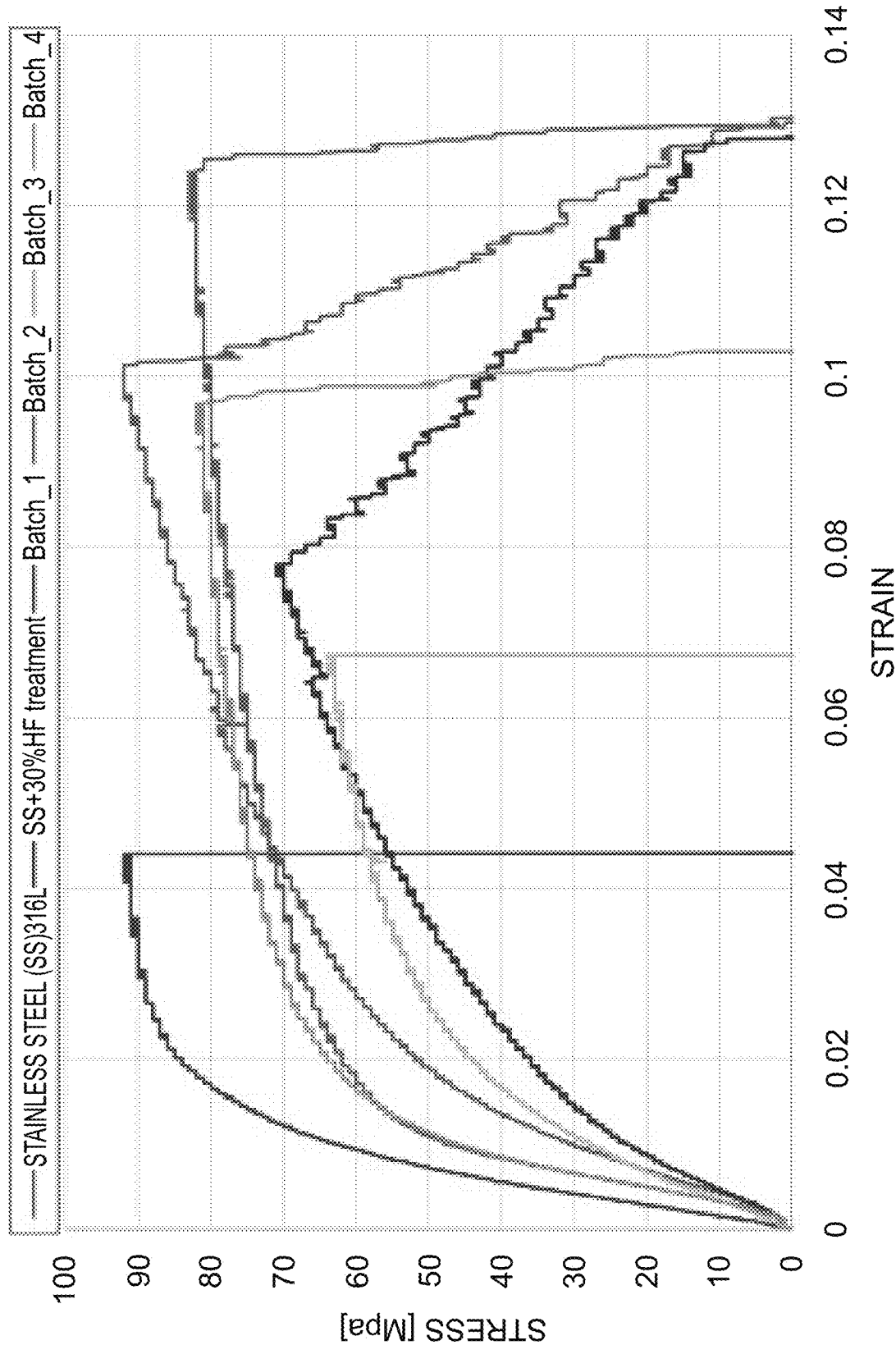

FIG. 77 presents a graph showing stress-strain curves of stainless steel (SS) 316L mesh per se and after treatment with 30% HF, and after deposition of silicon nanostructures on the surface (4 samples, batches 1-4).

Figure 78A:
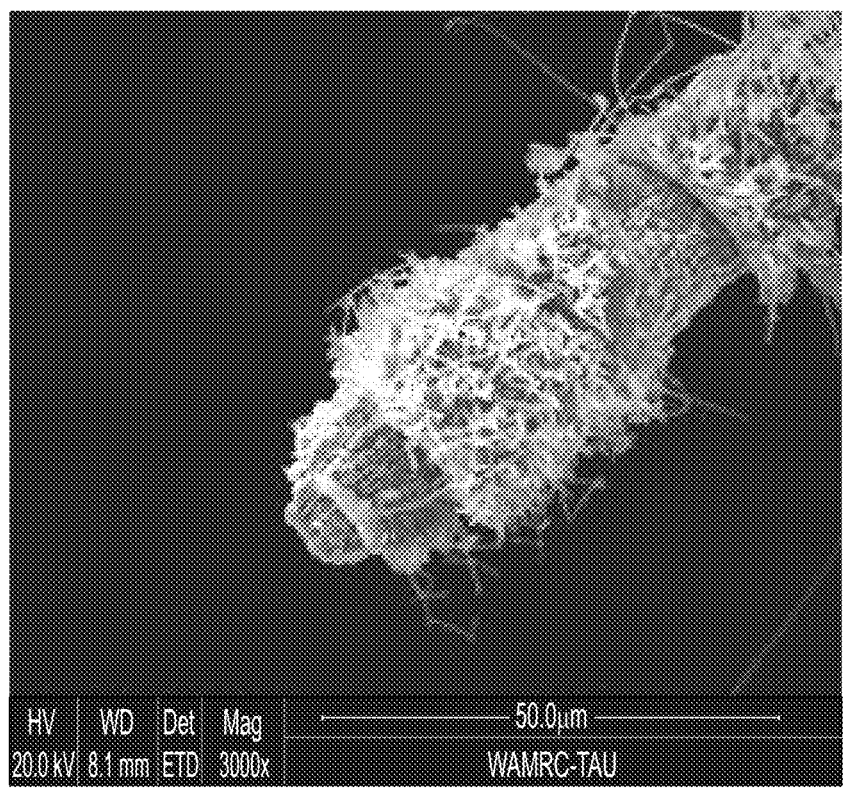
Figure 78B:
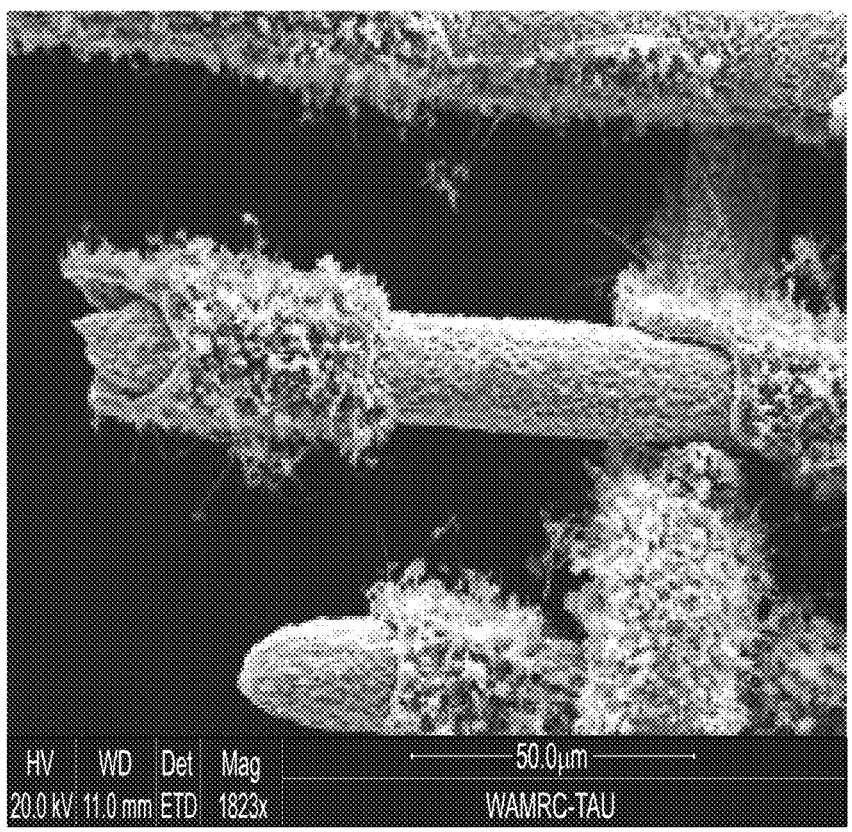

FIGS. 78A and 78B present scanning electron microscopy images of samples of silicon nanostructures on stainless steel mesh at a breakage point (following a tensile test).

Figure 79A:
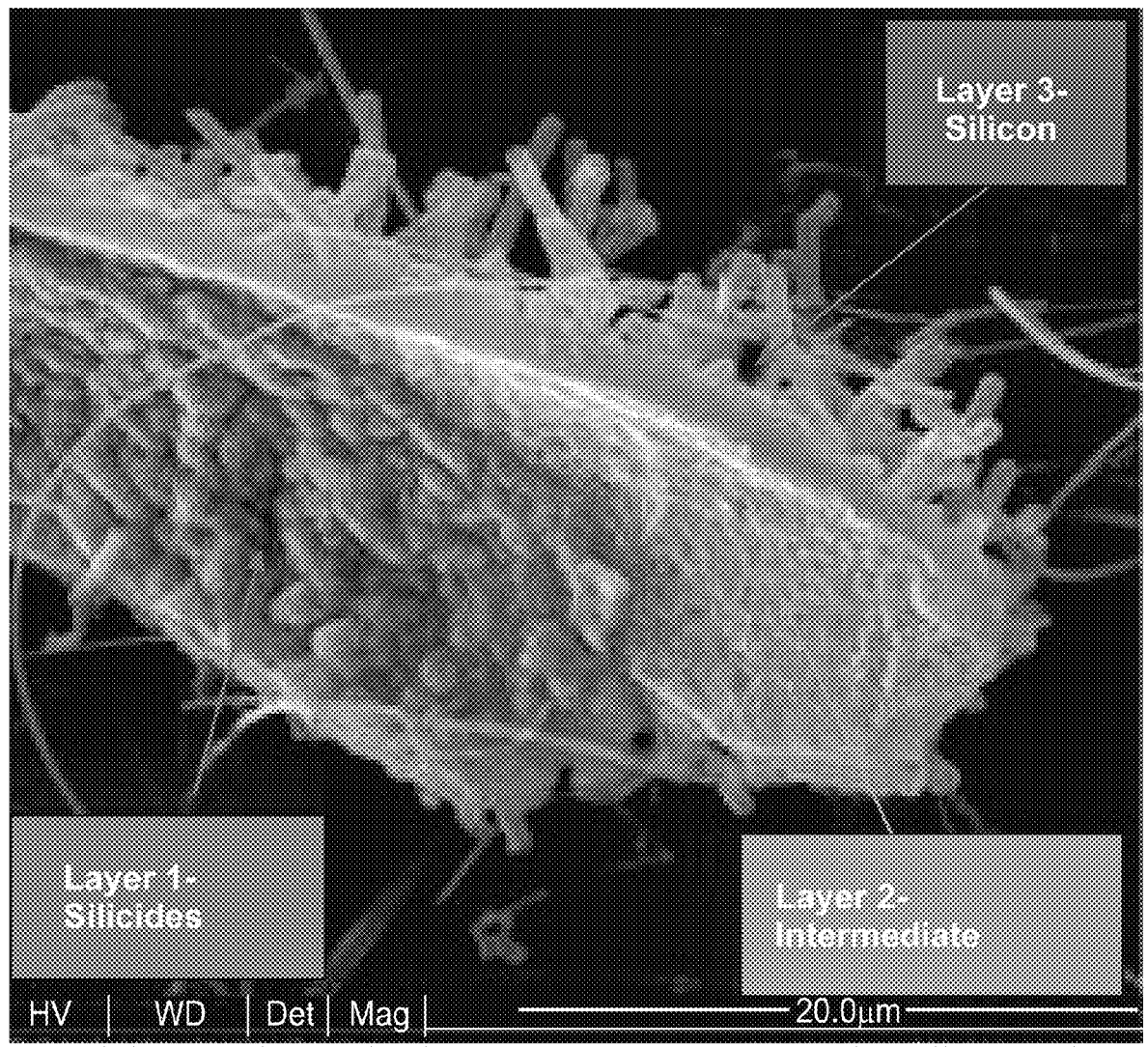
Figure 79B:
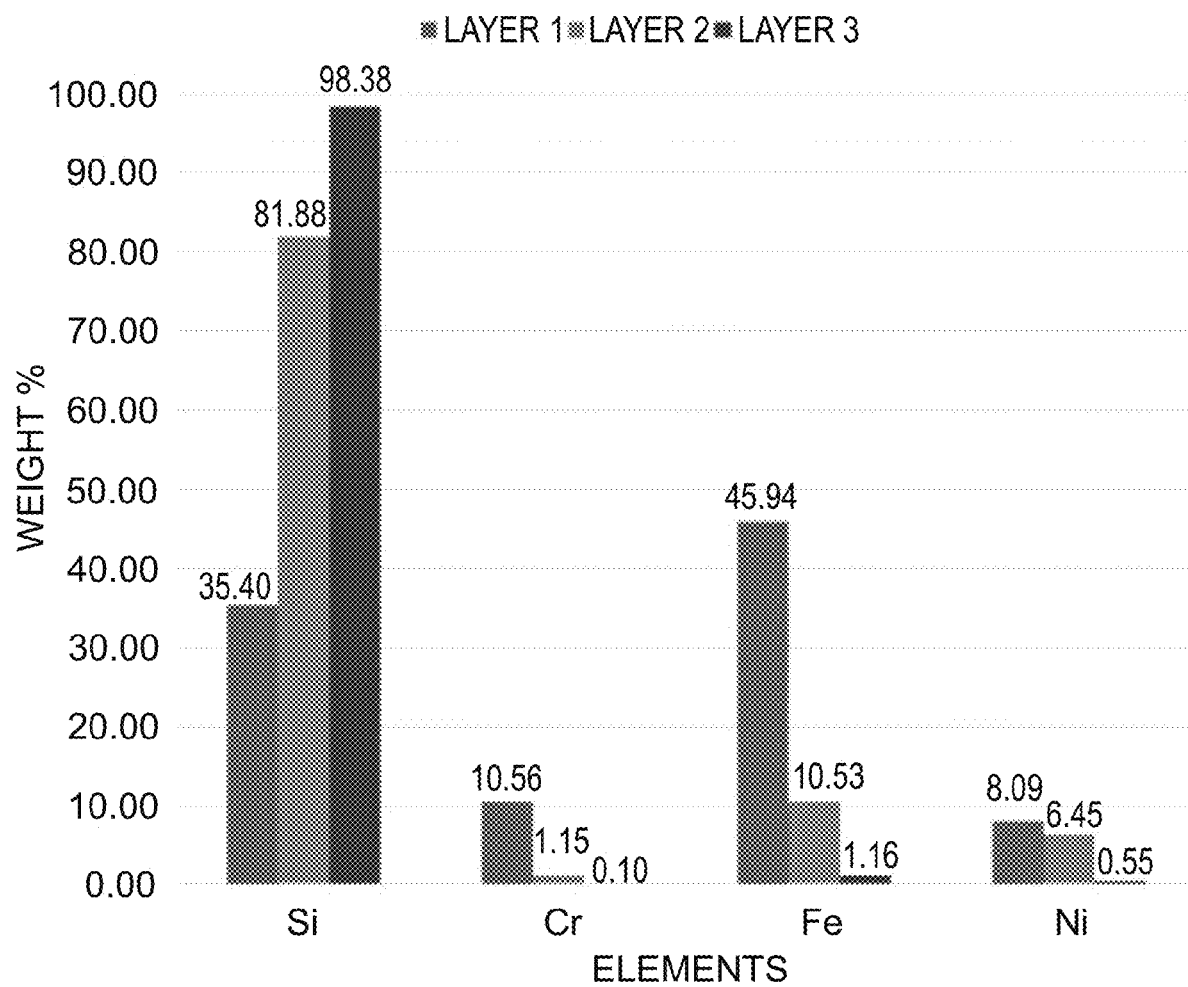

FIGS. 79A and 79B present a scanning electron microscopy image of layers (FIG. 79A) and bar graph showing silicon levels of layers as determined by energy-dispersive X-ray spectroscopy (FIG. 79B), in silicon nanostructures on stainless steel subjected to peeling with adhesive tape.

Figure 80A:
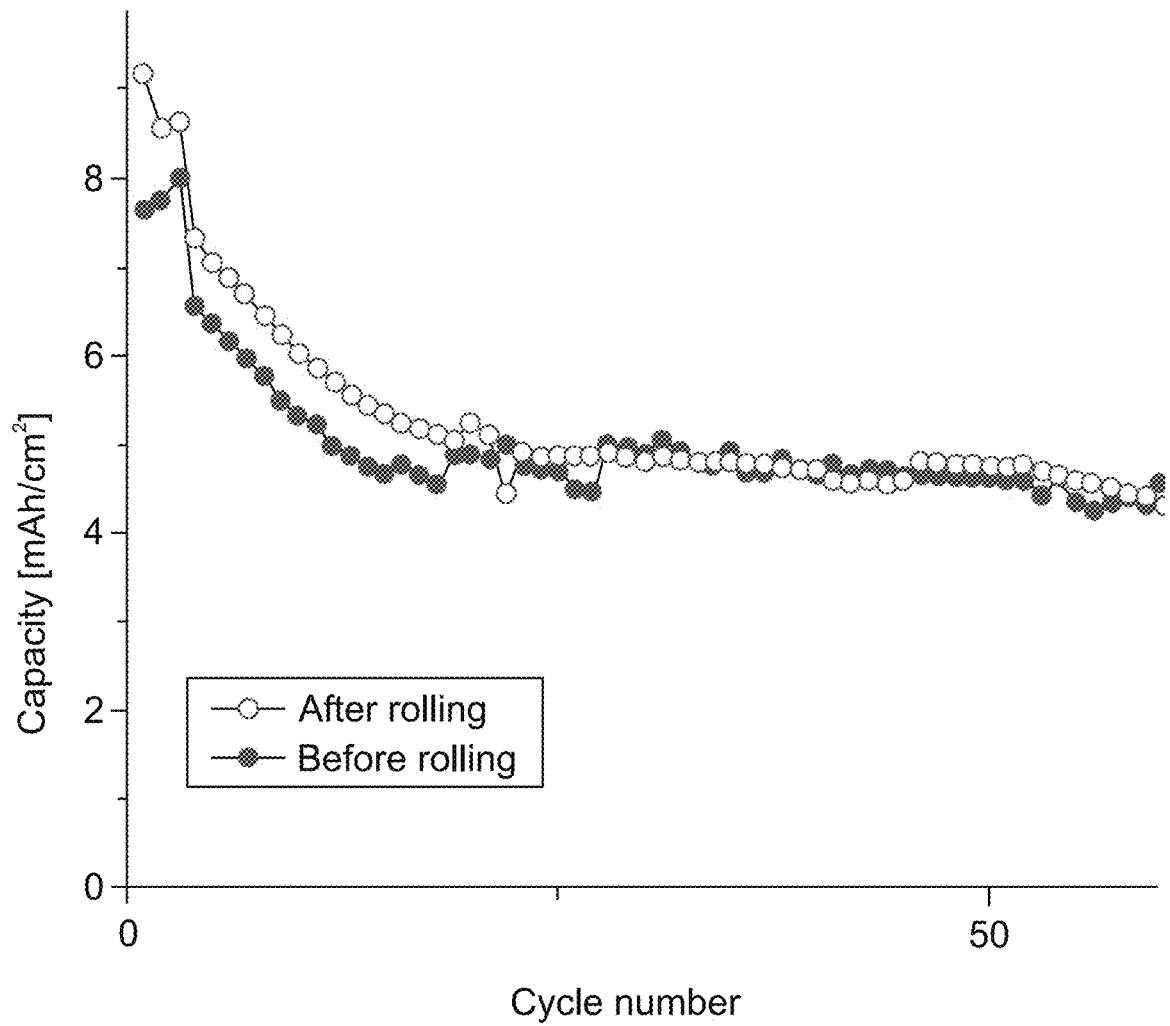
Figure 80B:
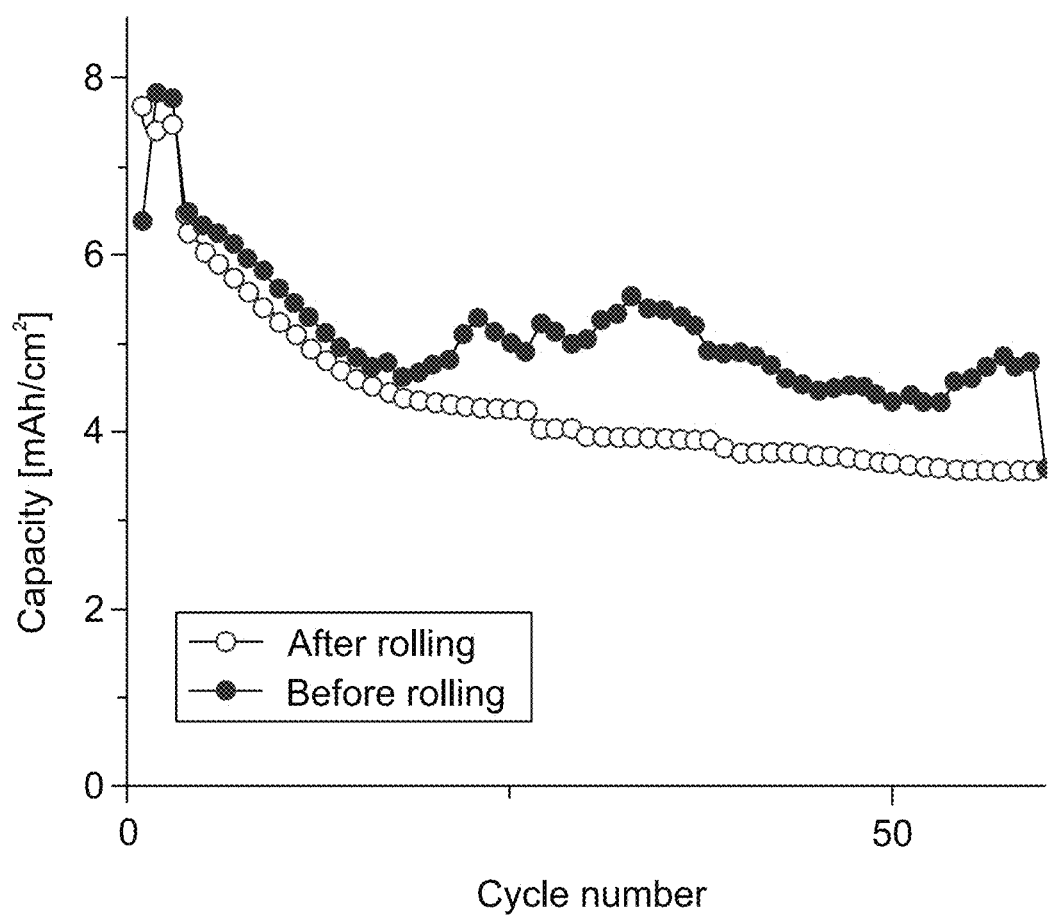
Figure 80C:
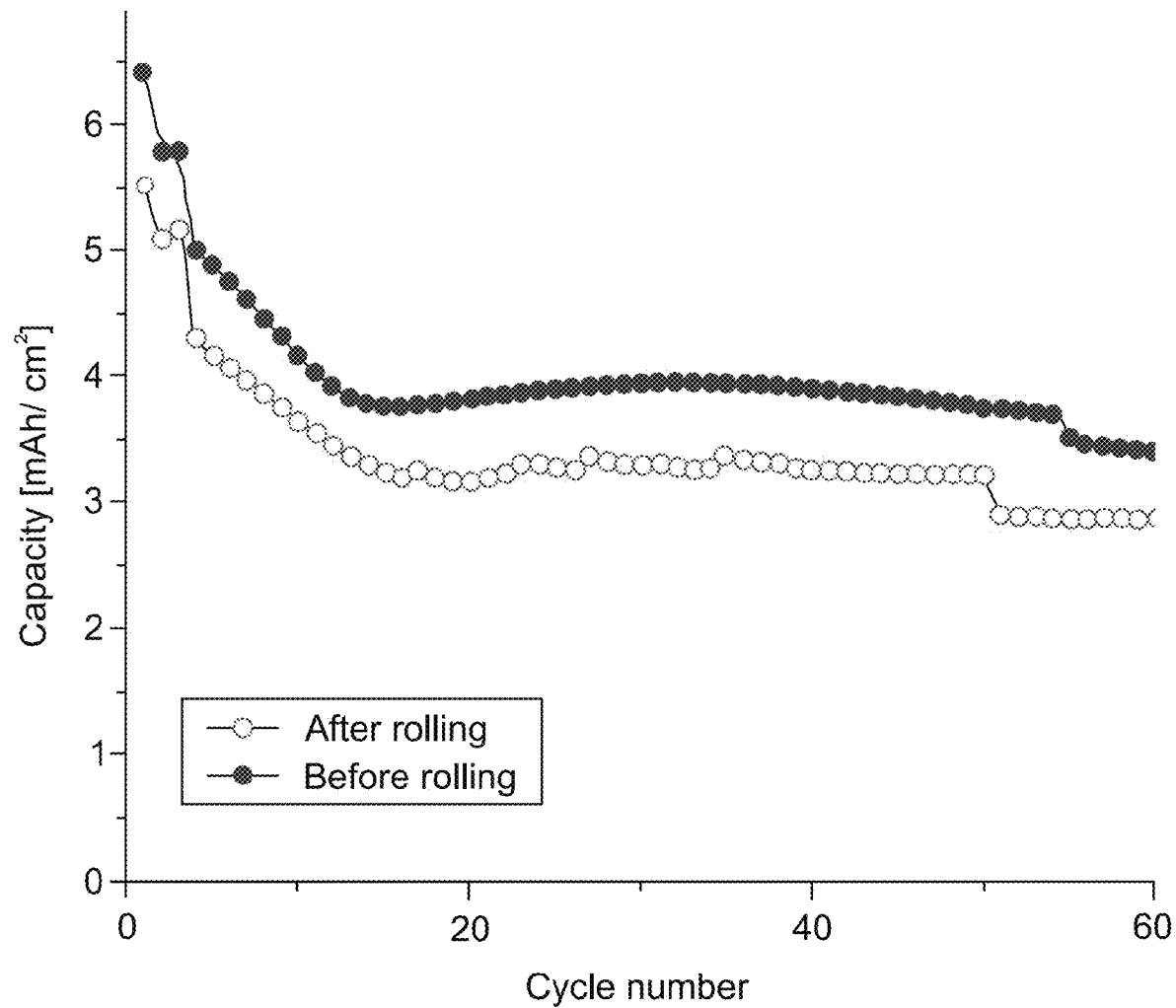

FIGS. 80A-80D present graphs (FIGS. 80A-80C) and a table (FIG. 80D) showing capacity of silicon nanostructure anodes before and after rolling, as a function of number electrochemical cycles; sample in FIG. 80A (batch 1, characterized by relatively strong adhesion between layers) has 2.1 mg/cm$^2$ Si, sample in FIG. 80B (batch 2, characterized by relatively weak adhesion between layers) has 2 mg/cm$^2$ Si, and sample in FIG. 80C (batch 3) has 1.3 mg/cm$^2$.

Figure 81A:
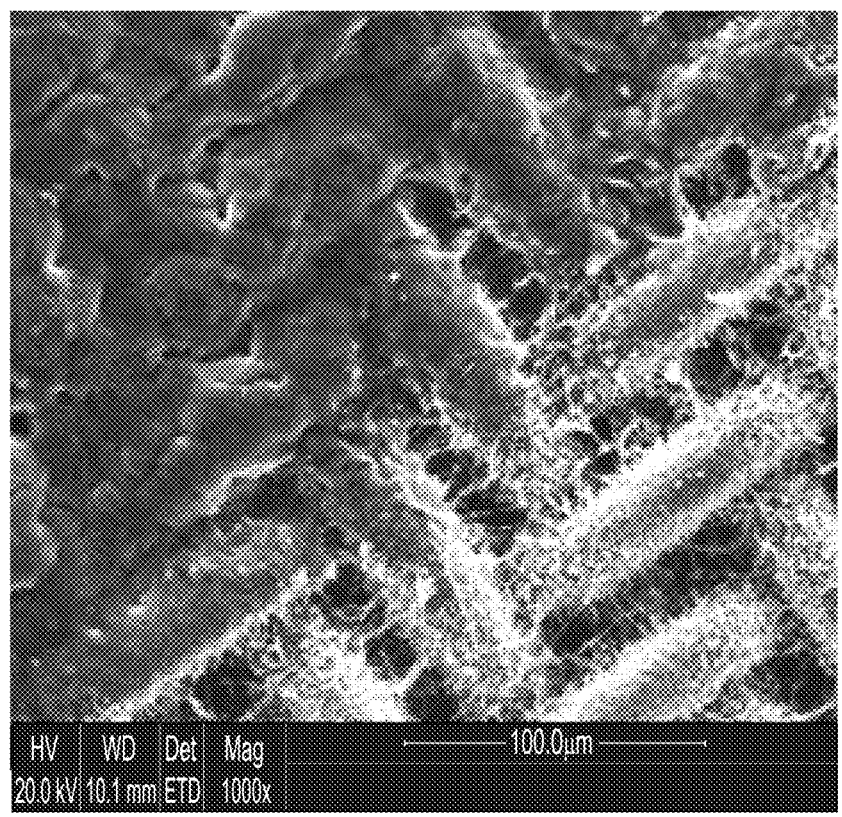
Figure 81B:
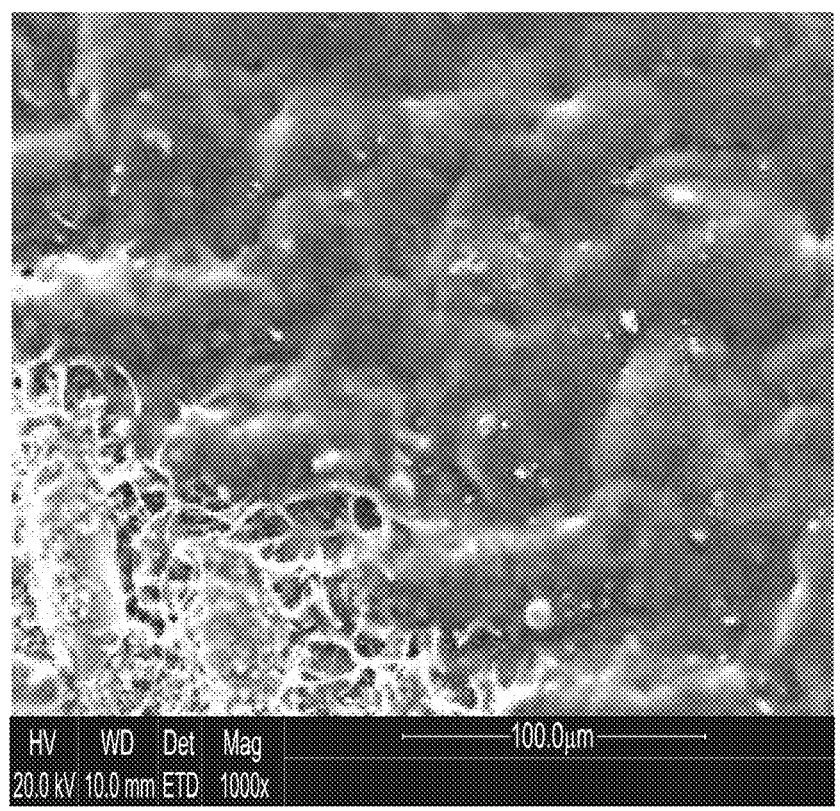

FIGS. 81A and 81B present scanning electron microscopy images of silicon nanostructures on steel mesh covered (except in one corner) with solid polymer electrolyte (SPE) with (FIG. 81B) or without (FIG. 81A) alumina, according to some embodiments of the invention.

Figure 82:
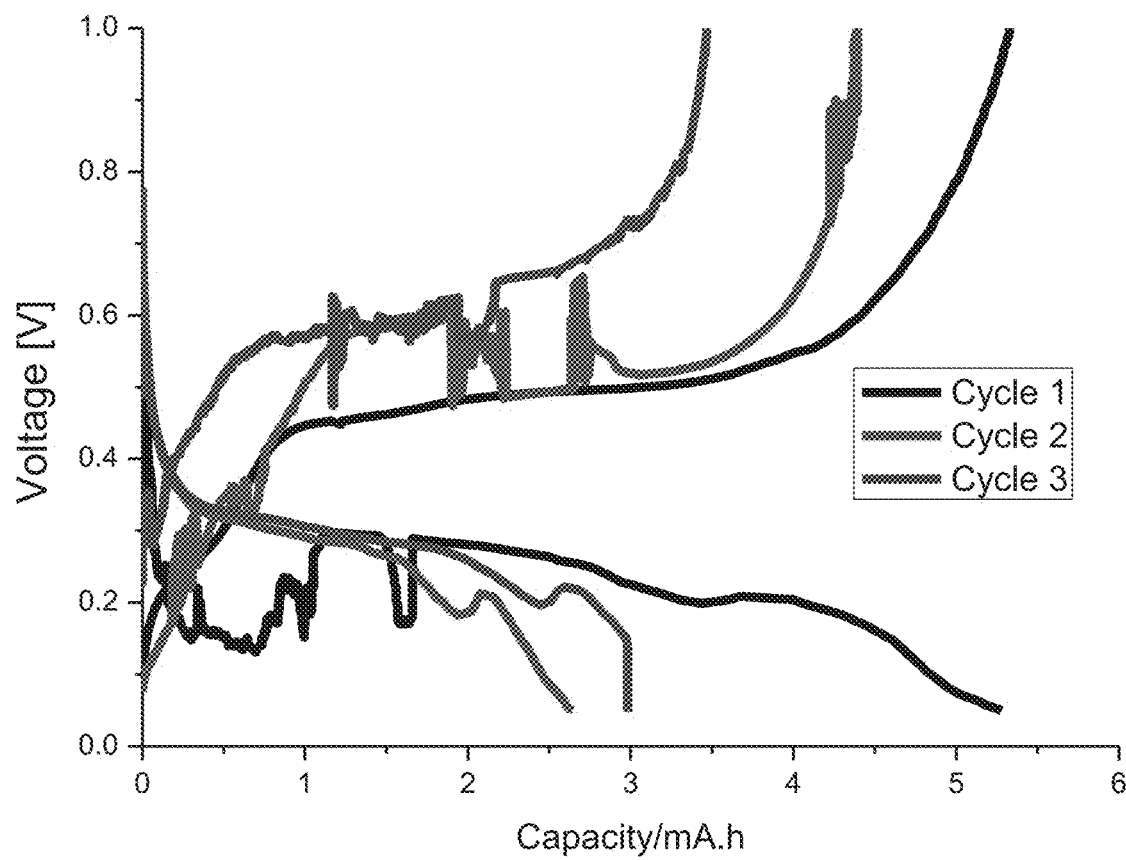

FIG. 82 presents a graph showing voltage as a function of capacity for initial three cycles of a silicon nanostructure anode with SPE.

Figure 83:
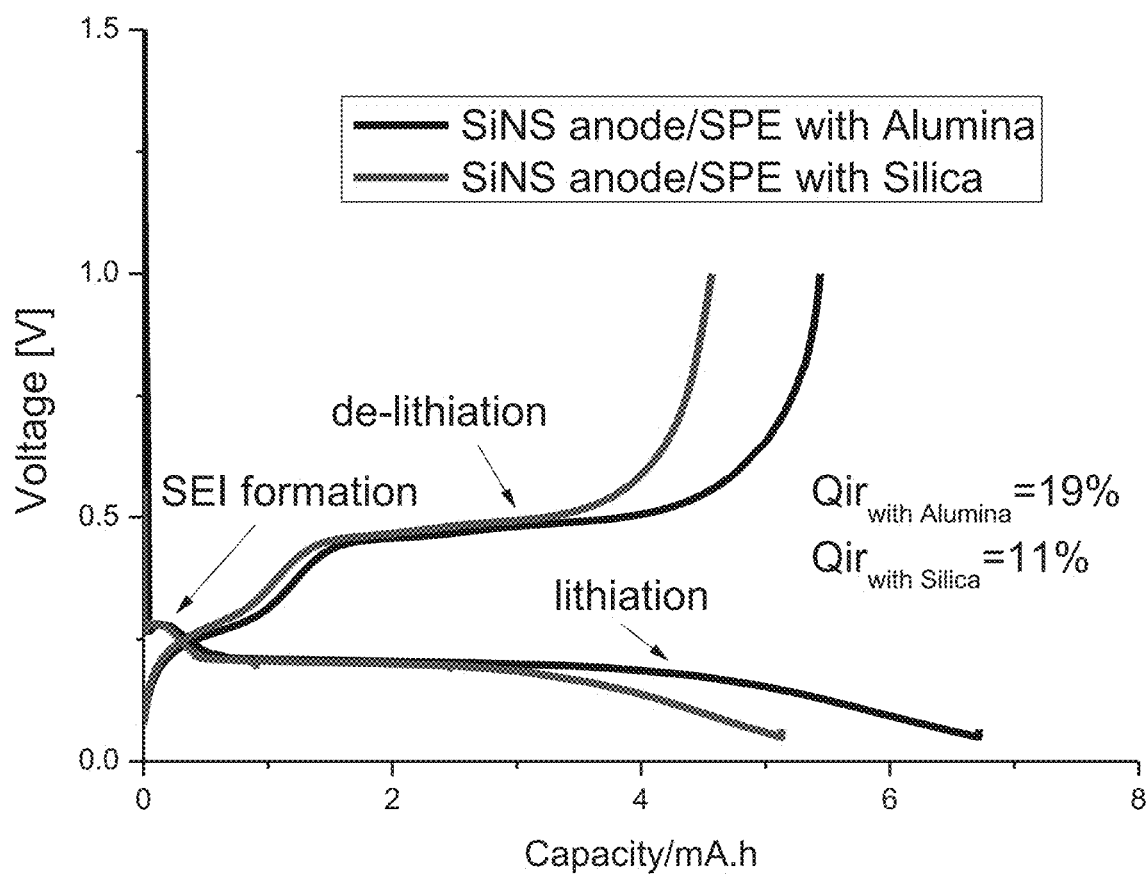

FIG. 83 presents a graph showing voltage as a function of capacity for a silicon nanostructure anode with SPE comprising alumina or silica.

DESCRIPTION OF SPECIFIC EMBODIMENTS OF THE INVENTION

The present invention, in some embodiments thereof, relates to electrochemistry and more particularly, but not exclusively, to silicon-based electrodes which are usable, for example, in energy storage devices such as lithium ion batteries.

The present inventors have uncovered catalyst free and low cost chemical vapor deposition (CVD) processes resulting in three-dimensional (3D) growth of dense (and largely amorphous) silicon nanostructures on conductive stainless steel networks. Prior to silicon deposition, the steel substrate is treated by exposure to HF, which results in growth of silicon nanostructures on the substrate upon CVD. Alternatively, the steel substrate is subjected to a heat treatment, which results in formation of metal-based nanostructures, which may then be coated with silicon via CVD.

The obtained silicon nanostructure materials were tested for use as anodes in a lithium battery. Silicon nanostructures on stainless steel mesh exhibited an electrode capacity of up to 3000 mAh per gram silicon. Exemplary half cells of silicon nanostructures vs. lithium demonstrated more than 500 cycles with less than 50% capacity loss at a cycling rate of about 0.05 C and capacity of about 2000 mAh per gram silicon. Exemplary full cells comprising a silicon nanostructure anode and NCA (lithium nickel cobalt aluminum oxide) or LFP (lithium iron phosphate) commercial cathodes demonstrated more than 300-400 full cycles with 100% DOD (depth of discharge) and with less than 40% capacity loss. The capacity of full cells was cathode-limited, according to commercial lithium ion battery standard, the cells being designed with anodic material excess.

The materials and processes described herein can overcome deficiencies of previously described electrodes for lithium ion batteries (e.g., as in Chan et al. [*Nat Nanotechnol* 2008, 3:31-35]); for example, low coulombic efficiency, low capacity per electrode area associated with flat substrates, insufficient room to expand upon lithiation associated with flat substrates, and/or the need for a catalyst such as gold (which increases cost and limits scalability to industrial scales). In contrast, the processes described herein may optionally result in a high surface area of active material by a simple, readily scalable, two-stage process (treatment of stainless steel followed by silicon deposition), without relying on addition of a catalyst.

Composite Electrode Comprising Silicon-Containing Nanostructures:

According to an aspect of some embodiments of the invention, there is provided a composite electrode, comprising a stainless steel substrate, and a plurality of silicon-containing nanostructures extending from the stainless steel substrate.

The term "silicon-containing nanostructure" encompasses nanostructures comprising silicon as a primary component, as well as nanostructures comprising silicon as a core or layer, for example, a layer coating a metallic core.

For simplicity, silicon-containing nanostructures comprising silicon as a primary component are referred to herein interchangeably as "silicon nanostructures".

Similarly, silicon-containing nanostructures comprising a layer of silicon on stainless steel are referred to herein interchangeably as "stainless steel nanostructures".

According to an aspect of some embodiments of the invention, there is provided a composite electrode, comprising a self-catalyzing stainless steel substrate, and a plurality of silicon-containing nanostructures extending from the stainless steel substrate.

Herein, the term "self-catalyzing" refers to a substrate (e.g., a stainless steel substrate) capable of catalyzing growth of silicon nanostructures (e.g., nanowires) on a surface of itself, for example, under conditions of chemical vapor deposition of silicon (e.g., according to any of the respective embodiments described herein). It is to be understood that the term "self-catalyzing" does not exclude treatment of a substrate to obtained a self-catalyzing substrate, provided that the treatment does not rely on addition of an external material which serves as a catalyst.

According to an aspect of some embodiments of the invention, there is provided a catalyst-free composite electrode, comprising a stainless steel substrate, and a plurality of silicon-containing nanostructures extending from the stainless steel substrate (i.e., substantially devoid of a catalyst material, as defined herein).

According to an aspect of some embodiments of the invention, there is provided a composite electrode, comprising a stainless steel substrate, and a plurality of silicon-containing nanostructures extending from the stainless steel substrate, wherein the silicon-containing nanostructures are grown via a vapor-solid-solid mechanism.

Herein, the terms "vapor-solid-solid" and "VSS", which are used herein interchangeably, refers to a mechanism for growth of structures (e.g., nanowires) by chemical vapor deposition, wherein a catalytic solid phase (optionally a part of a self-catalyzing solid substrate) induces growth at the interface of a solid substrate and the catalytic solid phase. VSS mechanisms are distinct from VLS mechanisms, which are discussed below.

Herein, the phrase term "extending from" refers to a first structure (e.g., a silicon-containing nanostructure described herein) which is attached to a second structure (e.g., a steel substrate), wherein the area where the two structures attach is shorter in at least one dimension (optionally in all dimensions) than the length of the first structure in a dimension along the surface of the second structure.

It is to be noted that the growth of such silicon-containing nanostructures need not be catalyzed on any portion of the substrate, but only on a portion of the substrate. For example, the portion of the substrate from which nanostructures can grow may be in a form of many disconnected small regions, each of which is also referred to herein as a "seed site".

Herein, the term "stainless steel" refers to an alloy of iron and carbon (referred to in the art as "steel") which further comprises chromium at a concentration of at least 10.5 weight percents. The concentration of carbon is typically in a range of from 0.002 to 2.14 weight percents.

It is expected that during the life of a patent maturing from this application many relevant types (e.g., grades) of stainless steel will be developed and the scope of the term "stainless steel" is intended to include all such new technologies a priori.

In some of any of the respective embodiments described herein, a concentration of chromium in the stainless steel is at least 14 weight percents (e.g., from 14 to 22 weight percents), optionally at least 16 weight percents (e.g., from 16 to 20 weight percents), and optionally at least 18 weight percents (e.g., from 18 to 20 weight percents).

In some of any of the respective embodiments described herein, the stainless steel comprises nickel. In some of embodiments, a concentration of nickel in the stainless steel is at least 6 weight percents (e.g., from 6 to 14 weight percents), optionally at least 8 weight percents (e.g., from 8 to 12 weight percents), and optionally at least 10 weight percents (e.g., from 10 to 12 weight percents).

In some of any of the respective embodiments described herein, the stainless steel comprises molybdenum. In some embodiments, a concentration of molybdenum in the stainless steel is at least 1 weight percent (e.g., from 1 to 4 weight percents), and optionally at least 2 weight percents (e.g., from 2 to 3 weight percents).

In some of any of the respective embodiments described herein, the stainless steel is an austenitic stainless steel, i.e., comprising a face-centered cubic crystal structure. Such a crystal structure may be obtained, for example, by alloying with sufficient nickel and/or manganese and nitrogen.

Examples of suitable stainless steel include, without limitation 316L stainless steel (comprising 16-18 weight percents chromium, 10-12 weight percents nickel, 2-3 weight percents molybdenum, and no more than 0.03 weight percents carbon) and 304 stainless steel (comprising 18-20 weight percents chromium, 8-10.5 weight percents nickel, and no more than 0.08 weight percents carbon). 316L and 304 stainless steels are austenitic. Any other stainless steel, preferably stainless usable as an electrode substrate, is contemplated.

According to some of any of the embodiments described herein, at least a portion (e.g., at least 50%, or at least 60%, or at least 70%, or at least 80%, or at least 90%, or at least 95%, or at least 99%), and preferably all, of the nanostructures are elongated nanostructures.

As used herein, an "elongated nanostructure" generally refers to a three-dimensional body which is made of a solid substance, and which, at any point along its length, has at least one cross-sectional dimension and, in some embodiments, two orthogonal cross-sectional dimensions less than 1 micron, or less than 500 nanometers, or less than 200 nanometers, or less than 150 nanometers, or less than 100 nanometers, or even less than 70, less than 50 nanometers, less than 20 nanometers, or less than 10 nanometers. The cross-section of the elongated nanostructure may have any arbitrary shape, including, but not limited to, circular, square, rectangular, elliptical, star-shape and tubular. Regular and irregular shapes are included.

In some of any of the embodiments described herein, an average length of the silicon-containing nanostructures (according to any of the respective embodiments described herein) ranges from 5 to 1,000 microns, or from 10 to 500 microns, or from 20 to 300 microns, or from 30 to 200 microns, including any intermediate subranges and values therebetween.

In some of any of the embodiments described herein relating to a "portion", the portion is at least 10%, and optionally at least 20%, or at least 30%, or at least 50%, or at least 60%, or at least 70%, or at least 80%, or at least 90%, or at least 95%, or at least 98%, or even at least 99%.

In some of any of the embodiments described herein, a length of at least a portion of (optionally each of) the plurality of silicon-containing nanostructures (according to any of the respective embodiments described herein) ranges from 5 to 1,000 microns, or from 10 to 500 microns, or from 20 to 300 microns, or from 30 to 200 microns, including any intermediate subranges and values therebetween.

In some of any of the embodiments described herein, an average diameter of the silicon-containing nanostructures (according to any of the respective embodiments described herein) ranges from 5 nm to 1,000 nm, or from 10 nm to 300 nm, or from 20 nm to 200 nm, or from 30 nm to 100 nm, including any intermediate subranges and values therebetween.

In some of any of the embodiments described herein, at least a portion of (optionally each of) the plurality of silicon-containing nanostructures (according to any of the respective embodiments described herein) have a diameter which ranges from 5 nm to 1,000 nm, or from 10 nm to 300 nm, or from 20 nm to 200 nm, or from 30 nm to 100 nm, including any intermediate subranges and values therebetween.

In some of any of the embodiments described herein, for at least a portion of (optionally for each of) the plurality of silicon-containing nanostructures, the regions of the substrate surface in which the nanostructures are attached to the substrate are disconnected, that is, the nanostructures are separated by a portion of the substrate surface which is not attached to silicon.

In some of any of the embodiments described herein, the elongated nanostructures are generally parallel to each other, at least in a region close to a surface of the substrate from which they extend (e.g., a region of up to 1 micron from the surface).

In some of any of the embodiments described herein, the elongated nanostructures are aligned generally vertically to a surface of the substrate, at least in a region close to the substrate surface (e.g., a region of up to 1 micron from the surface).

In some of any of the embodiments described herein, the elongated nanostructures are generally parallel to each other and are aligned generally vertically to the substrate, at least in a region close to the substrate surface (e.g., a region of up to 1 micron from the surface).

In some of any of the embodiments described herein, an average distance between the nanostructures (e.g., average of distances between each nanostructure and the nearest other nanostructure) ranges from 10 nm to 10000 nm, or from 10 nm to 5000 nm, or from 10 nm to 2000 nm, or from 10 nm to 2000 nm, or from 10 nm to 500 nm including any subranges and intermediate values therebetween.

The elongated nanostructures according to some of the present embodiments, are collectively referred to herein as "nanowires". Nanowires may optionally be hollow, e.g., shaped like a hollow tube (in which case, they may be referred to as "nanotubes"), or full (i.e., not hollow, as defined herein).

In some of any of the embodiments described herein, the nanowires are full (i.e., not hollow).

Herein, a "full" nanowire is one in which void space makes up no more than 20% of a volume of the nanowire (optionally no more than 10% thereof) and wherein the void space does not extend continuously throughout most (i.e., over 50%) or all of the length of the nanowire.

In some of any of the embodiments described herein, the stainless steel substrate is a self-catalyzing stainless steel substrate, as defined herein.

In some of any of the respective embodiments described herein, the self-catalyzing stainless steel substrate comprises a nanoporous surface structure.

Herein, the term "nanoporous" refers to a porous structure which includes (inter alia) pores having a diameter of less than 1 micron, and optionally less than 100 nm.

In some embodiments, the nanoporous surface structure is featuring a plurality of nanostructure growth seed sites, that is, nanostructures grow in regions comprising the above-mentioned pores having a diameter of less than 1 micron. The seed sites of a self-catalyzing stainless steel substrate are composed of material derived from the stainless steel (e.g., certain metallic elements and/or certain structures of the steel), rather than being generated by a catalyst material (as defined herein). In some such embodiments, the plurality of silicon-containing nanostructures (according to any of the respective embodiments described herein) extend from the plurality of nanostructure growth seed sites on the self-catalyzing stainless steel substrate, e.g., each nanostructure extending from a respective growth seed site.

In view of the self-catalyzing properties of stainless steel according to some embodiments of the invention, nanostructures may be prepared without any externally added catalyst being present.

In some of any of the embodiments described herein, in at least a portion of the plurality of silicon-containing nanostructures (e.g., at least 50%, or at least 75%, or at least 90% of the nanostructures), each of the silicon-containing nanostructures (according to any of the respective embodiments described herein) is substantially devoid of a catalyst material. In some embodiments, each of the plurality of silicon-containing nanostructures is substantially devoid of a catalyst material.

Herein, the phrase "catalyst material" refers to a material capable of catalyzing growth of silicon nanostructures (e.g., nanowires).

As used herein, stainless steel components, i.e., any material comprised by the stainless steel substrate in the bulk thereof (e.g., outside of nanostructures extending from the substrate), are excluded from the phrase "catalyst material", even if said material would be considered a catalyst material if not incorporated in the stainless steel substrate bulk (e.g., if present in or on a silicon-containing nanostructure). In other words, components of the stainless steel bulk cannot prevent a substance from being considered "substantially devoid of a catalyst material", as defined herein.

It is expected that during the life of a patent maturing from this application many relevant catalysts will be developed and the scope of the term "catalyst material" is intended to include all such new technologies a priori.

In some of any of the embodiments described herein relating to a catalyst material, the catalyst material is a metallic material.

In some of any of the embodiments described herein, in at least a portion of the plurality of silicon-containing nanostructures (e.g., at least 50%, or at least 75%, or at least 90% of the nanostructures), each of the silicon-containing nanostructures (according to any of the respective embodiments described herein) is substantially devoid of a catalyst material usable in vapor-liquid-solid growth of silicon nanostructures, i.e., capable of catalyzing vapor-liquid-solid growth of silicon. In some embodiments, each of the plurality of silicon nanostructures is substantially devoid of a catalyst material usable in vapor-liquid-solid growth of silicon nanostructures, i.e., capable of catalyzing vapor-liquid-solid growth of silicon.

Herein, the terms "vapor-liquid-solid" and "VLS", which are used herein interchangeably, refers to a mechanism for growth of structures (e.g., nanowires) by chemical vapor deposition, wherein a catalytic liquid phase induces growth (e.g., from nucleated seeds) at the interface of a solid substrate and the liquid phase, for example, by collection of vapor into the liquid phase to generate higher concentrations of the substance being deposited than exist in the vapor phase. The catalytic liquid phase comprises a catalyst, optionally in a form of a liquid alloy with a substance in the substrate and/or a substance being deposited (e.g., an alloy with silicon). Thus, for example, if gold (which has a melting point of over 1000° C.) is used as a VLS catalyst for silicon deposition, the catalytic liquid phase is a gold-silicon alloy, which may have a melting point of about 363° C. (below common temperatures for silicon vapor deposition) at its eutectic point (about 4:1 Au:Si).

Typically, a liquid phase catalyst of vapor-liquid-solid growth remains (e.g., in the form of minute droplets) at a tip of the structure (distal from the substrate) during duration of the growth.

In some of any of the embodiments described herein, in at least a portion of the plurality of silicon-containing nanostructures (e.g., at least 50%, or at least 75%, or at least 90% of the nanostructures), each of the silicon-containing nanostructures (according to any of the respective embodiments described herein) is substantially devoid of a substance which in admixture (e.g., alloy) at any proportion with silicon (e.g., at a eutectic point with silicon) has a melting point of below 600° C. and a boiling point above 600° C. (at a pressure of 20 Torr). In some embodiments, each of the plurality of silicon-containing nanostructures is substantially devoid of a substance which in admixture with silicon has a melting point of below 600° C. and a boiling point above 600° C. (at a pressure of 20 Torr).

Without being bound by any particular theory, it is believed that a melting point of below 600° C. and a boiling point above 600° C. at a pressure of 20 Torr is indicative of a substance being a liquid under conditions suitable for chemical vapor deposition of silicon.

In some of any of the embodiments described herein, in at least a portion of the plurality of silicon-containing nanostructures (e.g., at least 50%, or at least 75%, or at least 90% of the nanostructures), each of the silicon-containing nanostructures (according to any of the respective embodiments described herein) is substantially devoid of a catalyst material which is a non-silicon catalyst material. That is, in such embodiment, a catalyst material which is a form of silicon does not prevent a substance from being considered "substantially devoid of a catalyst material". In some embodiments, each of the plurality of silicon-containing nanostructures is substantially devoid of a catalyst material.

Herein, the phrase "catalyst material" refers to a material capable of catalyzing growth of silicon nanostructures (e.g., nanowires).

As used herein, stainless steel components, i.e., any material comprised by the stainless steel substrate in the bulk thereof (e.g., outside of nanostructures extending from the substrate), are excluded from the phrase "catalyst material", even if said material would be considered a catalyst material if not incorporated in the stainless steel substrate bulk (e.g., if present in or on a silicon-containing nanostructure). In other words, components of the stainless steel bulk cannot prevent a substance from being considered "substantially devoid of a catalyst material", as defined herein.

In some of any of the embodiments described herein, in at least a portion of the plurality of silicon-containing nanostructures (e.g., at least 50%, or at least 75%, or at least 90% of the nanostructures), each of the silicon-containing nanostructures (according to any of the respective embodiments described herein) is substantially devoid of gold, silver, copper, indium, bismuth, gallium, zinc, aluminum, tin, iron, molybdenum, chromium, manganese, and/or nickel. In some embodiments, each of the plurality of silicon-containing nanostructures is substantially devoid of gold, silver, copper, indium, bismuth gallium, zinc, aluminum, tin, iron, molybdenum, chromium, manganese, and/or nickel. In some embodiments, each silicon-containing nanostructures in the aforementioned portion, or each of the plurality of silicon-containing nanostructures, is further substantially devoid of all noble metals, as defined herein (in addition to gold and silver).

In some of any of the embodiments described herein, in at least a portion of the plurality of silicon-containing nanostructures (e.g., at least 50%, or at least 75%, or at least 90% of the nanostructures), each of the silicon-containing nanostructures (according to any of the respective embodiments described herein) is substantially devoid of gold, silver, copper, indium, bismuth gallium, zinc, aluminum, tin, and/or manganese. In some embodiments, each of the plurality of silicon-containing nanostructures is substantially devoid of gold, silver, copper, indium, bismuth gallium, zinc, aluminum, tin, and/or manganese. In some embodiments, each silicon-containing nanostructures in the aforementioned portion, or each of the plurality of silicon-containing nanostructures, is further substantially devoid of all noble metals, as defined herein (in addition to gold and silver).

In some of any of the embodiments described herein, in at least a portion of the plurality of silicon-containing nanostructures (e.g., at least 50%, or at least 75%, or at least 90% of the nanostructures), each of the silicon-containing nanostructures (according to any of the respective embodiments described herein) is substantially devoid of gold. In some embodiments, each of the silicon-containing nanostructures in the portion is substantially devoid of a noble metal.

In some of any of the embodiments described herein, each of the plurality of silicon-containing nanostructures (according to any of the respective embodiments described herein) is substantially devoid of gold. In some embodiments, each of the plurality of silicon-containing nanostructures is substantially devoid of a noble metal.

Herein, the phrase "noble metal" refers to gold, platinum, iridium, osmium, silver, palladium, rhodium and ruthenium.

Herein throughout, "substantially devoid" refers to a concentration of a substance (e.g., in a nanostructure) of less than 10 parts per million (by weight). In some of any of the embodiments described herein relating to nanostructures substantially devoid of a substance, a concentration of the substance is less than 1 part per million (by weight), or less than 0.1 part per million, or less than 0.01 part per million (i.e., less than 10 parts per billion) by weight.

In some of any of the embodiments described herein, at least a portion of the plurality of silicon nanostructures, and optionally all of the plurality of silicon nanostructures, comprise a metal constituent originating from the stainless steel substrate, along the length (long axis) of the nanostructure, for example, dispersed along the length of the nanostructure. In some embodiments, a concentration of metal constituent is greater in the core of the nanostructure(s) than in the surface of the nanostructure(s).

In some of any of the embodiments described herein, at least a portion of the plurality of silicon-containing nanostructures, and optionally all of the plurality of silicon-containing nanostructures, consist essentially of silicon and one or more metal constituents originating from the stainless steel substrate, and optionally also alumina (e.g., in a coating described herein), for example, such that no catalyst material is included therein. In some embodiments, at least a portion of the plurality of silicon-containing nanostructures, and optionally all of the plurality of silicon-containing nanostructures, consist of silicon and one or more metal constituents originating from the stainless steel substrate, and optionally also alumina.

Examples of metal constituents which may originate from a steel substrate include, without limitation, nickel, copper, chromium and iron.

In some of any of the embodiments described herein, in at least a portion of the plurality of silicon nanostructures, and optionally in all of the plurality of silicon nanostructures, a metal silicide (e.g., an iron silicide, a nickel silicide, a chromium silicide and/or a copper silicide) extends from the self-catalyzing stainless steel substrate and along at least a portion of its length. Optionally, metal silicide where a nanostructure meets the steel substrate strengthens the mechanical and/or electrical connection between the silicon in the nanostructure and the steel.

Herein, a "metal silicide" refers to a compound comprising silicon and metal atoms.

In some embodiments the metal silicide forms a core of the nanostructure(s), surrounded by silicon.

In some embodiments, the metal constituent and/or metal silicide in the core and surrounding silicon represent a gradient (perpendicular to a long axis of the nanostructure) in a mixture of silicon and metal atoms, whereby a concentration of metal atoms decreases, and a concentration of silicon atoms increases, in a direction extending from the core to a surface of the nanostructure. Optionally, there is no distinct boundary between the "metal silicide" and the "silicon".

In some of any of the embodiments described herein, at least a portion of the plurality of silicon-containing nanostructures forms a three-dimensional network of crossing strands. The crossing strands may comprise nanostructures (e.g., elongated nanostructures) which are fused to each other and/or not fused to each other (e.g., in proximity and/or in contact with one another).

In some of any of the embodiments described herein, at least a portion of the plurality of silicon-containing nanostructures, and optionally each of the plurality of silicon-containing nanostructures, are fused with at least one other silicon-containing nanostructure at a location removed from a surface of the stainless steel substrate. In some embodiments, the fusion of silicon-containing nanostructures forms a sponge-like three-dimensional structure.

Herein, the term "sponge-like" refers to structure having a porosity of at least 50% (i.e., voids make up at least 50% of the volume of the structure).

In some embodiments of any of the embodiments described herein relating to a sponge-like structure, the porosity of the sponge-like structure is at least 75%, or at least 90%, or at least 95%, or at least 98%, or at least 99%.

As exemplified herein, fusion of silicon nanostructures may be effected by heat treatment (also referred to herein as "annealing") according to any of the respective embodiments described herein, for example, at a temperature of at least 600° C. (e.g., from 600° C. to 900° C.), and optionally at least 650° C. (e.g., from 650° C. to 850° C.).

In some of any of the embodiments described herein, in at least a portion, or in all, of the plurality of silicon nanostructures, each of the silicon nanostructures is characterized by at least one of:
(a) being substantially devoid of a non-silicon catalyst material (according to any of the respective embodiments described herein); and/or
(b) being substantially devoid of a noble metal (according to any of the respective embodiments described herein); and/or
(c) including along its length a metal constituent originating from the stainless steel substrate (according to any of the respective embodiments described herein); and/or
(d) including a metal silicide extending from the stainless steel substrate and along at least a portion of its length (according to any of the respective embodiments described herein); and/or
(e) being fused with at least one other silicon nanostructure at a location removed from a surface of the stainless steel substrate to form a sponge-like three-dimensional structure (according to any of the respective embodiments described herein).

In some of any of the embodiments described herein, in at least a portion, or in all, of the plurality of silicon nanostructures, each of the silicon nanostructures is characterized by at least any two of the abovementioned features (a)-(e), optionally by at least any three of the abovementioned features (a)-(e), optionally by at least any four of the abovementioned features (a)-(e), and optionally by all of the abovementioned features (a)-(e).

According to an aspect of some embodiments of the invention, there is provided a composite electrode comprising:
a self-catalyzing stainless steel substrate, the self-catalyzing stainless steel substrate comprising a nanoporous surface structure featuring a plurality of nanostructure growth seed sites (according to any of the respective embodiments described herein); and
a plurality of silicon nanostructures extending from the plurality of nanostructure growth seed sites on the self-catalyzing stainless steel substrate.

In some of any of the embodiments described herein for this aspect, at least a portion of, or each of the silicon nanostructures is substantially devoid of a non-silicon catalyst material (according to any of the respective embodiments described herein). In some embodiments, the non-silicon catalyst material is usable in vapor-liquid-solid growth of silicon nanostructures (according to any of the respective embodiments described herein). In some embodiments, the non-silicon catalyst material is a metallic catalyst material (according to any of the respective embodiments described herein).

In some of any of the embodiments described herein for this aspect, at least a portion of, or each of the silicon nanostructures is substantially devoid of a noble metal (according to any of the respective embodiments described herein).

In some of any of the embodiments described herein for this aspect, at least a portion of, or each of the silicon nanostructures is substantially devoid of a metallic material usable as non-silicon catalyst in vapor-liquid-solid growth of silicon nanostructures (according to any of the respective embodiments described herein).

In some of any of the embodiments described herein, in at least a portion, or in all, of the plurality of silicon nanostructures, each silicon nanostructure includes along its length one or more metal constituents originating from the stainless steel substrate (according to any of the respective embodiments described herein).

In some of any of the embodiments described herein, in at least a portion, or in all, of said plurality of nanostructures, each silicon nanostructures includes a metal silicide extending from the self-catalyzing stainless steel substrate and along at least a portion of its length (according to any of the respective embodiments described herein).

In some of any of the embodiments described herein, in at least a portion, or in all, of the plurality of silicon nanostructures, each of the silicon nanostructures is fused with at least one other silicon nanostructure at a location removed from the nanoporous surface structure of the stainless steel substrate (according to any of the respective embodiments described herein).

According to an aspect of some embodiments of the invention, there is provided a composite electrode comprising:
 a stainless steel substrate; and
 a plurality of silicon nanostructures extending from the stainless steel substrate,
 wherein each of the plurality of silicon nanostructures is substantially devoid of a non-silicon catalyst material (according to any of the respective embodiments described herein).

In some of any of the embodiments described herein for this aspect, the non-silicon catalyst material is usable in vapor-liquid-solid growth of silicon nanostructures (according to any of the respective embodiments described herein).

In some of any of the embodiments described herein, the non-silicon catalyst material is a metallic catalyst material (according to any of the respective embodiments described herein). In some embodiments, the metallic catalyst material comprises a noble metal.

In some of any of the embodiments described herein, in at least a portion, or in all, of the plurality of silicon nanostructures, each silicon nanostructure includes along its length one or more metal constituents originating from the stainless steel substrate (according to any of the respective embodiments described herein).

In some of any of the embodiments described herein, in at least a portion, or in all, of said plurality of nanostructures, each silicon nanostructures includes a metal silicide extending from the self-catalyzing stainless steel substrate and along at least a portion of its length (according to any of the respective embodiments described herein).

In some of any of the embodiments described herein, in at least a portion, or in all, of the plurality of silicon nanostructures, each of the silicon nanostructures is fused with at least one other silicon nanostructure at a location removed from the nanoporous surface structure of the stainless steel substrate (according to any of the respective embodiments described herein).

According to an aspect of some embodiments of the invention, there is provided a composite electrode comprising:
 a stainless steel substrate; and
 a plurality of silicon nanostructures extending from the stainless steel substrate,
 wherein each of the plurality of silicon nanostructures is substantially devoid of a noble metal (according to any of the respective embodiments described herein).

In some of any of the embodiments described herein for this aspect, the noble metal comprises gold.

In some of any of the embodiments described herein for this aspect, in at least a portion, or in all, of the plurality of silicon nanostructures, each silicon nanostructure includes along its length one or more metal constituents originating from the stainless steel substrate (according to any of the respective embodiments described herein).

In some of any of the embodiments described herein for this aspect, in at least a portion, or in all, of said plurality of nanostructures, each silicon nanostructures includes a metal silicide extending from the self-catalyzing stainless steel substrate and along at least a portion of its length (according to any of the respective embodiments described herein).

In some of any of the embodiments described herein for this aspect, in at least a portion, or in all, of the plurality of silicon nanostructures, each of the silicon nanostructures is fused with at least one other silicon nanostructure at a location removed from the nanoporous surface structure of the stainless steel substrate (according to any of the respective embodiments described herein).

According to an aspect of some embodiments of the invention, there is provided a composite electrode comprising:
 a stainless steel substrate; and
 a plurality of silicon nanostructures extending from the stainless steel substrate,
 wherein in at least a portion, or in all, of the plurality of silicon nanostructures, each silicon nanostructure includes along its length a metal constituent originating from the stainless steel substrate (according to any of the respective embodiments described herein).

In some of any of the embodiments described herein for this aspect, in at least a portion, or in all, of the plurality of nanostructures, each nanostructure is substantially devoid of a non-silicon catalyst material and/or of a noble metal (according to any of the respective embodiments described herein).

In some of any of the embodiments described herein for this aspect, in at least a portion, or in all, of said plurality of nanostructures, each silicon nanostructures includes a metal silicide extending from the self-catalyzing stainless steel substrate and along at least a portion of its length (according to any of the respective embodiments described herein).

In some of any of the embodiments described herein for this aspect, in at least a portion, or in all, of the plurality of silicon nanostructures, each of the silicon nanostructures is fused with at least one other silicon nanostructure at a location removed from the nanoporous surface structure of the stainless steel substrate (according to any of the respective embodiments described herein).

According to an aspect of some embodiments of the invention, there is provided a composite electrode comprising:
 a stainless steel substrate; and
 a plurality of silicon nanostructures extending from the self-catalyzing stainless steel substrate,
 wherein in at least a portion, or in all, of the plurality of silicon nanostructures, each of the silicon nanostructures includes a metal silicide extending from the self-catalyzing stainless steel substrate and along at least a portion of its length (according to any of the respective embodiments described herein).

In some of any of the embodiments described herein for this aspect, in at least a portion, or in all, of the plurality of nanostructures, each nanostructure is substantially devoid of a non-silicon catalyst material and/or of a noble metal (according to any of the respective embodiments described herein).

In some of any of the embodiments described herein for this aspect, in at least a portion, or in all, of the plurality of silicon nanostructures, each silicon nanostructure includes along its length a metal constituent originating from the stainless steel substrate (according to any of the respective embodiments described herein).

In some of any of the embodiments described herein for this aspect, in at least a portion, or in all, of the plurality of silicon nanostructures, each of the silicon nanostructures is fused with at least one other silicon nanostructure at a location removed from the nanoporous surface structure of the stainless steel substrate (according to any of the respective embodiments described herein).

According to an aspect of some embodiments of the invention, there is provided a composite electrode comprising:
 a stainless steel substrate; and
 a plurality of silicon nanostructures extending from the stainless steel substrate,
 wherein in at least a portion, or in all, of the plurality of silicon nanostructures, each of the silicon nanostructures is fused with at least one other silicon nanostructure at a location removed from a surface of the stainless steel substrate to form a sponge-like three-dimensional structure (according to any of the respective embodiments described herein).

In some of any of the embodiments described herein for this aspect, in at least a portion, or in all, of the plurality of nanostructures, each nanostructure is substantially devoid of a non-silicon catalyst material and/or of a noble metal (according to any of the respective embodiments described herein).

In some of any of the embodiments described herein for this aspect, in at least a portion, or in all, of the plurality of silicon nanostructures, each silicon nanostructure includes along its length a metal constituent originating from the stainless steel substrate (according to any of the respective embodiments described herein).

In some of any of the embodiments described herein for this aspect, in at least a portion, or in all, of said plurality of nanostructures, each silicon nanostructures includes a metal silicide extending from the stainless steel substrate and along at least a portion of its length (according to any of the respective embodiments described herein).

As mentioned hereinabove, silicon-containing nanostructures according to some embodiments of the invention may be in a form of nanostructures comprising a layer of silicon on stainless steel, also referred to herein as "stainless steel nanostructures".

According to an aspect of some embodiments of the invention, there is provided a composite electrode comprising:
 a stainless steel body, an outer surface of the stainless steel body including a plurality of elongated stainless steel nanostructures extending from the stainless steel body; and
 a layer of silicon disposed on each of the plurality of elongated stainless steel nanostructures.

As used herein, the phrase "elongated stainless steel nanostructure" refers to an elongated nanostructure (as defined herein) composed of stainless steel.

In some of any of the embodiments described herein, an average length of the stainless steel nanostructures (according to any of the respective embodiments described herein) ranges from 5 to 1,000 microns, or from 10 to 500 microns, or from 20 to 300 microns, or from 30 to 200 microns, including any intermediate subranges and values therebetween.

In some of any of the embodiments described herein, a length of at least a portion of (optionally each of) the plurality of stainless steel nanostructures (according to any of the respective embodiments described herein) ranges from 5 to 1,000 microns, or from 10 to 500 microns, or from 20 to 300 microns, or from 30 to 200 microns, including any intermediate subranges and values therebetween.

In some of any of the embodiments described herein, an average diameter of the stainless steel nanostructures (according to any of the respective embodiments described herein) ranges from 5 nm to 1,000 nm, or from 10 nm to 300 nm, or from 20 nm to 200 nm, or from 30 nm to 90 nm, including any intermediate subranges and values therebetween.

In some of any of the embodiments described herein, at least a portion of (optionally each of) the plurality of stainless steel nanostructures (according to any of the respective embodiments described herein) have a diameter which ranges from 5 nm to 1,000 nm, or from 10 nm to 300 nm, or from 20 nm to 200 nm, or from 30 nm to 90 nm, including any intermediate subranges and values therebetween.

Optionally, the layer of silicon substantially coats an outer surface of at least a portion, or each, of the plurality of stainless steel nanostructures. By "substantially coats" it is meant that at least 50% of the surface of steel nanostructure, for example, at least 75% of the surface, or at least 90% of the surface, or at least 95% of the surface, is covered with silicon.

In some of any of the embodiments described herein, the (average) thickness of the silicon layer is in a range of from about 6 nm to about 200 nm, or from about 6 nm to about 40 nm, or from about 40 nm to about 200 nm, or from about 20 nm to about 100 nm.

In some of any of the embodiments described herein, at least a portion of the plurality of elongated stainless steel nanostructures forms a three-dimensional network of crossing strands. The crossing strands may comprise nanostructures (e.g., elongated nanostructures) which are fused to each other and/or not fused to each other (e.g., in proximity and/or in contact with one another).

Fusion of the elongated stainless steel nanostructures may optionally be effected by fusion of the silicon layers coating them, e.g., without fusion of the stainless steel component of the nanostructures. Fusion of silicon layers may be effected, for example, upon deposition of silicon on adjacent stainless steel nanostructures, and/or by annealing (according to any of the respective embodiments described herein).

In some of any of the embodiments described herein, the plurality of elongated stainless steel nanostructures forms a sponge-like structure (as defined herein) and/or a nanoporous (as defined herein) stainless steel network at the outer surface of the stainless steel body.

Thus, a sponge-like stainless steel structure has a porosity of at least 50%, and optionally at least 75%, or at least 90%, or at least 95%, or at least 98%, or at least 99%, wherein the silicon layers are considered part of the pores/voids within the stainless steel structure.

In some of any of the embodiments described herein, in at least a portion, or all, of the plurality of silicon-containing nanostructures, each of the silicon-containing nanostructures includes a crystalline core and a semi-amorphous shell. In some embodiments a crystallinity of the silicon in the nanostructures (as a whole, including core and shell) is at least 4%, or at least 10%, or at least 20%, or at least 50%, or at least 75%, or even at least 90%.

Herein, the term "semi-amorphous" refers to a substance in which at least a portion of the substance is amorphous, such that a crystallinity of the substance is less than 100%, for example, less than 90%, less than 75%, less than 50%, less than 20%, and even 0%.

Crystallinity may optionally be determined (e.g., quantitatively) by X-ray diffraction according to standard procedures used in the art.

As exemplified herein, crystallinity of silicon-containing nanostructures may be enhanced by heat treatment (also referred to herein as "annealing") according to any of the respective embodiments described herein, for example, at a temperature of at least 600° C. (e.g., from 600° C. to 900° C.), and optionally at least 650° C. (e.g., from 650° C. to 850° C.).

In some of any of the embodiments described herein, the silicon of silicon-containing nanostructures is doped with donor or acceptor atoms, known as "dopant". The present embodiments contemplate doping to effect both n-type (an excess of electrons than what completes a lattice structure lattice structure) and p-type (a deficit of electrons than what completes a lattice structure) doping. The extra electrons in the n-type material or the holes (deficit of electrons) left in the p-type material serve as negative and positive charge carriers, respectively.

Atoms suitable as p-type dopants and as n-type dopants are known in the art. For example, the nanostructure can be made from silicon doped with, e.g., boron (typically, but not necessarily, by exposure to diborane), gallium or aluminum, to provide a p-type silicon-containing nanostructure, or with phosphorus (typically, but not necessarily, by exposure to phosphine), arsenic or antimony, to provide an n-type semiconductor nanostructure.

In some of any of the embodiments described herein, the silicon is intrinsic silicon, that is, silicon which is not doped by p-type or n-type dopants.

In some of any of the embodiments described herein, in at least a portion, or in all, of the plurality of silicon-containing nanostructures, each of the silicon-containing nanostructures is coated with a layer of alumina. The (average) thickness of the alumina layer is optionally in a range of from 1 nm to 50 nm, or from 2 nm to 25 nm, or from 3 nm to 15 nm. Exemplary alumina layers have a thickness from about 5 nm to about 10 nm.

The alumina layer is optionally formed by atomic layer deposition, as exemplified in the Examples section herein.

Silicon-containing nanostructures coated with a layer of alumina may optionally have alumina covering at least 50% of the surface of a silicon nanostructure or a stainless steel nanostructure (with silicon layer), or at least 75% of the surface, or at least 90% of the surface, or at least 95% of the surface.

Process of Preparing Composite Electrode Comprising Silicon Nanostructures:

According to an aspect of some embodiment of the invention, there is provided a process of preparing a composite electrode comprising silicon nanostructures on a stainless steel substrate, according to any of the respective embodiments described herein.

The process comprises contacting a stainless steel substrate (according to any of the respective embodiments described herein) with hydrofluoric acid (HF); and (subsequent to the contacting with HF) subjecting the substrate to conditions for growing a silicon nanostructure, for example, which extends from the substrate.

In some embodiments, contact with the HF results in a nanoporous surface structure (as defined herein), for example, including a plurality of nanostructure growth seed sites on the stainless steel substrate. Growth of the silicon nanostructure is optionally subsequently effected from at least a portion, or from each, of the plurality of nanostructure growth seed sites.

In some of any of the respective embodiments described herein, the substrate is contacted with an aqueous HF solution. In some embodiments, the HF solution comprises HF at a concentration of at least 5 weight percents, for example, from 5 to 40 weight percents. In some embodiments, the HF concentration is in a range of from 5 to 15 weight percents. In some alternative embodiments, the HF concentration is in a range of from 25 to 40 weight percents, for example about 30 weight percents.

In some of any of the respective embodiments described herein, HF is contacted with the stainless steel substrate for a time period of from 10 minutes to 60 minutes, or from 20 minutes to 40 minutes.

Following HF treatment, the stainless steel substrate is subjected to vapor deposition of silicon, to thereby obtain the silicon nanostructures. Vapor deposition may optionally be effected according to any of the embodiments described in the section herein relating to vapor deposition of silicon.

Process for Preparing Composite Electrode Comprising Stainless Steel Nanostructures:

According to an aspect of some embodiments of the invention, there is provided a process of preparing a composite electrode comprising a plurality of elongated stainless steel nanostructures and a silicon layer on the steel nanostructures, according to any of the respective embodiments described herein.

The process comprises contacting a stainless steel body with a gaseous environment (optionally at about atmospheric pressure) containing hydrogen gas, at a temperature of from about 850° C. to about 1200° C., thereby growing a plurality of elongated stainless steel nanostructures extending from the stainless steel body through exposure to the environment.

In some embodiments, the contacting with the gaseous environment described herein is at a temperature in a range of from about 950° C. to about 1100° C.

In some of any of the respective embodiments described herein, the gaseous environment further includes a non-oxidizing gas other than hydrogen, such as nitrogen and/or argon gas.

In some of any of the respective embodiments described herein, a concentration of hydrogen gas in the gaseous environment is at least 1%, optionally from 1 to 10% (e.g., as determined by partial pressure of the hydrogen gas relative to total pressure of the gaseous environment, and/or by volume of the hydrogen gas introduced to the gaseous environment relative to total volume of gases (under same conditions) in the gaseous environment)

In some of any of the respective embodiments described herein, the contacting with the gaseous environment described herein (at the indicated temperature) is effected for a time period of at least 30 minutes, for example, from 30 minutes to 5 hours.

The process further comprises forming a layer of silicon on the stainless steel nanostructures. In some embodiments, the layer of silicon is formed by vapor deposition of silicon, to thereby obtain the silicon layer according to any of the respective embodiments described herein. Vapor deposition may optionally be effected according to any of the embodiments described in the section herein relating to vapor deposition of silicon.

Silicon Vapor Deposition:

Vapor deposition of silicon, using a silicon precursor, may optionally be used to grow silicon nanostructures (according to any of the respective embodiments described herein) and/or to form a layer of silicon on a steel nanostructure (according to any of the respective embodiments described herein).

Herein, the term "silicon precursor" refers to a compound which, in vapor form, can form deposited silicon (e.g., under conditions described herein). Silane ($SiH_4$) and disilane ($Si_2H_6$) are exemplary silicon precursors.

A purity of one or more silicon precursor (silane and/or disilane) used in vapor deposition is optionally at least 99%, optionally at least 99.5%, optionally at least 99.8%, and optionally at least 99.9%.

The silicon precursor may be mixed with a carrier gas (which is not considered in determining purity of the silicon precursor), for example, argon or hydrogen gas.

In some of any of the respective embodiments described herein, vapor deposition is effected at a temperature in a range of from about 380 to about 550° C. In some embodiments, the temperature is in a range of from 400 to 500° C. In some embodiments, the temperature is in a range of from 400 to 460° C. In some embodiments, the temperature is in a range of from 400 to 440° C. In some embodiments, the temperature is in a range of from 400 to 420° C.

As exemplified herein, the temperature of vapor deposition may depend on silicon precursor. For example, a temperature for deposition using silane may optionally be about 460° C., whereas a temperature for deposition using disilane may optionally be about 400° C. to about 440° C. (e.g., from about 410 to about 430° C.).

In some of any of the respective embodiments described herein, vapor deposition is effected at a sub-atmospheric pressure, for example, at a pressure of no more than 100 Torr, and optionally no more than 50 Torr.

In some of any of the respective embodiments described herein, vapor deposition is effected at a pressure of at least about 1 Torr, for example, from about 1 to about 100 Torr, or from about 1 to about 25 Torr. In some embodiments, the pressure is at least about 5 Torr, or at least about 10 Torr, or at least about 20 Torr. Exemplary pressures for silicon vapor deposition are in a range of from about 10 to about 25 Torr.

The silicon precursor may optionally be introduced to an environment of the target surface (e.g., into a closed container in which the target surface is contained) at a gas flow rate in a range of from 1 to 50 sccm (standard cubic centimeters per minute), and optionally in a range of from 2 to 25 sccm. Exemplary gas flow rates for a silicon precursor are in a range of from about 3 sccm to about 15 sccm.

The skilled person will appreciate that a suitable gas flow rate may depend on the number of silicon atoms in the silicon precursor, for example, disilane may be introduced at a lower rate (e.g., about 3 sccm) than silane (e.g., about 5 sccm) to obtain similar results.

A carrier gas (as described hereinabove) may optionally be introduced to an environment of the target surface at a suitable gas flow rate, for example, in a range of from 3 to about 500 sccm. A suitable gas flow rate may optionally be determined for a given environment based on a desired total pressure (which may be affected, e.g., by strength of vacuum pump, volume of container, etc.)

In some of any of the respective embodiments described herein, vapor deposition is effected for a time period in a range of from 5 minutes to 180 minutes, or from 5 minutes to 90 minutes, or from 5 minutes to 60 minutes, or from 5 minutes to 30 minutes. In some embodiments, such a time period is used to form a silicon nanostructure.

In some of any of the respective embodiments described herein, vapor deposition is effected for a time period in a range of at least 30 minutes, for example, from 30 minutes to 180 minutes. In some embodiments, such a time period is used to form a silicon layer on a steel nanostructure (e.g., a silicon layer having a thickness in a range of from about 6 nm to about 200 nm, according to any of the respective embodiments described therein).

The conditions of silicon vapor deposition (e.g., time period, temperature, pressure and/or gas flow) are optionally selected so as to provide a silicon nanostructure featuring at least one dimension in a range according to any of the respective embodiments described herein (e.g., in a range of from about 10 nm to about 200 nm) and/or a silicon layer having a thickness according to any of the respective embodiments described herein (e.g., from about 6 nm to about 200 nm).

Annealing:

In some of any of the embodiments described herein (according to any of the aspects described herein), silicon-containing nanostructures according to any of the respective embodiments described herein are subjected (preferably subsequent to formation of the nanostructures) to a heat treatment, also referred to herein as "annealing". In some such embodiments, the nanostructure is a silicon nanostructure (e.g., as opposed to a stainless steel nanostructure with a silicon layer).

In some of any of the respective embodiments described herein, the heat treatment is effected at a temperature of at least 600° C. (e.g., from 600° C. to 900° C.), and optionally at least 650° C. (e.g., from 650° C. to 850° C.).

The heat treatment is optionally effected for a time period of at least one minute, and optionally at least two minutes, for example, from 2 to 8 minutes.

In some of any of the respective embodiments described herein, the heat treatment is effected under non-oxidizing conditions, for example, in an atmosphere of hydrogen gas or in a vacuum.

Without being bound by any particular theory, it is believed that annealing can provide one or more of the following features:

physical welding and mechanical strengthening of the silicon networks, and their physical attachment to the underlying stainless substrate;

crystallization of silicon nanostructured domains; and/or enhancement of conductivity of the silicon-to-stainless steel connection points through the diffusion of metal centers into the silicon base structures, wherein formation of short metal silicide segments at the bottom of the nanostructures improves the electrical contacts between the silicon nanostructures and the underlying conductive substrate, thus improving current collection capability (e.g., during performance as lithium ion battery anodes).

Additional Features and Applications of Composite Electrodes:

In some of any of the embodiments described herein, an amount of silicon on a surface of the electrode is at least 0.5 $mg/cm^2$, optionally at least 1 $mg/cm^2$ and optionally at least 2 $mg/cm^2$. For example, the amount or silicon may be in a range of from 0.5 to 20 $mg/cm^2$, or from 0.5 to 12 $mg/cm^2$, or from 0.5 to 3 $mg/cm^2$. In such calculations, the surface of the electrode refers to macroscopic scales (e.g., neglecting depressions having a width of 1 mm or less), such that small pores in the electrode (e.g., as in a mesh) provide more attachment sites for silicon without a corresponding increase in the surface of the electrode.

As exemplified herein, at least a portion of the composite electrode (e.g., at least a portion of the nanostructures therein) is optionally coated with a carbonaceous coating (which is preferably electrically conductive), such as carbon black and/or carbon nanotubes (e.g., single-walled carbon nanotubes). The coating may optionally be formed by simple contact with a liquid (e.g., dispersion) containing the carbon and a solvent (e.g., aqueous and/or organic) which wets the electrode surface, and optionally followed by pyrolysis. The coating may optionally be used to enhance conduction between the silicon and a current collector, and/or between the anode and a cathode. In some embodiments, an average thickness of the carbonaceous coating is in a range of from 1 nm to 1000 nm.

The stainless steel substrate and/or body described herein may optionally have a continuous (e.g., flat) bulk structure or may comprise multiple stainless steel components, e.g., in a form of a woven or non-woven mesh.

The stainless steel substrate and/or body described herein may optionally serve as a current collector for electrochemical reactions (thereby enhancing the conductivity of the electrode), in addition to providing a substrate for nanostructures (according to any of the respective embodiments described herein).

Additionally or alternatively, the stainless steel substrate and/or body and associated nanostructures described herein (according to any of the respective embodiments) may optionally be characterized by thinness, which may be associated with relatively low weight, high ratio of capacity to volume and/or electrode flexibility; and/or by porosity (e.g., in embodiments comprising a steel mesh), which may be associated with enhanced capacity (due to higher surface area) and/or electrode flexibility.

Electrode flexibility is advantageous, for example, in facilitating preparation of electrochemical cells comprising a large electrode area (e.g., by folding and/or rolling a flexible electrode in a confined volume.

As exemplified herein, electrodes prepared as described herein may readily have large, scaled-up surface areas.

In some of any of the embodiments described herein, an area of a composite electrode (according to any of the embodiments described herein) is at least 10 cm$^2$, or at least 100 cm$^2$, or at least 1000 cm$^2$, or at least 1 m$^2$ (10000 cm$^2$), or at least 10 m$^2$.

In some of any of the embodiments described herein, an anode with a capacity of at least 3 mAh (milliampere-hours) per cm$^2$ (of surface of the electrode) is obtained (e.g., from 3 to 4 or from 3 to 5 mAh/cm$^2$), and in some embodiments, a capacity of at least 4 mAh/cm$^2$, or at least 6 mAh/cm$^2$, or at least 8 mAh/cm$^2$, or at least 10 mAh/cm$^2$, or at least 12 mAh/cm$^2$, or even at least 15 mAh/cm$^2$ is obtained.

In some of any of the embodiments described herein, an anode with a capacity of at least 1000 mAh per gram silicon (mAh/g$_{Si}$) is obtained, and in some embodiments, a capacity of at least 2000 mAh/g$_{Si}$, or at least 3000 mAh/g$_{Si}$ is obtained. In comparison, the theoretical capacity of graphite (used in many commercial lithium anodes) is 372 mAh per gram.

In some of any of the embodiments described herein, an anode with an irreversible capacity loss (capacity loss at beginning of electrochemical cycling) of no less than 20% (e.g., from 7 to 15%) is obtained, and in some embodiments, an irreversible capacity loss of less than 15%, or less than 10%, or less than 7%, or even less than 5% is obtained.

In some of any of the embodiments described herein, an anode with a coulombic efficiency (determined by the relationship between the capacities upon charge and discharge) of at least 99% is obtained, and in some embodiments, a coulombic efficiency of at least 99.5%, or at least 99.8%, or even at least 99.9% is obtained.

Capacity, irreversible capacity loss, and coulombic efficiency (according to any of the embodiments described herein) refer to cycles of lithiation and de-lithiation versus a suitable lithium ion cathode. Cycling is optionally performed at a rate of C/20 (that is, at a rate of 1/20 of the capacity per hour). Coulombic efficiency is optionally determined according to an average efficiency over many (e.g., 100 or more) cycles (e.g., at C/20). Capacity and irreversible capacity loss are optionally determined using an initial cycle (or two or three cycles) at a rate of about C/2, which may optionally be followed by cycling at C/20 (e.g., as exemplified herein).

In some of any of the embodiments described herein, an anode and/or full cell (according to any of the respective embodiments described herein) has a cycle life of at least 400 cycles, or at least 500 cycles or at least 600 cycles or at least 700 cycles.

Herein, a "cycle life" refers to the number of cycles of lithiation and de-lithiation until capacity (not including irreversible capacity loss at initiation of cycling) decreases by 30%. Anode cycle life is determined by cycling the anode versus lithium metal (e.g., according to procedures exemplified herein). Full cell cycle life is determined by cycling the anode and cathode of the full cell.

Capacity is optionally determined by a cycle at a rate of about C/2 (e.g., to evaluate initial capacity and capacity at end of cycle life), with intervening cycles optionally being at rate of about C/20 (e.g., as exemplified herein).

Electrodes according to embodiments described herein may optionally be included in batteries, such as lithium ion batteries (e.g., in electric vehicles) and other energy storage devices, supercapacitors, portable and/or wearable devices (in which size and weight are a significant limiting factor) such as mobile telephones, and the like. In addition, it is noted that silicon/lithium alloys have a high melting point, which increases safety (e.g., relative to lithium metal applications).

According to an aspect of some embodiments of the invention, there is provided an energy storage device comprising an electrolyte and at least one composite electrode according to any of the respective embodiments described herein. The energy storage device may optionally be battery (e.g., lithium ion battery), comprising one or more full cells (i.e., comprising an anode and cathode); or a capacitor.

The energy storage device (e.g., battery) may comprise any number (i.e., one or more) of electrochemical cells, optionally lithium ion cells, of which some or all comprise at least one composite electrode according to any of the respective embodiments described herein.

Herein, the phrases "lithium ion cell" and "lithium ion battery" refer to a cell or battery, respectively, wherein an electrochemical reaction which stores (e.g., upon charge of the cell) and/or releases (e.g., upon cell discharge) at least a portion of the electric power stored therein comprises movement of lithium ions from one electrode to another, e.g., from an anode to a cathode, or vice versa.

Herein throughout, the term "electrolyte" also encompasses an "electrolyte solution".

It is expected that during the life of a patent maturing from this application many relevant electrolytes (solid and/or liquid electrolytes) will be developed and the scope of the term "electrolyte" is intended to include all such new technologies a priori.

Examples of liquid electrolytes suitable for a lithium ion cell include, without limitation, liquids comprising a lithium salt, such as LiPF$_6$, LiBF$_4$, LiClO$_4$, lithium bis(trifluoromethanesulfonyl)imide (LiTFSI) and/or lithium bis(oxalate) borate (LIBOB); and a solvent, such as ethylene carbonate (EC), diethyl carbonate (DEC), dimethyl carbonate (DMC), ethyl methyl carbonate (EMC), vinylene carbonate (VC), fluoroethyl carbonate (FEC) and/or propylene carbonate (PC).

Further examples of liquid electrolytes include room temperature ionic liquids, optionally comprising a cation such as a 1,3-dialkylimidazolium (e.g., 1-ethyl-3-methylimidazolium, 1-butyl-3-methylimidazolium and/or 1-hexyl-3-methylimidazolium), a 1,2,3-trialkylimidazolium (e.g., 1-butyl-2,3-dimethylimidazolium), a 1,3-dialkylpyrimidinium, an N-alkylpyridinium (e.g., N-octylpyridinium), an N-alkylisoquinolinium, an N-alkylpyrrolium, an N,N-dialkylpyrrolidinium (e.g., 1-methyl-1-propylpyrrolidinium, 1-methyl-1-butylpyrrolidinium and/or 1-methyl-1-octylpyrrolidinium), and N,N-dialkyl piperidinium (e.g., 1-methyl-1-propylpiperidinium, 1-methyl-1-butylpiperidinium and/or 1-methyl-1-octylpiperidinium); and/or an anion such as bis(trifluoromethylsulfonyl)imide ("bistriflimide"), tetrafluoroborate, hexafluorophosphate and/or halide; and/or any combinations thereof.

Examples of solid electrolytes include, without limitation, solid polymer electrolytes comprising a polymer, such as polyethylene glycol (e.g., comprising from about 500 to about 10,000 ethylene glycol units), and/or a ceramic, such as silica or alumina.

A schematic presentation of an exemplary assembly of an electrochemical cell 10 (also referred to herein interchangeably as a "full cell") according to some embodiments of the present invention is presented in FIG. 1.

Electrochemical cell 10 comprises a composite electrode 20 which comprises silicon (according to any of the respective embodiments described herein), which acts as an anode. Electrochemical cell 10 comprises a cathode 30, which may be any suitable cathode known in the art (e.g., for a lithium ion cell). Electrode (anode) 20 and/or cathode 30 may optionally further comprise a conductive coating, for example, a carbonaceous coating (optionally comprising carbon nanotubes), according to any of the respective embodiments described herein.

Examples of lithium ion cathodes (i.e., cathodes suitable for use in a lithium ion cell) include, without limitation, NMC (lithium nickel manganese cobalt oxide, i.e., $LiNi_xMn_yCo_zO_2$) cathodes; lithium cobalt oxide ($LiCoO_2$) cathodes; NCA (lithium nickel cobalt aluminum oxide, i.e., $LiNiCoAlO_2$) cathodes; LMO (lithium manganese oxide, i.e., $LiMn_2O_4$) cathodes; LFP (lithium iron phosphate, i.e., $LiFePO_4$) cathodes; and lithium/sulfur cathodes. NMC, LMO, lithium cobalt oxide and/or NCA cathodes are particularly suitable for use with anode 20. In exemplary embodiments, cathode 30 comprises an NCA cathode.

It is expected that during the life of a patent maturing from this application many relevant cathodes will be developed and the scope of the terms "cathode" and "lithium ion cathode" are intended to include all such new technologies a priori.

Electrochemical cell 10 further comprises an electrolyte 40, which may be a solid and/or liquid electrolyte (e.g., according to any of the respective embodiments described herein), between electrode (anode) 20 and cathode 30, and optionally in contact with electrode (anode) 20 and/or cathode 30.

Electrochemical cell 10 optionally further comprises current collector 22 configured for electrically connecting anode 20 to an electrical device to be powered by electrochemical cell 10 and/or current collector 32 is configured for electrically connecting cathode 30 to an electrical device electrical circuit to be powered by electrochemical cell 10. Current collectors 22 and/or 32 may optionally be configured for secure electrical contact with standard configurations (e.g., in commercial devices) for holding power sources such as batteries.

Electrochemical cell 10 is optionally devoid of cathodic excess, i.e., the capacity of cathode 30 does not exceed (e.g., within experimental error) the capacity of anode 20, for example, as determined by lithiation and de-lithiation of the anode and cathode separately (e.g., versus excess lithium metal), that is, outside of cell 10. In some such embodiments, electrochemical cell 10 has an anodic excess, the capacity of cathode 30 is less than the capacity of anode 20.

A plurality (not shown) of electrochemical cells 10 may optionally be configured in series (e.g., so as to obtain a voltage corresponding to the sum of the voltages of the individual cells), optionally encased within a single casing to form a battery.

An electrochemical cell according to the present embodiments can follow any of the designs known in the art, and can include one or more anodes and/or cathodes. Exemplary designs include, without limitation, rotating disk-ring electrodes, ultramicro-electrodes, or screen printed electrodes.

The configuration of the components of electrochemical cell 10 as presented in FIG. 1 are for illustrative purpose only and are not to be regarded as limiting in any way.

In some of any of the respective embodiments described herein, an energy density of a lithium ion battery is at least 250 Wh/kg (watt-hours per kg), and optionally at least 300 Wh/kg (e.g., from 300-400 Wh/kg), or at least 350 Wh/kg, or even at least 400 Wh/kg. In comparison, energy densities of commercial lithium ion batteries are typically in a range of from 150-250 Wh/kg.

In some of any of the respective embodiments described herein relating to a lithium ion battery, the lithium ion battery is rechargeable, i.e., designed and/or identified for re-use upon recharging the battery by application of a suitable electric potential.

As used herein the term "about" refers to ±20%. In some of any of the embodiments described herein using the term "about", the term refers to ±20%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Materials And Methods

Materials:
Hydrofluoric acid (HF) was obtained from Sigma-Aldrich.
Stainless steel meshes (304 or 316L grade) comprising fibers of 25 or 50 microns in width were used. The spacing between the fibers was similar in width to the fiber width.
Ink comprising a 9:1 mixture of Shawinigan Black Carbon and poly(styrene-co-butadiene) in toluene was obtained from Sigma-Aldrich.
Lithium foil was obtained from Rockwood Lithium Inc.
Chemical Vapor Deposition:
Stainless steel samples were placed within a quartz tube, and the chamber was evacuated to a base pressure of 0.005 Torr, followed by introduction of indicated gases (e.g., silane with argon and/or hydrogen) at indicated gas flow rates. In order to deposit p-type silicon, diborane was also introduced (at a rate of 6.25 sccm). The stainless steel samples were weighed before and immediately after deposition, in order to determine amount and density (amount per area) of silicon.
Cell Assembly:
Electrochemical cells were assembled in an argon-filled glovebox. Silicon-containing samples were cut to 10 mm diameter discs, and a drop of indicated carbon ink was applied to one side in order to improve electrical contact with the current collector. The obtained carbon-treated anode was typically placed in a vacuum oven at 50° C. overnight and then heated to 100° C. for 2 hours before assembly. A CR2032 coin cell, containing 2 spacers, silicon-containing nanostructures on stainless steel, separator (Celgard® 2400) and a lithium cathode (cut from foil 15 mm in diameter) was assembled, with the indicated electrolyte.

X-Ray Photoelectron Spectroscopy (XPS):
X-ray photoelectron spectroscopy measurements were performed using a 5600 Multi-Technique System (PHI, USA).

Example 1

Effect of HF Treatment on Silicon Growth on Stainless Steel

Initial attempts to grow silicon structures on top of the stainless steel were made by inserting a fresh, as-received stainless steel mesh, to a CVD (chemical vapor deposition) system. The as-received stainless steel mesh is shown in FIGS. 2A and 2C. As shown therein, the stainless steel substrate has almost no defects. However, minor defects are created when the substrate is being handled, e.g., folding, scratches, tweezers defects and so on.

As shown in FIG. 4A, the very few silicon structures which were observed grew near the contact points of the stainless steel mesh, indicating that they grew from within the defects of the substrate.

This result suggests that although the stainless steel comprises mainly iron and chromium elements on the surface of the stainless steel, the unintended defects may expose various other metallic elements, such as nickel and copper, which have positive effects on the growth of the silicon structures on the substrate.

Immersing the stainless steel in hydrofluoric acid (HF) strongly promotes cracking of the steel, up to the point where nano-islands are formed on the surface of the substrate. In addition, the color of the steel changed from gray to black.

Stainless steel mesh treated with HF is shown in FIGS. 2B and 2D.

As shown in FIG. 2D, HF treatment increased the roughness of the steel surface, suggesting a possible increase in potential nucleation points.

As shown in FIG. 4B, silicon structures grew uniformly on stainless steel mesh treated with HF.

Without being bound by any particular theory, it is believed that an increase in roughness and potential nucleation points contributes considerably to the uniform silicon growth induced by HF treatment.

Stainless steel substrates were taken for XPS analysis. The substrates were cleaned in 100 W oxygen plasma for 10 minutes in order to remove carbon and organic related contaminants.

TABLE 1

Atomic percentages of elements as determined by XPS analysis (surface only, no sputtering) of as-received, untreated 316 L stainless steel and of 316 L stainless steel treated with 40% HF for 30 minutes.

| Element | Untreated Stainless Steel (%) | HF Treated Stainless Steel (%) |
|---|---|---|
| C | 19.78 | 24.47 |
| O | 52.14 | 46.73 |
| N | 1.32 | Cannot Be Measured |
| F | 5.31 | 5.17 |
| Fe | 8.95 | 9.84 |
| Cr | 2.03 | 4.02 |
| Ni | 1.18 | 4.75 |
| Na | 0.93 | — |
| Ca | 0.94 | — |

TABLE 1-continued

Atomic percentages of elements as determined by XPS analysis (surface only, no sputtering) of as-received, untreated 316 L stainless steel and of 316 L stainless steel treated with 40% HF for 30 minutes.

| Element | Untreated Stainless Steel (%) | HF Treated Stainless Steel (%) |
|---|---|---|
| Si | 5.45 | — |
| S | 1.96 | — |
| Cu | — | 2.73 |
| Mo | — | 2.31 |

The XPS spectrum of a sample of stainless steel treated with 40% HF for 30 minutes is depicted in FIG. 3A, and the elemental composition determined by XPS is presented in Table 1.

As shown in Table 1, HF treatment increased the proportion of non-iron metals, such as chromium, nickel and copper and molybdenum, at the surface of the steel substrate, while also successfully cleaning the substrate from many inorganic contaminants such as sodium, calcium and sulfur.

Similarly, as shown in FIG. 3B, HF treatment led to a clear increase in peak size for $NiO_2$ as observed in the portion of the XPS spectrum associated with nickel.

Furthermore, as shown in FIGS. 3A and 3C, peaks associated with copper appeared in the XPS spectrum upon HF treatment, and such peaks were not visible prior to HF treatment.

These results indicate that HF treatment increased the amount of non-iron metals present in stainless steel on the surface of treated stainless steel.

As further shown in Table 1, HF treatment did not increase the amount of fluorine at the substrate surface. The substantial amount of fluorine in the untreated sample may be related to a chemical treatment that is performed on the stainless steel during its manufacturing, as the untreated sample did not come in any contact with any contaminated objects (the treated sample was handled with different tweezers and never came in contact with the untreated sample).

Further XPS analysis reveals that none of the metals exposed and enriched after the HF treatment contain any traces of metal-fluoride bonds. Only the iron XPS spectrum shows a possible signal of $FeF_2$, as its reference energy is observed on a scale of 711.3-711.4 eV and is associated with the $Fe_2O_3$ peak.

These results indicate that the only metal that is affected by the HF treatment is iron which is dissolved in the process. This is consistent with the results of Table 1, which indicate that all metals are enriched on the surface, except for iron (whose levels remain substantially unchanged).

The effect of treatment time (in HF) on silicon density was evaluated by treating a stainless steel mesh for various times with 40% HF, followed by deposition of intrinsic silicon by exposure to silane (5 sccm (standard cubic centimeters per minute) flow rate) and argon (20 sccm flow rate) at 460° C. and a pressure of 25 Torr for 60 minutes. Both 25 μm and 50 μm mesh samples were tested.

TABLE 2

Average silicon density measured after immersion of 25 and 50 μm stainless steel substrates in 40% HF for different times (after 60 minutes, 50 μm stainless steel begins to dissociate).

| Time in HF (minutes) | Average Silicon Density 25 μm sample (mg/cm$^2$) | Average Silicon Density 50 μm sample (mg/cm$^2$) |
|---|---|---|
| 0 | 0.04 | 0.004 |
| 15 | 0.17 | 1.16 |
| 30 | 0.80 | 1.36 |
| 45 | 1.20 | 1.33 |
| 60 | 1.30 | — |

As shown in Table 2, HF pre-treatment greatly enhanced silicon density on stainless steel mesh.

As further shown in Table 2, the silicon density is close to zero in untreated samples, and the 25 μm samples had more silicon than the 50 μm samples.

This result suggests that silicon growth in the absence of HF treatment is associated with defect points, and the thicker 50 μm sample is less prone to deformations during handling than the thinner 25 μm sample.

Table 3 presents results of an experiment made using 25 μm stainless steel mesh samples that were placed on top of each other in a 4 inch CVD apparatus. Each mesh sample was treated with a different HF concentration, ranging from 25% to 40%, where the order of placement was from 40% on top, downwards.

As shown in Table 3, the sample treated with 30% HF exhibited a higher silicon density than samples treated with higher HF concentrations, even though the 30% HF sample was less exposed to vapor deposition.

30 minutes was therefore selected as the HF treatment time for future experiments regarding electrode creation.

TABLE 3

Average silicon density as a function of HF concentration (all samples were immersed for 30 minutes and placed on top of each other in a 4-inch CVD apparatus for 3 hours under 200 sccm argon flow, 15 sccm silane flow at 460° C. and 10 Torr).

| HF Concentration | Average Silicon Density (mg/cm$^2$) |
|---|---|
| 25% | 0.84 |
| 30% | 0.95 |
| 35% | 0.76 |
| 40% | 0.71 |

In addition, HF concentrations as low as 5% promoted growth of silicon structures when the HF treatment time was over 2 hours (data not shown).

These results indicate that higher HF concentration does not necessarily result in higher silicon density, and suggests that metal-fluoride bonds created during the HF treatment inhibit further dissolution of the surface and create some form of passivation layer. Higher concentrations of HF (>30%) create fluoridic bonds on the surface more rapidly, thus lowering the efficiency of the HF in the process, whereas lower concentrations (<30%) have a weaker dissolution effect on the surface due to less acid contacting the surface.

TABLE 4

Average silicon density upon subjecting 25 and 50 µm stainless
steel substrates to various CVD times (all samples were
pre-treated with 40% HF for 30 minutes).

| Time of CVD (minutes) | Average Silicon Density 25 µm sample (mg/cm$^2$) | Average Silicon Density 50 µm sample (mg/cm$^2$) |
|---|---|---|
| 7 | 0.28 | 0.54 |
| 15 | 0.43 | 1.2 |
| 30 | 0.60 | 1.43 |
| 60 | 0.8 | 1.36 |

As shown in Table 4, silicon density increased considerably during the period of 7 to 15 minutes of vapor deposition, and continued at a more moderate rate during the period of 15 to 60 minutes of vapor deposition (the apparent decrease in density between 30 minutes and 60 minutes in the 50 µm samples were due to weighing errors, and may be disregarded).

This result indicates that the primary nucleation process takes place during the period of up to ~7 minutes and rapid growth begins thereafter.

As further shown in Table 4, thicker (50 µm) substrates tend to result in higher silicon densities than do thinner (25 µm) substrates subjected to the same deposition conditions, although they reach a plateau faster than do the thinner substrates.

This result suggests that HF treatment is more effective in 50 µm samples because these samples have less surface area than do the 25 µm samples, thereby heavily promoting silicon structure growth, up to a point where further treatment does not affect the silicon coverage and nucleation during the growth phase.

Similarly, due to greater effectiveness of HF on the thicker sample, 60 minutes of pure 40% HF begins to dissociate the stainless steel sample altogether (but not in the thinner sample). Taken together, the above results indicate that silicon density may be controlled by varying parameters such as duration of exposure to HF and duration of chemical vapor deposition, allowing for high densities of silicon to be obtained.

Silicon structures grown on a HF-treated stainless steel surface were imaged by electron microscopy.

FIGS. 5A and 5B show the presence of silicon nanostructures, including wire-like structures, using scanning electron microscopy.

Without being bound by any particular theory, it is believed that this phenomenon may be caused by the manner in which the HF pre-treatment creates the nano-islands that serve as catalysts in the following process. In the growth process, the silane gas is dissociated to pure silicon and then diffuses into the stainless steel. Closely spaced catalytic islands may result in unification of various growing silicon structures, thereby creating thicker and shorter structures, as compared to more isolated catalytic islands.

As shown in FIGS. 5C and 5D, no catalyst was observed (by high-resolution transmission electron microscopy) on top of elongating silicon structures.

Similarly, FIGS. 5A and 5B show an absence of catalyst from many silicon structures, as determined by scanning electron microscopy.

These results suggest that the silicon structures grow by a vapor-solid-solid (VSS) mechanism, such that the silicon is continuously elongating from the stainless steel surface.

However, by individually examining a phase diagram of each of the metals comprised by the stainless steel with silicon, no eutectic point is found for a temperature below about 800° C. It was therefore hypothesized that silicon growth is promoted by the formation of metal silicides upon silane degradation on the stainless steel mesh phase.

It is believed that previously reported methods of growing silicon nanowires on stainless steel (e.g., as described by Chan et al. [*Nat Nanotechnol* 2008, 3:31-35]; Kim et al. [*Materials Lett* 2010, 64:2306-2309]; and Li et al. [*Adv Energy Mater* 2012, 2:87-93]) do not allow silicon growth at relatively low temperatures with a simple and convenient methodology.

As shown in FIGS. 6A-7D, the holes between stainless steel fibers gradually close as silicon growth progresses, as observed by both optical microscopy (FIGS. 6A-6D) and scanning electron microscopy (FIG. 7A-7D), in samples pre-treated with 40% HF for 30 minutes.

These results indicate that the silicon wire-like structures can grow up to tens of microns in length, and that porosity can decrease considerably upon application of silicon growth using procedures described herein.

For example, FIG. 7A shows a stainless steel mesh with silicon at a density of 0.5 mg/cm$^2$. Even at this density, the silicon structures grow up to 10 microns in length while remaining ~30 nm in diameter.

In comparison, FIG. 7D shows a stainless steel mesh with silicon at a density of 5.11 mg/cm$^2$. At this density, the porosity of the potential anode material has decreased drastically.

As shown in FIG. 8A, the level of copper in the silicon structures, as determined by TOF-SIMS, reaches up to roughly $10^{20}$ copper atoms per cm$^3$ of silicon, which corresponds to up to about 0.2% by atomic ratio, indicating that copper diffuses from the stainless steel substrate into the silicon during growth phase.

The amount of copper in the newly produced stainless steel is minuscule, yet silicon is prone to copper contamination due to the high diffusion coefficient, even at low temperatures, of copper in silicon [Istratov & Weber, *J Electrochem Soc* 2002, 149:G21-G130].

As shown in FIG. 8B, p-type (boron-doped) grown silicon comprises iron and boron in addition to copper.

This result suggests that due to the donor characteristics of iron in silicon, the atomic radius of iron is considerably decreased due to its ionized nature, thus increasing its diffusion coefficient greatly, even at low temperatures.

Without being bound by any particular theory, it is believed that in intrinsic silicon, copper has a much larger diffusion coefficient, thereby creating a diffusion barrier for any other metals in the stainless steel; whereas in a highly boron-doped environment, the solubility of iron considerably increases due to very strong pairing of iron with boron (FeB), where this solubility and diffusion coefficient are increased substantially at low temperatures (see, for example, Istratov et al. [*Appl Phys A* 1999, 69:13-44]).

A further advantage of HF treatment is that it eliminates much of the contaminants on the surface by etching. Silicon structures can therefore be grown on the 3D stainless steel network, without requiring cleaning procedures.

Treatment with acids other than HF (e.g., nitric acid (65%), sulfuric acid (95%), phosphoric acid (85%), and chloric acid (32%)) or with acetone was also attempted (data not shown). These treatments did not provide the same results as HF, e.g., neither the change in appearance of the stainless steel surface nor the amount of silicon structures which grew on the stainless steel. On the contrary, such treatments may promote passivation of stainless steel (which inhibits silicon nanostructure growth) via formation of thin oxide layers. As revealed by XPS studies, nitric acid promotes the accumulation of more chromium on the surface of the stainless steel. However, nitric acid treatment resulted in a similar type of silicon growth as obtained on as-received stainless steel (as described hereinabove), apparently due to lack of cracking and exposure of different elements.

In summary, the treatment described herein can be used to produce nanoporous sponge-like silicon networks on stainless steel surfaces, using relatively low temperatures (e.g., 350-450° C.), without resorting to expensive noble metal catalysts.

Example 2

Coating of Silicon Nanostructures with Alumina Layer

In order to increase mechanical support and resistance to cracking during lithiation, a layer of alumina was deposited on silicon structures (prepared according to procedures described in Example 1) via atomic layer deposition (ALD), using a trimethyl aluminum (TMA) catalyst and vapor of deionized water ($dH_2O$), as depicted schematically in FIG. 9.

The alumina deposition process was conducted using "exposure" cycles, namely, both the TMA and $dH_2O$ gases were left in the chamber, each in its respective turn, for 7 and 25 seconds respectively, before opening the vacuum valve. Because the uniformity of the shell formation is rate-limited by the diffusion of both gases, allowing the gas to diffuse at high temperature (150° C.) is believed to result in greater penetration into the 3D sample, thereby allowing conformal formation of alumina shell down to the core of the stainless steel, despite the relatively high density of silicon (e.g., as exemplified in FIG. 4B).

In a typical procedure, samples were put in an ALD system and kept elevated from the system's bottom surface, in order to allow maximum diffusion through the entire 3D network. The sample was exposed to trimethyl aluminum (TMA) for 0.015 seconds while the vacuum pump was closed for 7 seconds followed by chamber vacuum for 25 seconds. The sample was then exposed to $dH_2O$ vapor for 0.02 seconds while the vacuum pump was closed for 25 seconds, followed by chamber vacuum of 30 seconds. Each exposure of the sample to alumina followed by exposure to $dH_2O$ was defined as 1 ALD cycle.

An alumina coating of ~5 nm thickness was obtained after 35 ALD cycles, which covered the exposed SiNS surface area conformably.

Representative alumina-coated silicon wire-like structures are shown in FIGS. 10A-10D, via transmission electron microscopy.

As shown in FIGS. 10B and 10C, many of the silicon structures interconnect with each other.

Interconnecting of silicon structures may provide increased mechanical support and resistance to cracking (e.g., in addition to the effect of the alumina layer).

In addition, the effect of gas remaining in the chamber (as discussed hereinabove) on alumina coating conformity was tested. In contrast to the procedures described hereinabove, the gas was not allowed to remain in the chamber, namely, the vacuum pump was always open. In addition, more deposition cycles were performed (200 cycles of each procedure).

When gas was not allowed time to diffuse further, the obtained alumina coating followed the roughness of the silicon structure; whereas in the "exposure" procedure described hereinabove, the alumina coating was more uniform in terms of roughness.

These results confirm the efficacy of the "exposure" procedure used in the experiments described herein.

Silicon nanostructures were grown on stainless steel mesh (5 sccm silane and 20 sccm argon for 80 minutes, at 460° C. and 25 Torr) and then subjected to RTP (rapid thermal processing) to promote crystallization of the silicon (elevating temperature for about 13 seconds to 650° C., at a rate of 50° C./second, followed by 4 minutes at 650° C.) followed by alumina deposition by 35 ALD cycles, in order to obtain a crystalline silicon core and amorphous shell.

The silicon nanostructures were then subjected to two lithiation/de-lithiation cycles, and examined by transmission electron microscopy.

As shown in FIG. 11, some structures exhibited no crystallinity and were covered by solid electrolyte interface (SEI) that couldn't be removed.

The conversion of a crystalline silicon core to amorphous silicon indicates that penetration of the lithium occurred along the whole nanostructure, including through the alumina shell.

As shown in FIGS. 12A and 12B, following two cycles of lithiation/de-lithiation, many nanowire structures exhibited SEI formation and cracks along the nanowire; yet alumina shells were still visible, indicating that they are not removed by two cycles.

The volumetric change was relatively small (about 27%), with the average diameter being 85.56±16.21 nm prior to lithiation (control structures) and 108.40±13.93 nm for cycled structures (in de-lithiated state).

This result suggests that the alumina shell limits volumetric change, in comparison with the 400% volume change typical of silicon.

In addition, some alumina-coated silicon nanostructures exhibit no damage following two lithiation/de-lithiation cycles, which may indicate incomplete wettability.

Example 3

Electrochemical Characterization of Silicon Nanostructures

Stainless steel mesh with alumina-coated silicon structures (prepared according to procedures described in Example 2) was assessed for potential use as an anode, via electrochemical characterization using a coin cell configuration with 10 mm diameter anodes. Cells were cycled at 30° C. using a constant current of 0.1 mA for the first three cycles in order to extract the maximum capacity of the cell, followed by aging tests using a constant current of 1 mA.

Results for a representative cell comprising alumina-coated silicon, and having a silicon density of 1.18 grams/$cm^2$, are shown in FIGS. 9A-9C.

As shown in FIGS. 13A and 13B, the initial capacity of the tested cell, at 0.1 mA current, reached about 3.6 mAh/$cm^2$ (about 3000 mAh per gram Si).

It is noted that such capacity values would be acceptable for electric vehicles.

As further shown therein, at a more rapid charging/discharging rate of 1 mA, the initial capacity measured was about 2.6 mAh/$cm^2$ (about 2300 mAh/gram Si) and decays to about 1 mAh/$cm^2$ (about 875 mAh/gram Si) after 200 cycles and to about 0.6 mAh/$cm^2$ (about 500 mAh/gram Si) after 500 cycles.

The above results indicate that even after 500 cycles, the capacity is still about 1.5-fold that of graphite.

As further shown therein, the maximum capacity of the cell (determined at intervals at 0.1 mA current) reached 2.3 mAh/cm$^2$ after 500 cycles, which represents a 36% capacity loss after 500 cycles.

As stainless steel itself has no lithiation capabilities, it is reasonable to assume that the silicon alone is responsible for the entire capacity of the cell.

As shown in FIG. 13C, a steady decline of the cell could be observed in the voltage profile. A more pronounced decrease in capacity occurred between cycle 150 and cycle 250.

FIGS. 14A and 14B show representative lithiation and de-lithiation peaks of silicon, which gradually broaden during charging phase, as well as sharp lithiation peaks at around 0.25 V.

Without being bound by any particular theory, it is believed that because the silicon structures are mostly amorphous, the observed dQ/dV peaks represent an equilibrium between two lithium rich phases, $SiLi_{2.3}$ and $SiLi_{3.25}$. It is further believed that the sharper lithiation peaks at around 0.25 V may be associated with a diffusion barrier caused by the SEI (solid electrolyte interface) formation along with the alumina layer.

After 700 cycles (with an additional 200 cycles at 0.5 mA), the silicon structures were inspected by electron microscopy.

As shown in FIGS. 15C and 15D, after 700 cycles, the alumina layer was disconnected from the silicon (possibly due to the stress the silicon applies during lithiation/de-lithiation as it partially expands and contracts), and accumulated in the SEI.

This result suggests that the alumina layer may contribute to formation of an even larger diffusion barrier than usual.

Kim et al. [*Chem Mater* 2015, 27:6929-6933] reported that thicker coatings (larger coating thickness to core diameter ratio, t/D) of $TiO_2$ on silicon nanowires undergoing lithiation and de-lithiation result in less radial expansion than thinner coatings, but that due to the poly-crystallinity of the $TiO_2$, grain-to-grain bonding with the silicon nanowires are weaker, enhancing the likelihood of being cracked.

The alumina shell described herein (considering an 80 nm average core diameter and 5 nm shell thickness) has a t/D value of about 0.06, which is expected to have little effect on radial expansion. However, due to the amorphous nature of the silicon structures and the alumina layer described herein, grain-to-grain bonding between the two materials are expected to be stronger than in the nanowires of Kim et al. [*Chem Mater* 2015, 27:6929-6933], and the amorphous nature of the alumina is expected to allow for greater flexibility of the shell [Chou et al., *Scr Metall Mater* 1991, 25:2203-2208], thus rendering it less prone to cracks.

TABLE 5

Characterization of 3D silicon networks with various silicon densities by electrochemical cycling (networks were not necessarily nonfunctional after the indicated number of cycles).

| Silicon Density (mg/cm$^2$) | Number of Cycles | Initial Capacity (mAh/cm$^2$) | Irreversible Capacity Loss (%) | Remarks |
| --- | --- | --- | --- | --- |
| 1.18 | 500 | 3.6 | 7.4 | 5 nm alumina |
| 1.18 | 300 | 2.8 | 11.6 | 5 nm alumina |
| 0.76 | 300 | 1.8 | 9.3 | p-type (1:4000), 5 nm alumina |
| 0.76 | 300 | 2.3 | 8.2 | p-type (1:4000), 5 nm alumina |
| 1.19 | 100 | 3.1 | 5.5 | |
| 2.25 | 100 | 5.2 | 6.7 | |
| 1.1 | 400 | 2.9 | 10.4 | |
| 1.86 | 200 | 5.9 | 8.3 | |
| 1.64 | 144 | 4.5 | 7.6 | |

As shown in Table 5, the presence or absence of an alumina coating had no clear effect on the determined electrochemical parameters, although the only cell that reached 500 cycles was one comprising an alumina coating.

In addition, FIG. 15B shows (via transmission electron microscopy) that after 700 cycles, some silicon structures are still fully encapsulated in an alumina shell, suggesting that a silicon nanostructure electrode may reach the end of its life before all the silicon is spent.

As shown in FIG. 15A, silicon nanostructures begin to detach from stainless steel fibers after 700 cycles.

The surface of cycled silicon nanostructure anodes was subjected to elemental analysis by energy-dispersive X-ray spectroscopy, after being washed with water or DMC (dimethyl carbonate), and the results are presented in Table 6 below.

TABLE 6

Elemental analysis of surface of silicon nanostructures following electrochemical cycling and washing with DMC or water

| | Washed with DMC | | Washed with water | |
| --- | --- | --- | --- | --- |
| Element | Atomic % | Weight % | Atomic % | Weight % |
| C | 39.9 | 30.3 | 38.6 | 26.0 |
| O | 43.6 | 44.0 | 16.7 | 15.0 |
| F | 6.2 | 7.4 | 22.1 | 25.5 |
| P | 0.1 | 0.2 | 0.03 | 0.05 |
| Si | 10.2 | 18.1 | 22.5 | 35 |

As shown in Table 6, washing with water removed carbon, oxygen and phosphorus from the surface, and resulted in an increase in observed silicon, in comparison with washing with DMC (which is not expected to substantially remove SEI).

This result indicates that an SEI comprising phosphate, oxides and organic material is formed upon electrochemical cycling of silicon nanostructures.

Taken together, the above results suggest the primary degradation mechanism of the anode is thickening of the SEI (until it becomes impenetrable to lithium ions), primarily on the surface and between the stainless steel fibers, before reaching the deeper residing silicon structures, until the cell is completely spent. Such a mechanism is depicted schematically in FIG. 16.

As further shown in Table 5, the tested cells (with silicon-containing anodes prepared as described herein) generally exhibited high capacity as well as low irreversible capacity, throughout hundreds of cycles.

These results indicate that anodes containing silicon nanostructures as described herein can exhibit very low capacity loss through hundreds of cycles while still maintaining higher capacities than that of the currently available graphite anodes.

Cells comprising highly doped (1:4000 B:Si) p-type silicon structures were compared to cells comprising intrinsic silicon, in order to gain further insights regarding the mechanism of decay. The property of p-type silicon structures prepared on stainless steel (according to procedures described herein), with or without a subsequent annealing treatment (at 650° C.), were also compared to those of p-type silicon nanowires grown using gold nanoparticles as a catalyst.

As shown in Example 1 (and FIG. 8B in particular), iron is diffused in relatively high amounts (around 0.2%) in p-type silicon, which apparently reduces the diffusivity of lithium in the silicon, thereby decreasing the capacity. While the additional iron may compromise the capacity of cells, the direct conductivity of the p-type silicon is increased due to the ionic state of the iron in the silicon structure.

As shown in FIGS. 17A and 17B, the p-type silicon nanostructures on stainless steel exhibits very little conductivity in the absence of annealing; whereas after annealing, conductivity is even higher than that of p-type silicon nanowires grown using gold nanoparticles.

As shown in FIG. 17D, annealing results in silicon structures becoming polycrystalline.

FIG. 17C shows an exemplary silicon nanostructure between source and drain electrodes.

These results indicate that prior to annealing, an amorphous nature of the silicon and lack of a continuous crystalline core results in lack of conductivity, whereas annealing enhances conductivity by inducing crystallinity.

Annealing the silicon, whether p-type or intrinsic, may facilitate out-diffusion of the copper and iron to the surface of the silicon, thereby reducing the suitability of the silicon for battery applications. This problem may be overcome by rapid heating.

As shown in FIG. 18, the growing 3D nanoporous silicon on a stainless steel network according to exemplary embodiments of the invention can be readily scaled up to large samples (e.g., one meter long in FIG. 18), with stainless steel covered in silicon reaching far and wide for anode production. Due to the porous nature of the stainless steel used, the density remains unaffected by rolling and/or placing samples on top of each other—thus one can reach unlimited size of silicon covered stainless steel anodes.

Example 4

Silicon Nanostructure Growth and Annealing

Silicon nanostructures were produced on HF-treated stainless steel, according to procedures described in Example 1.

HF treatment times between 10-60 minutes were tested, with good results being obtained at etching periods of 20-30 minutes at HF concentrations of 5-15%.

Boron-doped silicon deposition was effected in a CVD reactor via the VSS mechanism at 460° C. and 25 Torr, using $SiH_4$ gas as precursor (flow rate 5 sccm), $B_2H_6$ (flow rate 6.25 sccm) and diluted with Ar gas carrier (flow rate 10 sccm) for a period of 30-90 minutes, thus controlling the thickness of the silicon nanoporous conformal layer and the silicon loading of the resulting anodes.

Silicon nanostructure growth was followed by a high temperature annealing step, in the presence of hydrogen gas atmosphere or at vacuum atmosphere, for a period of 2-8 minutes, at temperatures between 650-850° C.

FIGS. 20A-20E and 23 show the etching effect of a 30 minute HF treatment of 304 stainless steel (compare, for example, with untreated stainless steel in FIG. 19).

FIGS. 21 and 22 show the time-dependent progression of etching as a result of HF treatment of 304 stainless steel.

As shown in FIGS. 25A-25F, silicon nanostructures exhibited a crystalline core and an amorphous silicon shell.

FIGS. 26A-26E show the growth of exemplary p-type silicon nanostructures on a stainless steel mesh.

As shown in FIG. 27, annealing by heat treatment causes silicon nanostructures to weld together.

Stainless steel samples (treated with HF) may optionally be conveniently rolled up in order to facilitate the CVD process, as depicted in FIGS. 28A-28D.

As shown in FIGS. 29A and 29B, the silicon nanostructures grew effectively on a rolled up sample. Nanostructure growth was similar in different portions of the sample, with the exception of the most downstream portion—where silane concentration was lowest—in which silicon density was somewhat lower than in other portions.

Example 5

Silicon-Stainless Steel Core-Shell Nanoporous Sponge-Like Networks

As an alternative to HF treatment, stainless steel native substrates were first heat-treated and annealed at temperatures between 950-1100° C. in a hydrogen-containing atmosphere (1-5% hydrogen in nitrogen carrier at atmospheric pressure) for periods ranging from 0.5 to 5 hours. This annealing pre-treatment step leads to the formation of conformal sponge-like nanoporous stainless steel structures on the native flat substrates, without the need for any chemical reagent provided to the CVD growth chamber, besides the flow of the $H_2/N_2$ gases.

The resulting "reagentless" process for the formation of metal-based sponge like networks is controlled by both the temperature and annealing times under given conditions.

The resulting sponge-like metal-based networks were obtained at abovementioned ranges of temperature and gas composition and pressure. No sponge-like structure formation was observed outside this range of conditions.

As shown in FIGS. 30A-30F, the "reagentless" growth process led to the formation of metal-based sponge-like nanoporous networks associated with stainless steel conductive surfaces.

Figure 31A:
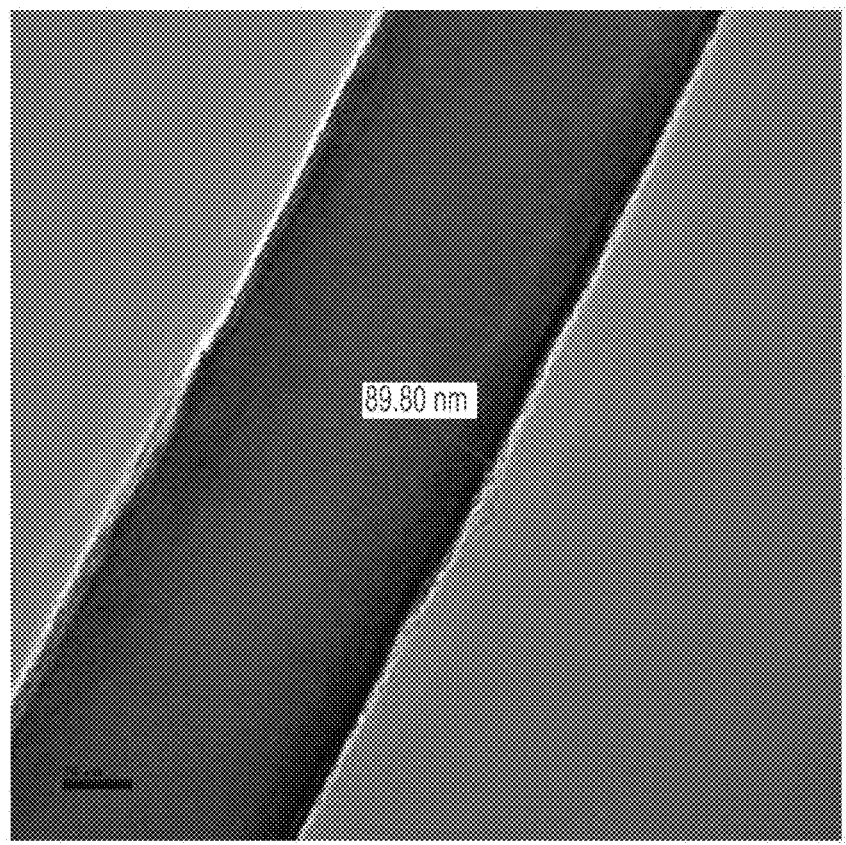
Figure 31B:
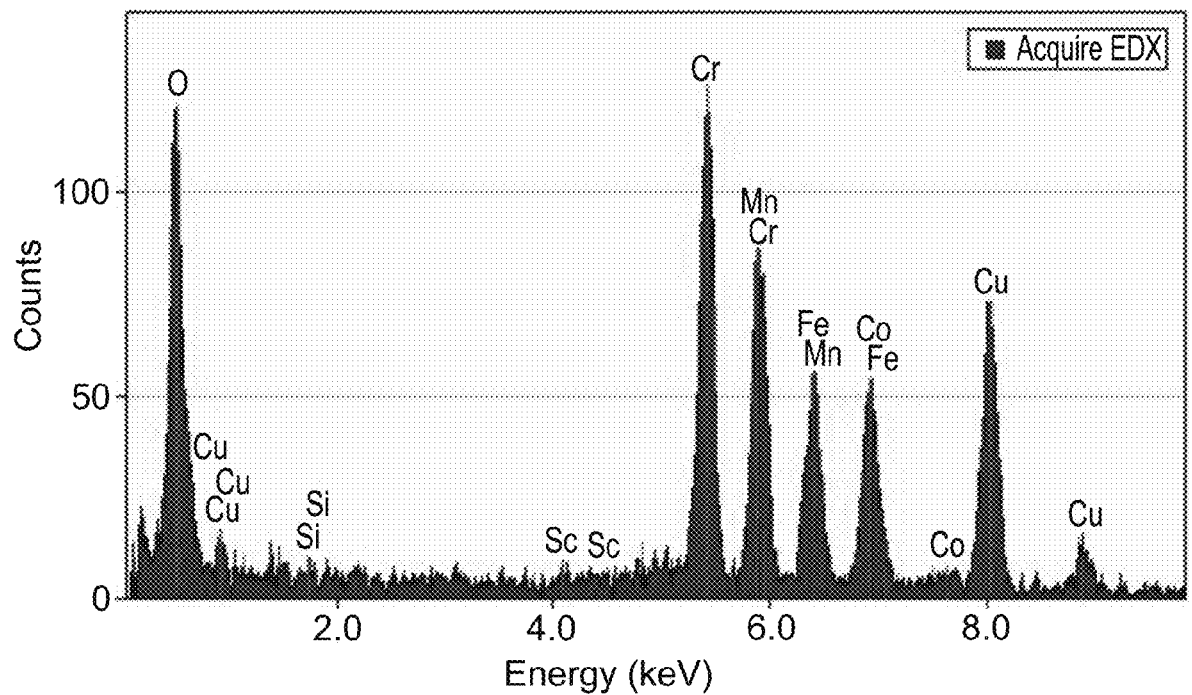

As shown in FIG. 31B, the networks were characterized by the presence of metal (such as chromium and copper) and oxygen atoms, as determined by EDX (energy-dispersive X-ray) spectroscopy.

Figure 31C:
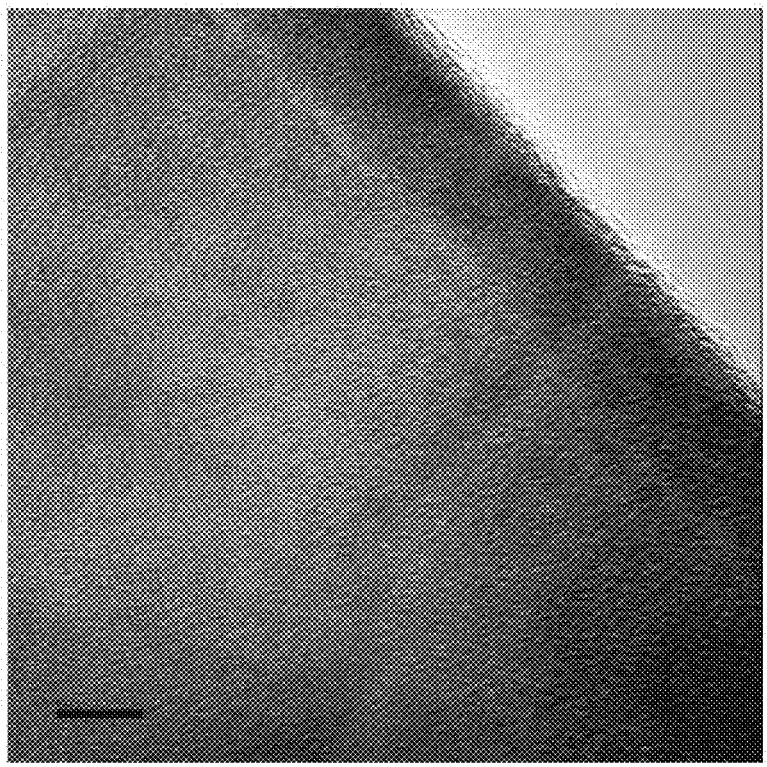
Figure 31D:
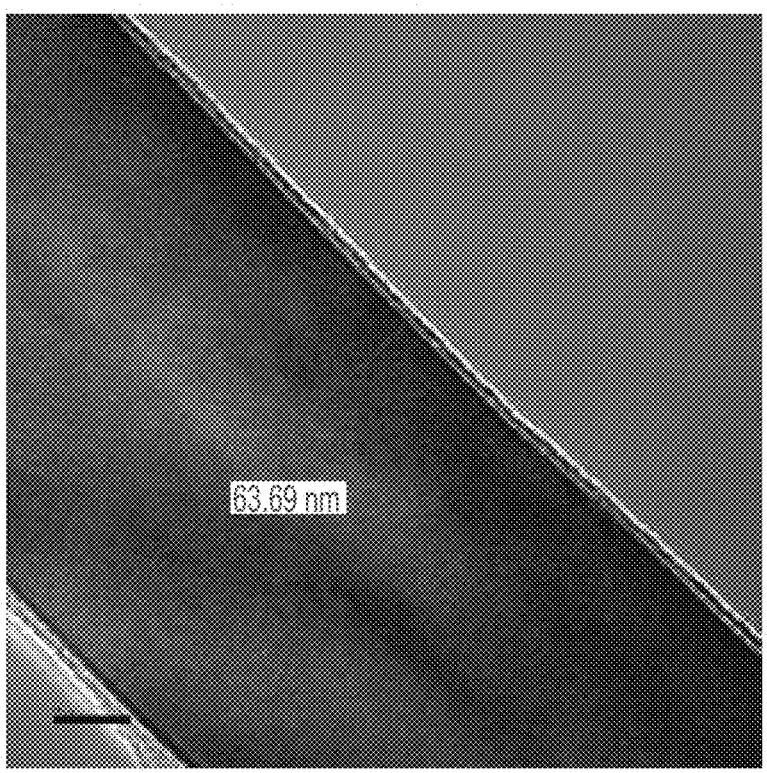
Figure 31E:
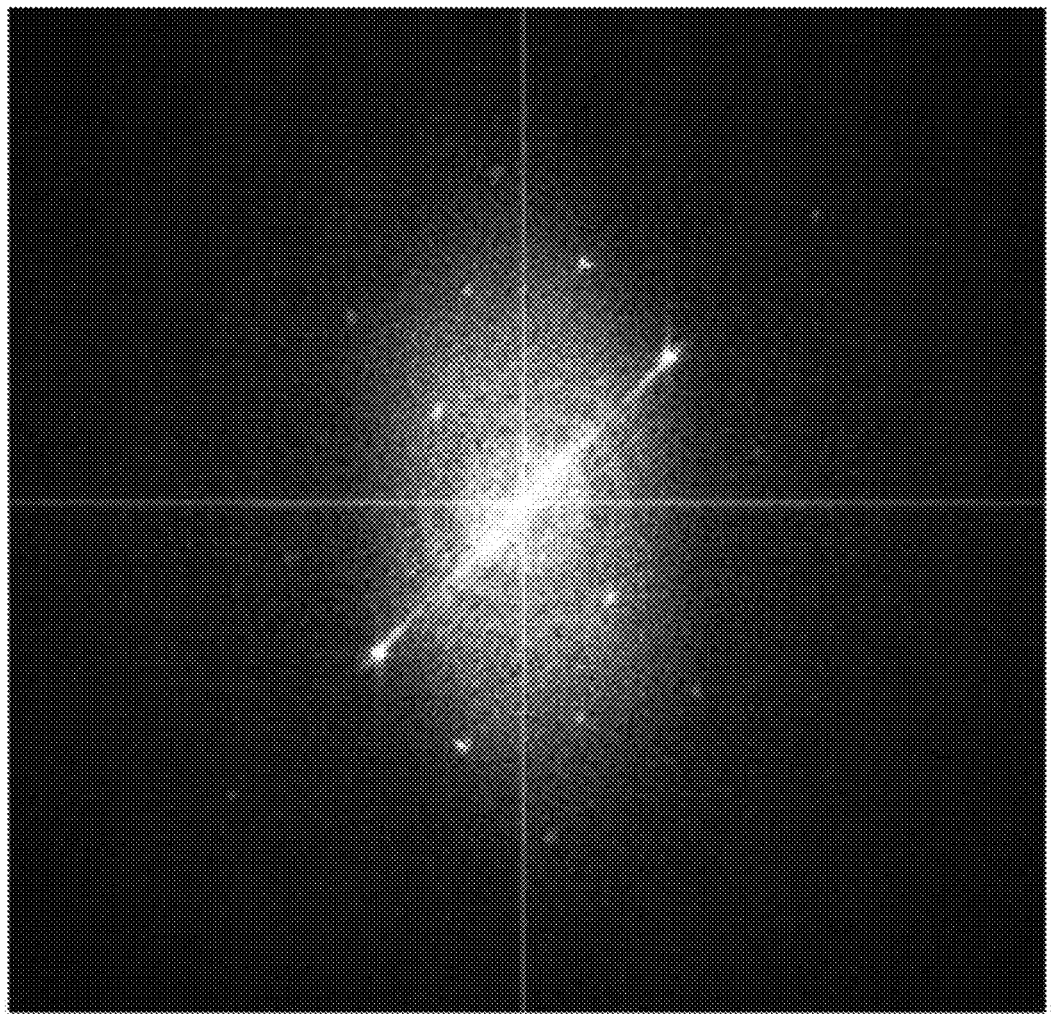
Figure 32A:
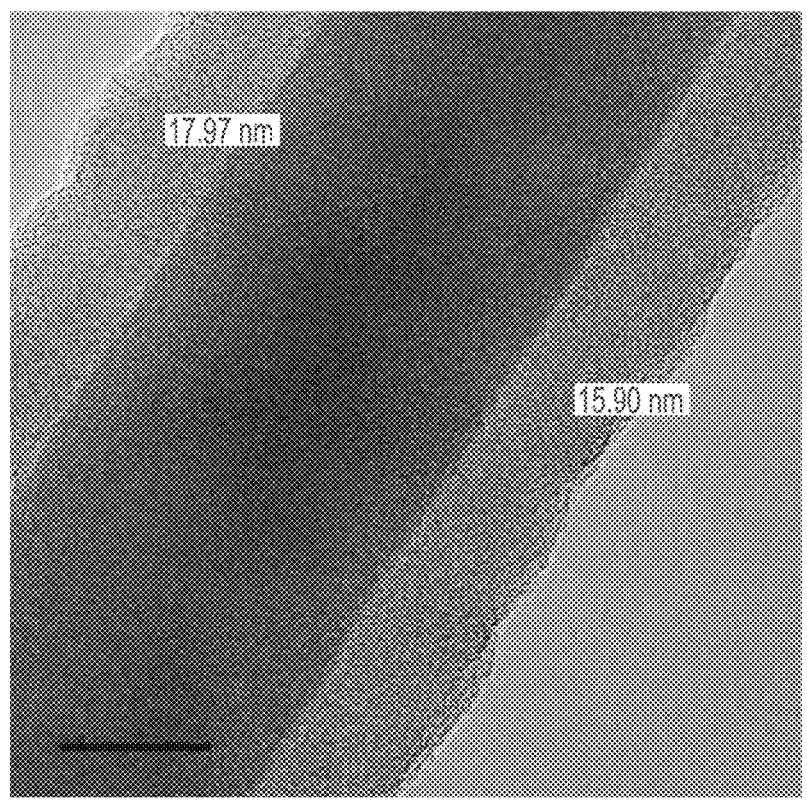
Figure 32B:
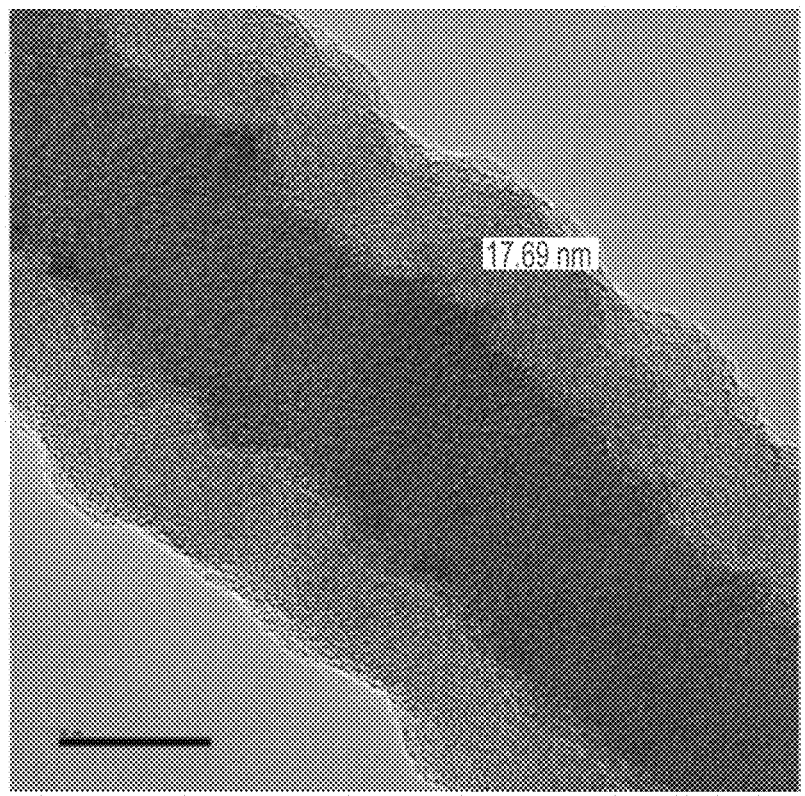
Figure 32C:
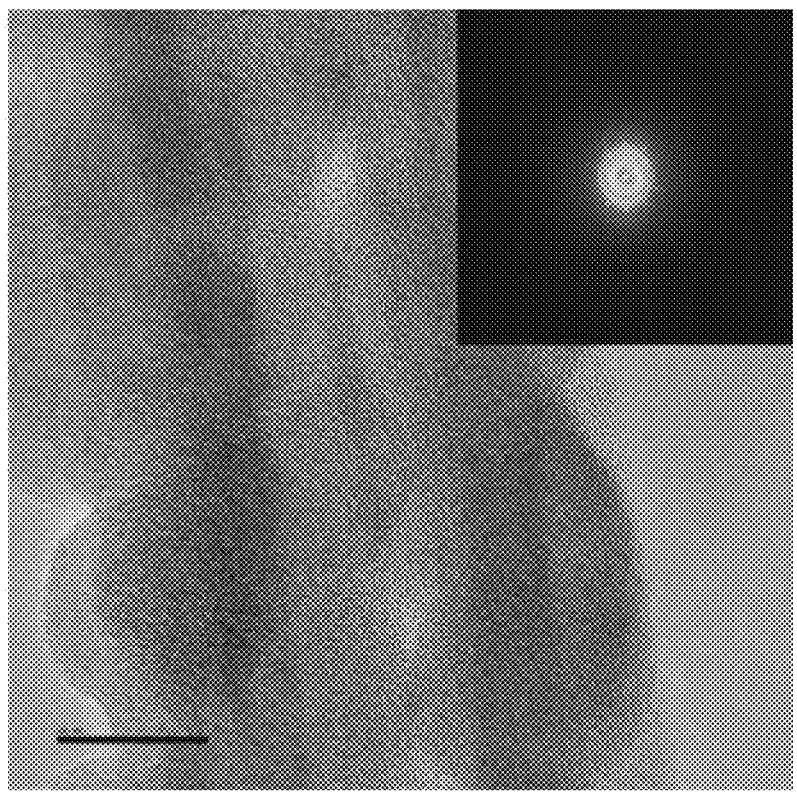
Figure 32D:
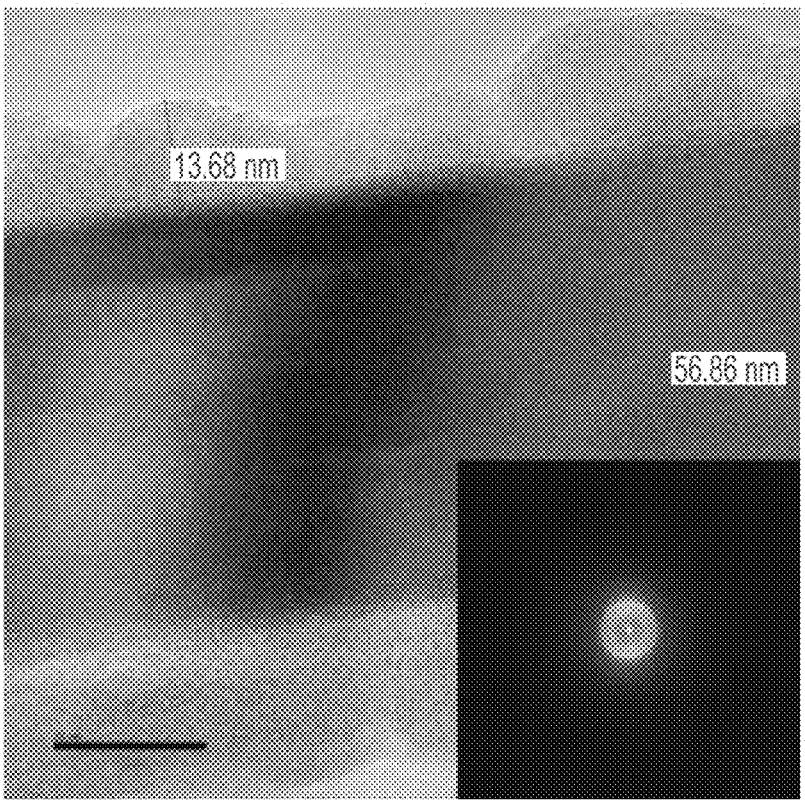
Figure 32E:
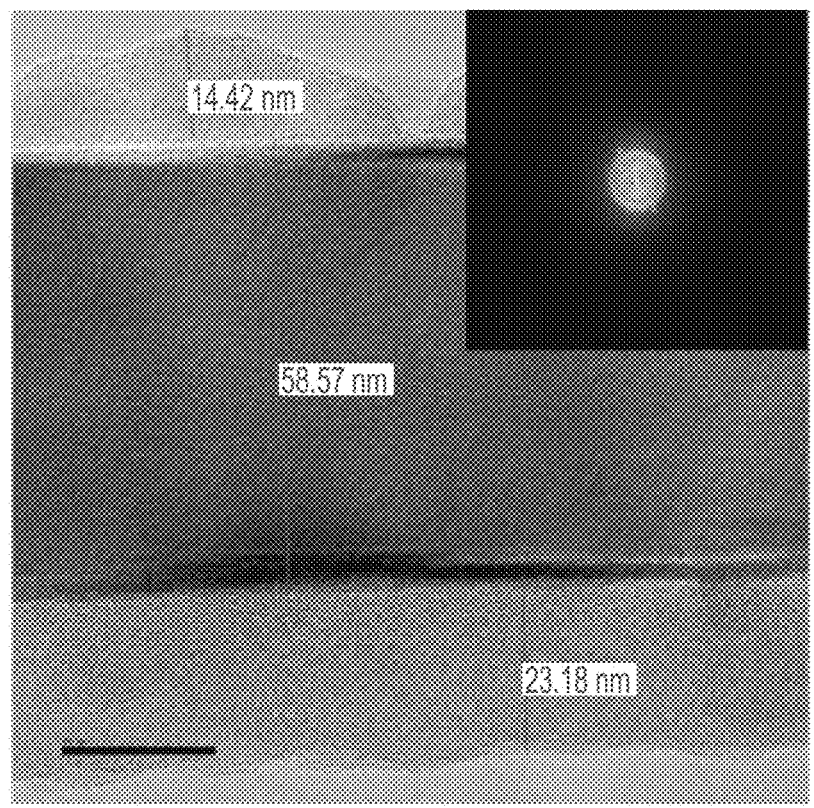
Figure 32F:
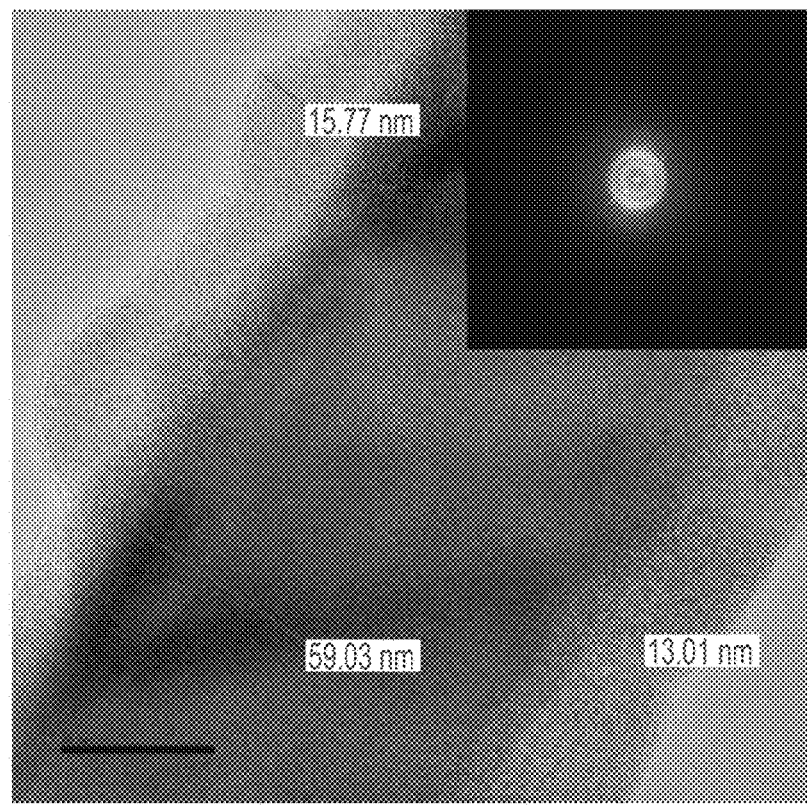

As shown in FIGS. 31A and 31D, the networks contained metal-based structures with typical diameters in a range of about 50-100 nm.

Electrical measurements of single metal-based nanowires harvested from the sponge-like layers were performed, showing relatively high conductivity values.

Upon the first high-temperature annealing step, a 3D sponge-like metal-based conductive network is obtained, associated with the original stainless steel substrate and highly stable mechanically. This 3D conductive sponge-like layer comprises a dramatically increased active surface, thereby serving as an excellent candidate for the further deposition of thin thickness-controlled silicon active shell layers.

The metal-based sponge-like surfaces were used as basis for further pyrolytic deposition of an amorphous silicon conformal layer. After the first annealing step and the formation of the metal-based sponge-like network structured layer, a thin thickness-controlled layer of amorphous silicon was conformally deposited on the metal-based sponge-like network surfaces, leading to a mesoscopic large-scale silicon conformal shell layer covering the whole metal-based network surface.

As a general procedure, the silicon conformal layer is created in situ in the CVD set-up at temperatures in a range of 380-550° C., for time periods of 30-180 minutes, depending on the desired degree of loading of silicon (e.g., based on final battery applications). Silane gas precursor in an argon or hydrogen carrier atmosphere is flowed at a rate of about 5 or about 12 sccm, respectively, at pressures in a range of 1-25 Torr.

This general procedure results in the formation of one-dimensional conductive metal-based cores achieved during the first high-temperature annealing step, covered conformally by a loading-controlled silicon layer, suitable for serving as active material for lithiation/de-lithiation applications (e.g., in a lithium ion battery anode).

Silicon loadings in the range of 0.1-15 mg/cm$^2$ are obtainable for silicon layers with a thickness in a range of 6-200 nm.

The resulting metal-silicon sponge-like core-shell structure displays conformal silicon coatings of controlled loading, high-mechanical stabilities, short lithium ion diffusion lengths through a silicon shell layer, high metal core chemical stability against lithium reactions, high electrical conductivity of metal-based core networks as well as high mechanical stability when performing as battery anode elements.

As shown in FIGS. 32A-32F, an amorphous silicon shell was deposited on the (crystalline) metal-based nanostructures, as determined using high-resolution transmission electron microscopy (for comparison, the magnification is similar to that in FIGS. 31A, 31C and 31D). The thickness of the silicon layer was typically in a range of about 10-20 nm.

Example 6

Electrochemical Characterization of 3D Silicon Nanostructures in Half Cells Versus Lithium Metal Anodes An electrochemical study of electrode materials was performed by analysis of impedance spectroscopy and cycling of electrochemical cells. The first stage of material study was characterization of the studied electrode vs. a lithium metal counter-reference electrode. This set of tests enables investigation of the electrode material parameters without complications associated with the limitations of a cathode. In this study the half-cell is composed of an electrode comprising SiNS (silicon nanostructures) on stainless steel net (prepared according to procedures described in Example 1) vs. lithium metal electrode. The aforementioned half-cell configuration enables assessment of the alloying-de-alloying process of a silicon nanostructure anode.

The following parameters were studied:
1. Capacity—reversible, irreversible and differential analysis (dq/dv)
2. Impedance—EIS (electrochemical impedance spectroscopy) at 1 MHz to 0.01 mHz
3. Rate capability in range of C/40 to 5 C
4. Cycle life cycling at ~1 C rate The following procedure was used to evaluate if a cell is acceptable for being part of the study. A non-acceptable cell is usually one which was damaged during SiNS anode preparation or during cell assembly.
a) EIS—measurement is typically performed in a frequency range of 1 MHz to 0.01 mHz and amplitude of 20 mV in with a scanner (e.g., Solartron™ or Bio-Logic™ scanner) every 100 cycles (after charge and discharge 100). Spectrum analysis was used to determine Rb, $R_{SEI}$ diffusion, Rt. The Randles circuit model used for analysis is depicted in FIG. 33.
b) Electrochemical cycling procedures used to study half-cells are summarized in Tables 7-9.

TABLE 7

Cycling procedure for initial capacity measurement

| Step | Current [mA] (approx. C rate) | Voltage window [V] | Rest [seconds] | Number of cycles |
|---|---|---|---|---|
| First cycle (SEI) | 0.1 mA (0.05 C) | 0.05-1 | 300 | 3 |
| Cycling | 1 mA (0.5 C) | 0.05-1 | 300 | 97 |

TABLE 8

Cycling procedure for determining half-cell cycle life

| Step | Current [mA] (approx. C rate) | Voltage window [V] | Rest [seconds] | Profile |
|---|---|---|---|---|
| Cycling | 1 mA (0.5 C) | 0.05-1 | 300 | 500 cycles at constant current of 1 mA, every 100 cycles perform 3 cycles at 0.1 mA |

TABLE 9

Cycling procedure for determining rate capability of half-cell

| Step | Current [mA] | Voltage window [V] | Rest [seconds] | Number of cycles |
|---|---|---|---|---|
| Cycling at C rate C/20 | 0.2 | 0.05-1 | 300 | 5 |
| Cycling at C rate C/8 | 0.5 | 0.05-1 | 300 | 5 |
| Cycling at C rate C/4 | 1 | 0.05-1 | 300 | 5 |
| Cycling at C rate C/2 | 2 | 0.05-1 | 300 | 5 |
| Cycling at C rate C | 4 | 0.05-1 | 300 | 5 |
| Cycling at C rate 2 C | 8 | 0.05-1 | 300 | 5 |
| Cycling at C rate C/20 | 0.2 | 0.05-1 | 300 | 5 |

Effect of Doping:

Anodes were prepared (according to procedures described in Example 1) by growing p-type silicon, as opposed to intrinsic silicon, and then characterized as described hereinabove. The anodes were then tested in half cells versus lithium metal CE-RE electrode. The results are presented in FIGS. 34A-35.

As shown in FIG. 35, overall performance of p-doped silicon was inferior to that of intrinsic silicon.

In view of these results, future studies used intrinsic silicon anode as a benchmark.

According to the literature, doping was expected to increase stability, in contrast to the above results. Without being bound by any particular theory, it is believed that boron ions in p-type silicon may migrate during lithiation and de-lithiation from the bulk of the structures to the surface, forming a glassy oxide that inhibits lithium diffusion.

Effect of Silicon Loading:

Silicon nanostructured anodes with different degrees of silicon loading were characterized using procedures described hereinabove. The cycle life (defined as the number of cycles before the cell reaches 70% of its initial capacity) was determined for anodes comprising intrinsic silicon nanostructures on stainless steel mesh in half cells versus lithium metal CE-RE electrode (counter electrode-reference electrode).

As shown in FIGS. 36 and 37, the cycle life of representative samples, upon cycling at 1.28 mA/cm$^2$, was longer than 100 cycles when silicon loading was 0.9 mg/cm$^2$ (FIG. 36), but considerably shorter at a higher silicon loading of 1.8 mg/cm$^2$ (FIG. 37).

These results suggest that a combination of relatively high silicon loading and relatively high current density promotes degradation, possibly due to enhanced SEI growth during cycling.

In an additional experiment, the cycle life of electrodes with a silicon loading of 2 mg/cm$^2$ was tested in a half-cell versus lithium metal.

As shown in FIG. 38, the cycle life of the tested cells (with silicon loading of 2 mg/cm$^2$) was considerably shorter than that of half cells with lower silicon loading (e.g., as shown in FIG. 36).

However, as shown in FIG. 49, anodes from the same series as shown in FIG. 38 exhibited a prolonged cycle life of over 400 cycles in full cells vs. NCA (lithium nickel cobalt aluminum oxide) cathode.

These results suggest that higher silicon loading is associated with increased cycling instability, which is express mainly in half cells. Half cells comprising electrodes with a relatively high silicon loading (e.g., as shown in FIG. 37, as well as in FIGS. 41 and 43) exhibited a shorter cycle life than half cells comprising electrodes with a lower silicon mass loading (e.g., as shown in FIG. 36, as well as in FIG. 40).

In half cells, the lithium metal electrode is in excess, such that the silicon anode is fully lithiated and de-lithiated. Full lithiation may be responsible for a short cycle life due to radical volume changes between charged and discharged states associated with pulverization of the silicon anode.

In addition, typically during post mortem analysis of half cells, a black deposit was found on the lithium metal surface, indicating formation of dendrites on the lithium. A dendritic lithium anode may facilitate rapid degradation of the cells. However, as the primary final goal is integration of a SiNS anode in full lithium ion cells, this phenomenon does not interfere with development.

Effect of Current Collector:

In order to create a current collector for the SiNS on stainless steel mesh, the backside of the electrode was generally coated by carbon paste, according to the following procedures (except when testing alternative methods and materials for creating current collectors):

The current collector layer was prepared by spreading conduction carbon slurry layer (containing Shawinigan Black, binder and toluene) on the back side of the anodes, before the vacuum drying. In order to study the influence of the current collector, the anodes were tested without conductive additive coating and with SWCNT suspension coating (from aqueous solution of PVP). The performance of anodes without carbon coating was then evaluated.

As shown in FIG. 39, the tested uncoated anodes performed poorly, especially at 1 mA.

As shown in FIGS. 40 and 41, carbon-coated SiNS electrodes (coated only on side of current collector) exhibit superior performance relative to corresponding uncoated SiNS electrodes, in half cells versus lithium metal.

This result indicates that the carbon ink does play a significant role in current conductivity, especially after the SEI builds and forms additional insulation on the back of the anode. It is clear that cells without ink have a reduced chance of providing high capacity at 1 mA.

Further tests were performed in order to assess the performance of a SWCNT (single-walled carbon nanotube) coating as current collector.

FIG. 42 shows cycling of four (duplicate) SWCNT-coated SiNS electrodes (1.15 mg/cm$^2$ silicon) in half cells vs. lithium metal.

FIG. 43 shows cycling of SWCNT-coated SiNS electrodes (2.2 mg/cm$^2$ silicon) in half cells vs. lithium metal.

These results indicate that SWCNT coating is suitable as current collector and can replace carbon coating. It is generally advantageous to replace carbon coating with SWCNT because the latter is a commercial solution with improved adhesion to the stainless steel mesh; whereas poor adhesion of the carbon coating to the mesh may cause short circuits.

The results of FIGS. 40-43 also indicate that relatively high silicon loading is associated with decreased cycling stability, as discussed hereinabove.

Application of an SWCNT coating from an N-methyl-2-pyrrolidone (NMP)-based dispersion (obtained from OCSiAl) was then tested, in samples with 1 mg/cm$^2$ silicon loading.

As shown in FIG. 44, half cells in which electrodes (~1 mg/cm$^2$ silicon loading) were coated using an NMP-based dispersion exhibited enhanced stability relative to similar SWCNT-coated electrodes (e.g., as shown in FIG. 42). One of the tested samples (#3) had still not reached the end of the cycle life after over 200 cycles.

These results indicate that applying a current collector using an NMP-based dispersion results in more intimate contact for current collector, leading to considerable enhancement in the stability of the anode.

Example 7

Formation and Growth Mechanism of Solid Electrolyte Interphase (SEI) of Silicon Anodes FIGS. 45A and 45B present Nyquist plots for charge (FIG. 45A) and discharge (FIG. 45B) of a half cell containing exemplary intrinsic silicon nanostructures versus lithium metal, as determined by impedance spectroscopy.

As shown in FIG. 45A, the resistance during charge grows with increasing voltage.

As the first circuit is attributed to solid electrolyte interphase (SEI) on the SiNS anode, these results indicate that the thickness of the SEI is growing with increasing voltage. Such a phenomenon is consistent with a breakdown and repair mechanism of the SEI on the SiNS anode, such as described in Peled et al. [*Nano Lett* 2015, 15:3907-3916] and Peled & Menkin [*J Electrochem Soc* 2017, 164:A1703-A1719].

As shown in FIG. 45A, the impedance during discharge is reduced with decrease of potential.

During discharge (alloying of the SiNS electrode with lithium), the lithium is inserted to the silicon electrode, causing volume expansion and cracks in the secondary porous layer of the SEI. The exposure of the thinner primary SEI reduces the impedance with decrease of potential. During charge (de-alloying of the silicon anode with lithium) the alloy volume is reduced and the opposite phenomenon occurs.

Without being bound by any particular theory, it is believed that capacity degradation originates primarily from the thickening of the SEI and the concomitant resistance increase. The continuous SEI growth is caused by the reduction of the electrolyte salt and solvents leading to precipitation of solids, and drying out of the cell. It is further believed that the thickness of a freshly formed SEI on lithium (or on other substrates) is only a few nanometers only (within the tunneling range of electrons), but that under open circuit voltage conditions, the thickness and the resistance of the SEI grow with time, and that this phenomenon is further aggravated upon cycling. Electrons diffuse and migrate from the lithium, or from the lithiated anode, through the SEI to the electrolyte. The electrons reduce the solvent and the electrolyte, leading to the formation of insoluble products, including lithium carbonate, lithium oxide, lithium fluoride, and several polymers. These byproducts precipitate on the anode, considerably increasing the thickness of the compact layer of SEI, or form a porous secondary layer.

In addition, it was determined by impedance spectroscopy and spectral analysis (as described herein) that the SEI resistance ($R_{SEI}$) decreases during lithiation, specifically during the first phase transformation of silicon to $\alpha$-$Li_2Si$ which occurs around 0.25 V (versus Li).

This result may be explained by the formation of a fresh and thus lower-resistance SEI due to the expansion of the SiNSs and by the increase of the surface area of the SiNSs.

These results suggest that an insufficiently stable SEI layer is a major contributor to the observed capacity loss.

Example 8

Electrochemical Characterization of 3D Silicon Nanostructures in Full Battery Cells Versus Commercial Lithium Ion Cathode Full lithium ion battery cells were assembled. The cells consisted of a commercial NCA (lithium nickel cobalt aluminum oxide) cathode (Tadiran) and a SiNS anode (silicon nanostructures on stainless steel mesh, 0.78 $cm^2$ area and 0.94 mg silicon, prepared according to procedures described in Example 1). The electrolyte was 0.95 M $LiPF_6$ and 0.05 M LIBOB (lithium bis(oxalate) borate) in EMC:DMC:FEC:PC (ethyl methyl carbonate: dimethyl carbonate: fluoroethylene carbonate: propylene carbonate) [3:3:3:1] (obtained from 3M). The cells were cycled between 4 V and 2.8 V at 0.128 mA and 1.28 mA.

As shown in FIGS. 46A and 46B, the tested cells exhibited poor performance, with a cycle life of less than 10 cycles and very low efficiency.

The abovementioned cells were not balanced, meaning that there was a cathodic excess resulting from sub-optimal silicon loading. The motivation for cathodic excess in full cells was to load the cell with sufficient lithium, originating from the cathode, in order to achieve a balanced cell after SEI formation.

However, the above results suggest that cathodic excess may shorten the cycle life of the full cells.

Without being bound by any particular theory, it is believed that the following degradation mechanism occurs in full cells with excess cathode material and silicon anode: the capacity of the silicon anode decreases during cycling, causing increase of the minimal voltage on the anode and as a result, and increase in the maximal voltage on the cathode. Increasing the maximal voltage on the cathode beyond the stability range leads to fast degradation of the cathode material, and as a result, shortens the cycle life of the full cell.

In addition, a study of the cathode was performed. Half-cells of NCA versus lithium metal were cycled between 4.4 and 3.5 V and between 4.2 and 3.5 V at current densities of 0.06 $mA/cm^2$ and 0.6 $mA/cm^2$.

As shown in FIG. 47, the irreversible capacity of the tested NCA half cells was higher for the range of 4.4-3.5 V than for the range of 4.2-3.5 V.

These results indicate that more lithium is extracted from the cathode when cycling until higher voltage, resulting in higher capacity.

As shown in FIG. 48, exemplary NCA cathodes performed similarly well with different tested electrolytes.

Cycling NCA-SiNS full cells with an anodic excess between 4 and 3 V was therefore tested.

Full cells were constructed using SiNS anodes (2 $mg/cm^2$ silicon) and NCA cathodes. The carbon current collector was SWCNT carbon ink; and the electrolyte was 0.85 M $LiPF_6$ in EC:DEC (ethylene carbonate/diethyl carbonate) with 2% VC (vinylene carbonate) and 15% FEC (fluoroethylene carbonate). The cells were cycled between 4 and 3 V for 500 cycles at 0.88 $mA/cm^2$, with four cycles at 0.088 $mA/cm^2$ every 100 cycles.

As shown in FIG. 49, at cycle 400 the cells had lost about 44% of the initial capacity (as determined at 0.1 mA current density), a relatively low rate of capacity decrease, and the series of 4 cells exhibited high reproducibility.

Similarly, as shown in FIG. 50, an exemplary cell with SiNS anode (0.88 $mg/cm^2$) versus LFP (lithium iron phosphate) cathode exhibited a cycle life of over 400 cycles, with 32% capacity loss.

The increased stability of the LFP-based cell was attributed to the increased stability of the LFP cathode.

In order to study the voltage distribution between the electrodes in a full cell, a 3-electrode cell was assembled. The cell was assembled in an EL CELL REF apparatus and consisted of an NCA cathode as working electrode (WE), a SiNS anode as counter electrode (CE), and a lithium metal reference electrode (RE). The voltage was recorded during charge (lithium alloying with silicon/intercalation).

In this experiment, it was observed that as the cathode is in excess, the silicon anode is lithiated over its available capacity, and after lithiation is complete, there is a deposition of lithium metal on the silicon anode.

A voltage drop to about −0.01 V was observed on the anode (CE) at the end of charge, at which time there was about 4 V on the cathode and about −0.01 V on the anode.

The cathode was stable up to at least 4.4 V, as exemplified hereinabove. Without being bound by any particular theory, it is believed that the voltage on the silicon based anode shouldn't be lower than ~50 mV.

This result suggests that low voltage on the silicon anode may cause fast degradation of the full cells compared to the SiNS-lithium metal half-cells.

The above results indicate that cell degradation is composed of rise of the voltage on both electrodes, and that in order to accurately test the actual cycle life of the SiNS anodes in full cells, it is necessary to build balanced cells either by using higher silicon loading or by using cathodes with lower capacity (e.g., by using thinner electrodes).

A full NCA-SiNS cell in a 2-electrode configuration was assembled and cycled between 4 and 3 V at 0.128 mA/cm² (normalized per SiNS electrode area). The cell passed the acceptance criteria and was then cycled to establish cycle life. However, as the highest silicon loading that was deposited so far is 2.2 mg/cm² (about 2 mAh/cm²) and the commercial cathodes used have a capacity of 2.6 mAh/cm², such full cells still have cathodic excess.

Without being bound by any particular theory, it is believed that in the case of cathodic excess, the previously described failure mechanism occurs: the excess lithium from the cathode deposits on the anode, and lithium metal particles and dendrites are formed causing additional irreversible capacity due to SEI growth on new exposed lithium surface. Once the capacity of the anode is reduced, the minimal voltage on the anode during charge rises, and as a result the maximal voltage on the cathode during charge rises. As a consequence, the cathode excess causes degradation of the cell and shortens the cycle life.

Example 9

Effect of Silicon Nanostructure Modification Via Alumina Deposition

Intrinsic Si nanostructured anodes were coated by alumina ALD coating (35 cycles=about 5 nm thickness) and characterized as described hereinabove in Example 2. The cycle life (defined as the number of cycles done before the cell reaches 70% of its initial capacity) was then determined for the silicon-based anodes on stainless steel mesh (alumina coated) in half cells versus a lithium metal CE-RE electrode. Silicon-based anodes with different silicon loadings were compared.

As shown in FIG. 51, an exemplary cell with silicon loading of 1.2 mg/cm² lost 30% of its capacity after about 500 cycles at 0.128 mA/cm²; whereas at a higher current density of 1.28 mA/cm², the cell capacity decreased to 70% of its initial capacity at around cycle 200.

In comparison, as shown in FIG. 52, an exemplary cell with silicon loading of 2.2 mg/cm² lost less than 30% of its capacity after 200 cycles at 0.128 mA/cm²; whereas at a higher current density of 1.28 mA/cm², the cell capacity decreased to 70% of its initial capacity at around cycle 40.

The above results indicate that relatively high current density and relatively high silicon loading are both associated reduced cycling stability.

SiNS anodes (2.4 mg/cm²) were coated with alumina by atomic layer deposition, as described hereinabove, and carbon coating was effected using SWCNTs. The alumina coating thickness was 5 nm (35 coating cycles) or 10 nm (70 coating cycles).

As shown in FIG. 55, a silicon anode coated with a 10 nm alumina coating exhibited better stability than did a silicon anode coated with a 5 nm alumina coating.

These results indicate that the deposited alumina coating enhances anode performance, particularly with respect to stability and cycle life.

As shown in FIGS. 56A and 56B, a deposited alumina coating reduced the capacity of silicon anodes relative to that of uncoated anodes in full electrochemical cells, to a degree correlated with coating thickness, with no clear difference in stability between the coated and uncoated anodes.

Without being bound by any particular theory, it is believed that because the anodic capacity is almost double that of the tested cells, the cells are limited by the cathode, such that the silicon may not lithiate sufficiently to allow a limiting protective layer to enhance performance. It is further believed that the use of different electrolytes in these samples is not responsible for the variance as they have proven themselves to be quite similar in the past.

Example 10

Effect of Thermal Treatment on Silicon Nanostructure Anode Performance

Thermal treatment was effected in order to improve electrode flexibility and release internal stresses. The thermal treatment procedures are presented in Table 10 below.

TABLE 10

Exemplary thermal treatment procedures

| Procedure No. | Stage | Time and temperature | profile |
|---|---|---|---|
| 1 | 1 | 5 hours at 25-400° C. | linear ramp |
|  | 2 | 2 hours at 400° C. | constant temperature |
|  | 3 | 5 hours at 25-400° C. | linear ramp |
|  | 4 | 4 hours at 400° C. | constant temperature |
|  | 5 | 5 hours at 25-400° C. | linear ramp |
|  | 6 | 6 hours at 400° C. | constant temperature |
| 2 | 1 | 5 hours at 25-400° C. | linear ramp |
|  | 2 | 2 hours at 400° C. | constant temperature |

As shown in FIGS. 57A and 57B, annealed electrodes exhibited wire-like morphology (FIG. 57B), whereas non-annealed electrodes exhibited more particle-like morphology (FIG. 57A). It is noted that FIGS. 57A and 57B present areas demonstrating large morphological variation, and are not necessarily representative.

However, the variations in morphology did not result from the annealing treatment, but existed prior to annealing due to the electrodes being cut from different areas of the original sample (prepared as described hereinabove).

The capacity of various annealed (full symbols) and non-annealed (open symbols) anodes during cycling is presented in FIG. 58.

As shown in FIGS. 58 and 59, whereas the tested non-annealed silicon anodes typically exhibited a relatively steep degradation between cycle 4 (when the current density increased to ~1 C) to cycle 20 (with generally only moderate degradation thereafter), such degradation was not observed in the tested annealed anodes.

In addition, as shown in FIG. 59, the annealed anode with wire line morphology exhibited a loss in capacity which was an order of magnitude less than that of non-annealed anode (0.0094% vs. 0.26% per cycle), although the improvement may be also be associated with the difference in morphology.

These results suggest that the annealing process alters the degradation mechanism in a manner which may significantly extend cycle life, although the improvement may also be associated with the difference in morphology.

Further experimentation can ascertain whether the annealing or the morphology is the dominant factor in enhancing cycle life, by testing each parameter separately.

Example 11

Effect of Polyelectrolyte Wet Coating on Silicon Nanostructure Anode Performance In order to enhance cycle life of silicon nanostructure anodes, modification by polyelectrolyte wet coating was investigated. The goal of the wet coating is to form a thin conformal polyelectrolyte layer which will serve as artificial SEI. LiPAA (lithium salt of polyacrylic acid), NaCMC (sodium carboxymethylcellulose) and sodium alginate, which are single ion conductors (lithium or sodium) soluble in water, were selected as polyelectrolytes. Water was chosen as solvent due to the presumed hydrophilic character of silicon nanostructures. The coating was effected by transferring 1% polyelectrolyte solution through the electrode. A "filtration" process was effected by placing the electrodes in a Buchner funnel and drawing the polymers into pores by vacuum.

As shown in FIG. 60, no significant effect was exhibited by LiPAA, NaCMC or sodium alginate coatings on anode cycling or capacity.

As anode capacity was not affected, such coatings may be useful for stabilizing the anodes in certain embodiments.

Higher concentrations of polyelectrolytes in aqueous solution, and other polymers (such as PVP) dissolved in organic solvent, and tested as solutions for wet modification.

Example 12

Disilane as Precursor Gas for Preparing Silicon Nanostructures

Silicon nanostructures were prepared on a steel mesh according to procedures such as described in Example 1, except that silane ($SiH_4$) precursor gas was replaced with disilane ($Si_2H_6$). Disilane is heavier and more reactive than silane, leading to a reduction in the necessary temperature and growth times required for the preparation of the anodes, and also giving preference to the catalytic reaction of the gas on the stainless steel surface over the pyrolytic reaction. This elevates the efficiency of the whole growth process.

As shown in FIGS. 61A-63B, the morphology of the SiNSs grown with disilane was dependent on the growth conditions.

These results indicate that morphology (e.g., thinner, longer and more uniform wires) and silicon loading obtained using disilane can be controlled based on growth conditions (e.g., gas flow rate and/or temperature), for example, within a range of 380-460° C., 1-25 Torr pressure, and disilane gas flow as low as 1 sccm.

Example 13

Effect of Cathode Type on Silicon Nanostructure Anode

In order to further assess the degradation mechanism and to compare degradation in cells with different types of cathode, 3-electrode cells were assembled in a coin cell comprising a silicon nanostructure (SiNS) anode and either an NCA cathode or an LFP cathode. This new coin cell assembly was achieved with a thin copper tab placed between 2 separators with one end covered with metallic lithium as reference and the other end protruding from under the top of the cell and insulated by the upper separator.

As shown in FIG. 64, cell degradation is associated with a rise in minimal voltage on the silicon-containing anode and a rise in the maximal voltage of the cathode (NCA), as determined using a 3 electrode cell vs cell capacity.

This result indicates that the rise of the minimal voltage on silicon anode is caused by degradation and capacity decrease of the silicon anode, due to the previously discussed degradation mechanisms, and the maximal voltage of the cathode rises in the same manner as the minimal anodic voltage, leading to further degradation of the cathode and increased cell degradation.

As shown in FIGS. 65 and 66, a full cell with SiNS anode and LFP cathode degraded more rapidly than a full cell with SiNS anode and NCA cathode, even though a LFP cathode is generally considered the more stable cathode.

In order to understand the reason for the different degradation rates for different cathodes, the voltages of the electrodes versus the reference were examined. Specifically, the end voltages of the anode as the cell reached its cut-off voltages at charge or discharge were plotted against cycle number.

As shown in FIG. 67, in cells with either LFP or NCA cathodes, the end voltages on the anode rose steadily upon cycling, as they did accordingly on the cathodes; but the anode that was coupled with NCA exhibited a voltage window of approximately 0.45 V, whereas the anode coupled with LFP exhibited a 0.55 V window. In addition, the anode coupled with NCA ran at a window that was on average about 0.1 V below the window of the anode coupled with LFP.

These results indicate that the silicon nanostructures coupled with NCA were de-lithiated to a lesser extent and therefore less cracking occurred as a result of silicon contraction.

In view of these results, as well as the NCA's higher energy density, NCA cathodes were selected for use in additional studies.

Example 14

Scaled Up Production of Cylindrical ⅓ AAA Full Cells Comprising Silicon Nanostructure Anodes Industrial prototypes of full cells (cylindrical ⅓ AAA cells) were prepared and subjected to cycling for 500 cycles. Exemplary cells are depicted in FIG. 68.

As shown in FIG. 69, although one of the three tested cells performed poorly from the start, each of the other two cells were cycled for 600 cycles, and exhibited less than 50% capacity loss after 500 cycles at C/20 rate, with initial capacities of approximately 3 mAh per $cm^2$ and 1200 mAh per gram silicon.

The cell performance (both calculated and tested) upon cycling is summarized in Table 11 below, and compared with that of a corresponding cell which differs only in the presence of a commercial graphite anode.

TABLE 11

Performance parameters of 1/3 AAA cell with either
SiNS anode or commercial graphite anode

| | | Model | |
|---|---|---|---|
| | | 1/3 AAA cell (SiNS anode) | 1/3 AAA cell (commercial graphite anode) |
| Rated Capacity | | 54 mAh calculated 75 mAh | calculated 54 mAh |
| Minimum Capacity | | 46 mAh | NA |
| Maximum Charge Voltage [V] | | 4.1 V | 4.1 V |
| Standard Discharge (at 30° C.) | Discharge cut-off voltage | 3 V | 3 V |
| Standard Charge (CC) | Maximum Charge Voltage | 4 V (3.8 V nominal) | 4 V (3.8 V nominal) |
| | Maximum Charge Current | 0.22 C 0.01 A(CC) | NA |
| | Charge Time | 4.3 hours | NA |
| Maximum Diameter | | 10.1 mm | 10.1 mm |
| Maximum Height | | 16.0 mm | 16.0 mm |
| Weight | | 4.4518 grams | NA |
| Impedance (high F) | | 3.6 ohm | NA |
| Energy density [Wh/l] | | 163 (227 calculated) | 174 calculated |
| Cycle life | | 500 | 500-1000 |

As shown in Table 11, the calculated energy density of the cell was higher by about 30% than the calculated commercial cell (of the same dimensions) with a graphite anode.

Although the experimentally determined energy density was lower by 6% due to stability issues (30% irreversible capacity), it is believed that this can be overcome by optimization.

In full cells, the silicon capacity of 3000 mAh per gram silicon isn't achieved because the voltage window and the cell capacity are limited by the cathode.

Cycling of the cathode to higher voltage (in order to get deeper lithiation of the silicon) will result in fast degradation of the cell.

The cathode capacity is determined by it maximal thickness which is limited by diffusion.

A second batch of anodes was then used to assemble eleven ⅓AAA cells were assembled, of which nine were tested under the same testing conditions as the first batch (C/20 and C/60), and two were cycled by at C/3 in a voltage range of 2.9-4 V.

As shown in FIGS. 70 and 71, the stability of the cells (second batch) at C/6 and C/20 was inferior to that of the cells of the first batch, although the initial capacities of the cells was higher—approximately 4 mA/cm² and 1800 mAh/$g_{Si}$.

The experiments using a C/3 rate served as a basic rate capability test, and provided encouraging results.

As shown in FIG. 71, upon doubling the current density from C/6 to C/3, and broadening the voltage range by 0.1 V, the cells still showed the same degradation rate as observed at C/6 (FIG. 70).

These results suggest that the higher degradation rate in the second batch may stem from inaccurate balance of the cells or mechanical damage inflicted on the anodes during assembly that reduced the amount of effectively active silicon.

Example 15

Modification of Silicon Nanostructure Anode with Carbon Coating

The effect of carbon coating of silicon nanostructures was further investigated. Coating of silicon nanostructures was therefore effected both on the side of the anode facing the cathode, in addition to the coating the (opposite) side of the anode having a current collector. Such coating is therefore referred herein as "double" coating.

Single-walled carbon nanotubes were selected due to its higher conductivity and lower weight percent. Active material loading was 2.4 mg/cm² silicon, tested under standard conditions.

As shown in FIG. 72, double coating with single-walled carbon nanotubes didn't significantly affect the cycling stability of the anodes; whereas double coating with single-walled carbon nanotubes followed by pyrolysis for 1 hour at 750° C. in an argon-hydrogen atmosphere resulted in enhanced stability relative to the uncoated reference.

As shown in FIGS. 73A and 73B, the silicon nanostructures are covered by a web of SWCNTs, indicating that SWCNTs form a conducting network around the silicon nanostructures.

In addition, as shown in FIG. 73B, the silicon nanostructures exhibited structural stability upon pyrolysis.

Without being bound by any particular theory, it is hypothesized that the pyrolysis forms stronger chemical bond between the silicon or silicon oxide and the SWCNTs.

Taken together, the above results suggest that incorporation of carbon nanotubes results in percolation of the carbon and increased electronic conductivity of the anode. The expected result of the electronic conductivity increase is the enhancement of power capabilities of the anode and reduction of the degradation rate during cycling. Degradation may decrease due to grafting of the silicon by the carbon nanotube network, thereby reducing damage associated with volume changes; and/or due to a rise in the capacity retention by reducing loss of electrical conductivity among silicon nanostructures (e.g., between the nanostructures and the mesh).

As a goal of the carbon nanotube coating is to cover commercial-sized electrodes, samples have been submerged in diluted nanotube suspensions at different concentrations in different solvents. In view of the importance of the ability of suspensions to disperse the carbon nanotubes and wet the silicon, both water and water/ethanol (1:1) were tested as solvent. In both cases, commercial TUBALL suspension with 0.2% SWCNTs was diluted by a factor of 6 with either water or water/ethanol.

As shown in FIG. 74, water/ethanol suspension resulted in better cycling performance in half-cells with a regular 1-sided coating, with the samples coated with aqueous suspension crashing after no more than 50 cycles.

As further shown therein, the advantage of the carbon nanotube coating diminished after cycling at 0.1 mA at cycles 101-103, suggesting that the SEI sedimentation at low current density was not mitigated by the carbon nanotube coating.

Without being bound by any particular theory, it is believed that the SEI formed at low current density separated the silicon from the carbon nanotubes, thereby negating the effect of the carbon nanotubes.

Full cells were also assembled with anodes that were coated with carbon nanotube suspension as a stabilizing agent. The anodes were either coated manually on both sides, coated and pyrolyzed at 750° C., or submerged in diluted suspensions (once in an aqueous suspension and once in water/ethanol).

As shown in FIG. 75, the best performance in full cells resulted from coating the anodes on both sides with no further treatment (disregarding spikes in capacity due to equipment issues), in contrast to the results described hereinabove in half-cells, in which pyrolyzing the anode enhanced performance, and dilution of the nanotube suspension with ethanol enhanced performance.

Taken together, these results indicate that coating silicon nanostructures with carbon, such as carbon nanotubes, on a side of the anode facing the cathode can enhance performance of cells comprising silicon nanostructure anodes (e.g., separately from the enhancement of current collection by carbon discussed hereinabove).

Example 16

Mechanical Properties of Silicon Nanostructure Anodes

During the production of cylindrical lithium ion batteries, the anodes are commonly rolled to small diameters (~2 mm) and stretched by the roll-to-roll production process. The ability to withstand such mechanical stresses while preserving performance was therefore assessed. In addition, it is desirable to define the mechanical properties of the anode in the acceptance test plan.

The following tests are used to assess mechanical properties:

Roll test—in order to examine the durability of the anode layers (stainless steel and silicon nano structures) when it rolled to different diameters; appearance of cracks and peeling on an electrode surface that experienced tensile stresses is assessed;

Tensile test—in order to evaluate ability to support load (tensile strength=maximal amount of stress before failure, yield strength=stress at which plastic deformation begins); specimen is gripped in a tensile testing machine and loaded in uniaxial tension until failure;

Peel test—adhesive tape used to assess tearing away of silicon nanostructures from the stainless steel.

Tensile tests were performed using a device (depicted in FIG. 76) which enabled testing in situ inside an environmental scanning electron microscope (eSEM).

As shown in FIG. 77 and in Table 12 below, HF treatment enhanced the ductility of stainless steel samples (with higher levels of strain at a given degree of stress, and failure occurring at higher degrees of strain); and deposition of silicon nanostructures enhanced brittleness.

TABLE 12

Yield strength, tensile strength and elongation of 316 L stainless steel (SS) mesh samples, with or without HF treatment, and from 4 batches in which silicon nanostructures (SiNS) (at various loading values) were deposited on the mesh (following HF treatment)

| | Si loading [mg/cm$^2$] | yield strength $\sigma_Y$ [MPa] | Young modulus $E_{Y.M}$ [GPa] | tensile strength $\sigma_{UTS}$ [MPa] | % Elongation |
|---|---|---|---|---|---|
| Stainless Steel (SS)316 L | — | 46 | 3.2 | 92 | 21.4 |
| SS + surface treatment with HF | — | 28 | 2.6 | 71 | 19.5 |
| SS + SiNS BATCH 1 | 2.1 | 65 | 7.5 | 91 | 10.1 |
| SS + SiNS BATCH 2 | 2 | 54 | 5.2 | 83 | 22.7 |
| SS + SiNS BATCH 3 | 1.3 | 36 | 2.9 | 63 | 11.6 |
| SS + SiNS BATCH 4 | 2.08 | 53 | 6.2 | 82 | 14.8 |

As further shown in Table 12, the samples (batches 1 and 4) with the highest silicon loading had the highest Young modulus, and the sample with the lowest silicon loading (batch 3) had the lowest Young modulus, suggesting that silicon loading is correlated to Young modulus (and thus to rigidity). Similar relationships are shown between silicon loading and yield strength and tensile strength.

Comparison of the above results with reported values in the literature for 316L stainless steel (ultimate tensile strength=485 MPa, yield strength (0.2%)=170 MPa) indicate that the mesh described herein is considerable more flexible and weaker, as expected when comparing mesh versus bulk material.

As shown in FIGS. 78A and 78B, the silicon and silicide layer were not detached from the steel fibers upon breakage of the fibers in a sample from one batch (FIG. 78A, batch 1), showing good adhesion consistent with the higher ultimate tensile strength shown in FIG. 77; whereas in a sample from another batch (FIG. 78B, batch 2) the silicon and silicide layer were detached from the steel fibers upon breakage, yet remained intact, suggesting poorer adhesion, higher ductility (the steel fiber is stretched thin beneath the silicon shell) and lower mechanical strength, also consistent with the results shown in FIG. 77.

As shown in FIG. 79A, there are two distinct layers of silicides (an inner layer and an intermediate layer) between the stainless steel fibers and the silicon nanostructures ("Layer 3"), as revealed by a peel test.

As shown in FIG. 79B, the inner layer is silicon-poor ("Layer 1") and the intermediate layer is silicon-rich ("Layer 2"), as determined by energy-dispersive X-ray spectroscopy.

Anode layers (silicon nanostructures on stainless steel mesh) were rolled into cylinders of different diameters, and examined by scanning electron microscopy. The correlation between observed defects (e.g., cracks and/or pilling) and diameter is determined.

Rolled and non-rolled anodes were electrochemically characterized versus lithium, in order to assess the effect of rolling on anode performance. Anodes from 3 batches were compared.

As shown in FIGS. 80A-80D, batch 1, which exhibited good adhesion of silicon to steel fibers (as discussed hereinabove, e.g., with respect to FIGS. 80A-80B), also exhibited the lowest decrease in capacity after rolling. As further shown therein, batch 2, which exhibited the greatest decrease in capacity after rolling (and poorer silicon adhesion), also exhibited a decrease in standard deviation after; whereas batches 1 and 3 exhibited an increase in standard deviation.

These results indicate that strong silicon adhesion is associated with durability towards rolling.

Example 17

Combination of Silicon Nanostructure Anode and Solid Electrolyte

In order to develop a solid polymer electrolyte (SPE), a mixture of polyethylene oxide (PEO) and polyethylene glycol (PEG) was incorporated with a lithium salt (LiTFSI) and ceramic fillers used to enhance the ionic conductivity of the SPE.

A mixture of PEO (n=20) and PEG (n=2000) was dissolved in acetonitrile for 12 hours within a glovebox. The ceramic filler ($Al_2O_3$ powder, 3% (v/v)) and the salt (LiTFSI, molar ratio of 1:20 with PEO) were then added and the mixture as mixed for another 12 hours. Part of the prepared solution was cast in a polytetrafluoroethylene template and dried to be used as a separator. Anodes with 2 mg silicon per $cm^2$ were then coated with 70 microliters of the mixture and dried. Both anodes and separators were first dried in the glovebox and then dried in vacuum overnight at 65° C.

FIGS. 81A and 81B show representative anodes covered with an SPE with (FIG. 81B) or without (FIG. 81A) alumina. The corner of the corner of the anode is exposed for comparison.

A shown in FIGS. 81A and 81B, silicon nanostructures are not visible in the SPE-covered portion, indicating thorough coverage by the SPE.

Similarly, no more than 1% (by weight) of silicon was detected by EDX spectroscopy, further confirming thorough coverage by the SPE.

Cells were built with the coated anodes, the prepared separators and lithium electrodes, without any liquid electrolytes. The cells were then cycled at 110° C. The first cycles of an exemplary cell with the SPE are presented in FIG. 82.

A second SPE was prepared using fumed silica (0.04% (v/v)) instead of $Al_2O_3$. Cells were prepared using this SPE, and cycles as described hereinabove.

As shown in FIG. 83, the alumina-containing and silica-containing SPEs each exhibit sufficient conductivity of ions to allow the SiNS to lithiate and de-lithiate.

In order to enhance performance, different lithium salts (e.g., LiFSi), different ceramic fillers and different PEO:PEG ratios are tested, using procedures such as described hereinabove.

The effect of addition of ethylene carbonate (EC) and/or fluoroethylene carbonate (FEC) on SEI properties is also tested.

A flexible micro-battery is then constructed using a silicon nanostructure-containing anode (as described herein), an SPE (as described herein) and a layer of cathodic active materials (e.g., LFP).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A composite electrode, comprising:
   a stainless steel substrate; and
   a plurality of silicon-containing nanostructures extending from the stainless steel substrate,
   wherein:
   said stainless steel substrate is a HF-treated stainless steel substrate,
   said substrate is devoid of an externally added catalyst material, said plurality of silicon-containing nanostructures form a three-dimensional network in which at least a portion of said plurality of silicon-containing nanostructures are fused with at least one other silicon-containing nanostructure, and in at least a portion, or in all, of said plurality of silicon-containing nanostructures, each of said silicon-containing nanostructures:

is devoid of said externally added catalyst material;
is devoid of a noble metal;
comprises copper along a longitudinal direction of said silicon-containing nanostructures at an atomic ratio of 0.1%±0.05% relative to silicon, said copper originating from said HF-treated stainless steel substrate; and
comprises nickel silicide along a longitudinal direction of said silicon-containing nanostructures.

2. The composite electrode of claim 1, wherein at least a portion of said silicon-containing nanostructures is devoid of a metallic material usable as a non-silicon catalyst in vapor-liquid-solid growth of silicon nanostructures.

3. The composite electrode of claim 1, wherein each of the plurality of silicon-containing nanostructures is devoid of a non-silicon catalyst material.

4. The composite electrode of claim 1, wherein in at least a portion, or in all, of the plurality of silicon-containing nanostructures, each silicon-containing nanostructure comprises along a longitudinal direction thereof one or more metal constituents originating from said HF-treated stainless-steel substrate, and said metal constituent is selected from nickel, copper and iron.

5. The composite electrode of claim 1, wherein in at least a portion, or in all, of said plurality of nanostructures, each of the silicon-containing nanostructures comprises along at least a portion of a longitudinal direction thereof a metal silicide extending from said HF-treated stainless-steel substrate.

6. The composite electrode of claim 1, wherein in at least a portion, or all, of the plurality of silicon-containing nanostructures, each of the silicon-containing nanostructures comprises a crystalline core and a semi-amorphous shell.

7. The composite electrode of claim 1, wherein in at least a portion, or in all, of the plurality of silicon-containing nanostructures, each silicon-containing nanostructure has a length of between 20 micrometers and 300 micrometers.

8. The composite electrode of claim 1, wherein in at least a portion, or in all, of the plurality of silicon-containing nanostructures, each silicon-containing nanostructure has a diameter of between 10 nm and 300 nm.

* * * * *